(12) United States Patent
Dayton et al.

(10) Patent No.: US 10,371,192 B2
(45) Date of Patent: *Aug. 6, 2019

(54) WELDLESS BUILDING STRUCTURES

(71) Applicants: NUCOR CORPORATION, Charlotte, NC (US); ASIA FASTENING (US), INC., Wilmington, DE (US)

(72) Inventors: Lionel E. Dayton, Decorah, IA (US); Richard W. Lukes, Decorah, IA (US)

(73) Assignees: Nucor Corporation, Charlotte, NC (US); Asia Fastening (US), Inc., Wilmington, DE (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/722,509

(22) Filed: Oct. 2, 2017

(65) Prior Publication Data

US 2018/0073541 A1    Mar. 15, 2018

Related U.S. Application Data

(63) Continuation of application No. 14/988,314, filed on Jan. 5, 2016, now Pat. No. 9,797,430, which is a
(Continued)

(51) Int. Cl.
*E04B 1/24* (2006.01)
*F16B 7/18* (2006.01)
(Continued)

(52) U.S. Cl.
CPC .............. *F16B 25/103* (2013.01); *E04B 1/24* (2013.01); *E04B 1/38* (2013.01); *E04B 1/4157* (2013.01); *E04B 5/40* (2013.01); *E04C 3/11* (2013.01); *F16B 7/18* (2013.01); *F16B 7/185* (2013.01); *F16B 25/0021* (2013.01); *F16B 25/0057* (2013.01); *F16B 25/0063* (2013.01); *F16B 25/0084* (2013.01); *F16B 25/10* (2013.01);
(Continued)

(58) Field of Classification Search
CPC .............................. F16B 25/103; F16B 25/084
USPC ..................... 411/387.8, 387.4, 387.1, 387.2
See application file for complete search history.

(56) References Cited

U.S. PATENT DOCUMENTS 4,192,217 A * 3/1980 Schwartzman ..... F16B 25/0084
411/387.8
4,781,506 A * 11/1988 Roberts ............... F16B 25/0084
408/230
(Continued)

*Primary Examiner* — Paola Agudelo
(74) *Attorney, Agent, or Firm* — Hahn Loeser & Parks LLP

(57) ABSTRACT

A building structure including a first building member and a second building member may be connected by a plurality of fasteners, each fastener having a head, a threaded portion having a through hardness of between HRB 70 and HRC 40, a thread-forming portion of at least HRC 50 hardness enabling the fastener to form threads in at least the second steel building member, and a fluted lead portion of at least HRC 50 hardness with a nominal diameter between 70 and 95% of major diameter, such that the fastener is capable of providing a ratio of strip torque to thread-forming torque of at least 3.0 and a ratio of strip torque to drive torque greater than 6.0 when the second steel building member having a thickness of 0.25 inch and the fluted lead portion having at least one diameter within nominal diameter between 80 and 98% of major diameter.

23 Claims, 100 Drawing Sheets

Related U.S. Application Data continuation of application No. 14/012,526, filed on Aug. 28, 2013, now Pat. No. 9,267,527, which is a continuation of application No. 13/031,181, filed on Feb. 18, 2011, now Pat. No. 8,529,178.

(60) Provisional application No. 61/306,309, filed on Feb. 19, 2010.

(51) Int. Cl.

| | | |
|---|---|---|
| *F16B 25/10* | (2006.01) | |
| *E04B 5/40* | (2006.01) | |
| *E04C 3/11* | (2006.01) | |
| *F16B 25/00* | (2006.01) | |
| *E04B 1/38* | (2006.01) | |
| *E04B 1/41* | (2006.01) | |

(52) U.S. Cl.
CPC .... *F16B 25/106* (2013.01); *E04B 2001/2415* (2013.01); *E04B 2001/2418* (2013.01); *E04B 2001/2448* (2013.01); *E04B 2001/2454* (2013.01); *E04B 2001/2457* (2013.01); *E04B 2001/2463* (2013.01); *E04B 2001/2472* (2013.01); *E04B 2001/2484* (2013.01); *E04B 2001/2487* (2013.01); *E04B 2001/2496* (2013.01)

(56) References Cited

U.S. PATENT DOCUMENTS

| | | | | |
|---|---|---|---|---|
| 5,141,376 A | * | 8/1992 | Williams | F16B 25/0021 411/387.4 |
| 5,294,227 A | * | 3/1994 | Forster | F16B 25/0026 411/386 |
| 5,597,357 A | * | 1/1997 | Roberts | B21H 3/027 470/9 |
| 5,827,030 A | * | 10/1998 | Dicke | F16B 25/0015 411/387.4 |
| 2003/0143057 A1 | * | 7/2003 | Shinjo | F16B 23/0038 411/387.1 |
| 2003/0223842 A1 | * | 12/2003 | Shinjo | F16B 25/0021 411/403 |
| 2006/0228186 A1 | * | 10/2006 | Shinjo | F16B 25/0021 411/5 |
| 2007/0243043 A1 | * | 10/2007 | Price | B21K 1/46 411/386 |
| 2013/0047797 A1 | * | 2/2013 | Lukes | F16B 23/003 81/460 |

* cited by examiner

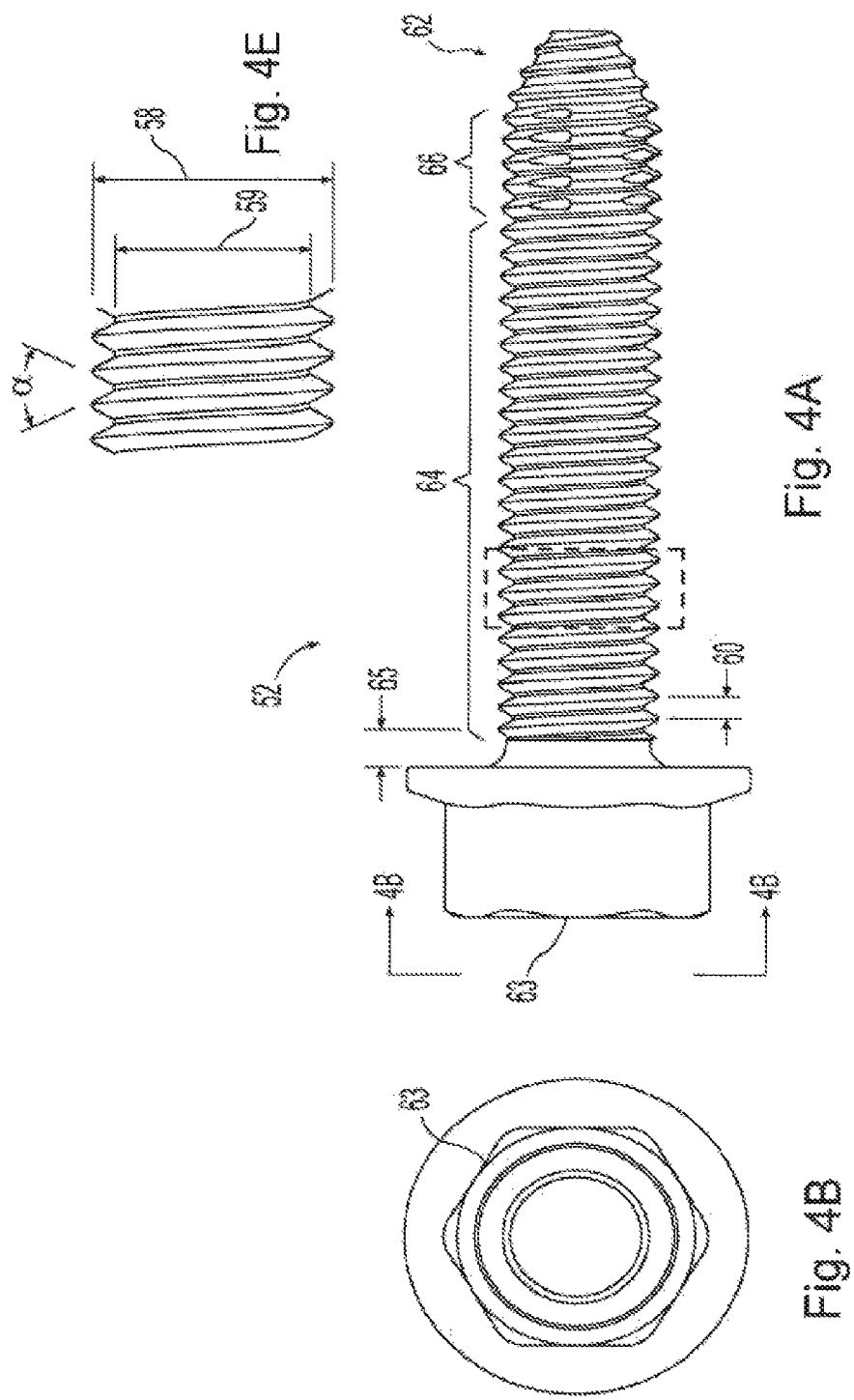

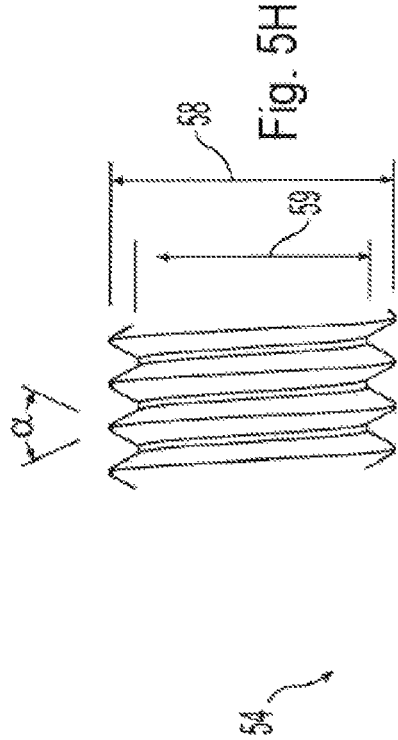
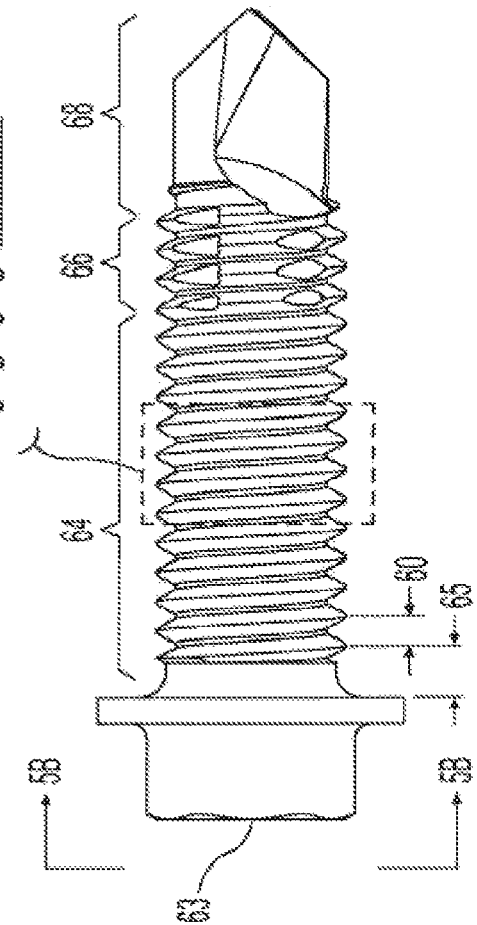
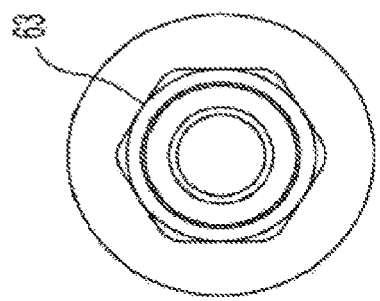
Fig. 5H
Fig. 5A
Fig. 5B

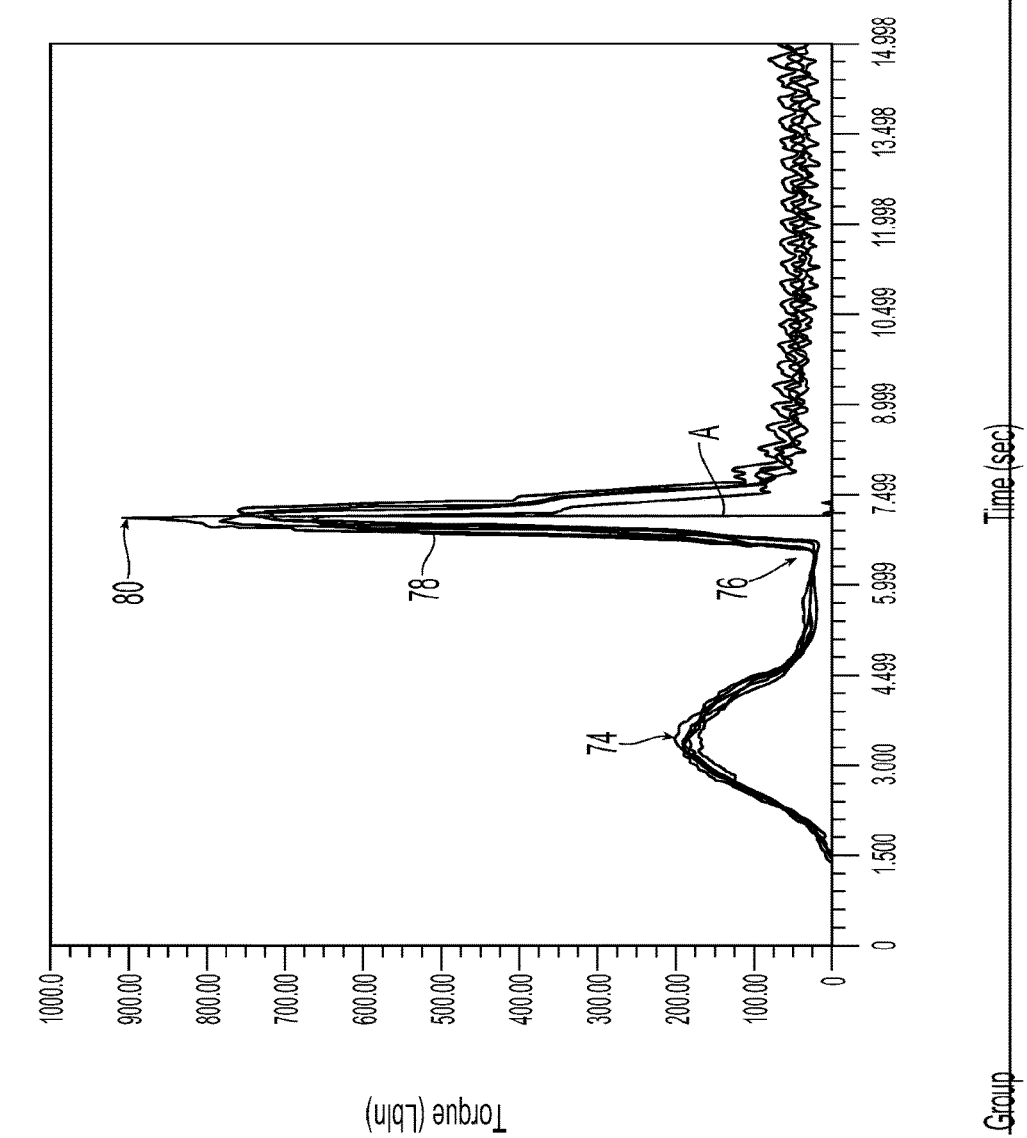

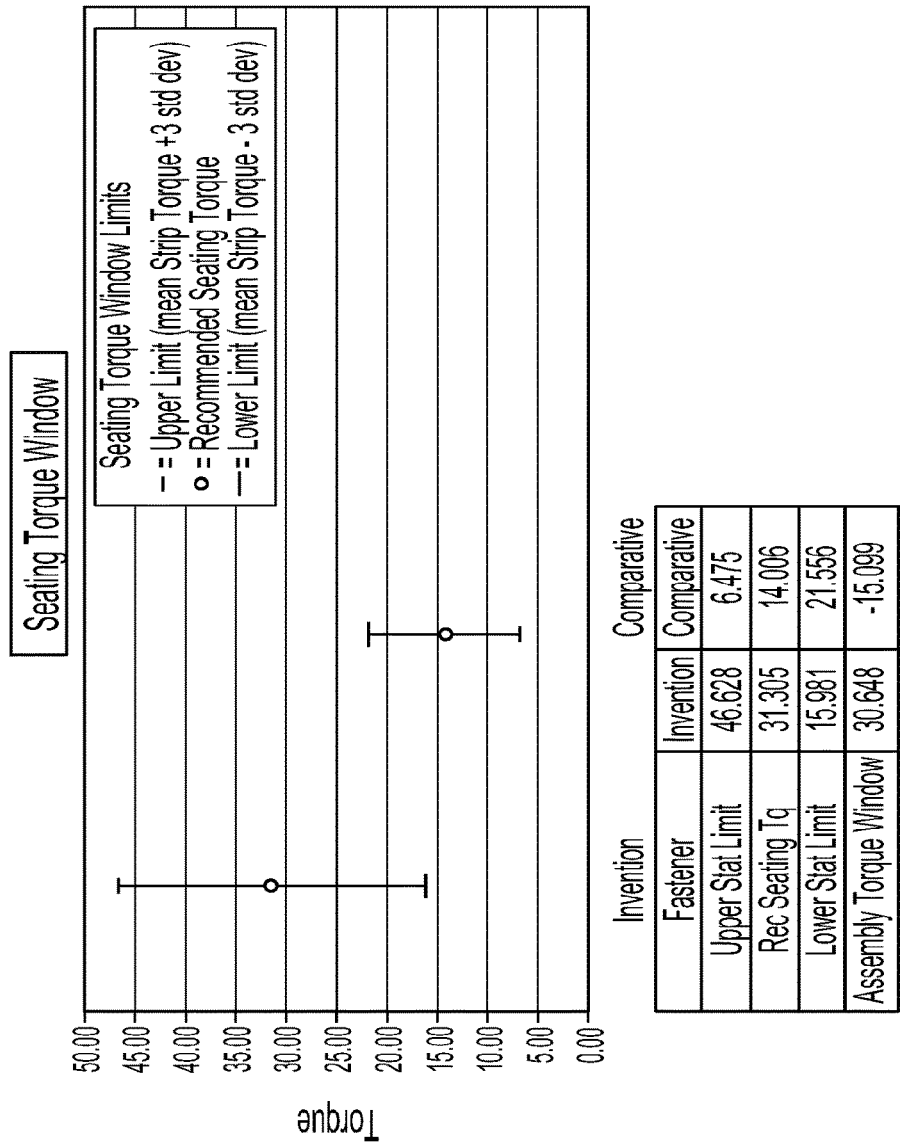

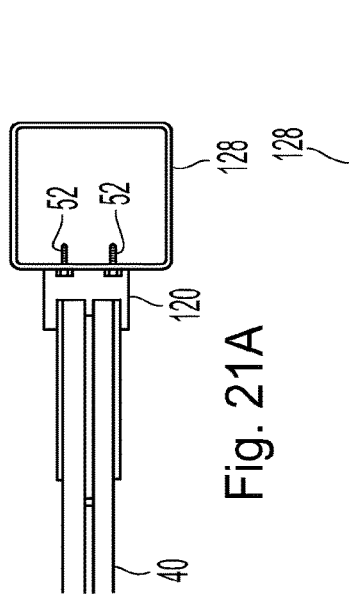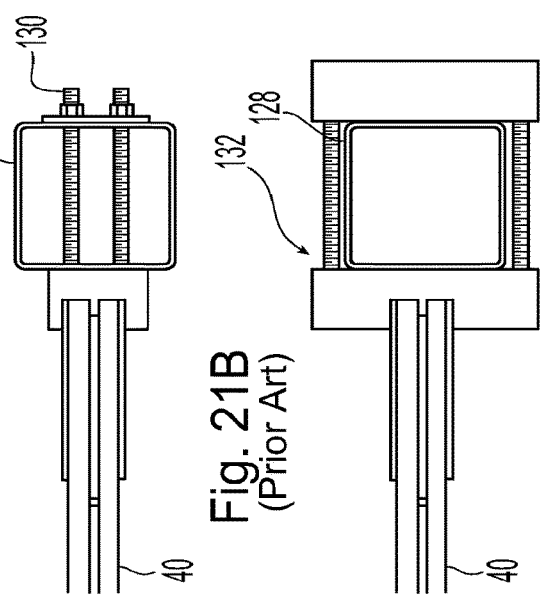
Fig. 21A
Fig. 21B
(Prior Art)
Fig. 21C
(Prior Art)

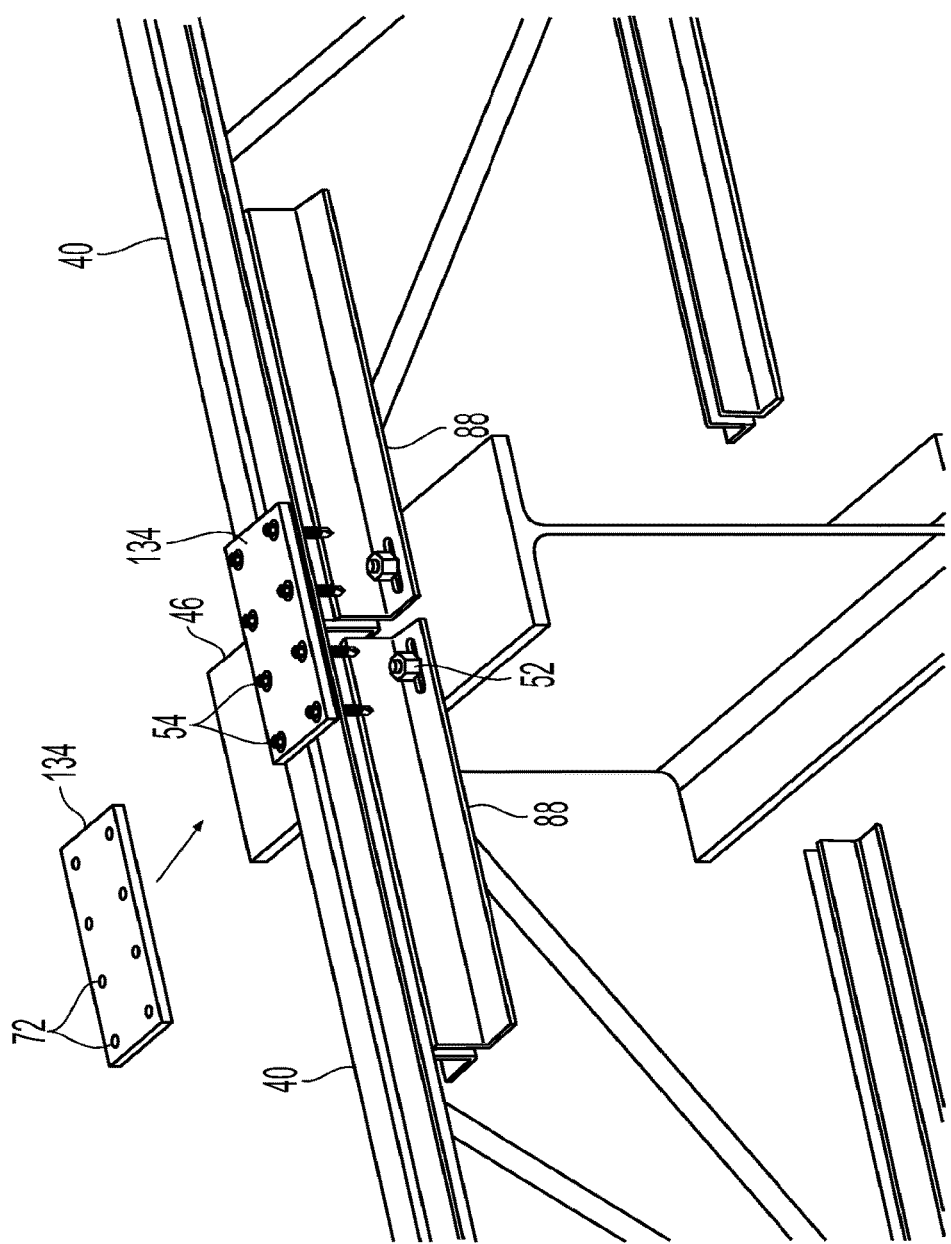

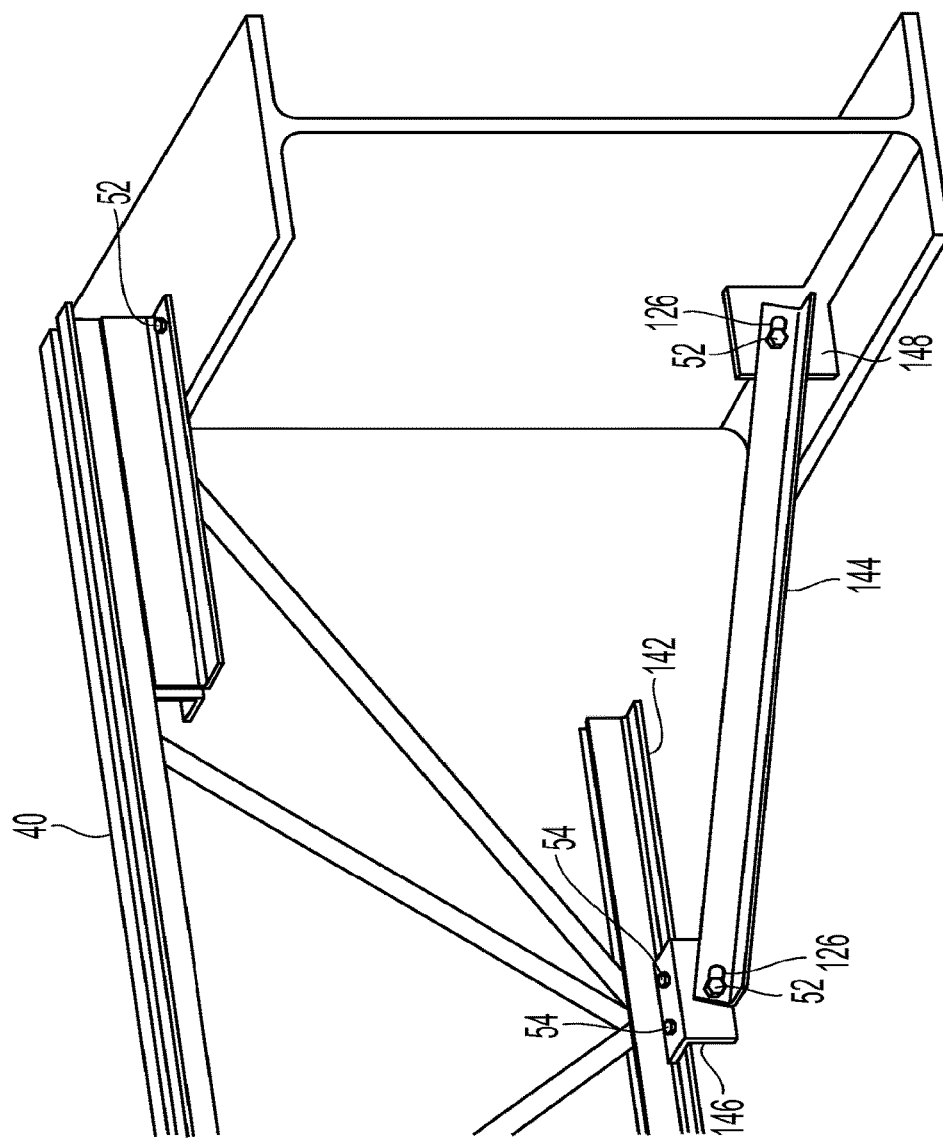

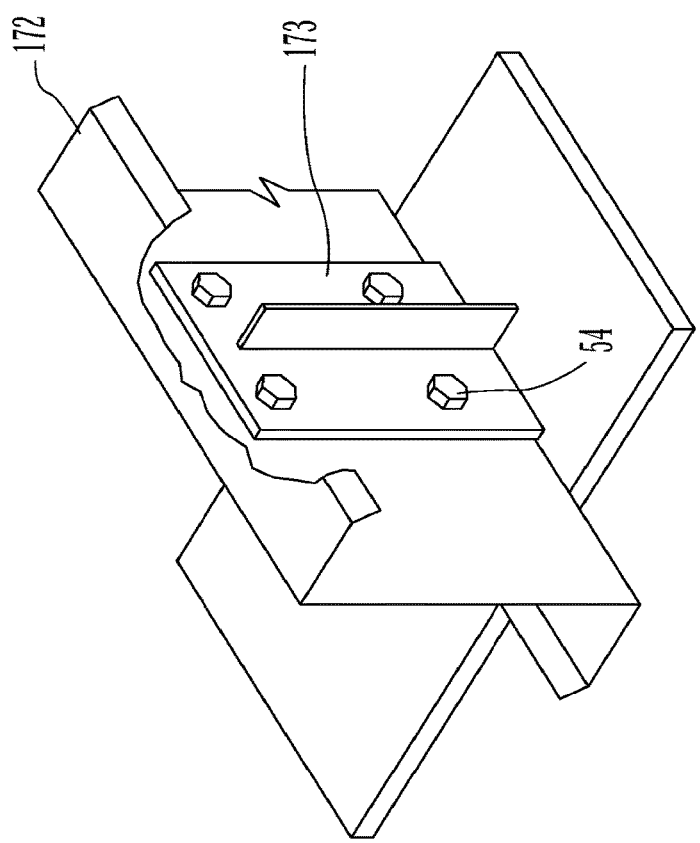
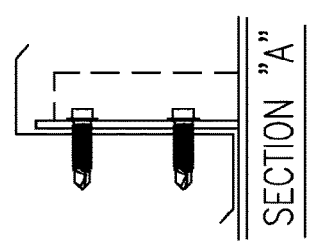
Fig. 42C

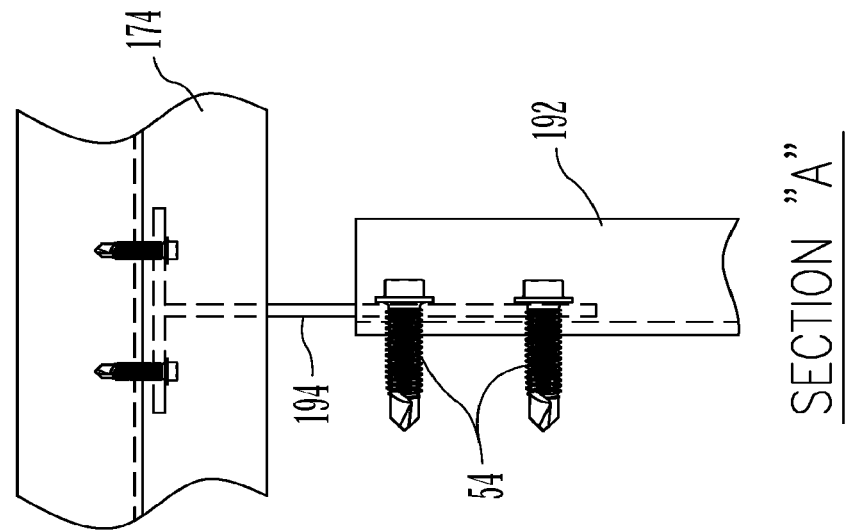
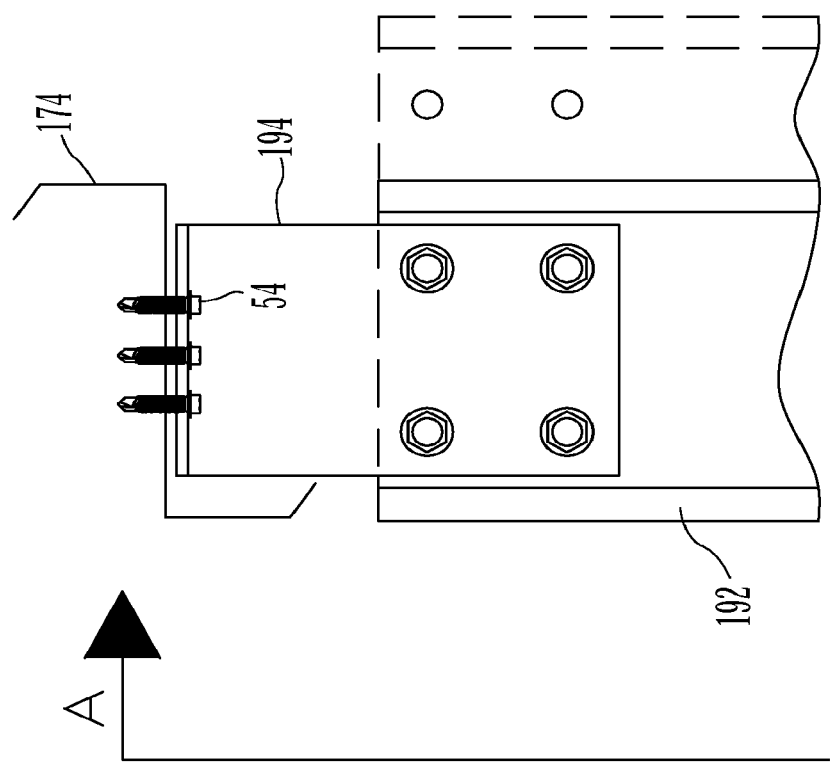
Fig. 44

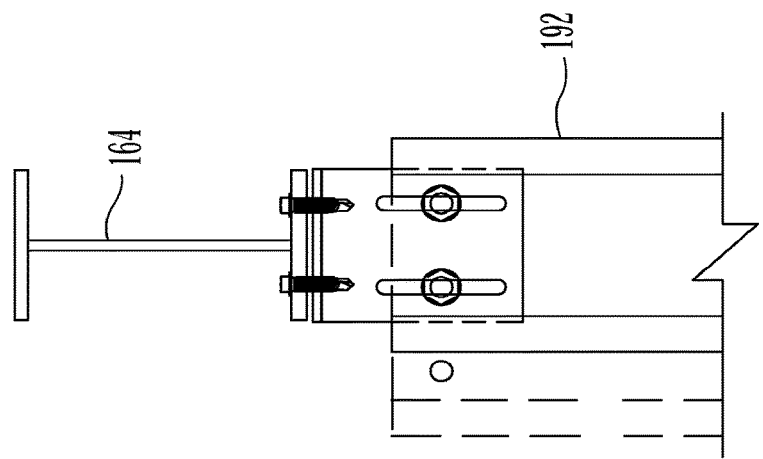
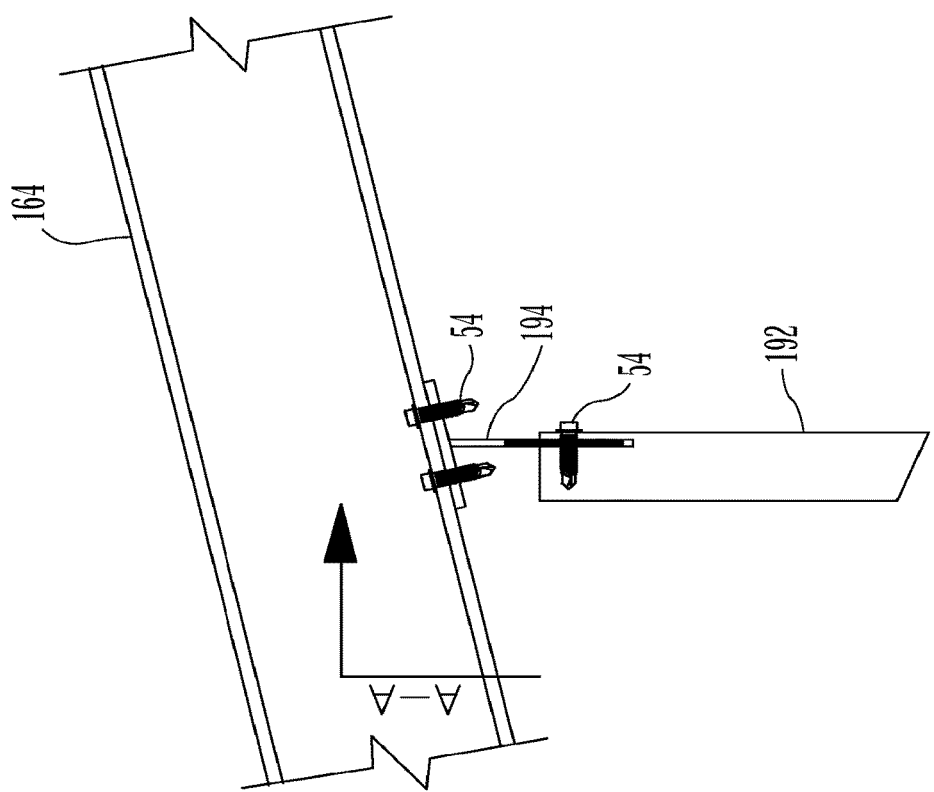
Fig. 45

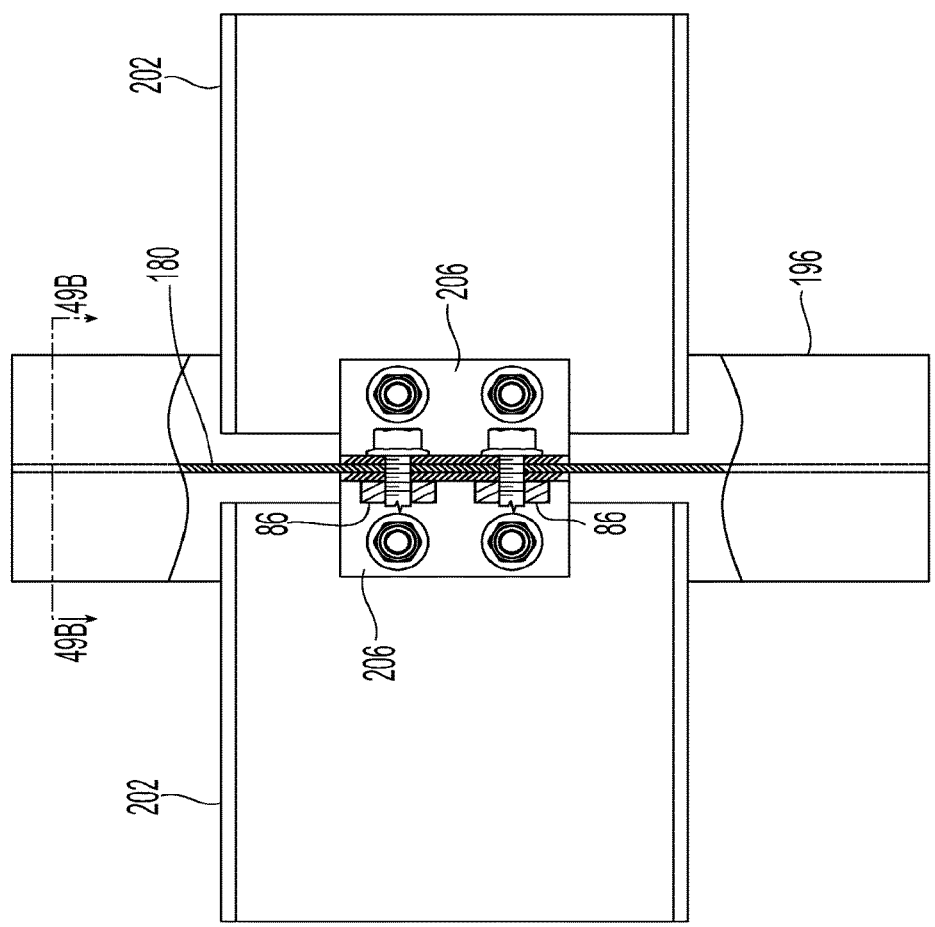

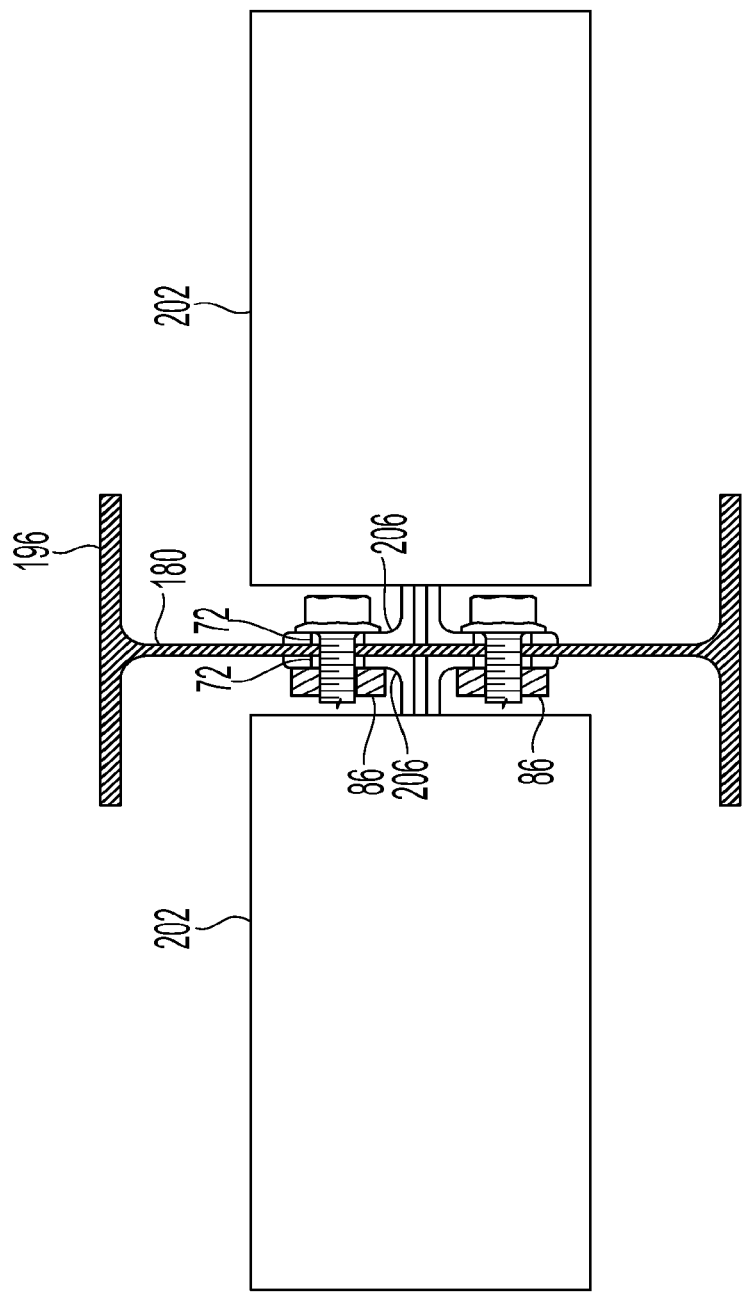

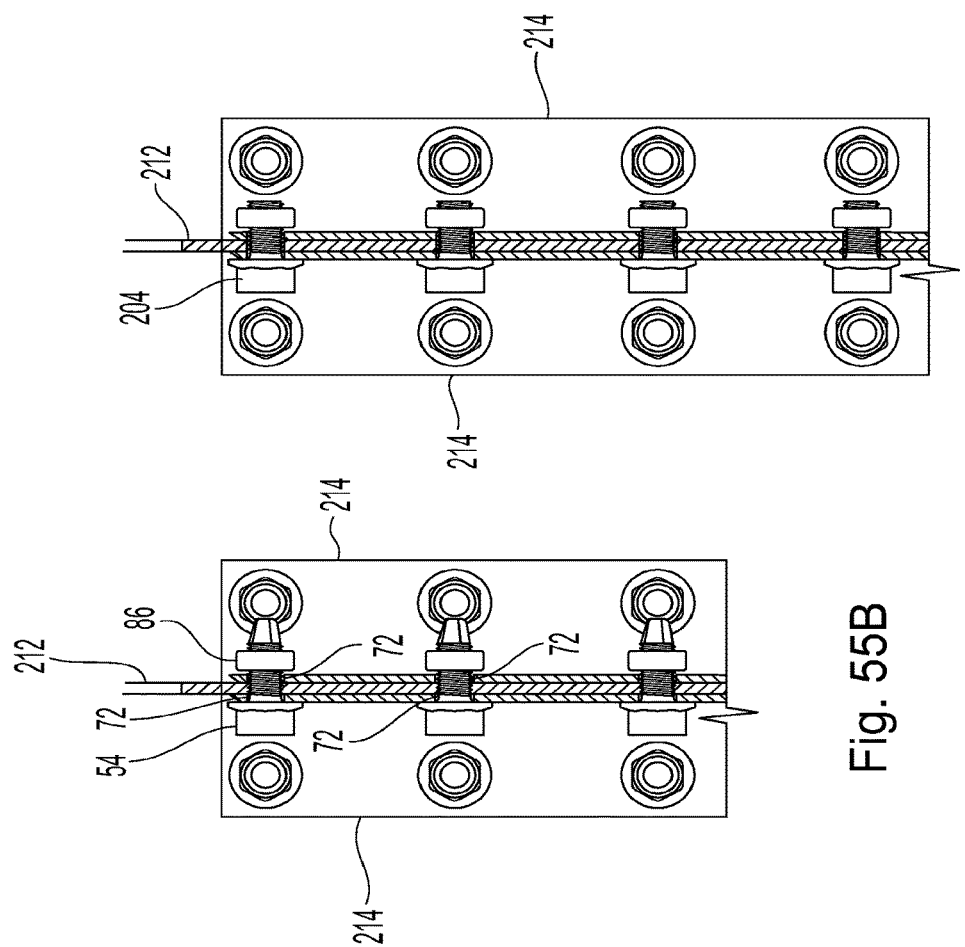

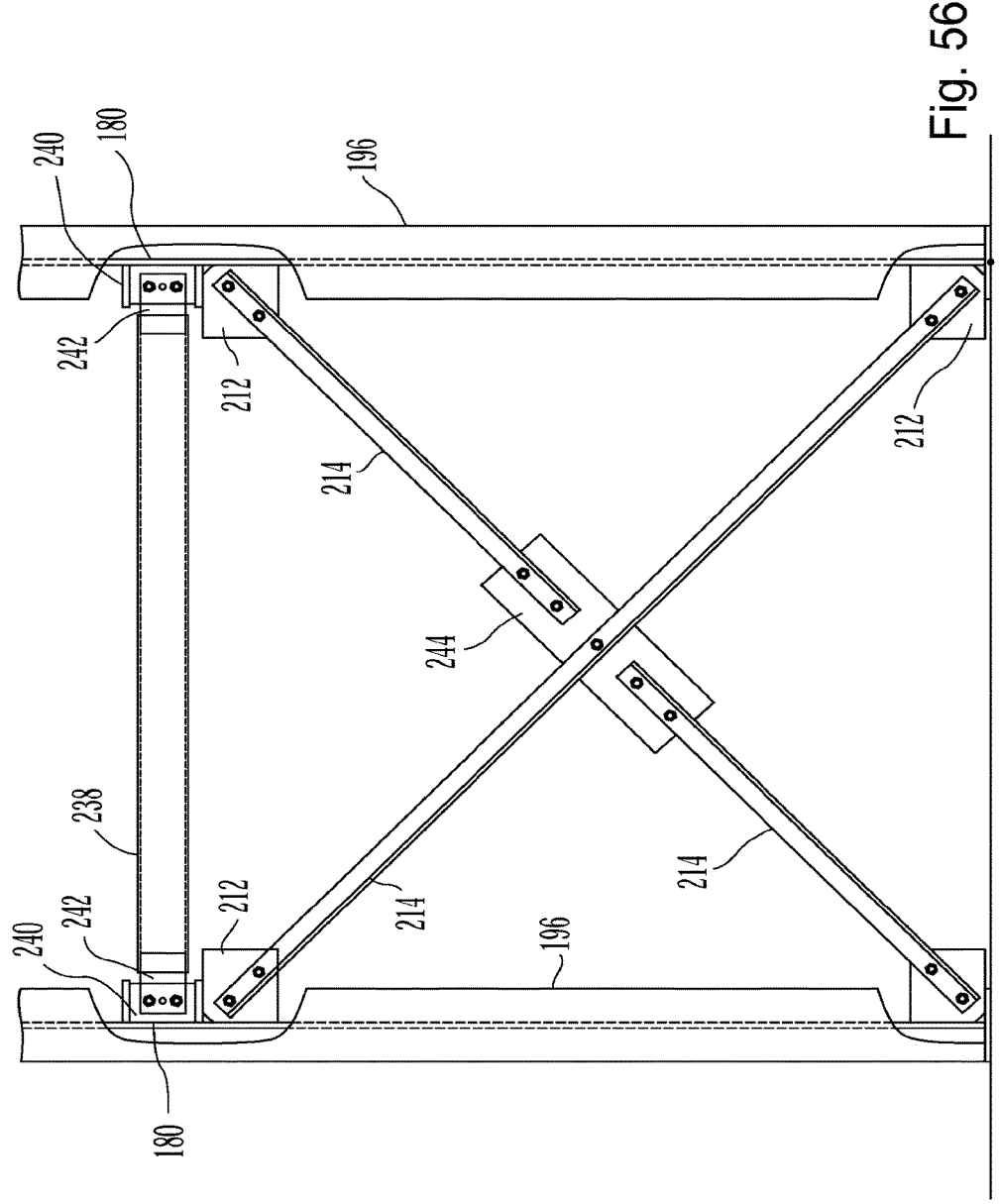

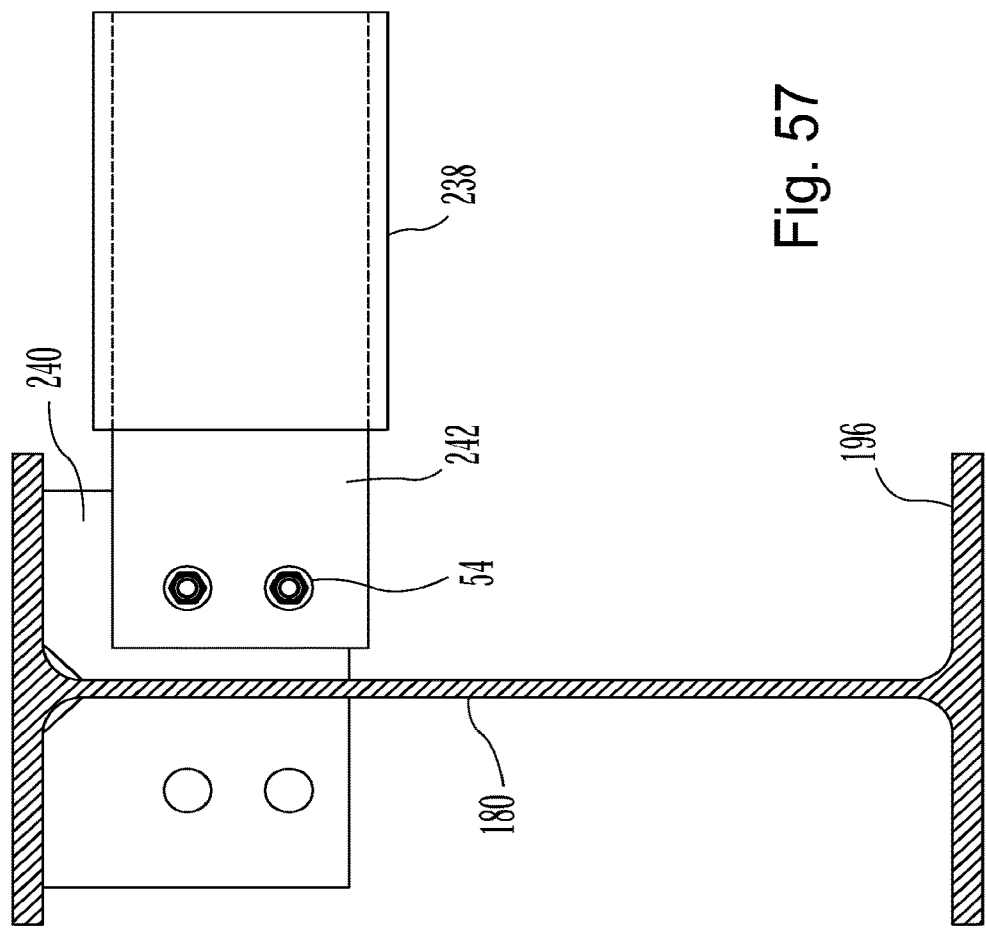

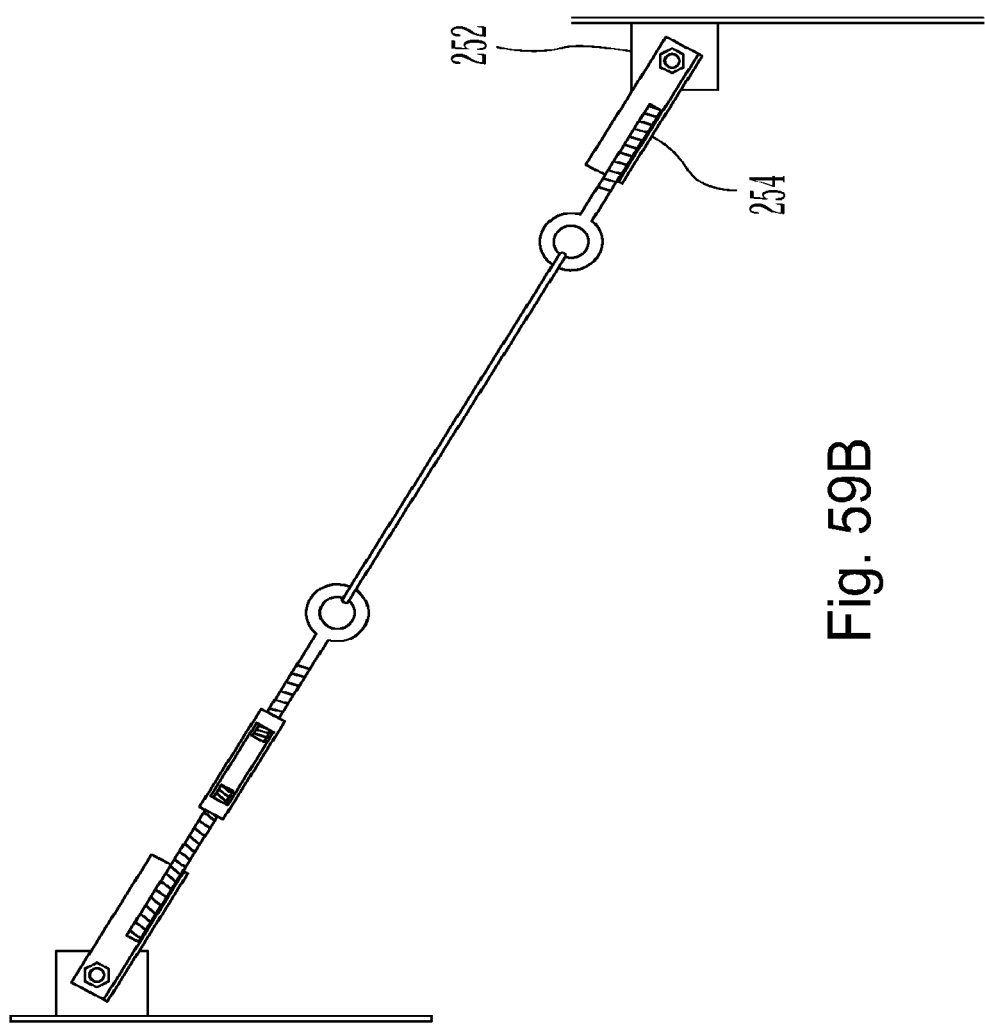

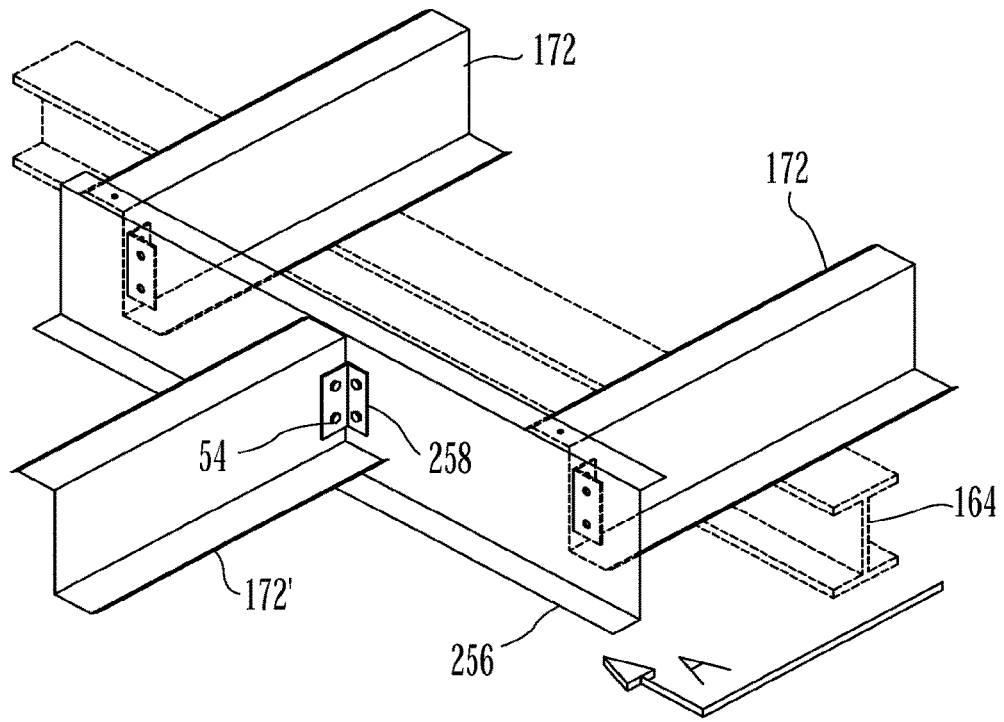
Fig. 60A
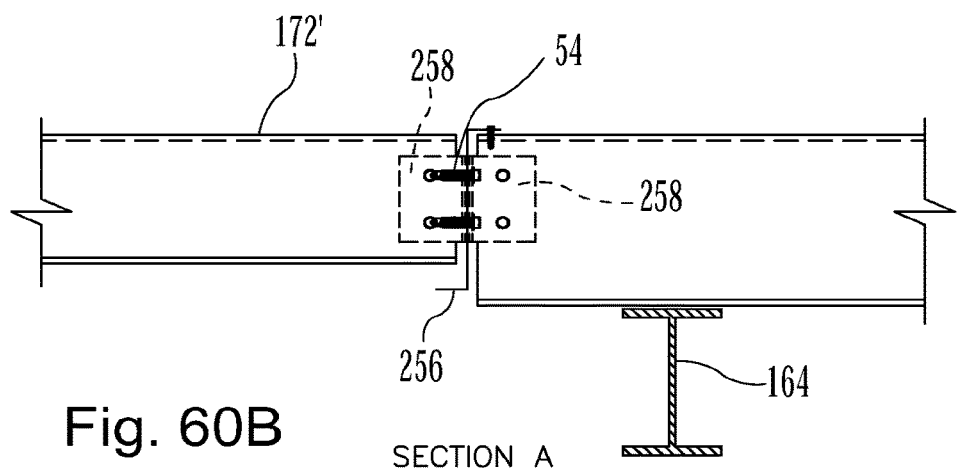
Fig. 60B  SECTION A

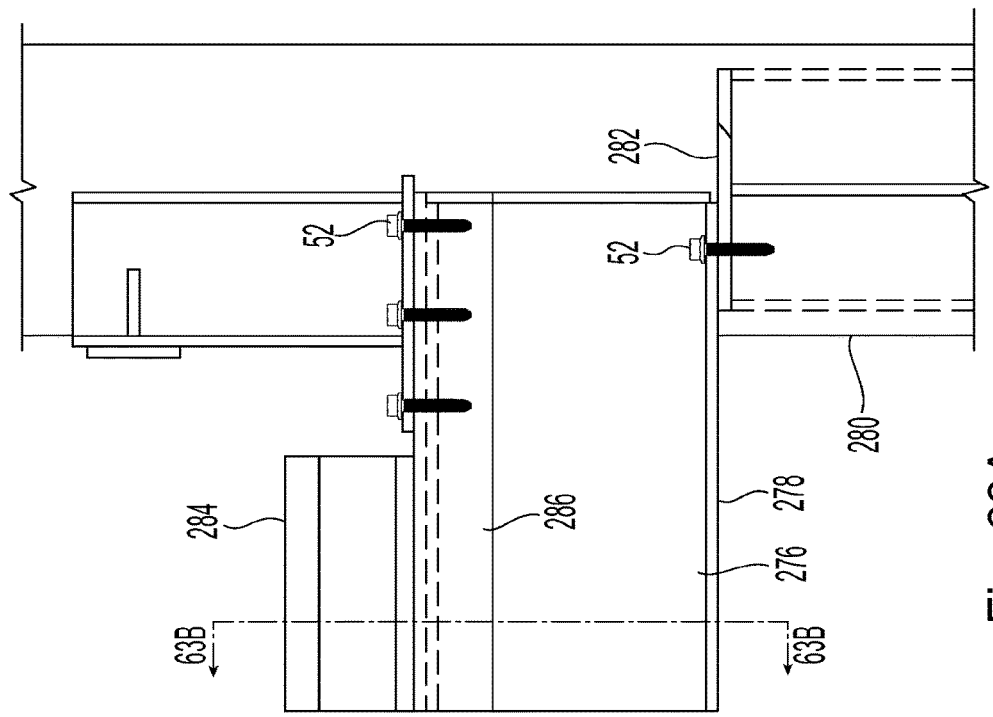

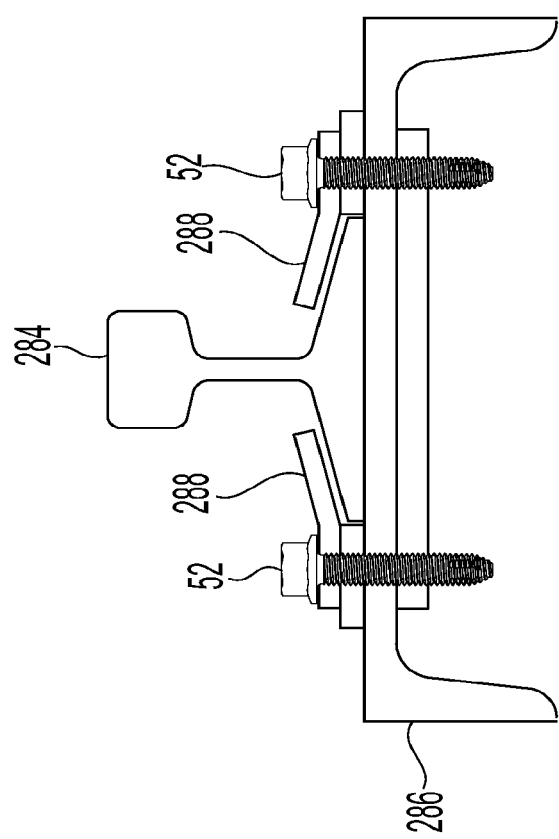

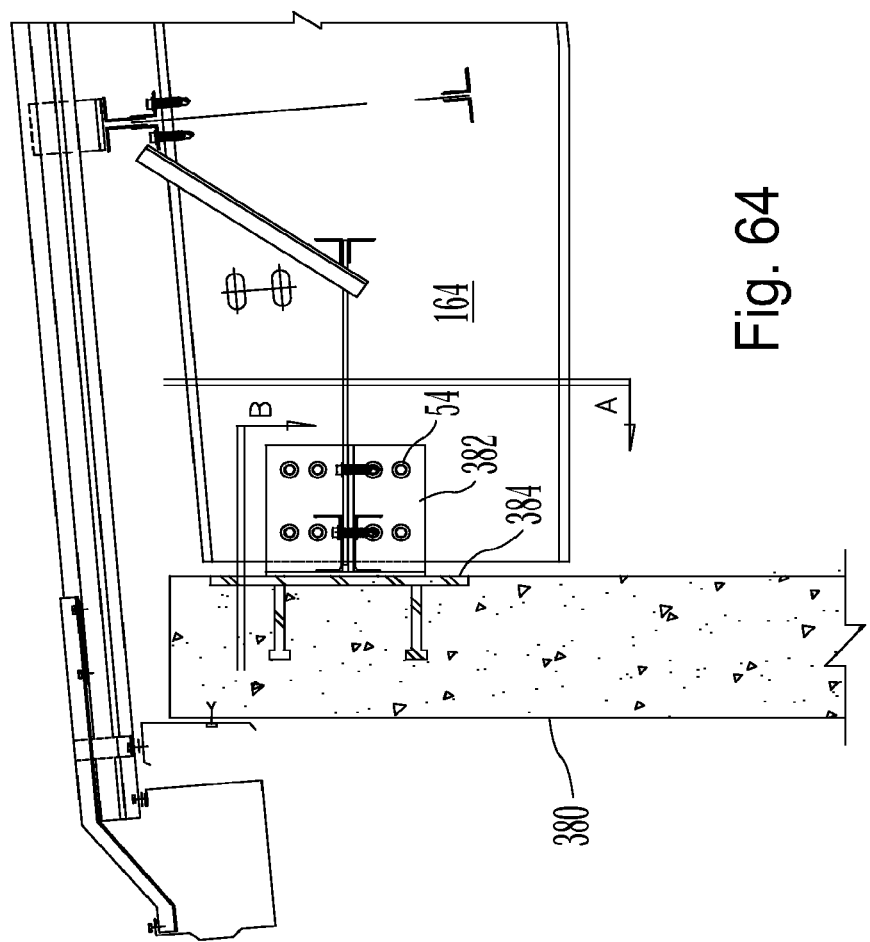

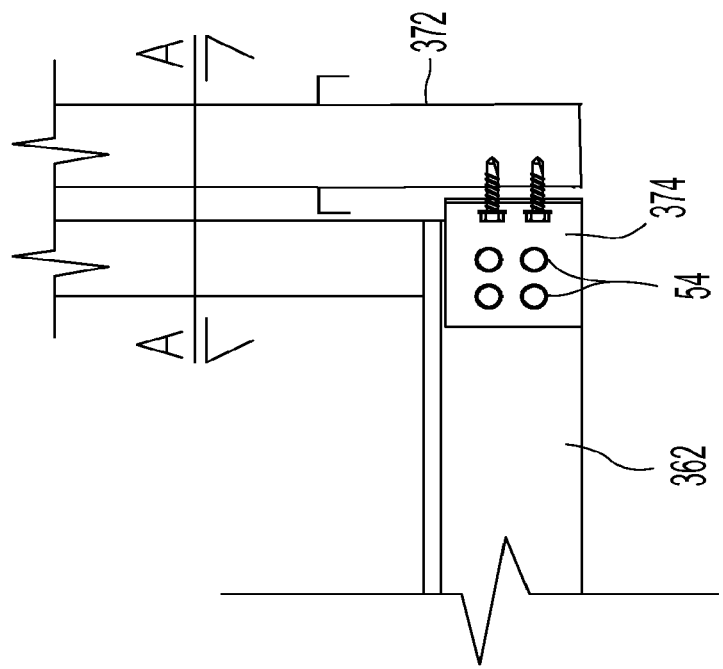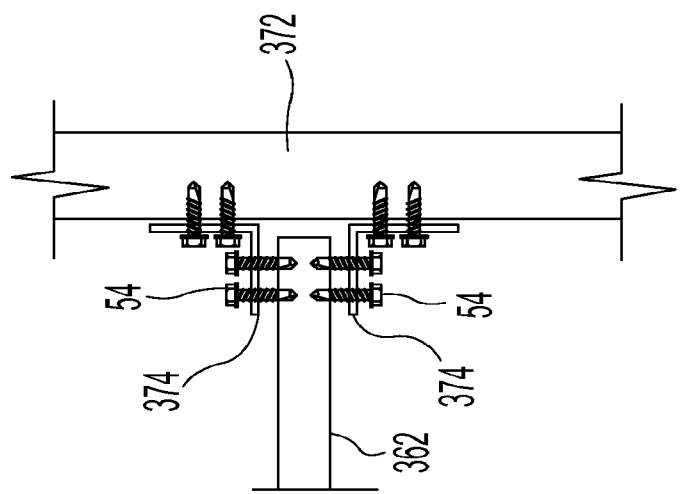
Fig. 84

WELDLESS BUILDING STRUCTURES

This application is a continuation of U.S. patent application Ser. No. 14/988,314, filed Jan. 5, 2016, which is a continuation of U.S. patent application Ser. No. 14/012,526, filed Aug. 28, 2013 (now U.S. Pat. No. 9,267,527), which is a continuation of U.S. patent application Ser. No. 13/031,181 (now U.S. Pat. No. 8,529,178), filed Feb. 18, 2011, which claims priority to U.S. Provisional Patent Application 61/306,309, filed Feb. 19, 2010.

BACKGROUND AND SUMMARY

This invention relates to building structure components assembled with little or no welding required at the construction site.

Steel structural members may be connected to construct various building structures. Various structural members, for example joists, beams, girders, studs, channels, bridging, decking, clips, brackets, and other components may be connected together to form a structure. Typically, steel structural members have been joined by welding the members together, bolting the members together, or a combination of both.

Welded connections have been effectively used in building structures; however, welding steel structural members together during the erection of a building structure requires a trained welder with welding equipment at the job site to perform the welding. The difficulty of providing welded connections increases with difficult and/or remote conditions of the construction site, and as the size and height of the structure increases.

Steel bolts have been used instead of certain welded connections. A typical prior art connection may include a bolt placed in pre-drilled holes through the components being connected and fastened in place with a nut. To complete a bolted connection, the bolt holes must be aligned sufficiently to pass the bolt through the holes. Then, the bolt must be held while the nut is turned onto the bolt and tightened. Fastening a nut onto the bolt required the installer to have access to both sides of the connection. For large structural members, positioning and holding the members to align the bolt holes has been a disadvantage. Bolted connections have been difficult to complete when the pre-drilled holes are not sufficiently aligned, and extra time and effort was required to set the structural members in place for hole alignment and bolting. Additionally, providing pre-drilled holes in each member increased the number of unique parts on the job site, increasing the amount time required to ensure the proper parts are used in their desired locations.

Another problem in the prior art is securing a plurality of structural members during assembly of certain connections, such as double connections involving two members that share common bolts on either side of a central piece. Federal regulations by the Occupational Safety and Health Administration (OSHA) require that for such double connections the first member must be attached before the second member is connected. This typically requires an extra bolt connection for attaching the first member positioned so as to not interfere with the placement of the second member. The increased complexity of providing pre-drilled holes and complying with OSHA securement requirements has decreased efficiency in producing and installing the structural members.

Self-drilling and self-threading bolts have been used in certain metal connections. However, prior self-drilling and self-threading bolts were case hardened to provide a desired hardness. The prior case hardened bolts lacked ductility, and the case hardened portion would break when loaded in certain structural connections causing premature fastener failure. Additionally, in connections where the prior self-drilling bolts could be used, additional installation time was required because of the difficulty in driving the bolts. Many fastener installations are made using electric or pneumatic drivers, and for certain applications drivers with rotary impact mechanisms have been used to deliver the torque needed to install certain fasteners. Without impact mechanisms, drivers typically have been limited to smaller fasteners requiring limited torque. Impact mechanisms may be used to drive self-threading fasteners to form threads in the drilled hole in the structural member, and certain prior self-drilling or self-tapping bolts required impact driving to drive the thread portion of the bolt through the threaded member. For longer bolts in the past, impact driving was time consuming and inefficient.

Steel bolts and screws have been tried in certain applications to join sheet metal building members. For example, U.S. Pat. No. 4,982,545 discloses a truss that includes web members and chord members fastened with screws. However, screws and bolts used in the past for sheet metal connections have caused assembly problems such as strip-out that have increased the time for assembly and increased scrap costs. Strip-out occurs when the shape of the hole deforms and/or the hole enlarges such that the threads of the screw cannot engage the material around the hole enough to tighten the screw or bolt. Additionally, the prior self-drilling bolts experienced high rates of tipping or angled installation in sheet metal applications. Strip-out and tipping required rework or additional screws to be installed to achieve the desired connection strength, increasing time and cost of installation.

Typical prior art self-drilling screw are shown in FIGS. 3A and 3B for connecting sheet metal components together. The screw has a head, a thread portion having a major diameter and a minor diameter, and a self-drilling tip having a notch or flute. In the past, after the self-drilling tip drilled through the material, the threaded portion would thread into the hole. As the threads typically did not continue to the head, the driving torque had to be controlled to avoid stripping the screw in the hole. These screws were relatively easy to strip in a sheet metal application, causing increased time for assembly and increased scrap costs. Additionally, certain prior fasteners were tailored to perform in a particular substrate thickness, but when the fasteners were used in another material thickness, the fasteners could not obtain the same performance.

What is disclosed is a building structure comprising a first steel building member and a second steel building member connected by a plurality of fasteners, each fastener being steel comprising a head capable of clamping the first steel building member to the second steel building member with the fastener installed, a threaded portion adjacent the head, a thread-forming portion adjacent the threaded portion of at least HRC 50 hardness adapted to form threads into at least the second steel building member, and a fluted lead portion adjacent the thread-forming portion of at least HRC 50 hardness with a nominal diameter in a range from 60% to 95% of major diameter of the threaded portion adapted to form a fastener opening, such that the fastener is capable of providing a ratio of strip torque to thread-forming torque of at least 3.0 and a ratio of strip torque to drive torque greater than 6.0 over a range of combined thickness of first and second steel building members from 0.036 inch to 0.084 inch.

Alternatively, the fasteners may have a ratio of strip torque to thread-forming torque of at least 3.0 and a ratio of strip torque to drive torque greater than 8.0 over a range of combined thickness of first and second steel building members from 0.036 inch to 0.084 inch. In yet another alternative, the fasteners may have a ratio of strip torque to thread-forming torque of at least 3.0 and a ratio of strip torque to drive torque greater than 6.0 over a range of combined thickness of first and second steel building members from 0.036 inch to 0.108 inch. For certain applications, the combined thickness of the first steel building member and the second steel building member at the fastener may be no more than 0.125 inch in thickness. In any case, the fasteners may be nutable.

The fastener threaded portion adjacent the head may have a through hardness in a range from HRB 70 and HRC 40. Additionally, the fasteners may have up to five threads between the threaded portion and the thread-forming portion that are hardened to at least HRC 50 hardness. The threaded portion may have less than 60° thread angle and back-tapered threads. Alternatively, the thread angle may be between 40° and 50°.

In one alternative, threaded portion of the fastener adjacent the head may have a case hardness of at least HRC 50.

The lead portion of the fluted lead portion of the fasteners may include a milled point, and may have at least HRC 50 hardness. The fluted lead portion may be adapted to form a fastener opening with a diameter between 62% and 85% of major diameter of the threaded portion.

The thread-forming portion of the fasteners may have a shape selected from a group consisting of quadlobular and pentalobular. The thread-forming portion may be from 3 to 7 thread pitch in length.

The fastener threaded portion may extend to adjacent the head of the fastener. Additionally, a sealing member may be positioned between the head and the threaded portion. The head of the fastener may be undercut and adapted to deform the first steel building member on tightening of the fastener. In alternatives in which the head is undercut, a sealing member may optionally be positioned adjacent the undercut. Alternatively or additionally, the threaded portion may comprise a major diameter extending to within 1.5 of the thread pitch of the head. Optionally, serrations may be provided in the undercut. In any case, such fasteners have the added advantage of increased back-out resistance and are less likely to come loose by vibration.

Also disclosed is a building structure comprising a first steel building member and a second steel building member connected by a plurality of fasteners, each fastener being steel comprising a head capable of clamping the first steel building member to the second steel building member with the fastener installed, a threaded portion adjacent the head, a thread-forming portion adjacent the threaded portion of at least HRC 50 hardness adapted to form threads into at least the second steel building member, and a fluted lead portion adjacent the thread-forming portion of at least HRC 50 hardness with a nominal diameter in a range from 60% to 95% of major diameter of the threaded portion adapted to form a fastener opening, such that the fastener is capable of providing a ratio of strip torque to thread-forming torque of at least 4.0 and a ratio of strip torque to drive torque greater than 8.0 over a range of combined thickness of first and second steel building members from 0.054 inch to 0.084 inch.

Alternatively, the fasteners may provide a ratio of strip torque to thread-forming torque of at least 4.0 and a ratio of strip torque to drive torque greater than 10.0 over a range of combined thickness of first and second steel building members from 0.054 inch to 0.084 inch. Alternatively, the fasteners may have a ratio of strip torque to thread-forming torque of at least 3.5 and a ratio of strip torque to drive torque greater than 6.0 over a range of combined thickness of first and second steel building members from 0.036 inch to 0.084 inch. In yet another alternative, the ratio of strip torque to thread-forming torque may be at least 3.5 and a ratio of strip torque to drive torque greater than 8.0 over a range of combined thickness of first and second steel building members from 0.036 inch to 0.084 inch. Alternatively, the ratio of strip torque to thread-forming torque may be at least 3.0 and a ratio of strip torque to drive torque greater than 4.0 over a range of combined thickness of first and second steel building members from 0.036 inch to 0.108 inch. For certain applications, the combined thickness of the first steel building member and the second steel building member at the fastener may be no more than 0.125 inch in thickness. In any case, the fasteners may be nutable.

The fastener threaded portion adjacent the head may have a through hardness in a range from HRB 70 and HRC 40. Additionally, the fasteners may have up to five threads between the threaded portion and the thread-forming portion that are hardened to at least HRC 50 hardness. The threaded portion may have less than 60° thread angle and back-tapered threads. Alternatively, the thread angle may be between 40° and 50°.

In one alternative, threaded portion of the fastener adjacent the head may have a case hardness of at least HRC 50.

The lead portion of the fluted lead portion of the fasteners may include a milled point, and may have at least HRC 50 hardness. The fluted lead portion may be adapted to form a fastener opening with a diameter between 62% and 85% of major diameter of the threaded portion.

The thread-forming portion of the fasteners may have a shape selected from a group consisting of quadlobular and pentalobular. The thread-forming portion may be from 3 to 7 thread pitch in length.

The fastener threaded portion may extend to adjacent the head of the fastener. Additionally, a sealing member may be positioned between the head and the threaded portion. The head of the fastener may be undercut and adapted to deform the first steel building member on tightening of the fastener. In alternatives in which the head is undercut, a sealing member may optionally be positioned adjacent the undercut. Alternatively or additionally, the threaded portion may comprise a major diameter extending to within 1.5 of the thread pitch of the head. Optionally, serrations may be provided in the undercut. In any case, such fasteners have the added advantage of increased back-out resistance and are less likely to come loose by vibration.

In one alternative, the building structure may comprise a first steel building member and a second steel building member connected by a plurality of fasteners, each fastener being steel comprising a head capable of clamping the first steel building member to the second steel building member with the fastener installed, a threaded portion adjacent the head having a through hardness in a range from HRB 70 to HRC 40, a thread-forming portion adjacent the threaded portion of at least HRC 50 hardness adapted to form threads in at least the second steel building member, and a fluted lead portion adjacent the thread-forming portion of at least HRC 50 hardness with a nominal diameter in a range from 75% to 95% of major diameter of the threaded portion adapted to form a fastener opening, such that the fastener is capable of providing a ratio of failure torque to thread-forming torque of at least 3.0 and a ratio of failure torque to drive torque greater than 6.0 over a range of combined thickness of first and second steel building members from 0.10 inch to 0.32 inch.

Alternatively, the fasteners may be capable of providing a ratio of failure torque to thread-forming torque of at least 3.75. The fasteners may have a drive torque no more than 50% of a thread-forming torque. The fasteners may be nutable.

The lead portion of the fluted lead portion of the fasteners may have a milled point, and may have at least HRC 50 hardness.

The fastener thread-forming portion may have a shape selected from a group consisting of quadlobular, pentalobular and hexalobular. The thread-forming portion may be from 3 to 7 thread pitch in length.

Additionally, the fasteners may have up to five threads between the threaded portion and the thread-forming portion that are hardened to at least HRC 50 hardness. The threaded portion may have less than 60° thread angle and back-tapered threads. Alternatively, the thread angle may be between 40° and 50°.

Also disclosed is a building structure comprising a first steel building member and a second steel building member connected by a plurality of fasteners, each fastener being steel comprising a head capable of clamping the first steel building member to the second steel building member with the fastener installed, a threaded portion adjacent the head having a through hardness in a range from HRB 70 to HRC 40, a thread-forming portion adjacent the threaded portion of at least HRC 50 hardness adapted to form threads in at least the second steel building member, and a fluted lead portion adjacent the thread-forming portion of at least HRC 50 hardness with a nominal diameter in a range from 80 to 92% of major diameter of the threaded portion adapted to form a fastener opening, such that the fastener is such that the fastener is capable of providing a ratio of failure torque to thread-forming torque of at least 3.0 and a ratio of failure torque to drive torque greater than 10 when the second steel building member having a thickness of 0.25 inch.

Alternatively, the fasteners may be capable of providing a ratio of failure torque to thread-forming torque of at least 3.0 and a ratio of failure torque to drive torque greater than 10 over a range of second steel building member thickness from 0.25 inch to 0.38 inch. The fasteners may have a drive torque no more than 50% of a thread-forming torque. The fasteners may be nutable.

The lead portion of the fluted lead portion of the fasteners may have a milled point, and may have at least HRC 50 hardness.

The fastener thread-forming portion may have a shape selected from a group consisting of quadlobular, pentalobular and hexalobular. The thread-forming portion may be from 3 to 7 thread pitch in length.

Additionally, the fasteners may have up to five threads between the threaded portion and the thread-forming portion that are hardened to at least HRC 50 hardness. The threaded portion may have less than 60° thread angle and back-tapered threads. Alternatively, the thread angle may be between 40° and 50°.

At least a portion of the threaded portion of the fastener may meet a specification selected from a group consisting of ASTM A307, ASTM A325, ASTM A354, and ASTM A490 specifications. Alternatively or in addition, at least a portion of the threaded portion of the fastener may meet a specification selected from a group consisting of SAE J429 Grade 2, SAE J429 Grade 5, and SAE J429 Grade 8.

Alternatively, a building structure may comprise a first steel building member and a second steel building member connected by a plurality of fasteners, each fastener being steel comprising a head capable of clamping the first steel building member to the second steel building member with the fastener installed, a tapered lead portion having an angle in the range from 30 to 60° of at least HRC 50 hardness adapted to start into a pilot hole in at least the second steel building member, a thread-forming portion of at least HRC 50 hardness adapted to thread the fastener into at least the second steel building member, and a threaded portion having a through hardness of in a range from about HRB 70 to HRC 40, such that the fastener and capable of providing a ratio of failure torque to thread-forming torque of at least 3.0 and a ratio of failure torque to drive torque greater than 10 when the second steel building member having a thickness of 0.25 inch and the pilot hole having at least one diameter within nominal diameter from 80 to 98% of major diameter.

The fasteners may have a drive torque no more than 50% of a thread-forming torque. The fasteners may be nutable.

The tapered lead portion of the fasteners may have at least HRC 50 induction hardness.

The fastener thread-forming portion may have a shape selected from a group consisting of quadlobular, pentalobular and hexalobular. The thread-forming portion may be from 3 to 7 thread pitch in length.

Additionally, the fasteners may have up to five threads between the threaded portion and the thread-forming portion that are hardened to at least HRC 50 hardness. The threaded portion may have less than 60° thread angle and back-tapered threads. Alternatively, the thread angle may be between 40° and 50°.

At least a portion of the threaded portion of the fastener may meet a specification selected from a group consisting of ASTM A307, ASTM A325, ASTM A354, and ASTM A490 specifications. Alternatively or in addition, at least a portion of the threaded portion of the fastener may meet a specification selected from a group consisting of SAE J429 Grade 2, SAE J429 Grade 5, and SAE J429 Grade 8.

Also described is a method of connecting a plurality of members in a building connection comprising providing a first building member having a first mounting surface and a second mounting surface opposite the first mounting surface and a first member thickness there between, providing at least one fastener having a thread-forming portion and a threaded portion, positioning a second building member having a first aperture adjacent the first mounting surface, installing the fastener through the first aperture and forming threads in a fastener opening through the first member thickness connecting the second member to the first member with the thread-forming portion extending through the second mounting surface, positioning a third building member having a second aperture larger than the major diameter of the threaded portion adjacent the second mounting surface such that the second aperture is positioned over the threaded portion, and installing a nut over the threaded portion to connect the third member to the first member.

The step of providing at least one fastener may include providing a steel fastener comprising a head capable of clamping the second building member to the first mounting surface with the fastener installed, a threaded portion adjacent the head having a through hardness in a range from HRB 70 to HRC 40, a thread-forming portion adjacent the threaded portion of at least HRC 50 hardness adapted to form threads in the fastener opening, and a fluted lead portion adjacent the thread-forming portion of at least HRC 50 hardness with a nominal diameter in a range from 80 to 98% of major diameter of the threaded portion adapted to form the fastener opening, such that the fastener is nutable and capable of providing a ratio of failure torque to thread-forming torque of at least 3.0 when the first member thickness is 0.25 inch.

Additionally, the method may further include after the step of providing a first member, providing the fastener opening through the first member thickness, and where the step of providing at least one fastener comprises providing a steel fastener comprising a head capable of clamping the second building member to the first mounting surface with the fastener installed, a tapered lead portion having an angle from 30 to 60° of at least HRC 50 hardness adapted to start into the fastener opening in the first member thickness, a thread-forming portion of at least HRC 50 hardness adapted to thread the fastener into the fastener opening, and a threaded portion having a through hardness of in a range from about HRB 70 to HRC 40, such that the fastener is nutable and capable of providing a ratio of failure torque to thread-forming torque of at least 3.0 when the first member thickness is 0.25 inch and the fastener opening having at least one diameter within nominal diameter in a range from 80 to 98% of major diameter.

BRIEF DESCRIPTION OF THE DRAWINGS

FIGS. 4A and 4B are side and end views respectively of a thread-forming fastener of the present disclosure;

FIG. 4E illustrates a close-up view of the threaded portion shown in FIG. 4A;

FIGS. 5A and 5B are side and end views respectively of a self-drilling, thread-forming fastener of the present disclosure;

FIG. 5H illustrates a close-up view of the threaded portion shown in FIG. 5A;

FIG. 6 is a graph of torque over time during installation representing the thread-forming fastener of FIG. 4A installed in a steel sheet having a thickness of about 0.25 inch;

FIGS. 13A through 13D are graphs of seating torque calculated for ¼ inch self-drilling, thread-forming fasteners and comparative samples for various material thicknesses;

FIG. 21A is a top view of a bolted seat connection on a hollow structural section;

FIGS. 21B and 21C are top views of prior art bolted seat connections on a hollow structural section;

FIG. 22A is a perspective view of a joist connection on a wide flange girder;

FIGS. 25A and 25B are perspective views of joist and wide flange girder brace;

FIGS. 42A through 42C are partial perspective views of alternative purlin connections to a roof beam;

FIG. 44 is a partial end view of a connection of a door jamb to a girt;

FIG. 45 is a partial end view of a connection of a door jamb to a rafter member;

FIGS. 49A and 49B is a partial side view of an alternative connection of mezzanine beam members to a column;

FIGS. 55A and 55B is a connection of diagonal bracing;

FIG. 55C is a prior art connection of diagonal bracing;

FIG. 56 is a side view of an alternative diagonal bracing;

FIG. 57 is a partial cross-sectional view showing connection of a pipe strut;

FIGS. 59A and 59B are views of rod and cable braces for use with brace strut connections such as shown in FIG. 58;

FIG. 60A is a perspective view of a purlin transition connection;

FIG. 60B is a side view of the purlin transition connection of FIG. 52B;

FIG. 63A is a side view of a crane rail connection;

FIG. 63B is a cross-sectional view through the crane rail of FIG. 55;

FIG. 64 is a partial side view of a concrete wall attachment;

FIG. 84 is a side and top view of a truss member secured to a girder truss.

DETAILED DESCRIPTION OF THE DRAWINGS

Figure 1:
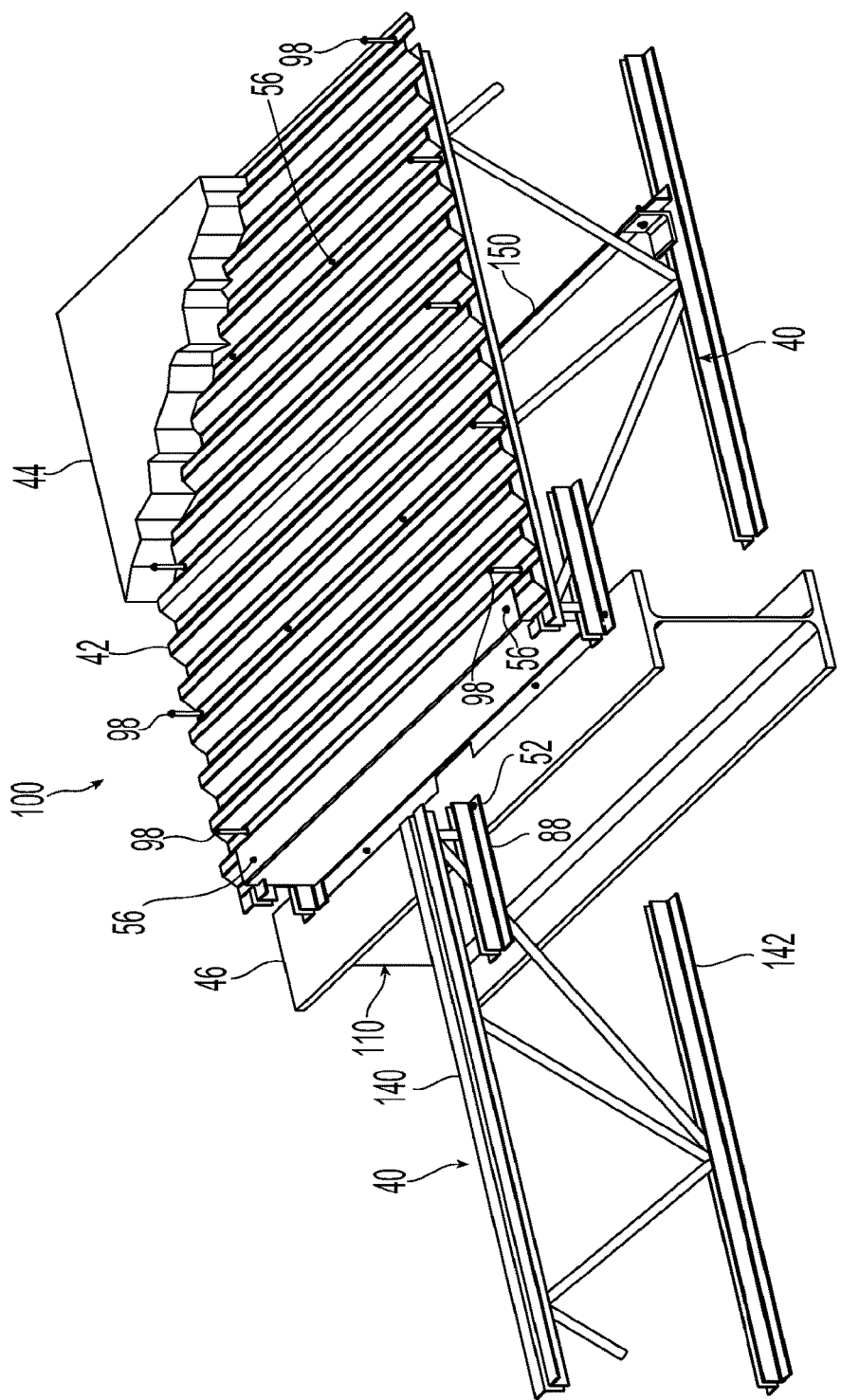
FIG. 1 is a partial prospective view of a floor joist system of the present disclosure.
Figure 2:
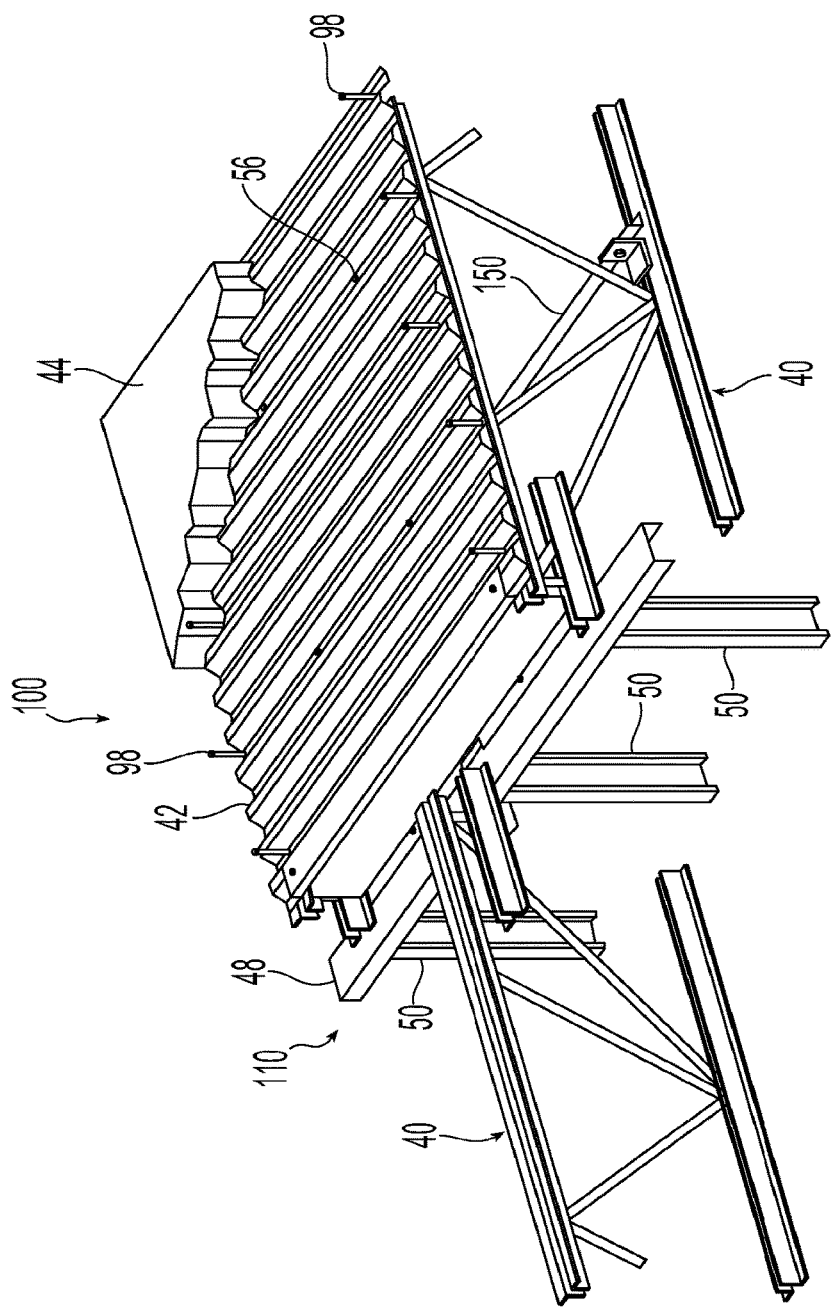
FIG. 2 is a partial prospective view of an alternative embodiment of the floor joist system of FIG. 1.
Figure 3B:
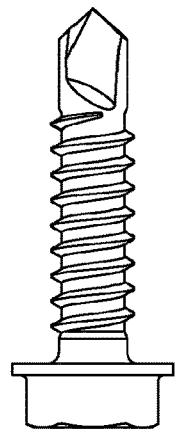
FIGS. 3A and 3B are side views of prior art self-drilling bolts.
Figure 3C:
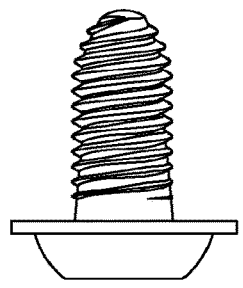
FIG. 3C is a side view of a prior self-threading bolt.
Figure 3A:
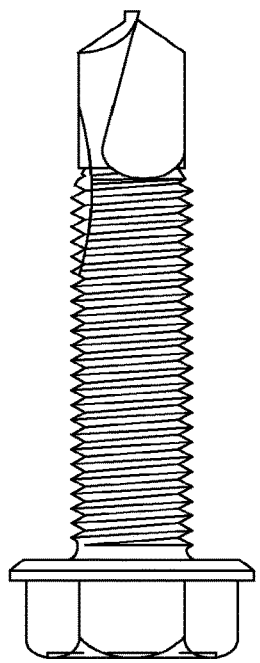

Turning now to FIGS. 1 and 2, a building structure may include a floor joist system 100 and at least one load and typically two or more bearing member 110. The floor joist system 100 may comprise a plurality of joists 40 transverse to the load bearing member 110 spaced between load bearing members 110, and supporting a steel deck 42. The steel deck 42 is typically made of side-by-side corrugated member, covered by a concrete slab 44. The load bearing member 110 may include a girder 46 as shown in FIG. 1. Alternatively, the load bearing member 110 may be a load bearing wall 48 comprising a plurality of studs 50 as shown in FIG. 2. The load bearing member may comprise other structural members as desired to support the floor joist system 100.

Figure 4C:
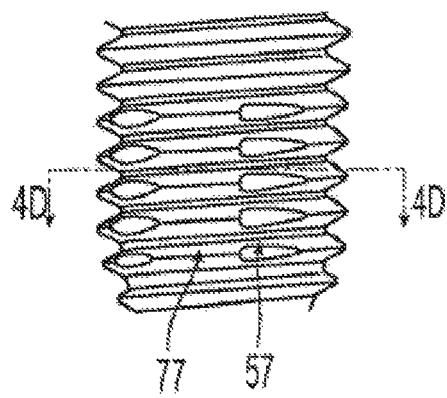
FIG. 4C and FIG. 4F illustrate alternative thread-forming portions of the fastener of FIG. 4A.
Figure 5C:
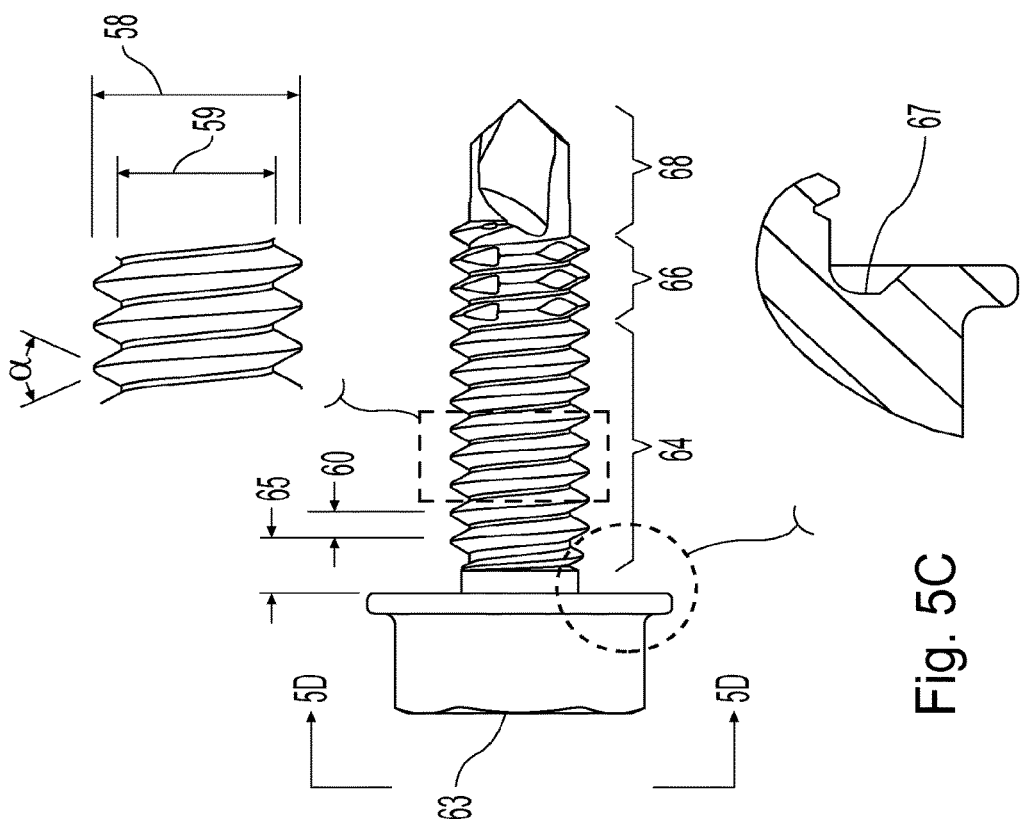
FIGS. 5C and 5D are side and end views respectively of an alternative self-drilling, thread-forming fastener of the present disclosure.
Figure 5D:
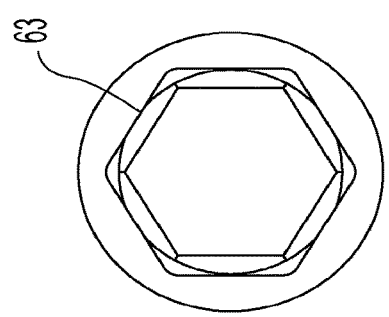

Various building members in the building structure may be connected together and secured by a plurality of thread-forming fasteners 52 such as shown in FIG. 4A, or by a plurality of self-drilling, thread-forming fastener 54 such as shown in FIG. 5A, or by a plurality of case hardened thread-forming self-drilling fasteners such as shown in FIG. 5C. For example, a first steel building member, such as a joist 40, may be connected to a second steel building member, such as the load bearing member 110, by a plurality of the thread-forming fasteners 52, or by a plurality of the self-drilling, thread-forming fastener 54.

Figure 8:
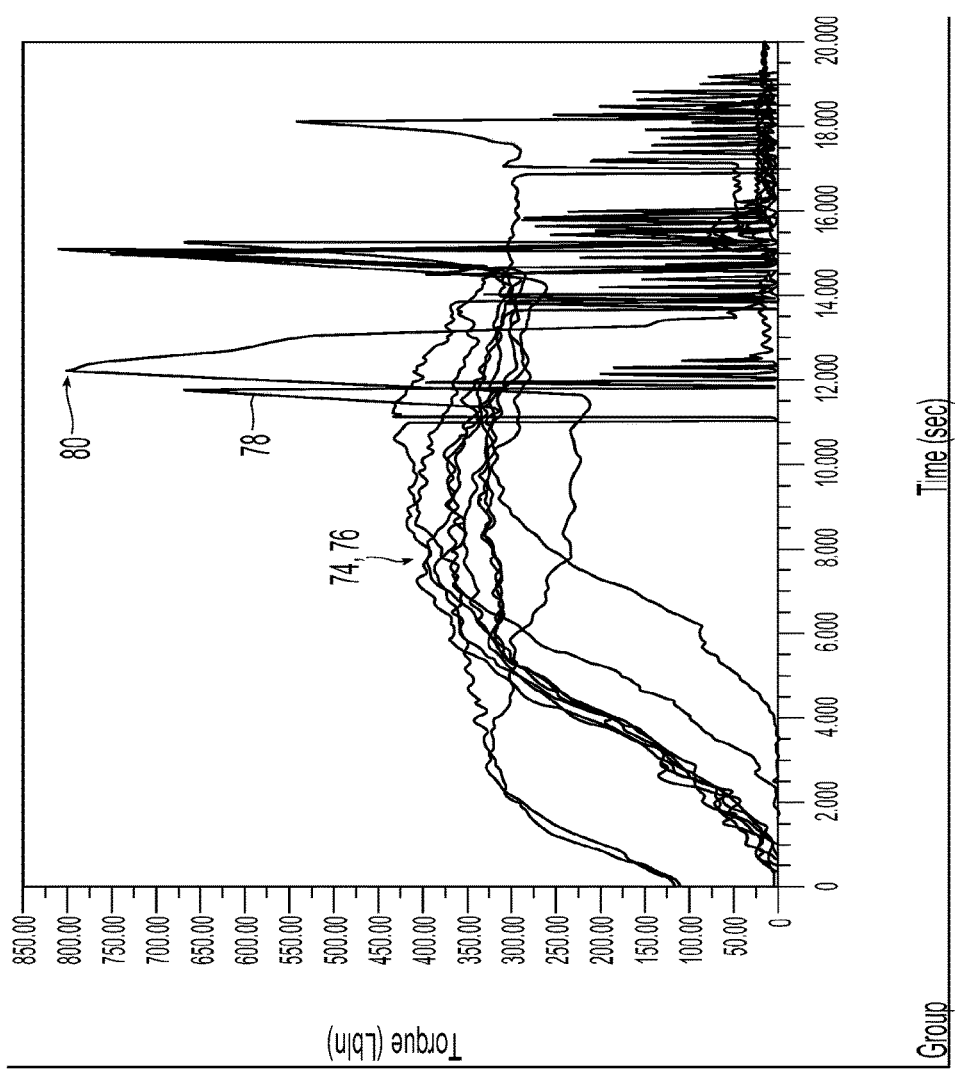
FIG. 8 is a graph of torque of over time during installation for a comparative self-drilling fastener installed in a steel sheet having a thickness of about 0.25 inch.

Each thread-forming fastener 52 is a fastener of steel having a tapered lead portion 62 tapering at an angle in a range from 30° to 60° of at least Rockwell C-Scale hardness (HRC) 50 induction hardness adapted to start into a pilot hole 70, which may be pre-drilled, pre-punched or otherwise formed, in at least the second steel building member, such as shown in FIGS. 8 and 9. The thread-forming fastener 52 includes a thread-forming portion 66 of at least HRC 50 hardness adapted to thread the fastener 52 into at least the second building member, and a threaded portion 64 adjacent the thread-forming portion 66. As used in the specification herein and the appended claims, the word adjacent means either adjoining or nearby; as used herein adjacent features may or may not be contiguous. The thread-forming fastener 52 has a head 63 capable of clamping the first steel building member to the second steel building member with the fastener 52 installed. The threaded portion 64 has a major diameter 58, i.e. the diameter of the fastener at the tip of the thread, and a minor diameter 59, i.e. the diameter of the fastener at the root of the thread, as shown in FIG. 4. The fastener 52 has a desired thread pitch 60, i.e. the distance from one thread tip to the adjacent thread tip along the length of the fastener, as shown in FIG. 4A.

At least a portion of the threaded portion 64 of the thread-forming fasteners 52 adjacent the head 63 may have a hardness between about Rockwell B-Scale hardness (HRB) 70 and HRC 40. In one alternative, at least a portion of the threaded portion 64 has a through hardness between about HRC 25 and HRC 34. In one alternative, at least a portion of the threaded portion 64 has a through hardness between about HRB 70 and HRB 100. In one alternative, at least a portion of the threaded portion 64 has a through hardness between about HRC 19 and HRC 30. In one alternative, at least a portion of the threaded portion 64 has a through hardness between about HRC 26 and HRC 36. In yet another alternative, at least a portion of the threaded portion 64 has a through hardness between about HRC 33 and HRC 39. The hardness of at least a portion of the threaded portion 64 may be selected to comply with ASTM A307, ASTM A325, ASTM A354, ASTM A490 or other fastener standard. Alternatively or in addition, the hardness of at least a portion of the threaded portion 64 may be selected to comply with SAE J429 Grade 2, SAE J429 Grade 5, and SAE J429 Grade 8, or other fastener standard. Adjacent the threaded portion 64, the thread-forming portion 66 may have a hardness greater than about HRC 50, and may be greater than about HRC 54. Up to five threads between the threaded portion 64 and the thread-forming portion 66 may be hardened to at least HRC 50 or at least HRC 54, and at least a majority of the threaded portion 64 of the thread-forming fasteners 52 is through-hardened such that the fastener is ductile through the threaded portion. As the thread-forming fastener 52 is installed connecting a first steel building member and a second steel building member, the fastener 52 may be tightened to clamp the first member between the head 63 and the formed threads in the second building member. As the thread-forming fastener 52 is tightened, a portion of the ductile threaded portion 64 between the head 63 and the threads engaging the second building member elongates providing a clamping load on the connection according to design requirements. In the past, thread-forming fasteners had case hardened threads that could not elongate in clamping without risk of fracture or hydrogen embrittlement. The present thread-forming fasteners 52 have sufficient ductility for structural connections such as slip-critical connections in which the materials joined are clamped together without slippage by the tension induced in the fasteners.

The thread-forming fastener 52 may have a major diameter between about ¼ inch, or smaller, and 1½ inch, or larger. In a connection of first and second steel building members, the first steel building member may have a clearance hole 72 having a diameter larger than the major diameter of the fastener 52. The second steel building member has the pilot hole 70 aligned with the clearance hole in the first member, the pilot hole being smaller than the major diameter of the fastener 52, and typically larger than the minor diameter, although for thin metal applications, such as thinner than 14 gage, or less than 16 gage, the pilot hole may be smaller than the minor diameter. The pre-drilled or pre-punched pilot holes 70 in the second steel building member may be adapted to installing thread-forming fasteners 52, the pilot holes 70 having a bore diameter between about 70% and 98% of the major diameter 58. Alternatively, the pilot hole bore diameters for installing the thread-forming fasteners 52 may be between about 80% and 98% of the major diameter 58, and alternatively between about 80% and 95% of the major diameter. The diameter of the pilot hole may be selected based on the thickness of the second building member, the major diameter of the fastener, and the desired thread-forming torque. The thread-forming fastener 52 is installed through the clearance hole 72 and rotated into the pilot hole 70. The thread-forming portion 66 forms threads in the bore of the pilot hole for the threaded portion 64 to engage the second member. The thread-forming fastener 52 is tightened to clamp the first member between the head 63 and the formed threads in the second member. Alternatively, the first and second members are both provided with pilot holes and the thread-forming portion 66 forms threads in the bore of the pilot holes in both the first and second members for the threaded portion 64 to engage the first and the second member. Optionally, the thread-forming fastener 52 may include an unthreaded shank portion (not shown) between the head 63 and the threaded portion 64 as desired for the connection. If provided, the length of an unthreaded shank portion and the axial length of the threaded portion 64 may be selected according to the thickness of the first and second building members and desired length of thread engagement. For example, in certain bearing-type connections with threads excluded from the shear plane, an unthreaded shank portion (not shown) may be desired having a length greater than the thickness of the first building member such that the threaded portion 64 engages the second building member clamping the first building member between the head 63 and the threads engaging the second building member. In any case, the threaded engagement with the first and/or second building member acts as a nut, and in certain applications, no nut may required based on design requirements. Examples of various configurations of installation of thread-forming fasteners 52 clearance holes and pilot holes are disclosed in applications described herein, and each application disclosed is not limited to the configuration described.

Shown in the graph of FIG. 6 is the installation torque over time for 5 test samples of the self-drilling, thread-forming fastener 54 identified as manufacturer's samples 360-80901-60, representative of the thread-forming portion and threaded portion of the thread-forming fastener 52 having a major diameter of ⅜ inch installed into a pilot hole at 175 revolutions per minute into a ¼ inch thick plate. As the thread-forming fastener 52 is driven into the pilot hole in the ¼ inch thick plate, a thread-forming torque 74 is the largest torque used to rotate the thread-forming portion 66 of the thread-forming fastener 52 into the pilot hole 70 forming threads in the pilot hole. After the head 63 makes contact with the first building member, further rotation advances the threaded portion 64 into the threaded fastener opening with increasing torque as the head clamps the members against the threads formed in the second member. The operator stops tightening the fastener at a seating torque 78 as desired lower than the failure torque 80. The drive torque 76 is the torque right before the torque rise to seating, as shown in FIG. 6. Continued rotation of the fastener may further increase the torque needed to turn the fastener until the bolted connection fails at the failure torque 80. The failure mode typically is determined by the thickness of the building members and the major diameter 58 of the fastener. When the building member in which threads are formed is a thin material such as less than 14 gage, or less than 16 gage, the material of the building member may deform or fracture and the fastener strip-out at a strip torque. Failure torque 80 generally refers to strip torque in building members of thinner thickness. For certain material thicknesses, the fastener will fracture at the failure torque 80.

The installation torque over time for the thread-forming fastener 52 was measured using self-drilling, thread-forming fasteners 54 installed in a pre-drilled pilot hole to negate effects of the fluted lead portion. Five samples having a major diameter of ⅜ inch were installed at 175 revolutions per minute into pilot holes in a steel member having a thickness of about 0.25 inch and plotted in the graph of FIG. 6. The thread-forming torque 74 as shown in the graph of FIG. 6 is less than about 200 inch-pounds. The drive torque 76, before the torque rises to seating, is less than about 25 inch-pounds. The failure torque 80 is greater than 600 inch-pounds. For certain samples, the failure torque is greater than 700 inch-pounds, and one sample greater than about 900 inch-pounds. The failure torque 80 shown in FIG. 6 is a strip torque for 4 of the 5 samples. The trace identified as "A" in FIG. 6 shows a drop to 0 inch-pounds after reaching the failure torque because fastener A fractured at the failure torque. The ratio of failure torque to thread-forming torque is at least 3.0, and the ratio of failure torque to drive torque may be greater than 6.0 when the steel member has a thickness of 0.25 inch (about 6.35 millimeter) and the pilot hole having at least one diameter within nominal diameter between 85 and 90% of major diameter. Alternatively, the ratio of failure torque to drive torque may be greater than 10, and may be greater than 20. The ratio of failure torque to drive torque may be as high as 50 to 100, or more, when the second building member having a thickness of 0.25 inch and the pilot hole having at least one diameter within nominal diameter between 80 and 98% of major diameter.

Figure 7:
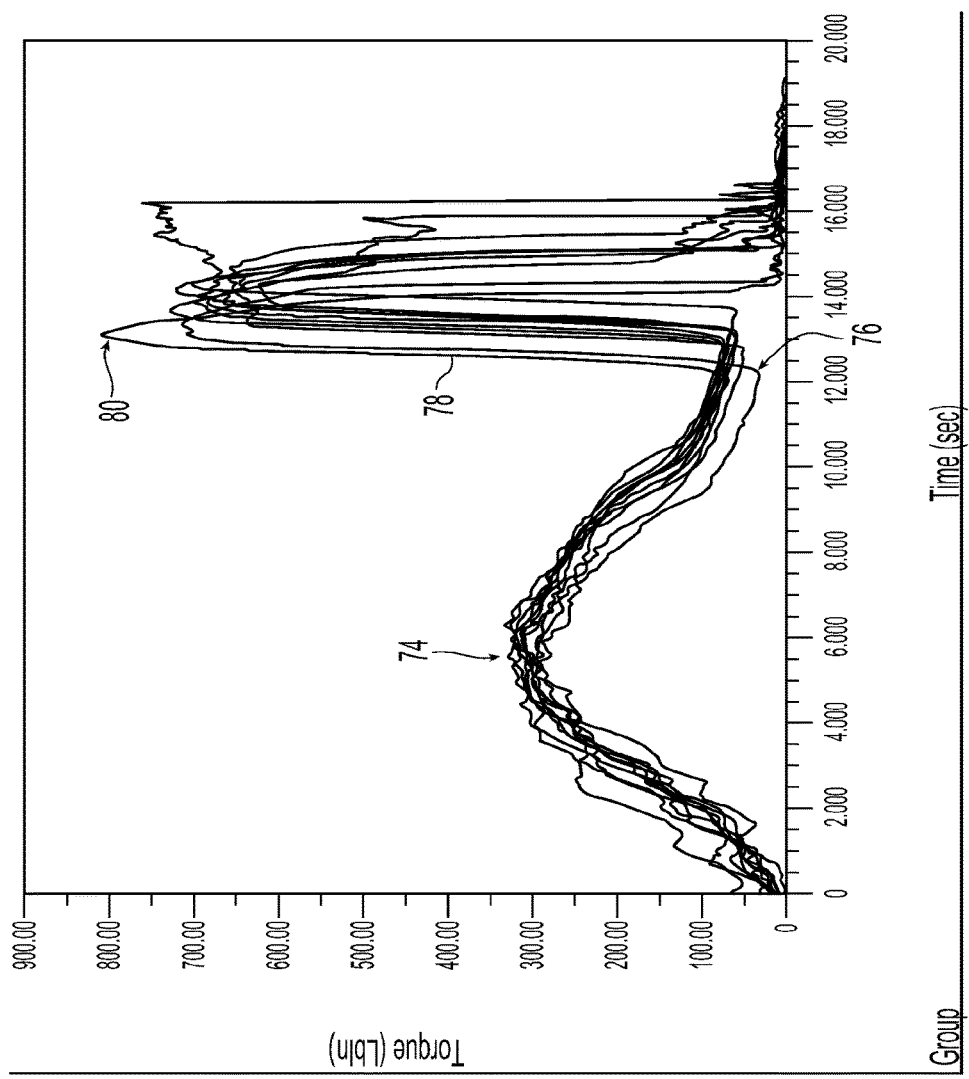
FIG. 7 is a graph of torque to over time during installation representing alternative thread-forming fasteners of FIG. 4A installed in a steel sheet having a thickness of about 0.25 inch.

Further testing of ⅜ inch major diameter thread-forming fasteners 52 is shown in FIG. 7. As with the experiment shown in FIG. 6, the installation torque over time for the thread-forming fastener 52 was measured using ten samples of self-drilling, thread-forming fasteners 54, identified as manufacturer's samples 360-80952-60 having a major diameter of ⅜ inch, installed in pre-drilled pilot holes to negate effects of the fluted lead portion. The samples were installed at 175 revolutions per minute into 0.302 inch diameter pilot holes in a steel member having a thickness of about 0.25 inch and plotted in the graph of FIG. 7. In this test sample, the average thread-forming torque 74 of the samples was 316.6 inch-pounds. As shown in the graph of FIG. 7, the thread-forming torque is less than about 350 inch-pounds. The drive torque 76, before the torque rises to seating, is less than about 100 inch-pounds. The failure torque 80 is greater than 600 inch-pounds. For certain samples, the failure torque is greater than 700 inch-pounds, and one sample greater than 800 inch-pounds.

FIG. 8 shows installation torque over time for comparative samples of prior ⅜ inch fasteners. The comparative fasteners lacked the present thread-forming portion, instead utilizing prior technology. The graph of FIG. 8 shows the higher thread-forming torque required to drive the prior fasteners. The average thread-forming torque of the ten samples was 373.4 inch-pounds. Additionally, the drive torque is significantly higher than the present fasteners as shown in FIG. 7. The drive torque for the comparative fastener samples is greater than 200 inch-pounds, and for most samples is greater than 250 inch-pounds. The ratio of failure torque to drive torque for the comparative fasteners is less than 4. Additionally, as shown by the graph of FIG. 8 and TABLE 1, the variation in performance among the comparative samples was much higher than the present fastener as shown by the standard deviation of the data.

TABLE 1

|  | Mean Thread-Forming Torque (in-lbs) | Standard Deviation Thread-Forming Torque | Mean Failure Torque (in-lbs) | Standard Deviation Failure Torque |
| --- | --- | --- | --- | --- |
| Present Invention, FIG. 7 | 316.6 | 9.8 | 708.1 | 53.4 |
| Comparative Invention, FIG. 8 | 373.4 | 37.5 | 685.1 | 136.1 |

The consistent performance of the present fastener provides better predictability. In certain applications, additional prior fasteners were added to accommodate the inconsistent performance of the prior fasteners. In these applications, the improved performance and decreased variation of the present fasteners 52 may allow a fewer number of fasteners to be used to provide the desired design requirement at an increased efficiency.

Figure 4F:
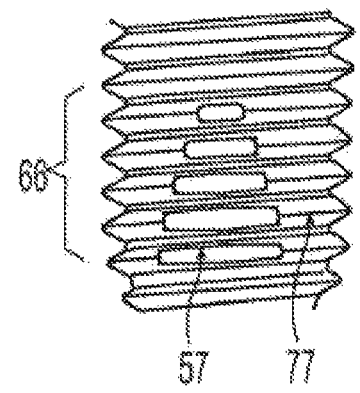

The thread-forming portion 66 of thread-forming fastener 52 may have a bilobular, trilobular, quadlobular, pentalobular, hexalobular or other cross-sectional shape. Of these the pentalobular shape has been found to date to give the best performance in thread forming. In any event, these lobar shapes of the thread-forming portion of the fastener control the thread-forming torque and drive torque to facilitate installation of the fastener, reduce failures in installation, and improve the load carrying capacity of the assembled building members. The thread-forming portion includes a plurality of relief recesses 57 spaced around the thread-forming portion 66 to segment the thread-forming portion 66 into a desired number of lobes 77 forming the bilobular, trilobular, quadlobular, pentalobular, hexalobular or other cross-sectional shape. For example, five relief recesses 57 may be spaced as desired around the thread-forming portion 66 to segment the thread-forming portion 66 into five lobes 77 forming the pentalobular cross-section shown in FIG. 4D, and four relief recesses 145 may be spaced as desired around the thread-forming portion 143 to segment the thread-forming portion 143 into four lobes 139 forming the quadlobular cross-section shown in FIG. 4D. As shown in FIG. 4C, the relief recesses 57 may be longitudinal recesses provided along the axial direction of the fastener. In one alternative, the width of the relief recesses 57 may be wider toward the fluted lead portion forming the triangular shape as shown in FIG. 4F.

Figure 4D:
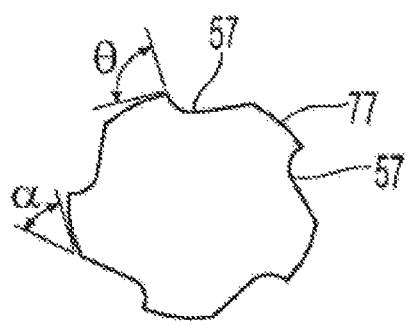
FIG. 4D and FIG. 4G illustrate alternative cross-sections through the thread-forming portion shown in FIG. 4C.
Figure 4G:
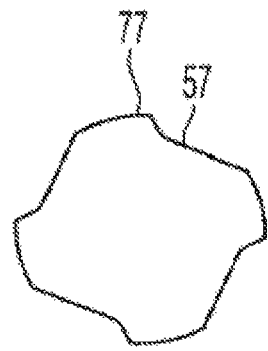

In some embodiments, the thread-forming portion of the fastener includes a series of lobes 77 with relief recesses 57 between about the rotational axis such as shown in FIGS. 4D and 4G. Each lobe 77 has a leading portion and a tailing portion, the leading portion and first adjacent recess may be at a first angle, shown as θ in FIG. 4D, in a range from 50° to 100° from a plane tangent to the lobe adjacent the leading portion, and the tailing portion and second adjacent recess may be at a second angle, shown as α in FIG. 4D, in a range from 25° to 50° from a plane tangent to the lobe adjacent the tailing portion. As shown in FIG. 4D, the first angle may be greater than the second angle. Alternatively, the second angle between the tailing portion and second adjacent recess may be in a range from 50° to 100° from a plane tangent to the lobe adjacent the tailing portion. In this alternative, the first angle and the second angle may be approximately the same. The recess may include arcuate surfaces and/or flat surfaces forming the intersection between the recess and the lobe forming the first and second angles.

The relief recesses 57 may extend into the threads of the fastener to about the minor diameter 59. Alternatively, the relief recesses 57 may extend into the shank of the fastener deeper than the minor diameter 59, such as to a depth between about 80% and 99% of the minor diameter. In yet another alternative, the relief recesses 57 may extend into the threads of the fastener to a depth between the major diameter 58 and the minor diameter 59, such as to a depth between about 101% and 120% of the minor diameter. Each relief recess 57 may be about one thread pitch in width. Alternatively, the relief recesses 57 may be between about 0.8 and 4 thread pitches wide. In one alternative, the width of the relief recesses 57 may be between about 30% and 70% of the formula (π×major diameter/number of lobes) as desired to provide desired separation between the lobes 77. In yet another alternative, the width of the relief recesses 57 may be between about 40% and 60% of the formula (π×major diameter/number of lobes). For example, in one application having 4 lobes (quadralobular), the width of the relief recesses may be approximately 60% of the formula (π×major diameter/number of lobes). In another example, in one application having 2 lobes (bilobular), the width of the relief recesses may be approximately 50% of the formula (π×major diameter/number of lobes). The relief recesses 57 of the thread-forming portion 66 may be between about 3 to 7 thread pitches 60 in axial length. Alternatively, the relief recesses 57 of the thread-forming portion 66 may be between 2 and 5 thread pitches 60 in axial length. Depending upon the size of the fastener, the thread-forming portion 66 may be between about 0.06 and 0.5 inches in length, and may have a thread-forming torque of no more than about ⅓ of the failure torque 80. In any event, the thread-forming torque is less than the torsional strength of the fastener to avoid failure. In one alternative, the thread-forming torque is less than 80% of the torsional strength of the fastener.

The threaded portion 64 of the thread-forming fastener 52 is adapted to install at a drive torque 76 at least 50% less than the thread-forming torque 74, i.e. no more than 50% of the thread-forming torque. In one alternative, the drive torque is less than 30% of the thread-forming torque. Alternatively, the drive torque 76 is between about 5% and 60% of the thread-forming torque 74. To reduce driving torque, the threaded portion 64 may include back-tapered threads, and may have a thread angle less than 60°, represented as a in FIG. 4E. Alternatively, the thread angle may be less than 50°. In yet another alternative, such thread angle may be between 45 and 50°. Reducing the thread angle also reduces the thread pitch 60 and reduces the minor diameter 59. Back-tapered threads as used herein means that the major diameter 58 of the threaded portion 64 has a back-taper such that the major diameter 58 is larger adjacent the thread-forming portion 66 than the major diameter 58 adjacent the head 63. In certain embodiments, the back-taper of the major diameter may be between about 0.0005 and 0.005 inch per inch of axial length. Alternatively, the back-taper may be between about 0.001 and 0.003 inch per inch of length.

The threaded portion 64 of fastener 52 may provide a failure torque 80 of at least 600 inch-pounds measured using a fastener 52 having a major diameter of ½ inch threaded into a pilot hole having at least one diameter within nominal diameter between about 80% and 98% of the major diameter 58 and the threaded member having a material thickness of about 0.25 inch (about 6.35 millimeter). For material thicknesses greater than 0.25 inch, the threaded portion may have a seating torque of at least 400 inch-pounds. Alternatively, the threaded portion has seating torque of at least 600 inch-pounds, and may be at least 800 inch-pounds measured using a ½ inch fastener threaded into a pilot hole having at least one diameter within nominal diameter between about 80% and 98% of the major diameter 58 and the threaded member having a material thickness of about 0.25 inch (about 6.35 millimeter).

Figure 16A:
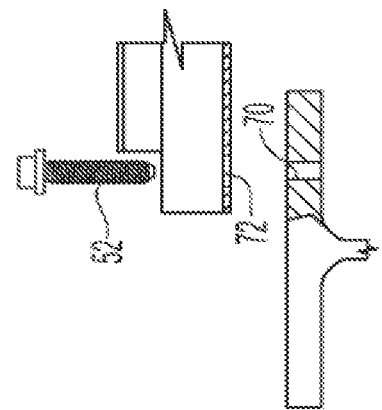
FIG. 16 and FIG. 16A illustrate a flush mounted joist seat.
Figure 16:
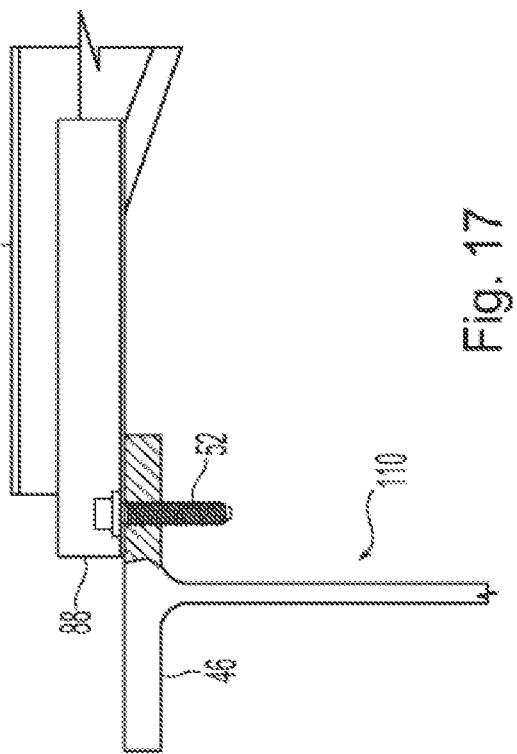
Figure 17:
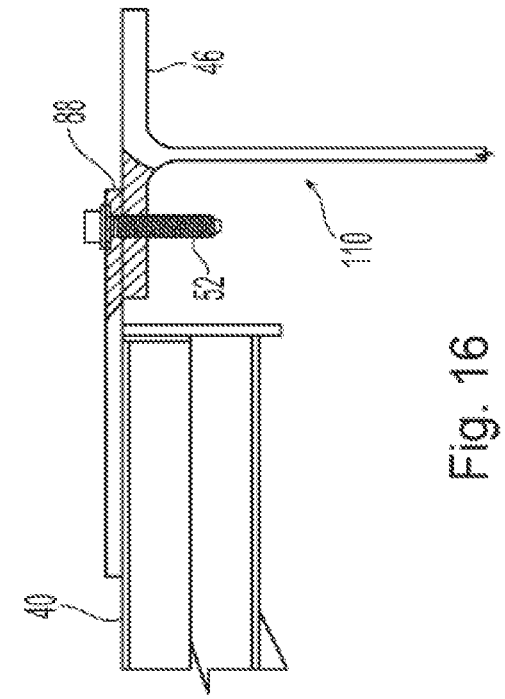

The thread-forming fastener 52 may be used in connections such as shown in FIGS. 16 and 17, where the first steel building member, such as the joist 40, includes a clearance hole 72 having a bore diameter larger than the major diameter 58 of the fastener. The second steel building member, such as the girder 46, includes the pilot hole 70. The pilot hole 70 may have a bore diameter between about 70% and 95% of the major diameter 58. Alternatively, the pilot hole 70 may have a bore diameter between about 80% and 98% of the major diameter, and alternatively, between about 80% and 95% of the major diameter 58. The thread-forming fastener 52 may be positioned through the clearance hole 72 in the first member and driven into the pilot hole 70 of the second member. The thread-forming portion 66 forms threads in the bore of the pilot hole enabling the threaded portion 64 to be threaded into the second member, clamping the first member between the head 63 and the threads formed in the second member. The thread-forming fastener 52 may have a major diameter between about ¼ inch and 1 inch, or greater as desired for the size and load requirements for the connection in the assembly. At least a portion of the threaded portion 64 of the thread-forming fastener 52 as shown in FIGS. 16 and 17 may comply with ASTM A307, A354, A325, A490, or other fastener standard as required.

Alternatively, for certain connections, both the first member and the second member may include the pilot hole 70, wherein the thread-forming portion 66 forms threads in both the first and second members.

The self-drilling, thread-forming fastener 54, as shown in FIGS. 5A through 5D and 5H, are fasteners of steel comprising the head 63 capable of clamping the first steel building member to the second steel building member with the fastener installed. The self-drilling, thread-forming fastener 54 includes the threaded portion 64 adjacent the head 63, and the thread-forming portion 66 as discussed above adjacent the threaded portion 64 of at least HRC 50 hardness adapted to enable the fastener form threads into at least the second building member. The self-drilling, thread-forming fastener 54 has a fluted lead portion 68 at the tip of the fastener 54 and adjacent the thread-forming portion 66 of at least HRC 50 hardness with a nominal diameter between about 70 and 95% of the major diameter 58 of the threaded portion 64 adapted to form the fastener opening, or pilot hole 70, and typically larger than the minor diameter, although for thin metal applications, such as thinner than 14 gage, or less than 16 gage, the nominal diameter of the fluted lead portion 68 may be smaller than the minor diameter. Alternatively, the fluted lead portion 68 has a nominal diameter between about 80% and 95% of the major diameter 58.

The fluted lead portion 68 may have a swaged or pinched point, a milled point, or a combination of both. The milled point alone, or in combination with preformed swedged or pinched point, is generally desired to ensure effectiveness of the fluted lead portion in drilling through the building members. The length of the fluted lead portion 68 may be longer than the thickness of the building member through which the fluted lead portion drills. It may be useful to provide the fluted lead portion 68 having an axial length between about 1.1 and 2.0 times the thickness of the drilled building member. The fluted lead portion 68 may be a Type 1, Type 2, Type 3, Type 4, Type 5, or a variation thereof.

At least a portion of the threaded portion 64 of the self-drilling, thread-forming fastener 54 may have a hardness between about HRB 70 and HRC 40 through hardness. In one alternative, at least a portion of the threaded portion 64 has a hardness between about HRC 25 and HRC 34. In one alternative, at least a portion of the threaded portion 64 has a through hardness between about HRB 70 and HRB 100. In one alternative, at least a portion of the threaded portion 64 has a through hardness between about HRC 19 and HRC 30. In one alternative, at least a portion of the threaded portion 64 has a through hardness between about HRC 26 and HRC 36. In yet another alternative, at least a portion of the threaded portion 64 has a through hardness between about HRC 33 and HRC 39. As discussed above, the hardness of the threaded portion 64 may be selected to comply with ASTM A307, ASTM A325, ASTM A354, ASTM A490 or other fastener standard. Alternatively or in addition, the hardness of the threaded portion 64 may be selected to comply with SAE J429 Grade 2, SAE J429 Grade 5, and SAE J429 Grade 8, or other fastener standard.

In yet another alternative, the self-drilling, thread-forming fastener may be case hardened to at least HRC 50. For certain applications, the self-drilling, thread-forming fastener may be a case hardened fastener. In the figures, such as FIGS. 1 and 2, in which under certain applications may utilize a case hardened self-drilling, thread-forming fastener, the fastener will be referenced as a case hardened self-drilling, thread-forming fastener 56. The case hardened self-drilling, thread-forming fastener 56 may have a major diameter 58 of between about 0.18 and 0.26 inch.

Adjacent the thread-forming portion 66, a portion of the threaded portion 64 may have a hardness greater than about HRC 50, and may be greater than about HRC 54. Up to five threads between the threaded portion and the thread-forming portion 66 may be hardened to at least HRC 50 or at least HRC 54. The threaded portion 64 of the self-drilling, thread-forming fastener 54 may be through-hardened such that the fastener is ductile through the threaded portion. As discussed above, as the self-drilling, thread-forming fastener 54 is installed connecting a first steel building member and a second steel building member, the fastener 52 may be tightened to clamp the first member between the head 63 and the formed threads in the second building member. As the thread-forming fastener 52 is tightened, a portion of the threaded portion 64 between the head 63 and the threads engaging the second building member elongate providing a clamping load on the connection according to design requirements. The present thread-forming fasteners 52 have sufficient ductility for structural connections such as slip-critical connections.

The self-drilling, thread-forming fastener 54 typically has a major diameter between about 0.12 inch and about ½ inch. In certain instances, the size of the fastener 54 may be limited by the ability of the fluted lead portion 68 to function in drilling at larger sizes. In a connection between a first and a second building member, the first building member may have a clearance hole 72 having a diameter larger than the major diameter of the fastener 54. The self-drilling, thread-forming fastener 54 is installed through the clearance hole and rotated into the second member. The fluted lead portion 68 drills an opening through the second member, and the thread-forming portion 66 forms threads in the bore of the drilled fastener opening for the threaded portion 64 to engage the second building member. The self-drilling, thread-forming fastener 54 is tightened to clamp the first member between the head 63 and the threads formed in the second member. The threaded second member acts as a nut, and in certain applications, no nut may be required based on design requirements. Alternatively, the self-drilling, thread-forming fastener 54 may be installed in a pilot hole, and the thread-forming portion 66 forms threads in the bore of the pilot hole for the threaded portion 64 to engage the second building member. In yet another alternative, neither clearance hole or pilot hole is provided and the fluted lead portion 68 drills through both the first and second member, and the thread-forming portion 66 forms threads in the bore of the drilled fastener opening for the threaded portion 64 to engage with the formed threads in both the first and second members. Optionally, the self-drilling, thread-forming fastener 54 may include an unthreaded shank portion (not shown) between the head 63 and the threaded portion 64 as desired for the connection. If provided, the length of an unthreaded shank portion and the axial length of the threaded portion 64 may be selected according to the thickness of the first and second building members and desired length of thread engagement. For example, in certain bearing-type connections with threads excluded from the shear plane, an unthreaded shank portion (not shown) may be desired having a length greater than the thickness of the first building member such that the threaded portion 64 engages the second building member clamping the first building member between the head 63 and the threads engaging the second building member. In any case, the threaded engagement with the first and/or second building member acts as a nut, and for certain applications, no nut may be required based on design requirements. Examples of various configurations of installation of self-drilling, thread-forming fastener 54 with and without clearance holes and/or pilot holes are disclosed in applications described herein, and each application disclosed is not limited to the configuration described.

Figure 9A:
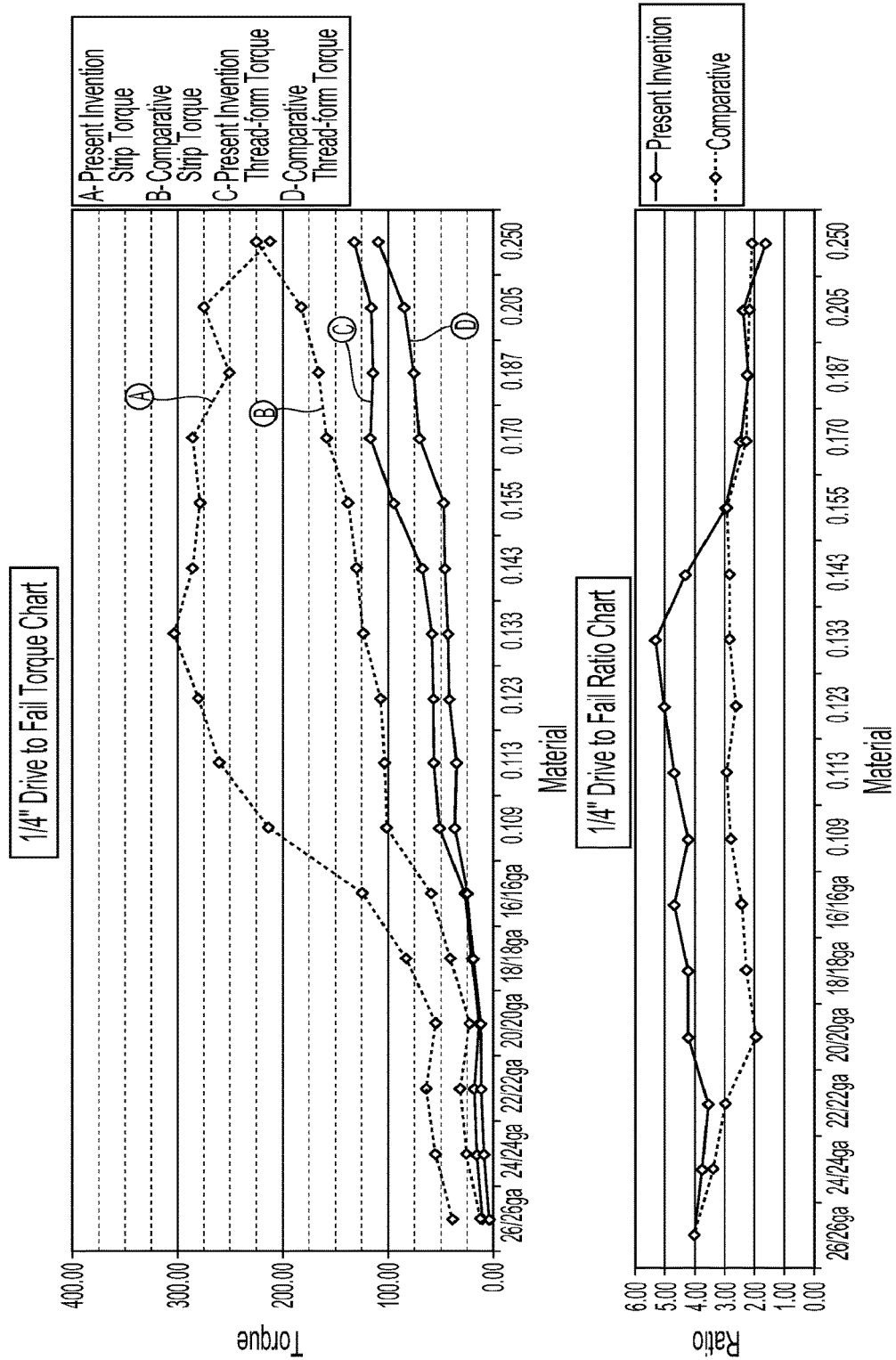
FIG. 9A is a graph of thread-forming torque, failure torque, and failure to thread-forming torque ratios for a ¼ inch major diameter self drilling, thread-forming fastener of FIG. 5A and a comparative sample installed in steel sheets of various thicknesses.

The present self-drilling, thread-forming fastener 54, 56 provides a ratio of strip torque to thread-forming torque of at least 3.0 and a ratio of strip torque to drive torque greater than 6.0 over a range of combined thickness of first and second steel building members from 0.036 inch to 0.084 inch. As shown in FIG. 9A, samples of a ¼ inch major diameter self-drilling, thread-forming fastener 54 of the present invention identified as manufacturer's samples ETC045 were installed into materials of different thicknesses and compared to prior ¼ inch major diameter fasteners. For steel sheet samples between 26 gage and 16 gage, the fasteners were installed into two sheets together. Additionally, the fasteners were installed into one steel sheet thickness for materials between about 0.109 and 0.25 inch thickness. Ten samples were used for each tested thickness. TABLE 2 shows typical gage thickness for steel sheet (source: Steel Deck Institute).

TABLE 2

| GAGE | ONE SHEET THICKNESS | TWO SHEET THICKNESS |
|---|---|---|
| 16 | .0598 | 0.120 |
| 18 | .0474 | 0.096 |
| 20 | .0358 | 0.072 |
| 22 | .0295 | 0.060 |
| 24 | .0238 | 0.048 |
| 26 | .0179 | 0.036 |

FIG. 9A and TABLE 3 show the ratio of strip torque to thread-forming torque for the tested fasteners. The ¼ inch self-drilling, thread-forming fastener 54 provided a ratio of strip torque to thread-forming torque of at least 3.0 for all thicknesses tested up to and including 0.143 inch thick sheet. Alternatively, the ¼ inch self-drilling, thread-forming fastener 54 provided a ratio of strip torque to thread-forming torque of at least 3.5 for all thicknesses tested up to and including 0.143 inch thick sheet. TABLE 4 provides the strip torque and thread-forming torque for the ¼ inch samples tested.

TABLE 3

| | ¼ inch Present Invention Strip Torque to Thread-forming Torque Ratio | ¼ inch Comparative Sample Strip Torque to Thread-forming Torque Ratio |
|---|---|---|
| 26/26 gage | 4.01 | 4.00 |
| 24/24 gage | 3.73 | 3.42 |
| 22/22 gage | 3.56 | 2.96 |
| 20/20 gage | 4.19 | 1.95 |
| 18/18 gage | 4.23 | 2.27 |
| 16/16 gage | 4.67 | 2.43 |
| 0.109 | 4.18 | 2.78 |
| 0.113 | 4.67 | 2.95 |
| 0.123 | 5.00 | 2.59 |
| 0.133 | 5.27 | 2.84 |
| 0.143 | 4.29 | 2.84 |
| 0.155 | 2.96 | 2.94 |
| 0.170 | 2.46 | 2.26 |
| 0.187 | 2.19 | 2.23 |
| 0.205 | 2.39 | 2.18 |
| 0.250 | 1.62 | 2.09 |

TABLE 4

| | ¼ inch Present Invention Thread-forming Torque (in-lb) | ¼ inch Present Invention Strip Torque (in-lb) | ¼ inch Comparative Sample Thread-forming Torque (in-lb) | ¼ inch Comparative Sample Strip Torque (in-lb) |
|---|---|---|---|---|
| 26/26 gage | 9.73 | 38.98 | 3.18 | 12.73 |
| 24/24 gage | 14.84 | 55.37 | 7.43 | 25.43 |
| 22/22 gage | 18.01 | 64.17 | 10.97 | 32.43 |
| 20/20 gage | 13.13 | 55.06 | 11.38 | 22.16 |
| 18/18 gage | 19.69 | 83.24 | 18.27 | 41.55 |
| 16/16 gage | 26.61 | 124.25 | 24.37 | 59.22 |
| 0.109 | 51.14 | 213.89 | 36.8 | 102.37 |
| 0.113 | 55.80 | 260.42 | 35.16 | 103.7 |
| 0.123 | 56.01 | 280.28 | 41.73 | 107.98 |
| 0.133 | 57.53 | 303.09 | 43.34 | 123.17 |
| 0.143 | 66.68 | 285.87 | 45.79 | 130.26 |
| 0.155 | 94.43 | 279.12 | 46.99 | 138.33 |
| 0.170 | 116.35 | 286.48 | 70.25 | 158.82 |
| 0.187 | 114.43 | 250.67 | 74.78 | 167.03 |
| 0.205 | 115.50 | 275.52 | 84.04 | 182.91 |
| 0.250 | 131.23 | 212.22 | 108.13 | 225.76 |

The ratio of strip torque to thread-forming torque is at least 3.0 and a ratio of strip torque to drive torque greater than 6.0 over a range of combined thickness of first and second steel building members from 0.036 inch to 0.084 inch. Alternatively, the present self-drilling, thread-forming fasteners 54, 56 may have a ratio of strip torque to thread-forming torque of at least 3.0 and a ratio of strip torque to drive torque greater than 8.0 over a range of combined thickness of first and second steel building members from 0.036 inch to 0.084 inch. Alternatively, the fasteners may have a ratio of strip torque to thread-forming torque of at least 3.5 and a ratio of strip torque to drive torque greater than 6.0 over a range of combined thickness of first and second steel building members from 0.036 inch to 0.084 inch. In yet another alternative, the ratio of strip torque to thread-forming torque may be at least 3.5 and a ratio of strip torque to drive torque greater than 8.0 over a range of combined thickness of first and second steel building members from 0.036 inch to 0.084 inch. In yet another alternative, the ratio of strip torque to thread-forming torque may be at least 3.0 and a ratio of strip torque to drive torque greater than 4.0 over a range of combined thickness of first and second steel building members from 0.036 inch to 0.108 inch. In another alternative, the fasteners may have a ratio of strip torque to thread-forming torque of at least 3.0 and a ratio of strip torque to drive torque greater than 6.0 over a range of combined thickness of first and second steel building members from 0.036 inch to 0.108 inch. Alternatively, the present self-drilling, thread-forming fasteners 54, 56 may have a ratio of strip torque to thread-forming torque of at least 4.0 and a ratio of strip torque to drive torque greater than 8.0 over a range of combined thickness of first and second steel building members from 0.054 inch to 0.084 inch. Alternatively, the fasteners may provide a ratio of strip torque to thread-forming torque of at least 4.0 and a ratio of strip torque to drive torque greater than 10.0 over a range of combined thickness of first and second steel building members from 0.054 inch to 0.084 inch.

Figure 9B:
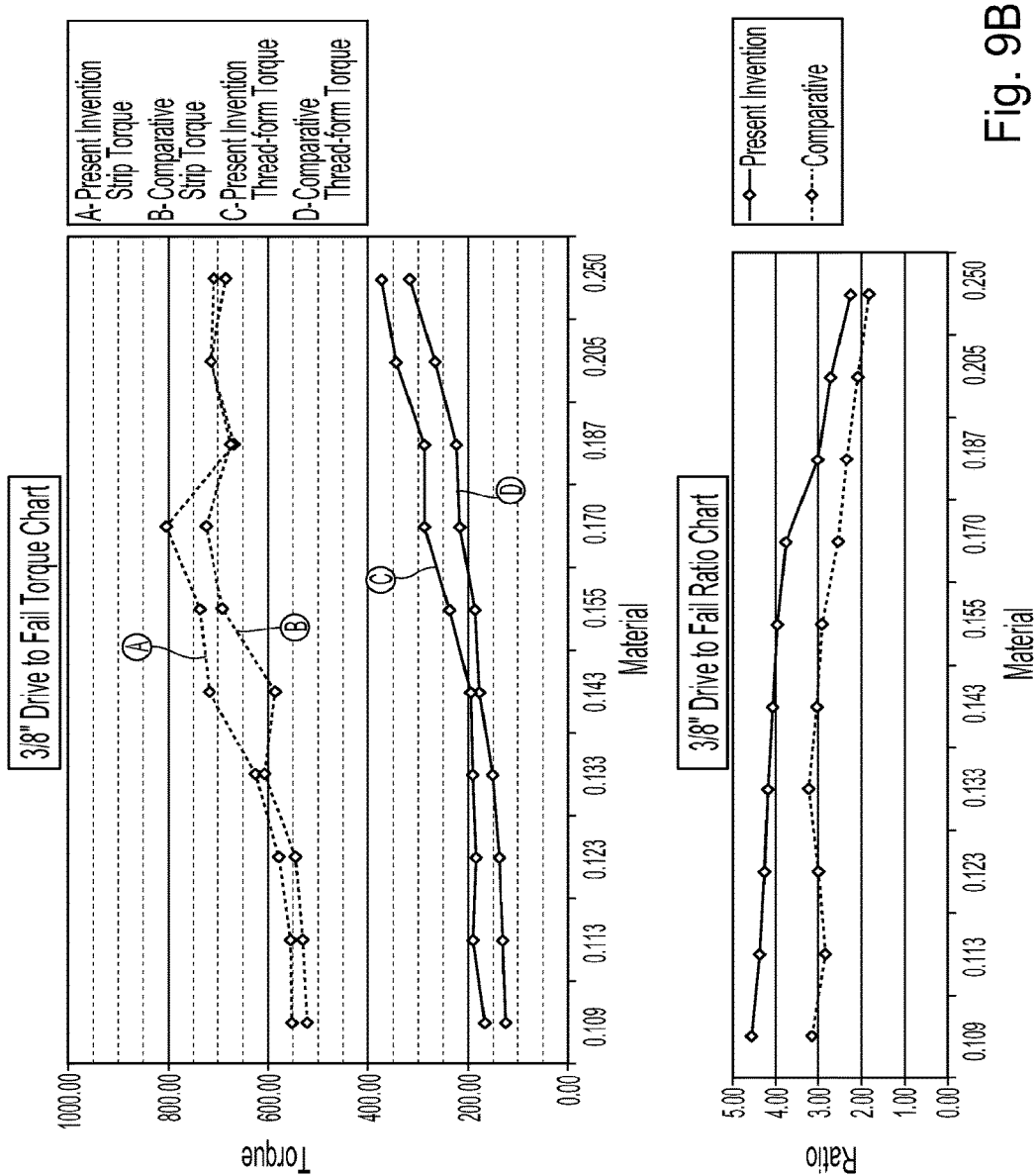
FIG. 9B is a graph of thread-forming torque, failure torque, and failure to thread-forming torque ratios for a ⅜ inch major diameter self drilling, thread-forming fastener of FIG. 5A and a comparative sample installed in steel sheets of various thicknesses.

For certain applications, the self-drilling, thread-forming fasteners 54, 56 are capable of providing a ratio of failure torque to thread-forming torque of at least 3.0 and a ratio of failure torque to drive torque greater than 6.0 over a range of combined thickness of first and second steel building members from 0.10 inch to 0.32 inch. As shown in FIG. 9B, samples of a ⅜ inch major diameter self-drilling, thread-forming fastener 54 of the present invention identified as manufacturer's samples 360-80952-60 were installed into a 0.302 diameter pilot hole in materials of different thicknesses and compared to prior ⅜ inch major diameter fasteners. The fastener samples were installed into single steel sheet thicknesses between about 0.109 and 0.25 inch thickness. Ten samples were used for each tested thickness. TABLE 5 shows the ratio of strip torque to thread-forming torque for the tested fasteners. The ⅜ inch self-drilling, thread-forming fastener 54 provided a ratio of strip torque to thread-forming torque of at least 3.0 for all thicknesses tested up to and including 0.187 inch thick sheet. TABLE 6 shows the failure torque and the thread-forming torque for the ⅜ inch samples tested.

TABLE 5

| | ⅜ inch Present Invention Strip Torque to Thread-forming Torque Ratio | ⅜ inch Comparative Sample Strip Torque to Thread-forming Torque Ratio |
|---|---|---|
| 0.109 | 4.54 | 3.15 |
| 0.113 | 4.34 | 2.83 |
| 0.123 | 4.32 | 3.00 |
| 0.133 | 4.17 | 3.23 |
| 0.143 | 4.07 | 3.04 |

TABLE 5-continued

| ⅜ inch Present Invention Strip Torque to Thread-forming Torque Ratio | ⅜ inch Comparative Sample Strip Torque to Thread-forming Torque Ratio |
|---|---|
| 0.155 | 3.95 | 2.92 |
| 0.170 | 3.75 | 2.53 |
| 0.187 | 3.00 | 2.35 |
| 0.205 | 2.68 | 2.08 |
| 0.250 | 2.24 | 1.83 |

TABLE 6

| | ⅜ inch Present Invention Thread-forming Torque (in-lb) | ⅜ inch Present Invention Strip Torque (in-lb) | ⅜ inch Comparative Sample Thread-forming Torque (in-lb) | ⅜ inch Comparative Sample Strip Torque (in-lb) |
|---|---|---|---|---|
| 0.109 | 121.83 | 552.62 | 165.35 | 520.63 |
| 0.113 | 128.16 | 556.18 | 188.02 | 531.63 |
| 0.123 | 136.25 | 576.89 | 182.13 | 545.9 |
| 0.133 | 149.72 | 625 | 188.02 | 608.06 |
| 0.143 | 176.16 | 716.7 | 192 | 583.56 |
| 0.155 | 186.66 | 737.11 | 236.14 | 690.14 |
| 0.170 | 214.49 | 804.78 | 286.1 | 724.11 |
| 0.187 | 223.23 | 668.83 | 266.83 | 673.98 |
| 0.205 | 266.46 | 713.15 | 342.96 | 712.69 |
| 0.250 | 316.59 | 708.05 | 373.44 | 685.13 |

As shown in FIG. 9B and TABLE 4, the ratio of failure torque to thread-forming torque of at least 3.0 for samples tested in material thicknesses from 0.109 through 0.187. It is contemplated that fasteners with the present thread-forming portion can obtain a ratio of failure torque to thread-forming torque of at least 3.0 up to thicknesses of 0.32.

Figure 10:
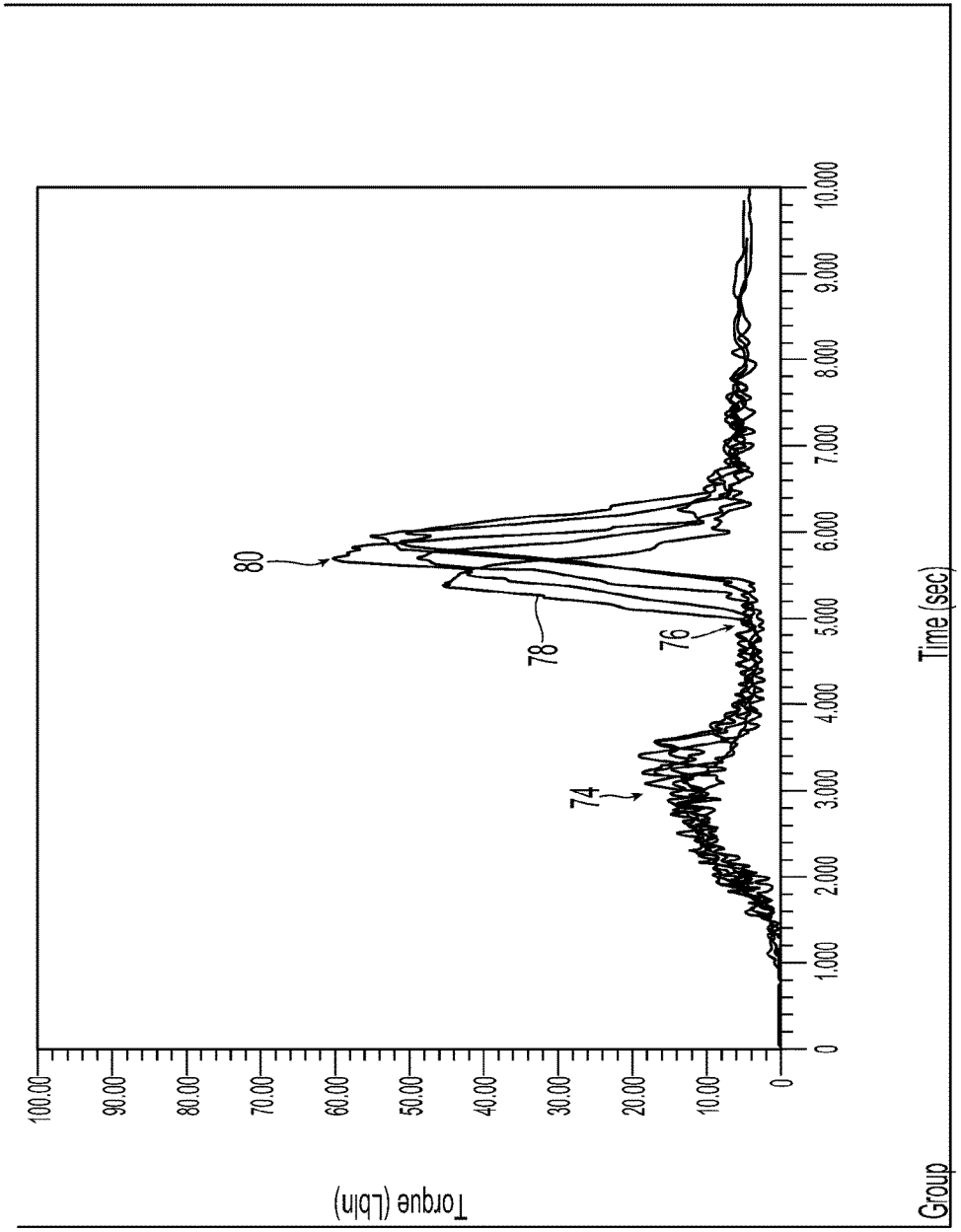
FIG. 10 is a graph of torque to over time during installation for the self-drilling, thread-forming fastener of FIG. 5A installed in two steel sheets having a combined thickness of about 0.06 inch.

As shown in the graph of FIG. 10, the self-drilling, thread-forming fastener 54 has a drilling torque to rotate the fluted lead portion 68 into the first and second building members forming the fastener opening. Additionally, the drive torque 76 is at least 50% less than the thread-forming torque 74. As discussed above, the drive torque 76 may be between about 5% and 60% of the thread-forming torque 74. The self-drilling, thread-forming fasteners 54 have the added advantage of increased back-out resistance and are less likely to come loose by vibration.

The installation torque over time for the self-drilling, thread-forming fastener 54 was measured and shown in FIG. 10. Five samples identified as manufacturer's samples ETC040 having a major diameter of ¼ inch were installed at 175 revolutions per minute into pilot holes corresponding to the fluted lead portion 68 into first and second steel members having a combined thickness of about 0.06 inch. The thread-forming torque 74 as shown in the graph of FIG. 10 is less than about 20 inch-pounds. Alternatively, the thread-forming torque 74 may be less than about 15 inch-pounds. The drive torque 76, before the torque rises to seating, is less than about 6 inch-pounds. The failure torque 80 is greater than 40 inch-pounds. For certain samples, the failure torque is greater than 50 inch-pounds, and one sample greater than about 60 inch-pounds. The failure torque 80 shown in FIG. 10 is a strip torque. The ratio of strip torque to thread-forming torque may be at least 3.0 and the ratio of strip torque to drive torque is greater than 6.0 when the first and second steel members have a combined thickness of 0.06 inch (about 1.5 millimeter) and the nominal diameter of the fluted lead portion 68 is between 85 and 90% of major diameter. Alternatively, the ratio of strip torque to thread-forming torque may be at least 3.0 and the ratio of strip torque to drive torque is greater than 6.0 when the first and second steel members have a combined thickness of 0.06 inch (about 1.5 millimeter) and the nominal diameter of the fluted lead portion 68 is between 70 and 95% of major diameter. The ratio of strip torque to drive torque may be greater than 10.

Figure 11:
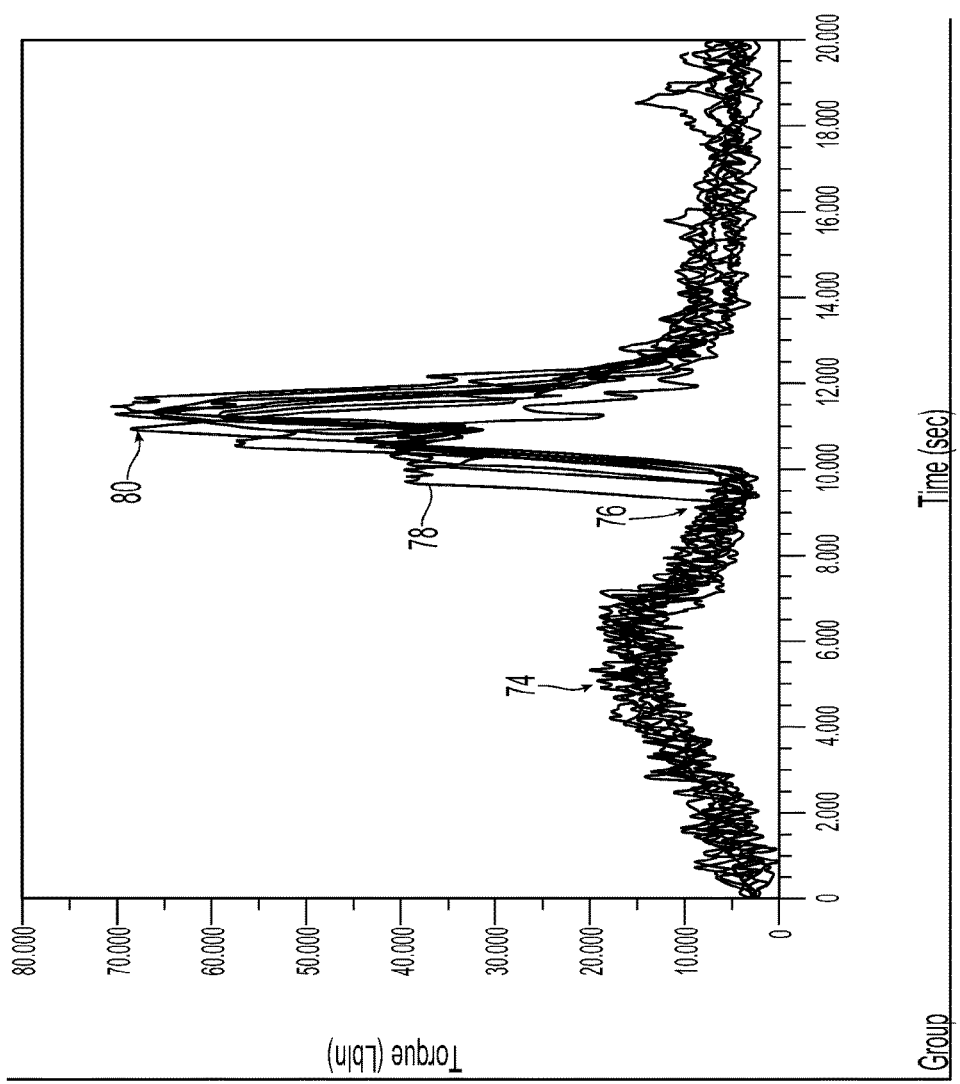
FIG. 11 is a graph of torque to over time during installation for alternative self-drilling, thread-forming fasteners of FIG. 5A installed in two steel sheets having a combined thickness of about 0.06 inch.

Further testing of ¼ inch major diameter self-drilling, thread-forming fasteners 54 is shown in FIG. 11. As with the experiment shown in FIG. 10, the installation torque over time for the self-drilling, thread-forming fastener 54 was measured using ten samples identified as manufacturer's samples ETC045 having a major diameter of ¼ inch installed at 175 revolutions per minute into two 22 gage steel members having a combined thickness of about 0.06 inch and plotted in the graph of FIG. 11. In this test sample, the average thread-forming torque 74 of the samples was 18 inch-pounds. As shown in the graph of FIG. 11, the thread-forming torque is less than about 20 inch-pounds. The drive torque 76, before the torque rises to seating, is less than about 10 inch-pounds. The failure torque 80 is greater than 60 inch-pounds. For certain samples, the failure torque is greater than 65 inch-pounds, and one sample greater than 70 inch-pounds. The average failure torque for the tested samples of the present ¼ fastener was 64.2 inch-pounds.

Figure 12:
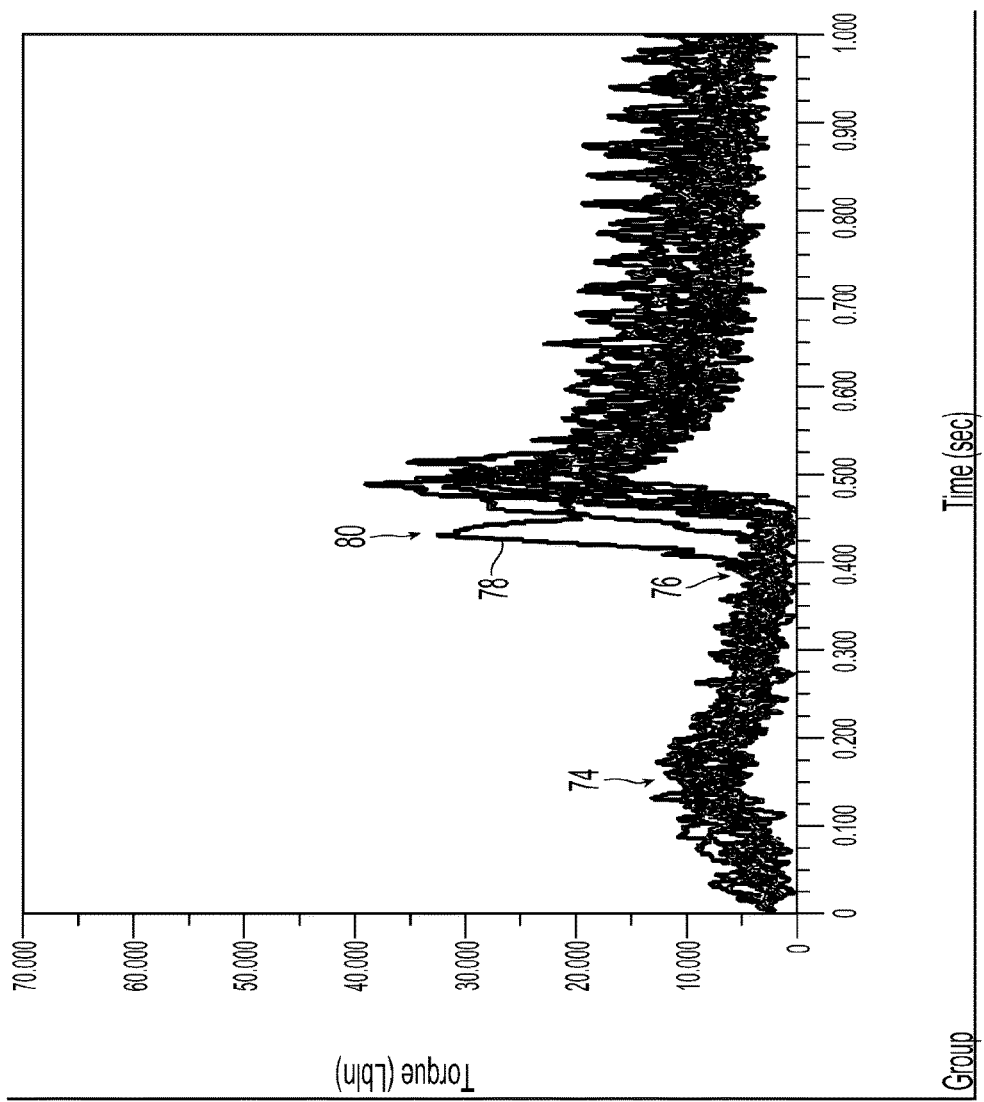
FIG. 12 is a graph of torque to over time during installation for a comparative self-drilling fastener installed in two steel sheets having a combined thickness of about 0.06 inch.
Figure 13A:
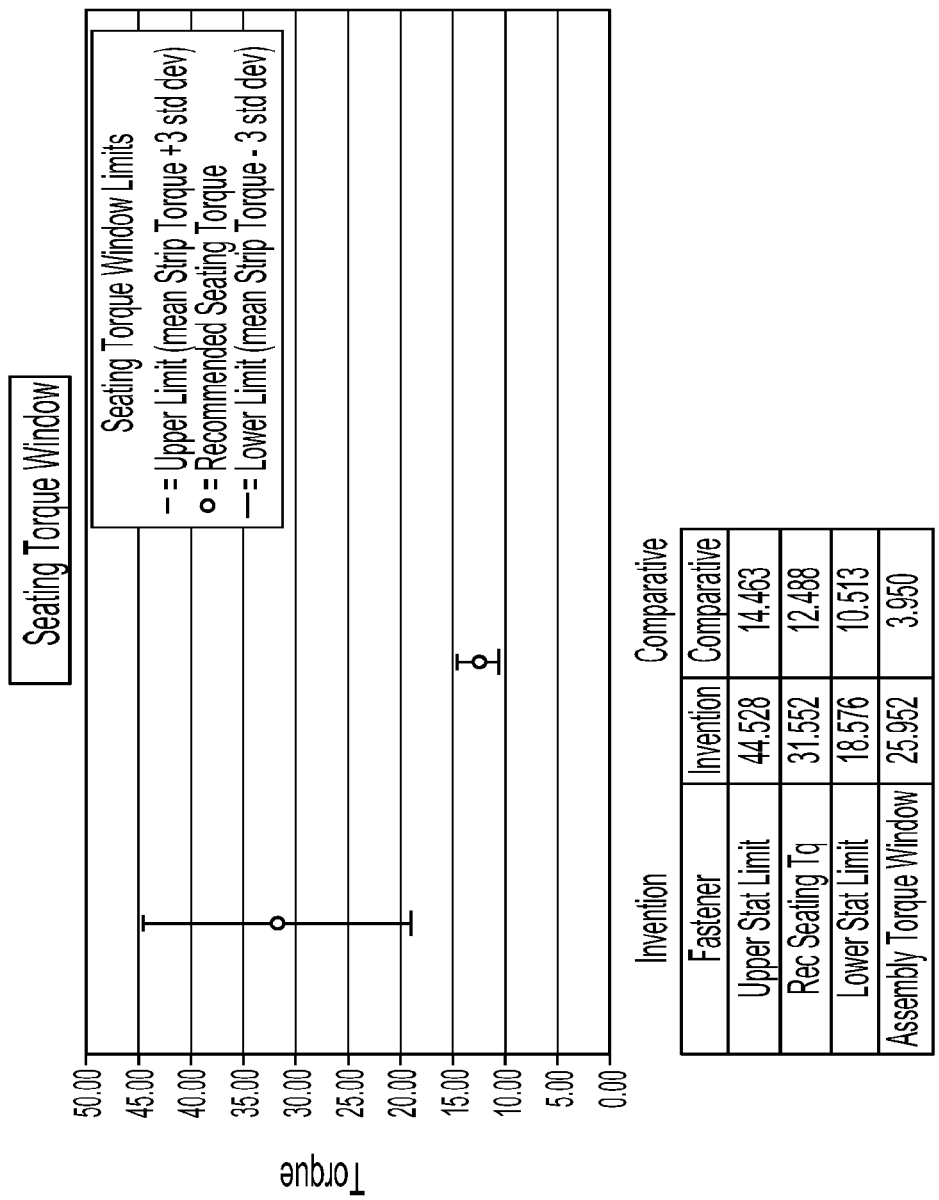
Figure 13B:
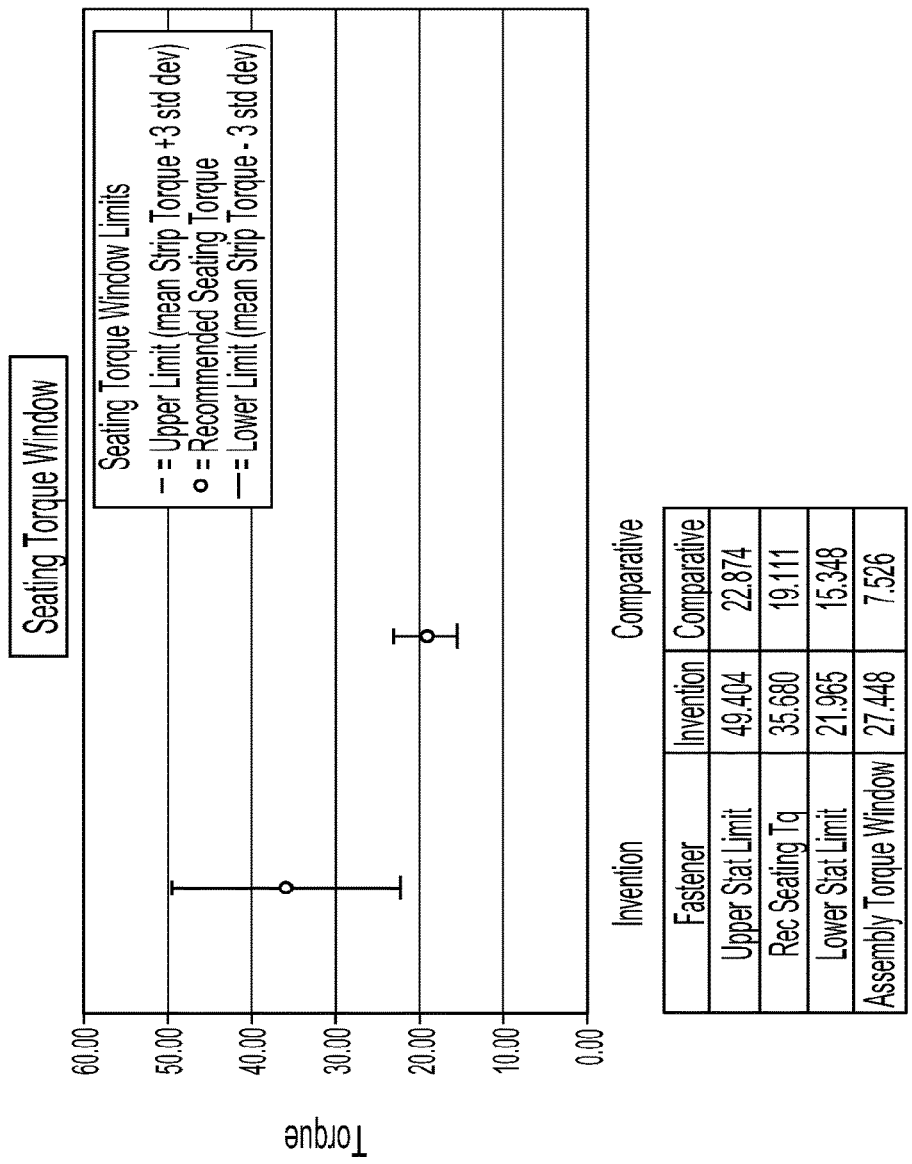
Figure 13D:
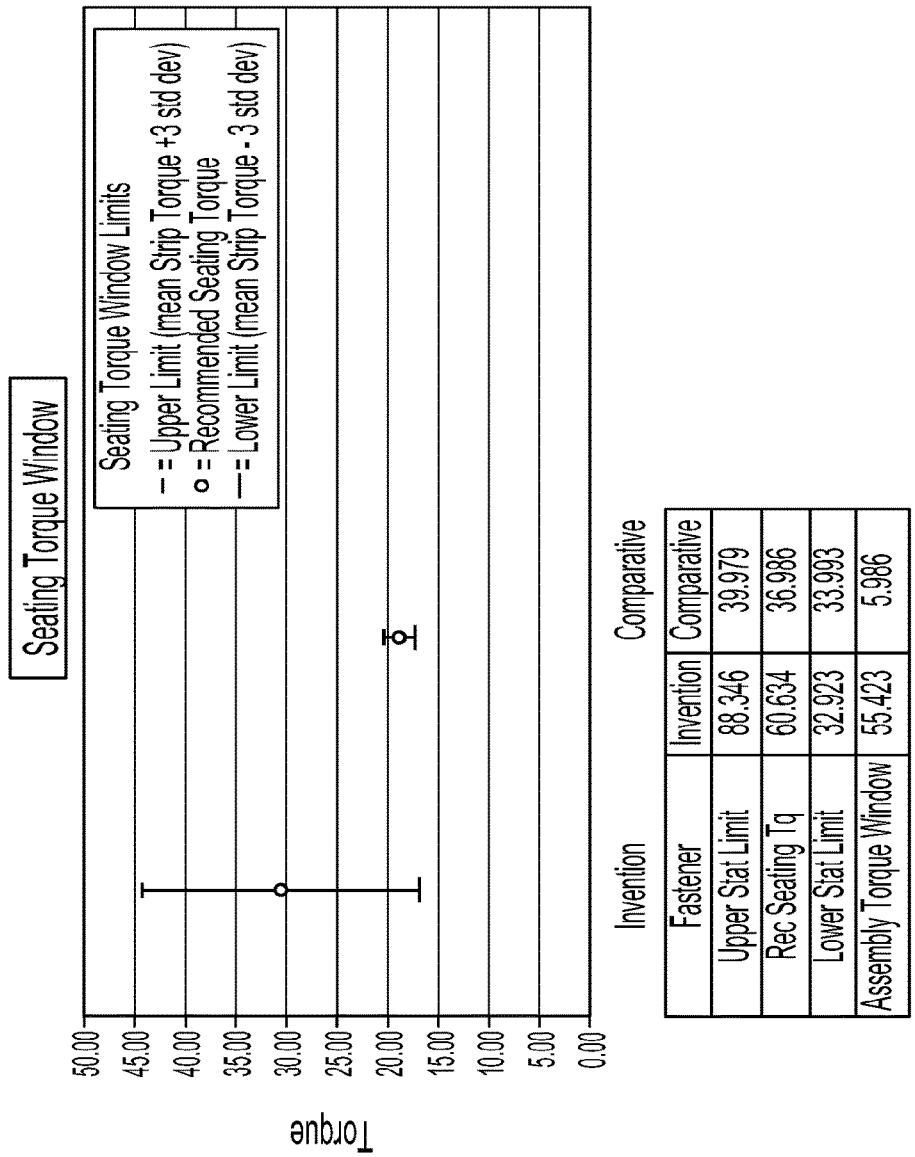

FIG. 12 shows installation torque over time for comparative samples of prior ¼ inch fasteners. The comparative fasteners lacked the present thread-forming portion, instead utilizing prior technology. The graph of FIG. 12 shows the significantly lower failure torque of the ten samples. The average failure torque for the tested comparative ¼ inch samples was 32.4 inch-pounds.

The present self-drilling, thread-forming fastener 54, 56 provides a larger seating torque window than prior fasteners in certain applications. The seating torque window is one measure for a range of seating torques in which the fastener may be installed providing a desired clamping and inhibiting stripping of the fastener or other fastener failure. FIGS. 13A through 13D show seating torque windows for present and comparative test samples installed in two thicknesses of 24 gage material (FIG. 13A), two thicknesses of 22 gage material (FIG. 13B), two thicknesses of 20 gage material (FIG. 13C), and two thicknesses of 22 gage material (FIG. 13D) as examples of improvements in seating torque. The seating torque window is calculated using the test data for strip torque minus three standard deviations of the strip torque data for the upper limit, and the thread-forming torque minus three standard deviations of the thread-forming torque for the lower limit. In the test shown in FIG. 13C, the competitive samples varied so greatly in failure torque that three standard deviations from the strip torque was lower than the thread-forming torque, shown by a negative torque window in the table in FIG. 13C. The improved consistency and performance of the present fasteners provides a greater seating torque window for certain applications. The larger seating torque window provides a larger seating target for various operators and various fastener drivers to achieve.

Figure 14:
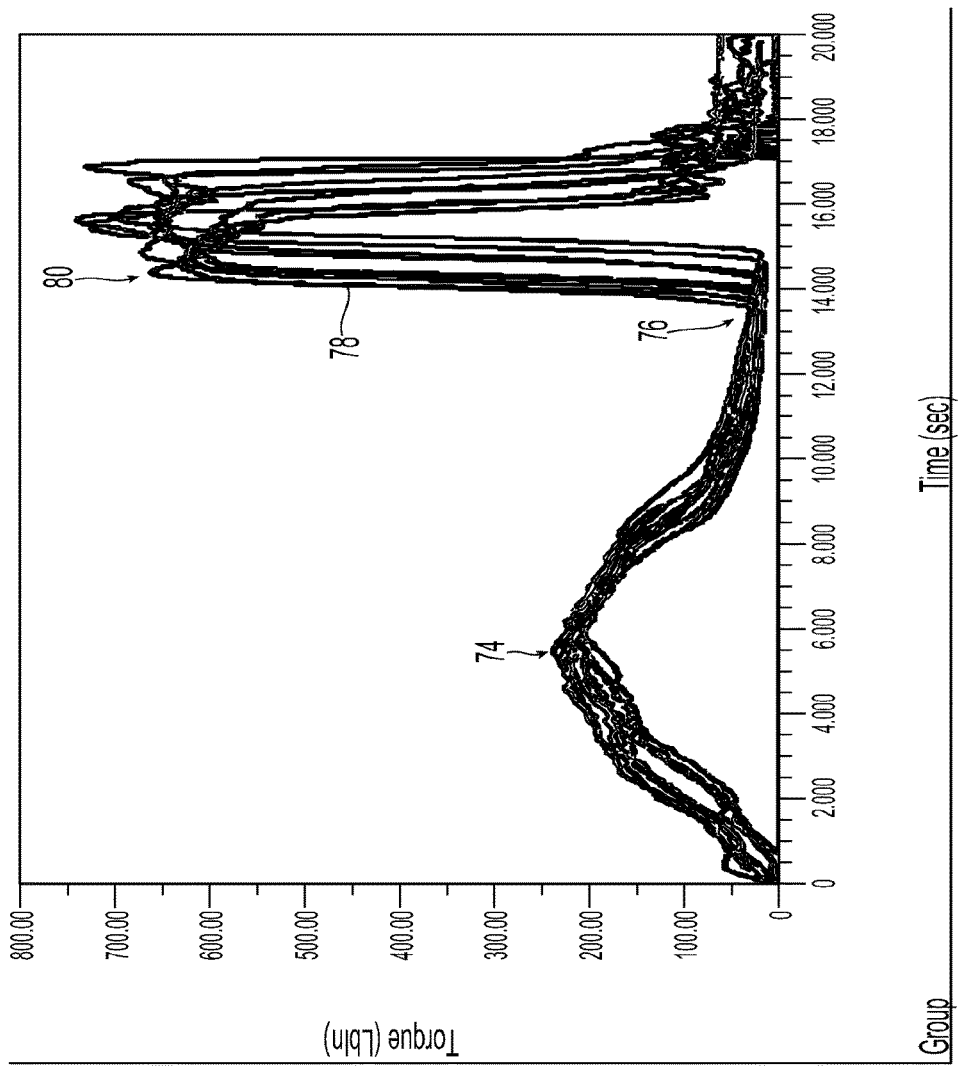
FIG. 14 is a graph of torque to over time during installation for the self-drilling, thread-forming fastener of FIG. 5A installed in a steel sheet having a thickness of about 0.187 inch.

Test results for samples of ⅜ inch major diameter self-drilling, thread-forming fasteners 54 is shown in FIG. 14. The installation torque over time for the self-drilling, thread-forming fastener 54 was measured using ten samples identified as manufacturer's samples 360-80952-60 having a major diameter of ⅜ inch installed at 175 revolutions per minute into a single sheet of 0.187 inch thick material and plotted in the graph of FIG. 14. In this test sample, the average thread-forming torque 74 of the samples was 223.2 inch-pounds. As shown in the graph of FIG. 14, the thread-forming torque is less than about 250 inch-pounds. The drive torque 76, before the torque rises to seating, is less than about 50 inch-pounds. The failure torque 80 is greater than 600 inch-pounds. For certain samples, the failure torque is greater than 650 inch-pounds, and several samples were greater than 700 inch-pounds. The average failure torque for the tested samples of the present ⅜ fastener was 668.8 inch-pounds.

Figure 15:
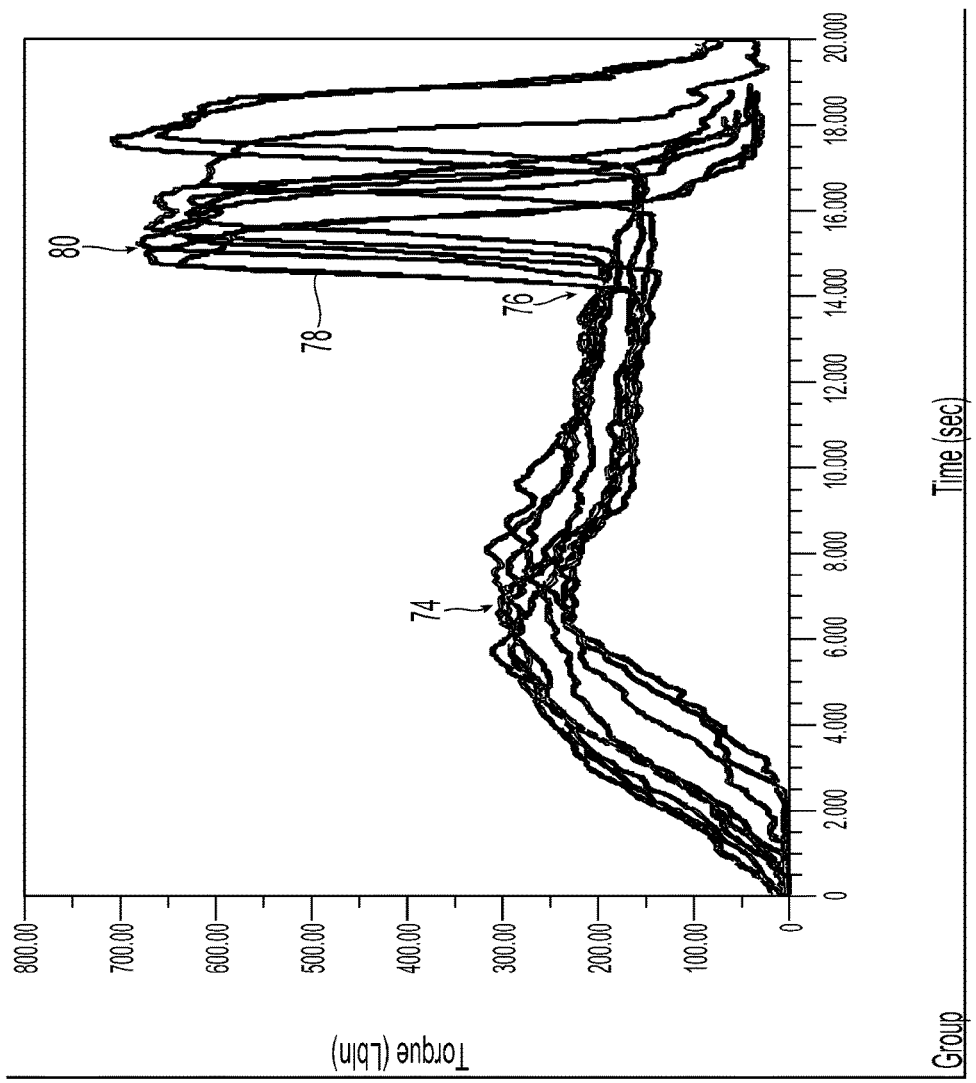
FIG. 15 is a graph of torque to over time during installation for a comparative self-drilling fastener installed in a steel sheet having a thickness of about 0.187 inch.
Figure 17A:
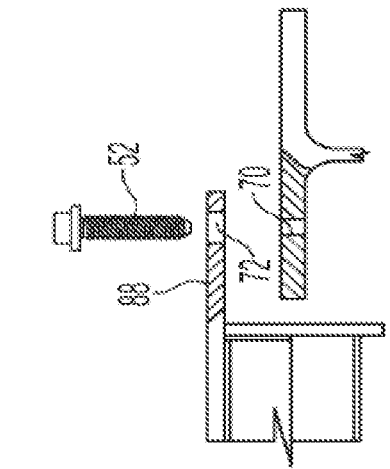
FIG. 17 and FIG. 17A illustrate an alternative joist seat.

FIG. 15 shows installation torque over time for comparative samples of the prior ⅜ inch fasteners in 0.187 thick material. The graph of FIG. 15 shows higher thread-forming torque required to drive the prior fasteners. The average thread-forming torque of the ten samples was 286.8 inch-pounds. Additionally, the drive torque is significantly higher than the present fasteners as shown in FIG. 14. The drive torque for the comparative fastener samples is greater than 125 inch-pounds, and for most samples is greater than 150 inch-pounds. The ratio of failure torque to drive torque for the comparative fasteners is less than about 5.

To increase the strip torque when the threaded building member is a thin material such as less than 14 gage, or less than 16 gage, the threaded portion 64 may extend to the head 63 such that the major diameter 58 of the threaded portion 64 is extending to within 1.5 of the thread pitch of the head 63, as indicated in the detail of FIG. 5A by reference 65. Alternatively, the major diameter extends to within 1.2 thread pitches of the head 63. In yet another alternative, the major diameter 58 extends to within about one thread pitch of the head. Optionally, the head 63 of the fastener may be undercut such as shown in the detail of FIG. 5C approximately adjacent where the threaded portion joins the head and adapted to deform the first steel building member on tightening of the fastener. Alternatively, the fastener may be undercut and adapted to deform the first and second steel building member on tightening of the fastener. The undercut may include a radius 67 at least about 0.02 inch radius, and may be at least about 0.03 inch radius adjacent where the threaded portion joins the head. Alternatively, or in addition, a serrated surface may be provided on the underside of the head 63 to engage the surface of the first steel building member. The serrated surface may comprise serrations, projections, nibs, or other deformations or protrusions as desired positioned on the underside of the head 63, and may be positioned in the undercut, if provided.

In one alternative, the head is undercut adjacent where the threaded portion joins the head and the major diameter of the threaded portion extends to within 1.5 of the thread pitch of the head. The close proximity of the threads to the underside of the head further assists the deformation of at least the first steel building member into the undercut on tightening of the fastener. We have found that the deformation of at least the first building member into the undercut improves the connection strength by increasing the strip torque and inhibiting failure modes caused by tipping of the fastener under sheet sheer when the threaded building member is a thin material such as less than 14 gage, or less than 16 gage. In certain applications, the improved performance the present fasteners 54,56 may allow a fewer number of fasteners to be used to provide the desired design requirement at an increased efficiency.

The threaded portion 64 of fastener 54 may provide a seating torque of at least 80 inch-pounds measured using a fastener 54 having a major diameter of about ¼ inch with the fluted lead portion 68 having at least one diameter within nominal diameter between about 80% and 95% of the major diameter 58 and installed in a first and second building member having a combined material thickness of at least 0.125 inch (about 3.2 millimeter). Alternatively, the threaded portion has seating torque of at least 100 inch-pounds, and may be at least 120 inch-pounds measured using a ¼ inch fastener with the fluted lead portion 68 having at least one diameter within nominal diameter between about 80% and 95% of the major diameter 58 and installed in a first and second building member having a combined material thickness of at least 0.125 inch (about 3.2 millimeter).

For larger diameter self-drilling, thread-forming fasteners 54 such as having a major diameter 58 of ⅜ inch, the threaded portion 64 of fastener 52 may provide a failure torque 80 of at least 600 inch-pounds measured using a fastener 54 having a major diameter of ⅜ inch and a fluted lead portion 68 having a nominal diameter between about 80% and 98% of the major diameter 58 and the threaded member having a material thickness of about 0.25 inch (about 6.35 millimeter). For material thicknesses greater than 0.25 inch, the threaded portion may have a seating torque of at least 400 inch-pounds. Alternatively, the threaded portion has seating torque of at least 600 inch-pounds, and may be at least 800 inch-pounds measured using a ⅜ inch fastener having a fluted lead portion 68 having a nominal diameter between about 80% and 98% of the major diameter 58 and the threaded member having a material thickness of about 0.25 inch (about 6.35 millimeter).

Figure 18:
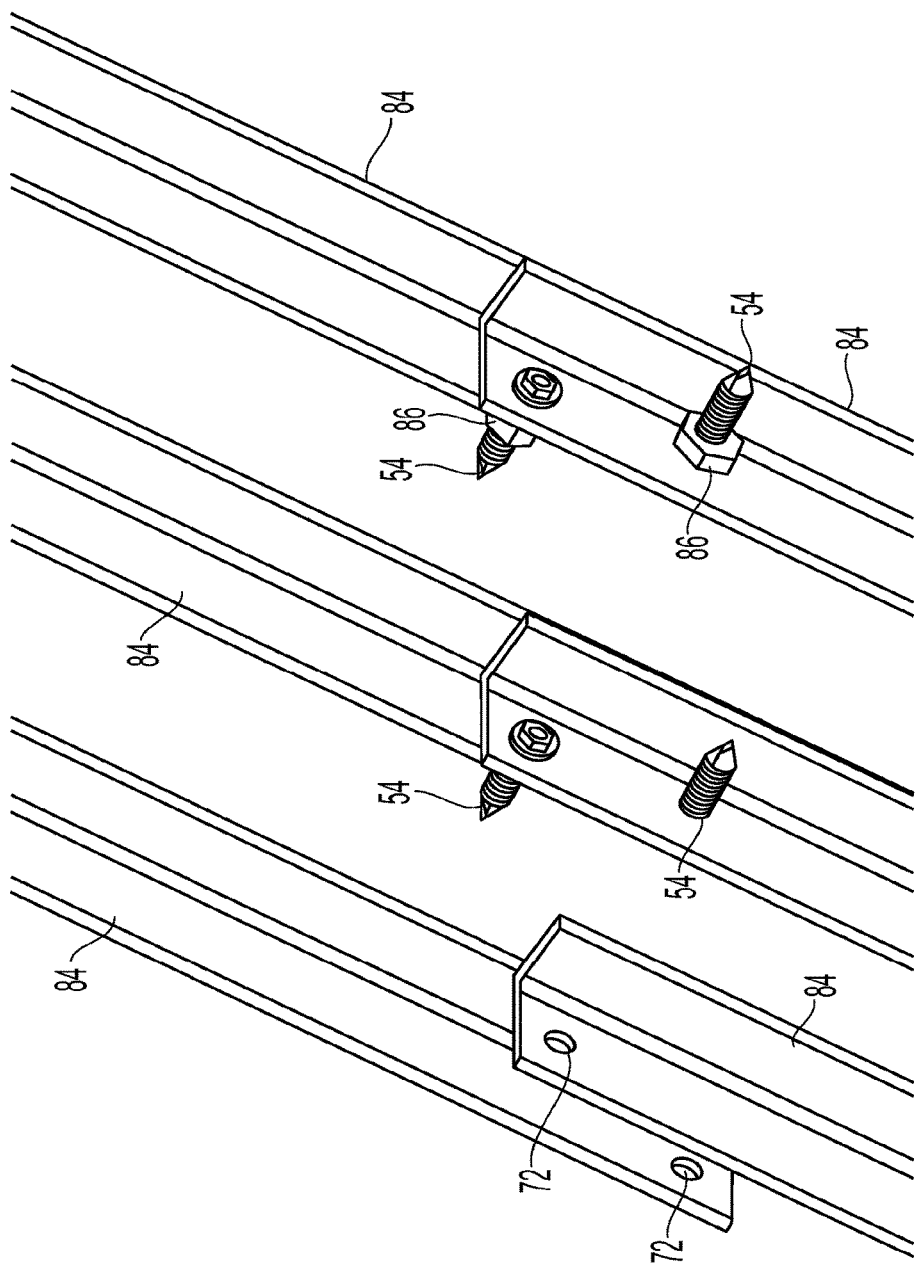
FIGS. 18A-18C are perspective views of a bolted connection of two bridging members.

The self-drilling, thread-forming fastener 54 may be used in connections such as shown in FIGS. 10A through 10C. A building member 84 used for bridging may be provided with one or more clearance holes 72 at each end larger than the major diameter 58 of the fastener 54. In certain applications, two bridging members 84 may be put together to form an extended length. In the past, bolting two bridging members 84 together required drilling a bolt hole through at least one of the members, or aligning pre-drilled holes to pass the bolt through for making a bolt-and-nut connection. Aligning pre-drilled holes in the past was a disadvantage when the pre-drilled holes provided a length that was different than the desired length. Additionally, drilling bolt holes at the job site added time and cost to the installation, reducing efficiency. The present bridging members 84 may be assembled together without drilling bolt holes at the job site. The self-drilling, thread-forming fastener 54 are installed through the clearance hole 72 in the first building member 84 and the fluted lead portion 68 forms a fastener opening in the second building member as the fastener 54 is rotated. The thread-forming portion 66 then forms threads in the bore of the fastener opening formed by the fluted lead portion, and continued rotation of the fastener 54 clamps the first building member between the head 63 and the threads formed in the second building member 84 as shown in FIG. 18B. For certain applications such as shown in FIG. 18C, a nut 86 may be provided and threaded onto the fastener 54 and tightened as desired. The self-drilling, thread-forming fastener 54 as shown in FIGS. 18B and 18C may have a major diameter 58 between about ¼ inch and ⅜ inch as desired for the size and load requirements of the application. The threaded portion 64 of the thread-forming fastener 52 as shown in FIGS. 18B and 18C typically comply with ASTM A307, ASTM A354, ASTM A325, or other fastener standards as desired.

As discussed above, the threaded portion 64 of the thread-forming fasteners 52 and self-drilling, thread-forming fastener 54, 56 may include back-tapered threads, and may have a thread angle less than 60°. Alternatively, the thread angle may be less than 50°. In yet another alternative, the threads may have a thread angle between 45 and 50°. The back-taper of the major diameter may be between about 0.0005 and 0.005 inch per inch of axial length. Alternatively, the back-taper of major diameter may be between about 0.001 and 0.003 inch per inch of length. In the past, the thread portion of fasteners used for building structures typically had a pitch angle of 60°. We have found that the drive torque required to drive prior self-tapping fasteners after thread-forming was nearly the same as the thread-forming torque. This is a disadvantage because for larger fasteners, such as about ½ inch major diameter fasteners and greater, an impact driver typically is required to drive the fasteners. While an impact driver delivers sufficient torque to drive the prior fasteners, the time required to impact a large bolt into a structural member in the past was not commercially practical. The present fasteners 52, 54 may require an impact driver to provide the thread-forming torque 74 to advance the thread-forming portion 66 into the fastener opening, but the drive torque 76 of the present fasteners is sufficiently lower than the thread-forming torque 74 that the driver may easily turn the threaded portion 64 into the fastener opening without binding and engaging the impact mechanism. With the impact mechanism disengaged while installing the threaded portion, the fastener may be rapidly installed. Alternatively, the threading 74 torque may be low enough that an impact driver is not required and a drill driver may be used.

The thread-forming fastener 52 and the self-drilling, thread-forming fastener 54 may be nutable, i.e., adapted to thread a nut on the fastener, such as the nut 86 shown in FIG. 18C. For a nut to be threaded onto the fastener 52, 54, the major diameter 58 of the thread-forming portion 66 may be about the same diameter or smaller than the major diameter of the threaded portion 64. The thread profile of the thread-forming portion 66 corresponds to the threaded portion 64 to enable the nut to be threaded over the thread-forming portion. Additionally, for a nutable self-drilling, thread-forming fastener 54, the fluted lead portion 68 has a nominal diameter smaller than the minor diameter of the corresponding nut 86 such that the nut will pass over the fluted lead portion 68.

In one alternative, the thread-forming fasteners 52 and the self-drilling, thread-forming fasteners 54 may be configured to be used in place of bolt-and-nut fasteners without changing the hole sizes and hole placement in the building members. The major diameter of the threaded portion 64 may be selected to be installed into standard-size punched or drilled holes provided in the building members. For example, a building connection designed for a ½ inch bolt-and-nut fastener may be fabricated with punched holes having a diameter of 9/16 inch. The thread-forming fasteners 52 and the self-drilling, thread-forming fasteners 54 may be configured to have a major diameter of ⅝ inch, or 11/16 inch, or other major diameter providing thread engagement and seating torque as desired. By configuring the thread-forming fasteners 52 and the self-drilling, thread-forming fasteners 54, fabricators can continue producing the building members using standard-size punches or drills without costly re-tooling. It is contemplated that fasteners of this configuration may increase the capacity of the connection by 15% to 30% over prior art standard nut-and-bolt fasteners through the same size pilot hole, and in turn, can reduce the number of fasteners to carry the same load by 15% to 30%.

For certain bolted connections, the threaded portion 64 of the fastener must comply with fastener standards such as ASTM A307, ASTM A325, ASTM A354, ASTM A490, SAE J429 Grade 2, SAE J429 Grade 5, SAE J429 Grade 8, or other fastener standards. In the past, case hardened self-drilling fasteners and self-threading fasteners could not comply with these standards because of the case hardness of the prior fasteners. Prior fasteners were case hardened over the whole fastener reducing ductility and preventing their use in many structural applications. The present fasteners 52, 54 overcome some of the problems of the prior fasteners by selectively hardening portions of the fastener. Portions of the present fasteners 52, 54 may be selectively hardened, such as the tapered lead portion 62, fluted lead portion 68, and the thread-forming portion 66 to a hardness of at least HRC 50. Additionally, between about 1 and 5 threads between the threaded portion 64 and the thread-forming portion 66 may be hardened to at least HRC 50. By hardening only a portion of the fastener to at least HRC 50, the portion of the threaded portion 64 making the bolted connection may be provided with physical properties as desired in compliance with ASTM A307, ASTM A325, ASTM A354, ASTM A490, SAE J429 Grade 2, SAE J429 Grade 5, SAE J429 Grade 8 or other selected fastener standards. Typically, the fasteners 52, 54 are made with a medium carbon steel, medium carbon alloy steel, or a weathering steel in conformance with the desired fastener standard.

In one alternative, the floor joist system 100 may be a composite wall and floor joist system such as disclosed in U.S. patent application Ser. No. 12/019,372, filed Jan. 24, 2008. The floor joist system 100 may include the steel deck 42, fastened to the joists 40 using self-drilling, thread-forming fasteners 56. Additionally, self-drilling, thread-forming stand-off screws 98 may be provided through the deck 42 and joist 40 adapted to be encapsulated within the concrete slab 44 providing a composite joist floor as disclosed in U.S. patent application Ser. No. 12/019,372.

Figure 5I:
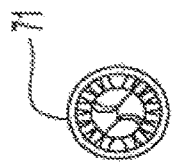
FIG. 5I illustrates serrations in the seat portion shown in FIGS. 5E-5G.
Figure 5G:
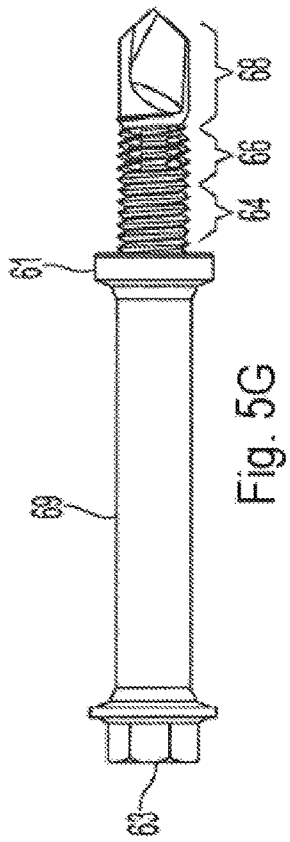
FIGS. 5E-5G illustrate side views of self-drilling, thread-forming stand-off screws of the present disclosure.
Figure 5F:
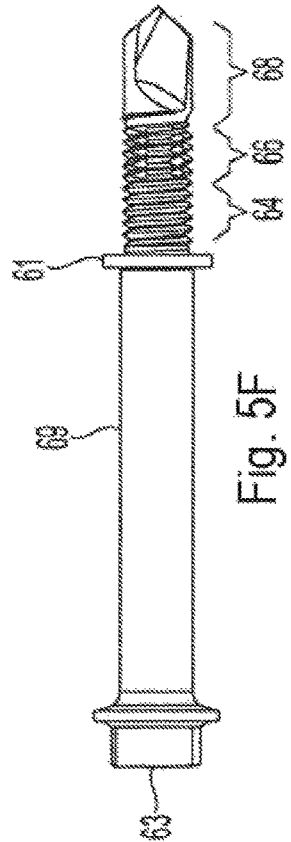
Figure 5E:
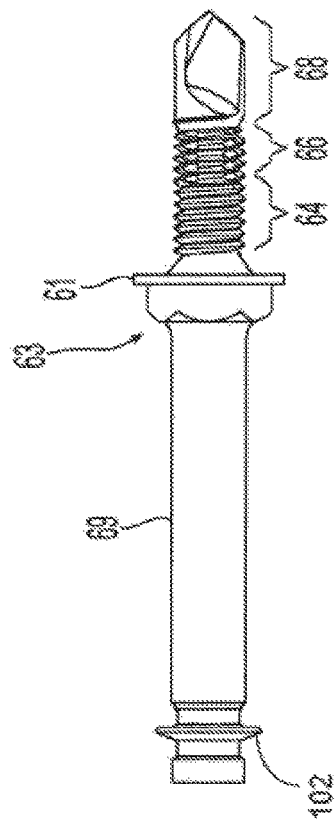

The self-drilling, thread-forming stand-off screws 98 as shown in FIGS. 5E through 5G typically have a major diameter between about 0.12 inch and about ⅜ inch. The self-drilling, thread-forming stand-off screws 98 may include the head 63, a stand-off portion 69 having a desired length, a seat portion 61, the threaded portion 64 as discussed above adjacent the seat portion, and the thread-forming portion 66 as discussed above adjacent the threaded portion 64 adapted to enable the fastener to engage with formed threads in a building member. The seat portion 61 may be a SEMS washer positioned adjacent the stand-off portion 69. A SEMS washer includes a washer or other member held captive on the fastener where the dimension of the fastener on each side of the SEMS washer being larger than the washer hole prevents the SEMS washer from coming off. Alternatively, the seat portion may be a flange integral to the stand-off portion 69. In yet another alternative, the seat portion 61 of the self-drilling, thread-forming stand-off screws 98' may include the head. As shown in FIG. 5E, the self-drilling, thread-forming stand-off screws 98' may include an anchor member 102 formed integrally with the stand-off portion 69. The anchor member 102 may be a rolled collar as shown in FIG. 5E.

As illustrated in FIG. 5I, the seat portion 61 may include serrations 71 adjacent the threaded portion 64 to engage the surface of the steel deck 42 or other building member during installation. The self-drilling, thread-forming stand-off screws 98 has the fluted lead portion 68 as discussed above adjacent the thread-forming portion 66 with a nominal diameter between about 70 and 95% of the major diameter 58 of the threaded portion adapted to form the fastener opening 70. The self-drilling, thread-forming stand-off screws 98 is installed through the steel deck 42 into the joist 40 or other building member. The fluted lead portion 68 drills through the steel deck 42 and joist, and the thread-forming portion 66 forms threads in the bore of the drilled fastener opening for the threaded portion 64 to engage the joist 40. The self-drilling, thread-forming stand-off screws 98 is tightened to clamp the deck 42 between the seat portion 61 and the threads in the joist 40 or other building member.

As shown in FIGS. 16-16A and 17-17A, the joists 40 may be connected to the load bearing building member 110 such as the girder 46 using thread-forming fasteners 52. When connecting structural members using the thread-forming fasteners 52, the first member is provided with a clearance hole 72 larger in diameter than the major diameter of the fastener 52, and the second member is provided with the pilot hole 70 smaller in diameter than the major diameter of the fastener, typically between 80 and 98% of the major diameter 58, and typically larger than the minor diameter of the fastener 52. The joist 40 includes a joist seat 88 through which the joist 40 may be connected to the girder 46 or other load bearing member 110. As shown in FIGS. 16 and 17, various configurations of joist seats may be used as desired. The joist seat 88 includes one or more clearance holes 72 for fastening the joist to the load bearing member. To install the joist 40 to the girder 46 or other load bearing member, the fastener 52 positioned in the clearance hole 72 in the joist is driven into the pre-drilled hole 70 in the girder. The thread-forming portion 66 forms threads in the hole 70 enabling the threaded hole in the girder to act as a nut to clamp the joist seat between the girder and the head 63 of the fastener. Optionally, a nut 86 may be provided and threaded onto the fastener 52 and tightened as desired.

In the past, joists were fastened to the load bearing member by welding or by a bolt-and-nut connection. The bolts used for fastening joists typically comply with ASTM A307, A354, or A325. Bolt-and-nut connections require the installer to reach both sides of the connection to hold the nut while the bolt turns. Additionally, welded connections have been a disadvantage because a trained welder must be present and perform the weld connections. The presently disclosed thread-forming fasteners 52 and self-drilling, thread-forming fastener 54 overcome these and other disadvantages, and may be installed from the top side of the joists 40. The present fasteners 52, 54 increase the speed of joist installation and decrease cost.

Figure 19:
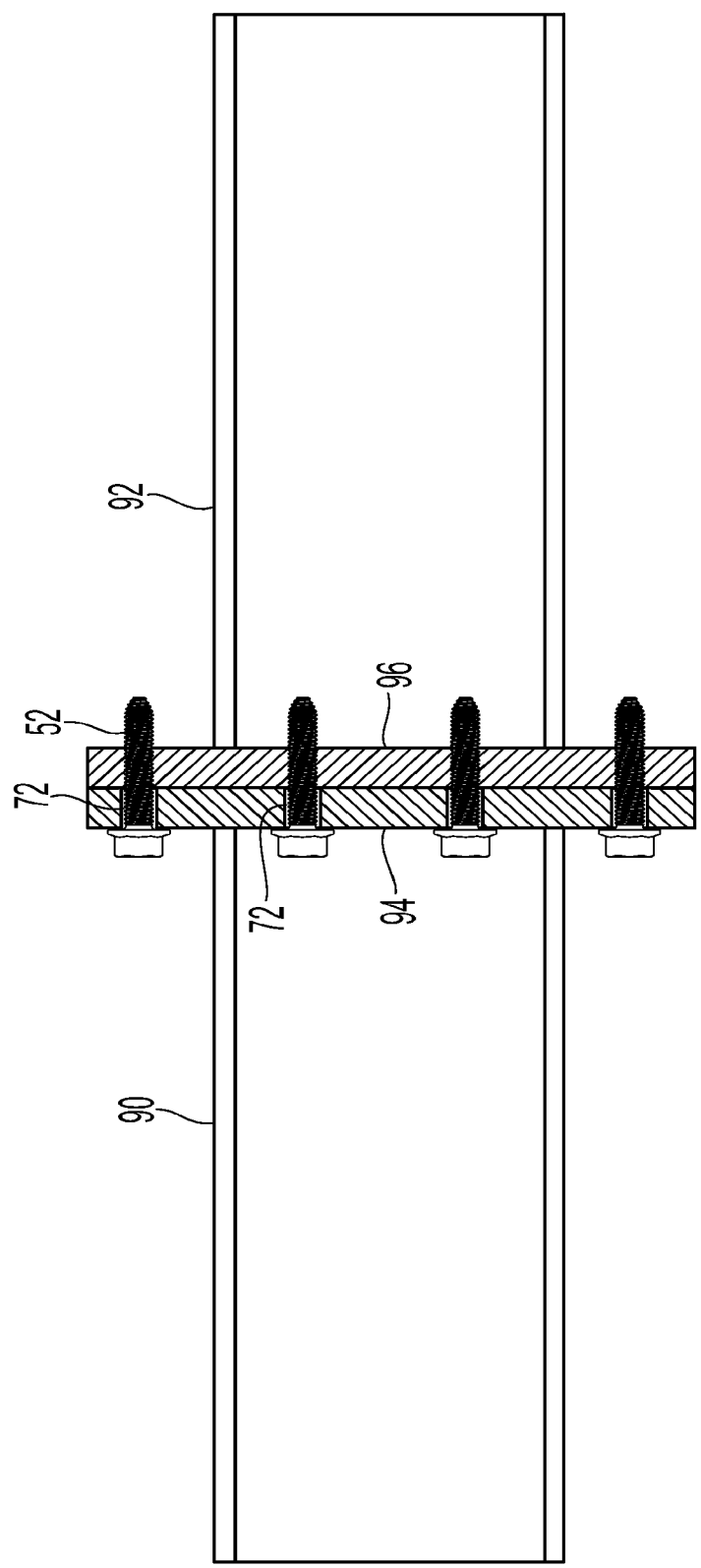
FIG. 19 is a side view of a bolted connection of two structural members.

FIG. 19 shows a connection of a first structural building member 90 having a first end plate 94, and a second structural building member 92 having a second end plate 96. The second end plate is provided with pre-drilled pilot holes 70, and the first end plate is provided with pre-drilled clearance holes 72 for alignment with the pilot holes 70. The thread-forming fasteners 52 are provided through the clearance holes 72 and are threaded into the pilot holes 70 of the second end plate 96. As the fastener 52 is tightened in the fastener opening, the second end plate 96 performs as a nut clamping the first end plate 94 between the head 63 of the fastener and the threads formed in the second end plate 96. Optionally, a nut may be threaded onto the installed fastener 52 (not shown) as desired.

In the past, the end plate connection shown in FIG. 19 was typically made either by welding or a bolt-and-nut connection. The weld connection requires a trained welder and time to make the welds. The bolts used in end plate connections typically comply with ASTM A325, A354, or A490. As discussed above, bolt-and-nut connections require the installer to reach both sides of the connection to hold the nut while the bolt turns. Self-tapping fasteners in the past were unable to provide the thread forming capability while also complying with these fastener standards.

By contrast, the present thread-forming fasteners 52 may be installed from one side of the end plate connection, increasing the speed of making the connection and decreasing cost. The fastener 52 in the application such as shown in FIG. 19 typically have a major diameter between about ½ inch and 1½ inch, or larger, as desired for the size and load requirements of the connection.

Figure 20:
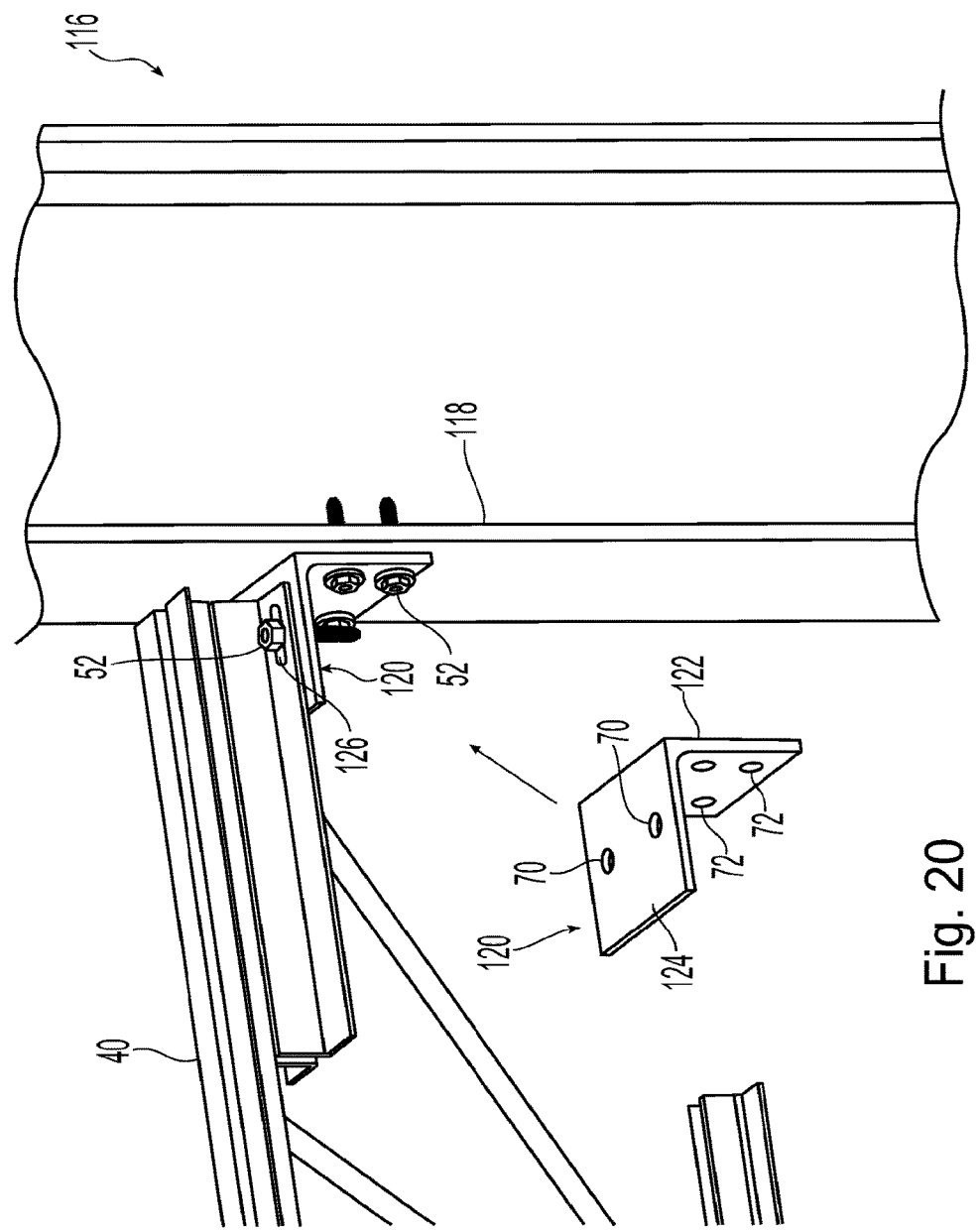
FIG. 20 is a perspective view of a bolted seat connection for a joist on a column flange.

Certain structures require connection of a structural member to a load bearing member using seat joints such as shown in FIGS. 20 and 21. As shown in FIG. 20, the joist 40 may be connected to a column 116 using an angle bracket 120. The angle bracket 120 may be a right angle bracket having an angled leg 122 and a support leg 124. The angled leg 122 may include a plurality of clearance holes 72, and the support leg may include pilot holes 70. As shown in FIG. 20, the column 116 has a column flange 118 that may include pre-drilled pilot holes 70 for aligning with the clearance holes 72. The pilot holes 70 in the support leg 124 may be positioned for aligning with slots 126 in the joist 40. The thread-forming fasteners 52 may be positioned through the clearance holes 72 of the angle bracket 120 and driven into the pilot holes 70 in the girder 46 to clamp the bracket 120 between the head 63 of the fastener and the threads formed in column flange 118 by fasteners 52. The joist 40 is connected to the support leg 124 by the thread-forming fasteners 52 into the bracket 120.

As shown in FIG. 21A, the load bearing member may be a hollow structural section (HSS) column 128. In the past, angle brackets were connected to a HSS column by welding (not shown), or using a through bolt 130 as shown in FIG. 21B or a clamp bracket 132 as shown in FIG. 21C. The prior methods of attaching to a HSS column have been expensive, time consuming, and for certain applications still often needed reinforcement. The present fasteners 52 form a robust connection of the angle bracket to the HSS column 128 in less time and less expense.

In an alternative configuration, the pilot holes in the column 116 and/or HSS column 128 may be omitted and self-drilling, thread-forming fastener 54 used to fasten the angle bracket 120 to the load bearing member under suitable load requirements. In this embodiment, the fastener 54 is installed through the bracket 120 into the column 128 forming threads in the HSS column member. Optionally, the pilot holes in the support leg 124 may also be omitted, and self-drilling, thread-forming fastener 54 used to fasten the joist 40 to the angle bracket 120 by forming threads in the angle bracket 120. The self-drilling, thread-forming fastener 54 may have a major diameter between about ¼ and ½ inch as desired for the size and load requirements of the application, and at least a portion of the threaded portion 64 comply with fastener standard ASTM A307, A354, A325, A490, or other fastener standard as required.

FIG. 22A shows two joists 40 longitudinally aligned in connection to the girder 46 and having at least one tie plate 134. The tie plate 134 may be provided with clearance holes 72 positioned as desired for assembling the tie plate to the top chord 140 of the joist 40. The self-drilling, thread-forming fastener 54 may be positioned through the clearance holes 72 and drilled and thread-formed into the top chord 140.

Figure 22B:
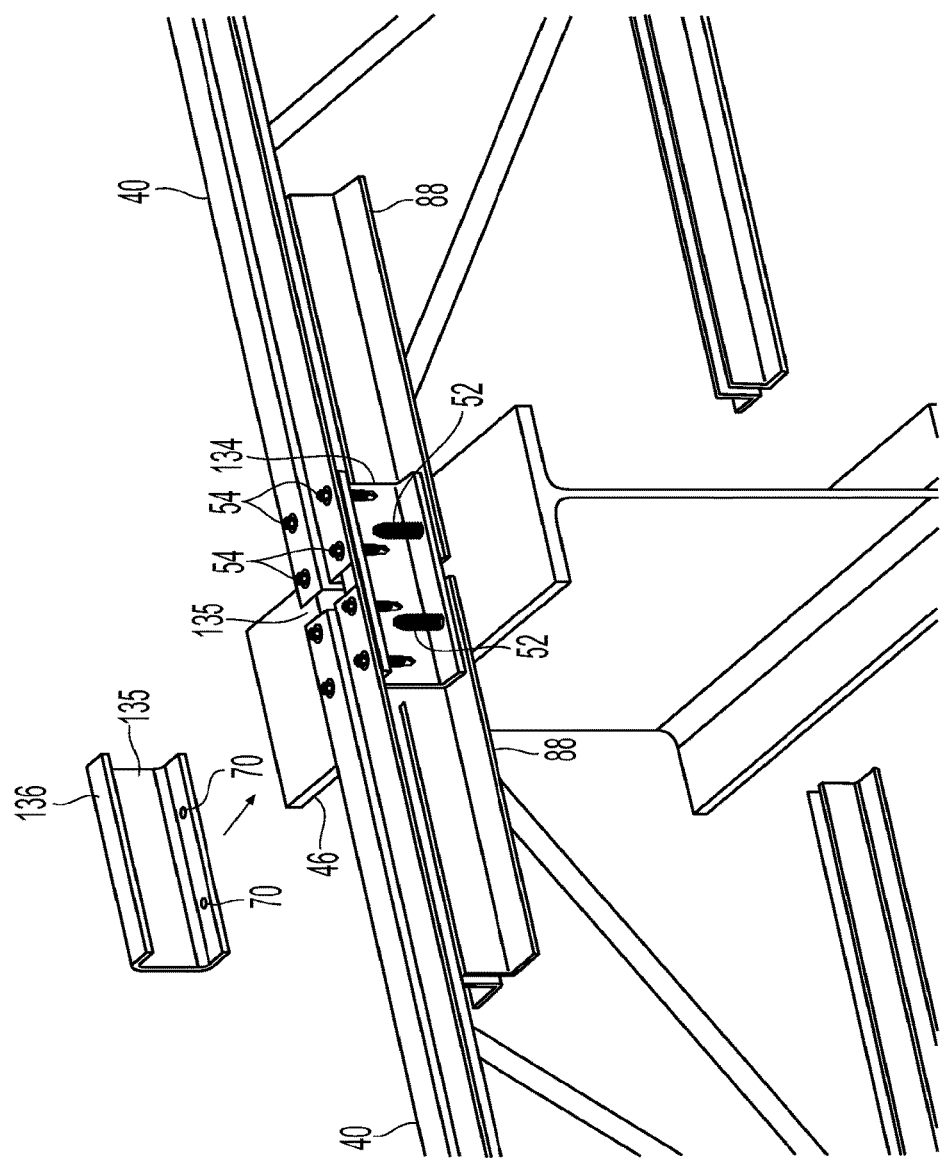
FIG. 22B is a perspective view of an alternative joist connection on a wide flange girder.
Figure 23:
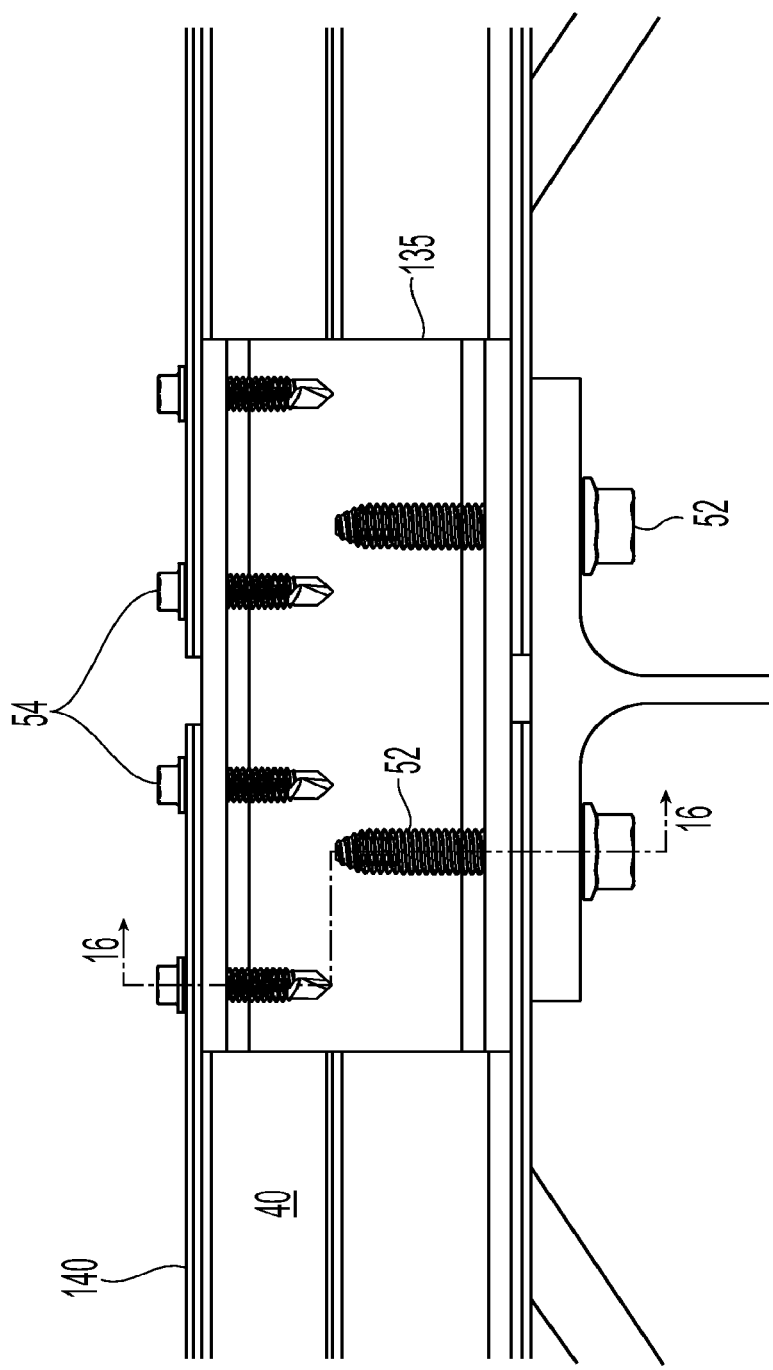
FIG. 23 is a side view the joist connection of FIG. 22B.
Figure 24:
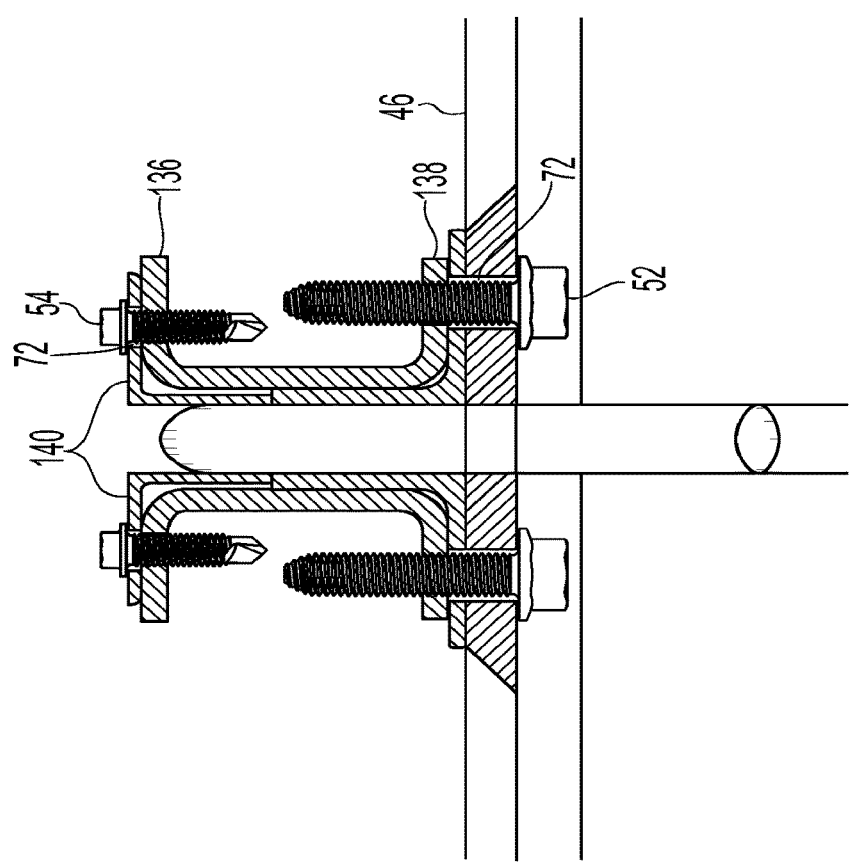
FIG. 24 is a partial cross sectional view through the joist connection of FIG. 23.

Alternatively, as shown in FIG. 22B, a C-channel tie plate 135 may have an upper flange 136 and a lower flange 138 formed to fit between the joist seat 88 and the top chord 140. The lower flange 138 includes pilot holes 70 positioned for aligning with clearance holes (not shown) in the girder 46 and the joist seat 88. Thread-forming fasteners 52 are used to connect the joist 40 to the girder 46 by positioning the thread-forming fastener 52 through the clearance holes 72 in the girder 46 and the joist seat 88 and threading the thread-forming fastener 52 into the pilot hole 70 in the lower flange 138 of the C-channel tie plate 135. The thread-forming portion 66 of the thread-forming fastener 52 forms threads in the bore of the pilot hole 70 in the tie plate 134, enabling the tie plate 134 to act as a nut clamping the joist seat 88 against the girder 46 as shown in FIG. 20. The top chord 140 of the joist is also secured to the upper flange 136 of the tie plate 134 using self-drilling, thread-forming fastener 54. The top chord 140 may be provided with clearance holes 72, through which the self-drilling, thread-forming fastener 54 may be fastened into the upper flange 136 of the C-channel tie plate 135 as shown in FIG. 20. Using the self-drilling, thread-forming fastener 54, no pilot holes are needed in the upper flange 136 of the tie plate, simplifying manufacture and alignment of the tie plate 134 and reducing the installation time of the joists.

In an alternative configuration, the thread-forming fasteners 52 may be provided from above the joist seat and fastened into the girder when the space between the top chord 140 and the joist seat 88 is sufficient to position and drive the thread-forming fastener. In this alternative, the lower flange 138 of the tie plate includes clearance holes instead of pilot holes, and the girder is provided with pilot holes instead of clearance holes. The thread-forming portion 66 of the thread-forming fastener 52 forms threads in the girder 46 to clamp the joist seat 88 between the tie plate 134 and the girder 46.

The thread-forming fastener 52 for the application shown in FIGS. 20 through 24 may have a major diameter between about ⅜ inch and 1½ inch as desired for the size and load requirements of the connection. At least a portion of the threaded portion 64 of the thread-forming fastener 52 as shown in FIGS. 20 through 24 may comply with ASTM A354, A325, A490, or other fastener standard as required.

The self-drilling, thread-forming fastener 54 for the application shown in FIGS. 20 through 24 may have a major diameter between about ¼ inch and ½ inch as desired for the size and load requirements of the connection. The threaded portion 64 of the self-drilling, thread-forming fastener 54 as shown in FIGS. 20 through 24 may comply with ASTM A354, A325, A490, or other fastener standard as required.

The bottom chord 142 of the joist 40 may be connected to the load bearing member, such as the girder 46, using a wide flange girder brace 144 as shown in FIG. 25A. A first bracket 146 may be provided on the bottom chord, and a second bracket 148 may be provided on the girder 46, with the first bracket 146 and second bracket 148 provided with pilot holes for use with the thread-forming fasteners 52 for securing the brace 144. The wide flange girder brace 144 may be connected between the first bracket 146 and second bracket 148 using thread-forming fasteners 52. The wide flange girder brace 144 may be provided with slots 126 through which the thread-forming fasteners 52 are installed into the pilot holes to fasten the wide flange girder brace 144 to the brackets.

Figure 25B:
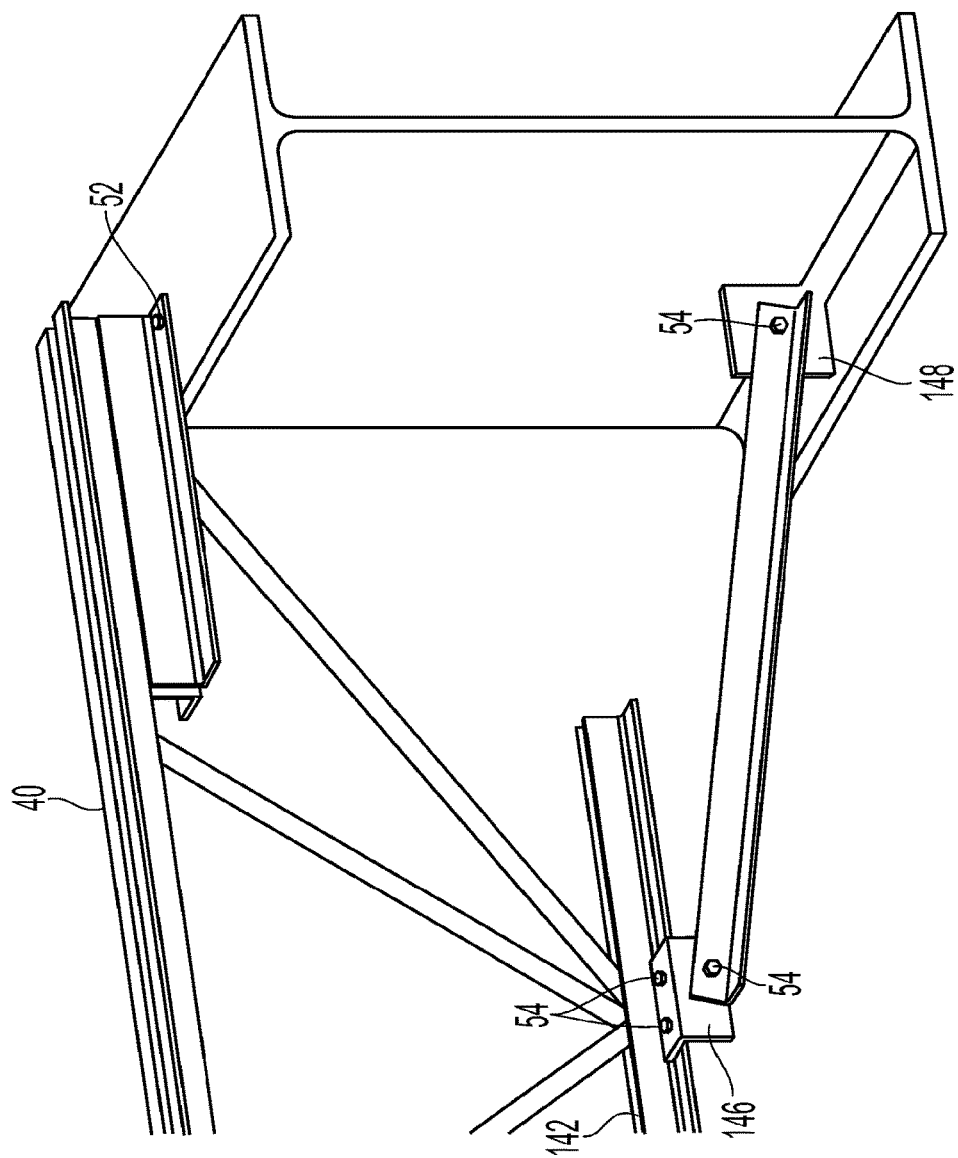

Alternatively, the self-drilling, thread-forming fasteners 54 may be used to install the wide flange girder brace 144 to the brackets 146, 148 such as shown in FIG. 25B. In this alternative, the first bracket 146 and second bracket 148 are provided without pilot holes and the wide flange girder brace 144 may or may not be provided with clearance holes for installing the self-drilling, thread-forming fastener 54.

The self-drilling, thread-forming fastener 54 and thread-forming fastener 52 as used in the application of FIGS. 25A and 25B may have a major diameter between about ¼ inch and ½ inch, or larger as desired for the size and load requirements of the connection. At least a portion of the threaded portion 64 of the fasteners 52, 54 as shown in FIGS. 25A and 25B may comply with ASTM A307, A354, A325, A490, or other fastener standard as required.

Figure 26:
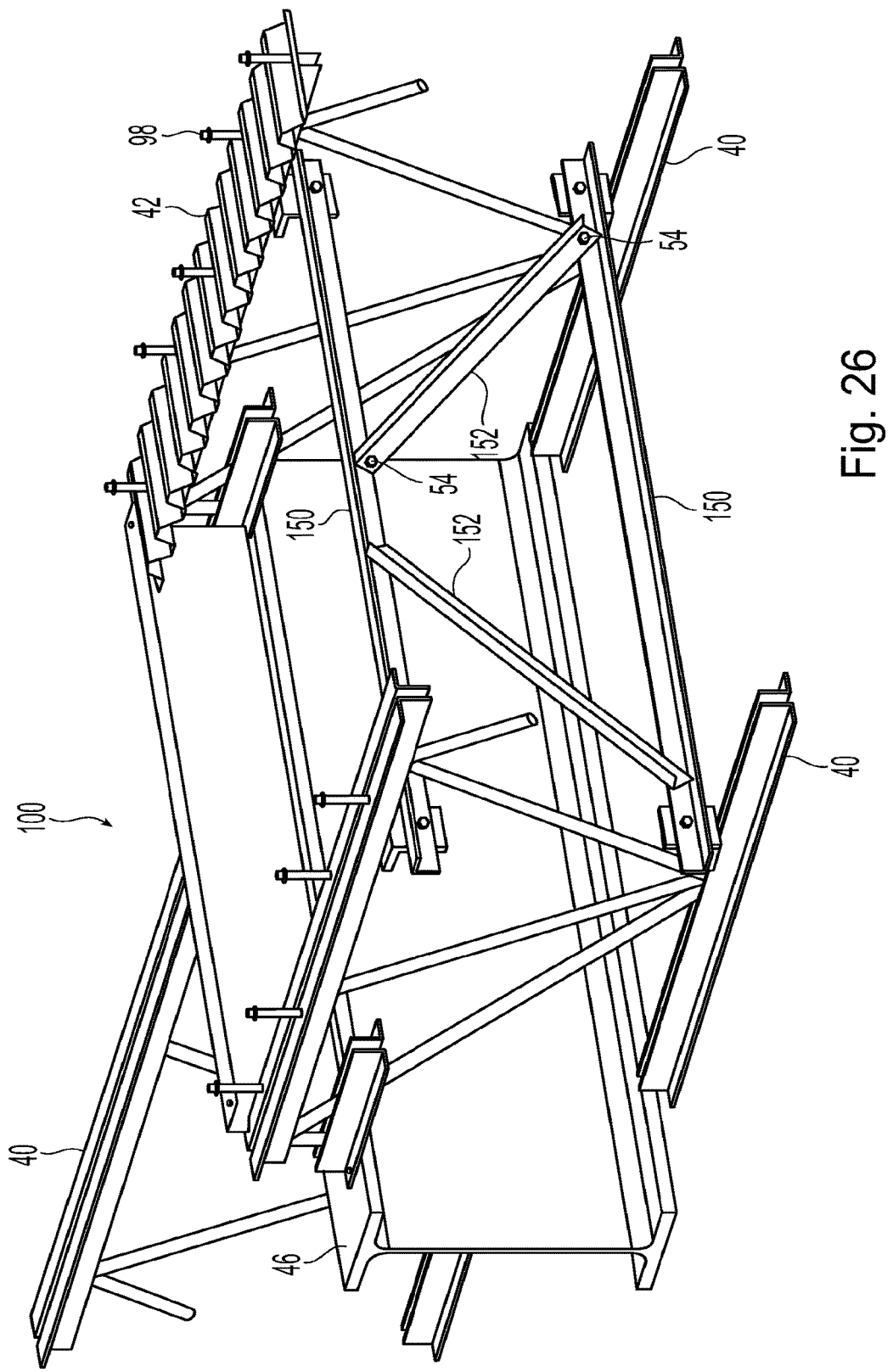
FIG. 26 is a partial prospective cut-away view of the floor joist system of FIG. 1.
Figure 27:
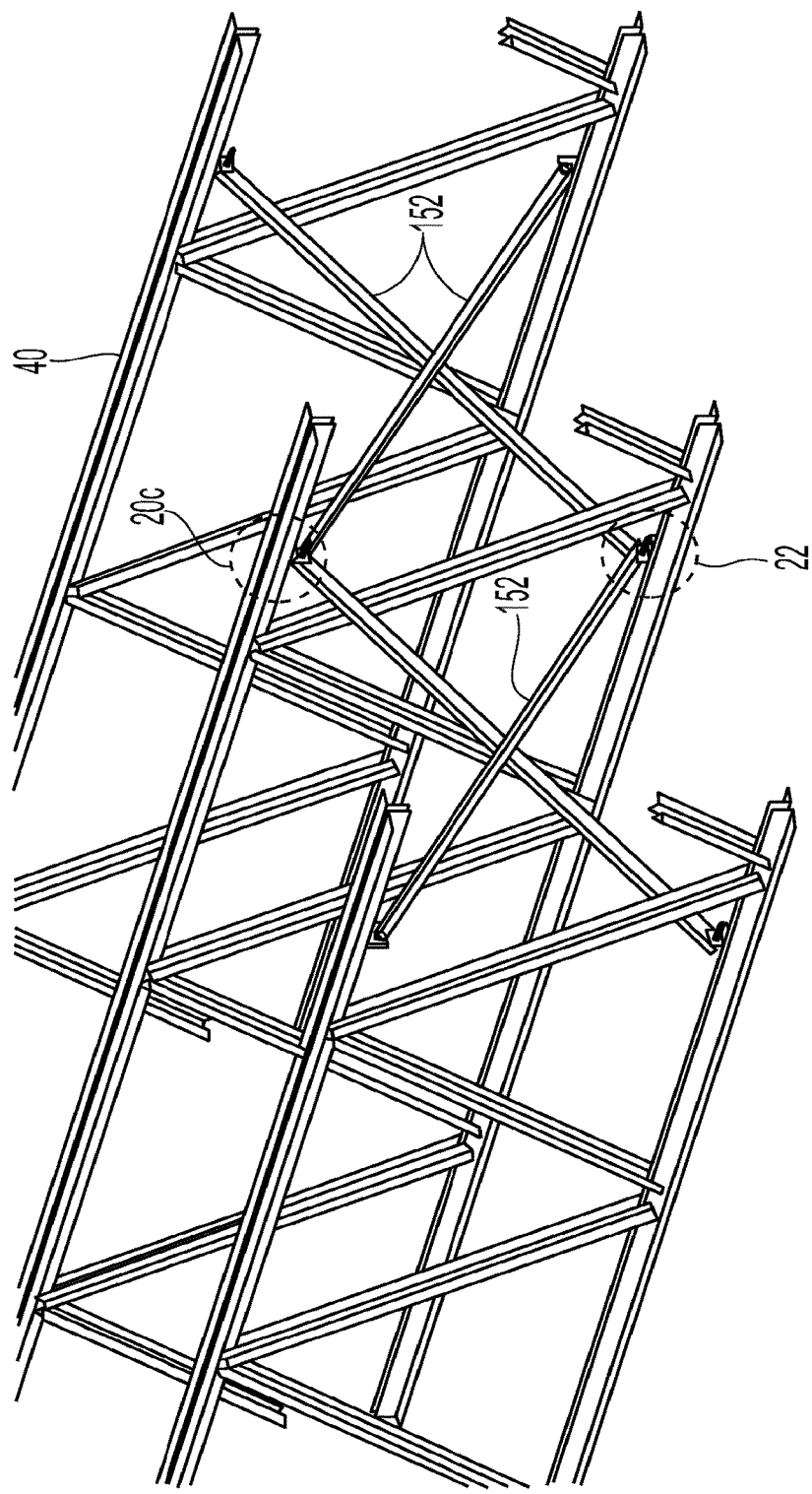
FIG. 27 is a prospective view of joists with diagonal bridging.

Various building structures require bridging members or cross braces. The bridging members are typically used for bracing beams, trusses, joists, or other structural members to hold them together and in place during construction and to secure the structural members in place under building loads and stresses. As shown in FIGS. 26 and 27, the floor joist system 100 may include horizontal bridging members 150, diagonal bridging members 152, or both.

Figure 28C:
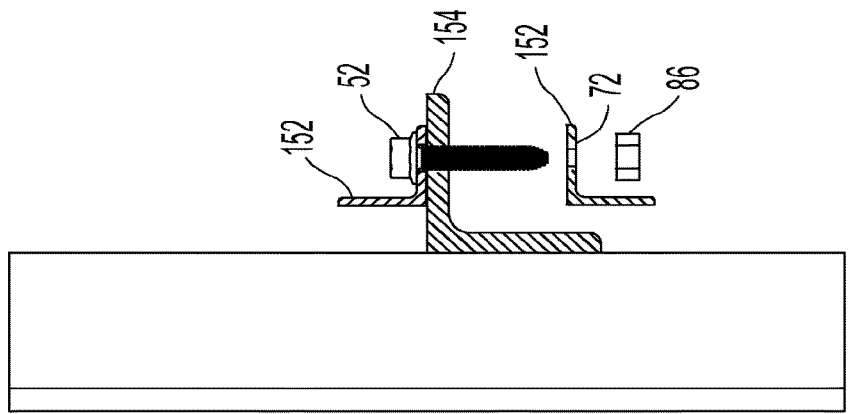
FIG. 28A-28C are partial sectional views showing connections of bridging members to joists from FIG. 27.
Figure 28B:
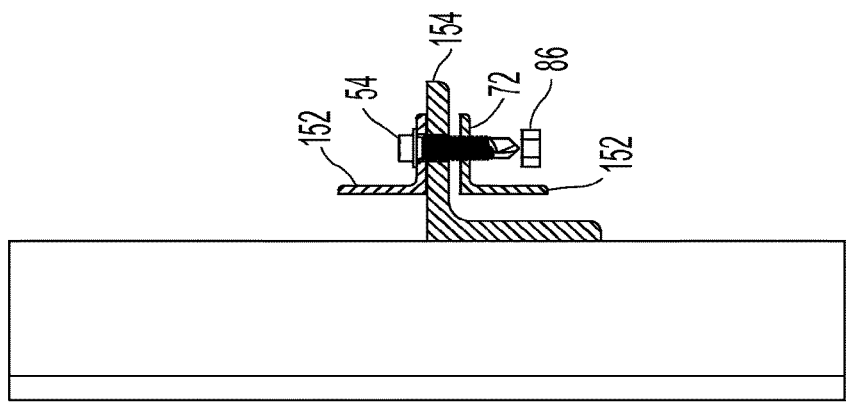
Figure 28A:
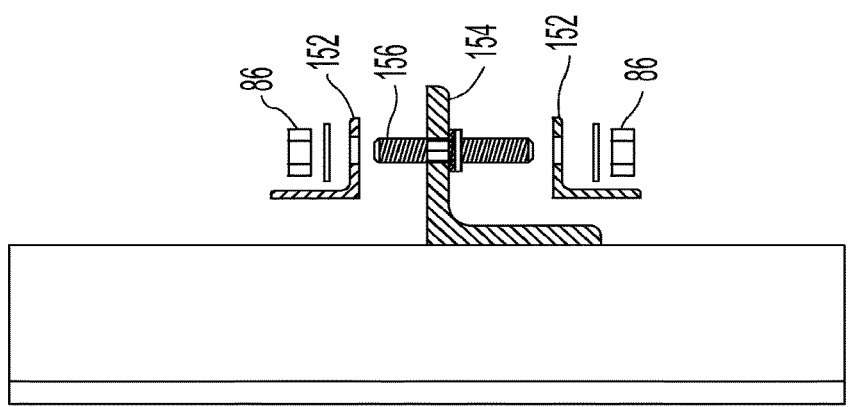

As shown in FIGS. 27 and 28, the ends of two bridging members 150, 152 may be connected to an L-bracket 154 to secure a building member such as the joist 40. As discussed above, under OSHA requirements for installation of double connections, the first member must be attached before connection of the second member is commenced. In the past, as shown in FIG. 28A, a special two ended bolt 156 was provided for making bridging double connections. An operator secured the first bridging member 152 by turning a nut 86 onto one end of the two ended bolt 156 while holding the bolt 156 from turning. Then, the second bridging member was secured to the other end of the bolt 156 with a second nut 86. The prior procedure was time consuming and costly. The present fasteners 52, 54 may be used to quickly and efficiently secure bridging members to the joists, reducing assembly time and cost during installation.

The self-drilling, thread-forming fastener 54 as used in bridging applications may have a major diameter between about ¼ inch and ½ inch as desired for the size and load requirements of the connection. The thread-forming fastener 52 as used in bridging applications may have a major diameter between about ¼ inch and ⅝ inch, or larger as desired for the size and load requirements of the connection. At least a portion of the threaded portion 64 of the fasteners 52, 54 used in bridging may comply with ASTM A307, A354, A325, A490, or other fastener standard as required.

Figure 29:
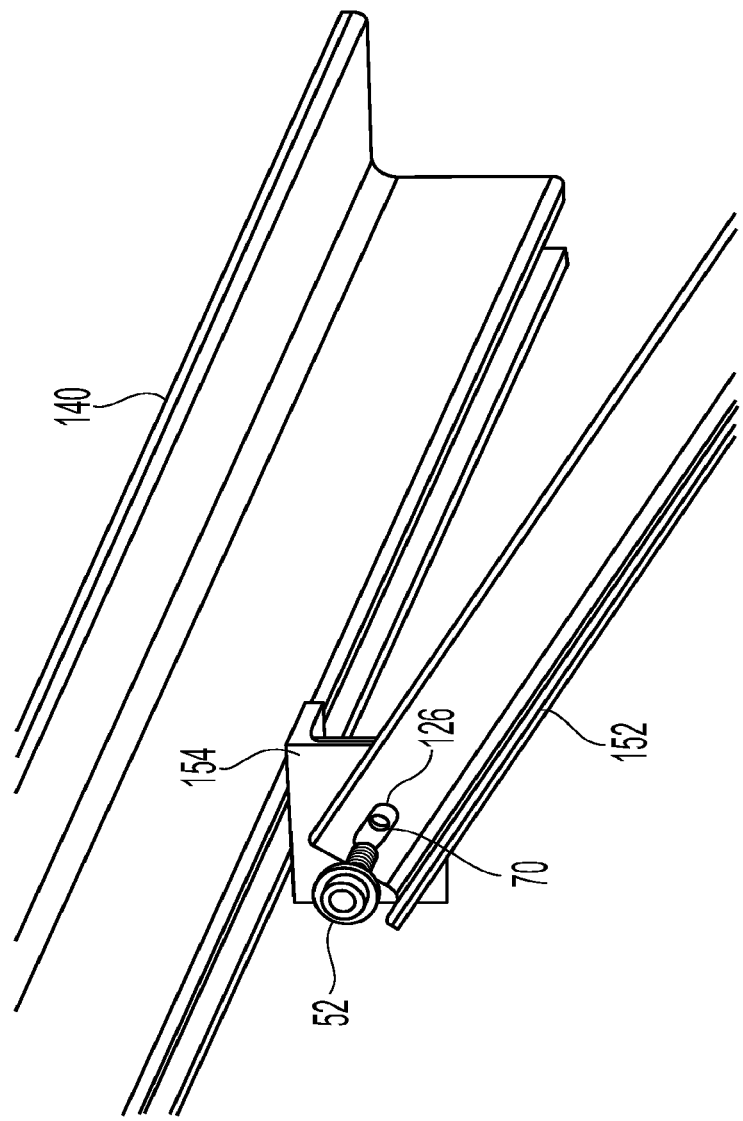
FIG. 29 is an exploded perspective view from FIG. 27.
Figure 30:
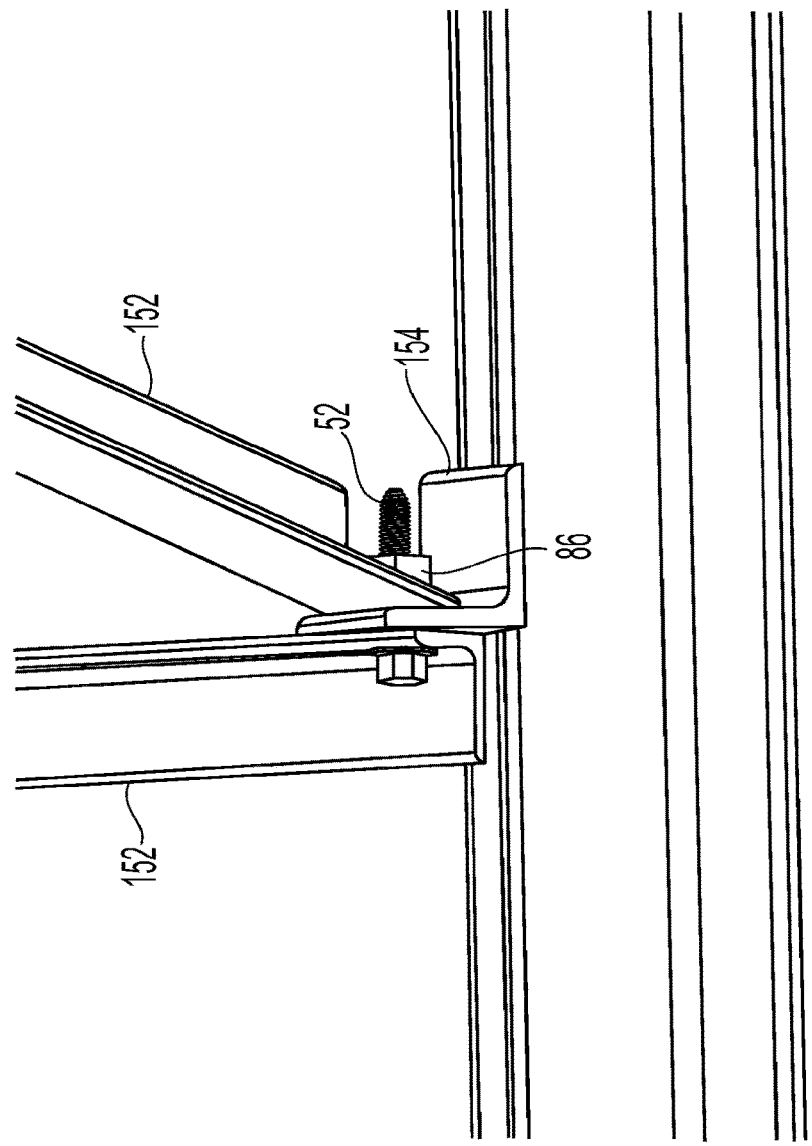
FIG. 30 is a perspective detail view from FIG. 27.

The present fasteners 52, 54 provide an efficient, more robust and less expensive way to install bridging. As shown in FIG. 28B, the L-bracket 154 may be provided with a pilot hole 70, and the bridging member 150, 152 provided with the slot 126 or clearance hole 72. The thread-forming fastener 52 may be provided through the clearance hole 72 and thread-formed into the L-bracket 154 as shown in FIG. 29, clamping the bridging member 150, 152 onto the L-bracket 154. Then, a second bridging member having a clearance hole 72 may be provided over the end of the fastener 52, as shown in FIG. 28B, and the nut 86 threaded onto the fastener 52 to secure the second bridging member as shown in FIG. 30.

Alternatively, the L-bracket 154 may be provided without a pilot hole, and the self-drilling, thread-forming fastener 54 may be used to secure the first bridging members to the L-bracket as shown in FIG. 28C, and the nut 86 threaded onto the fastener 54 to secure the second bridging member.

Figure 31:
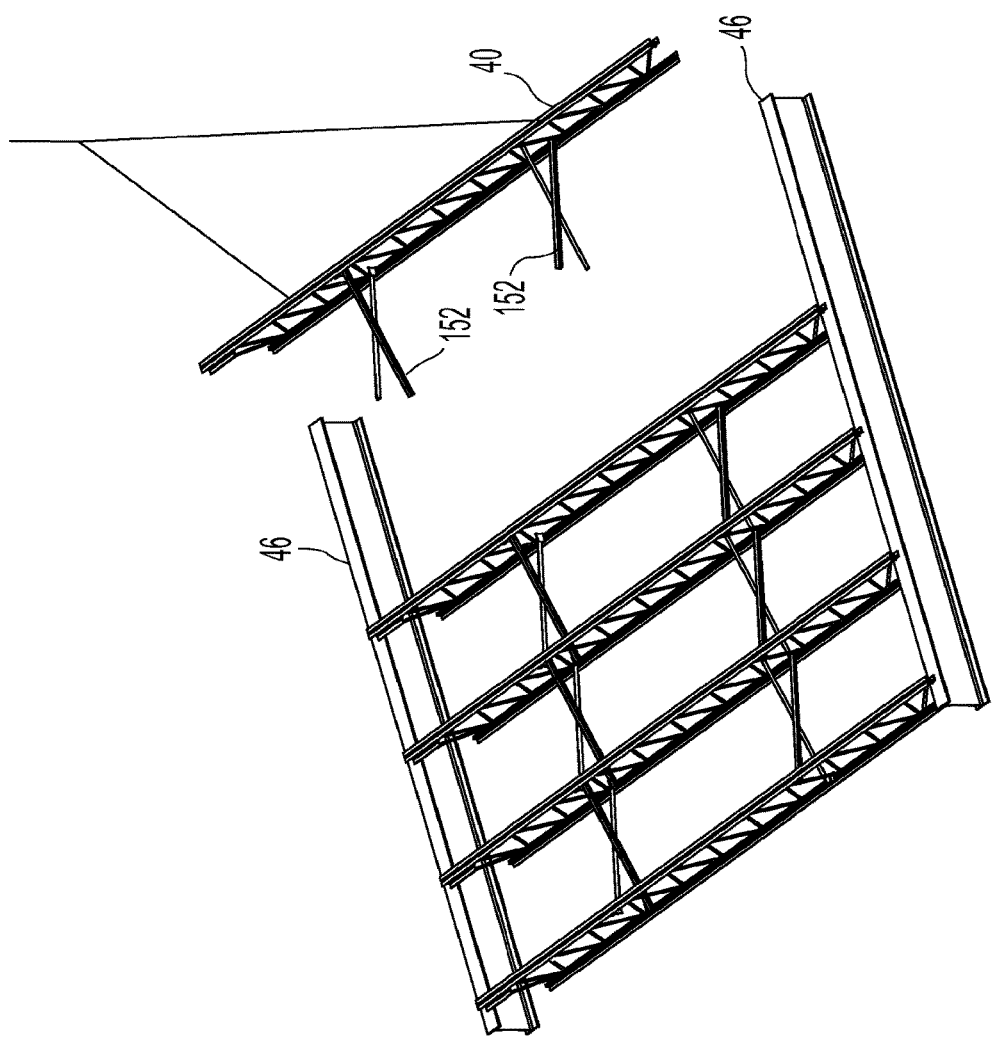
FIG. 31 is a perspective view of a plurality of joists and a joist being lifted by a crane.

A further advantage of the presently disclosed bridging assembly is shown in FIG. 31. Under current OSHA regulations, certain joists require bridging to be installed during erection. (See Perry S. Green and Tim Holtermann, *Bridging of Open-Web Steel Joists and Joist Girders*, ASCE Conf. Proc. 314, 110 (2008)). For such joist installations, the crane or other lift setting the joists cannot release the joist until diagonal bridging is secured in place. In the past, securing erection bridging using the bolt 156 as shown in FIG. 28A required the crane operator to wait until the bolts 156 and nuts were secured by operators working on the structure or in lifts. The prior installation used valuable crane operation time inefficiently. Using the present fasteners 52, 54, the bridging members are connected and secured quickly and efficiently, using electric or pneumatic drill drivers enabling the crane operator to release the hoisting cables from the joist more quickly, and reducing erection time cost of the building structure.

Figure 32:
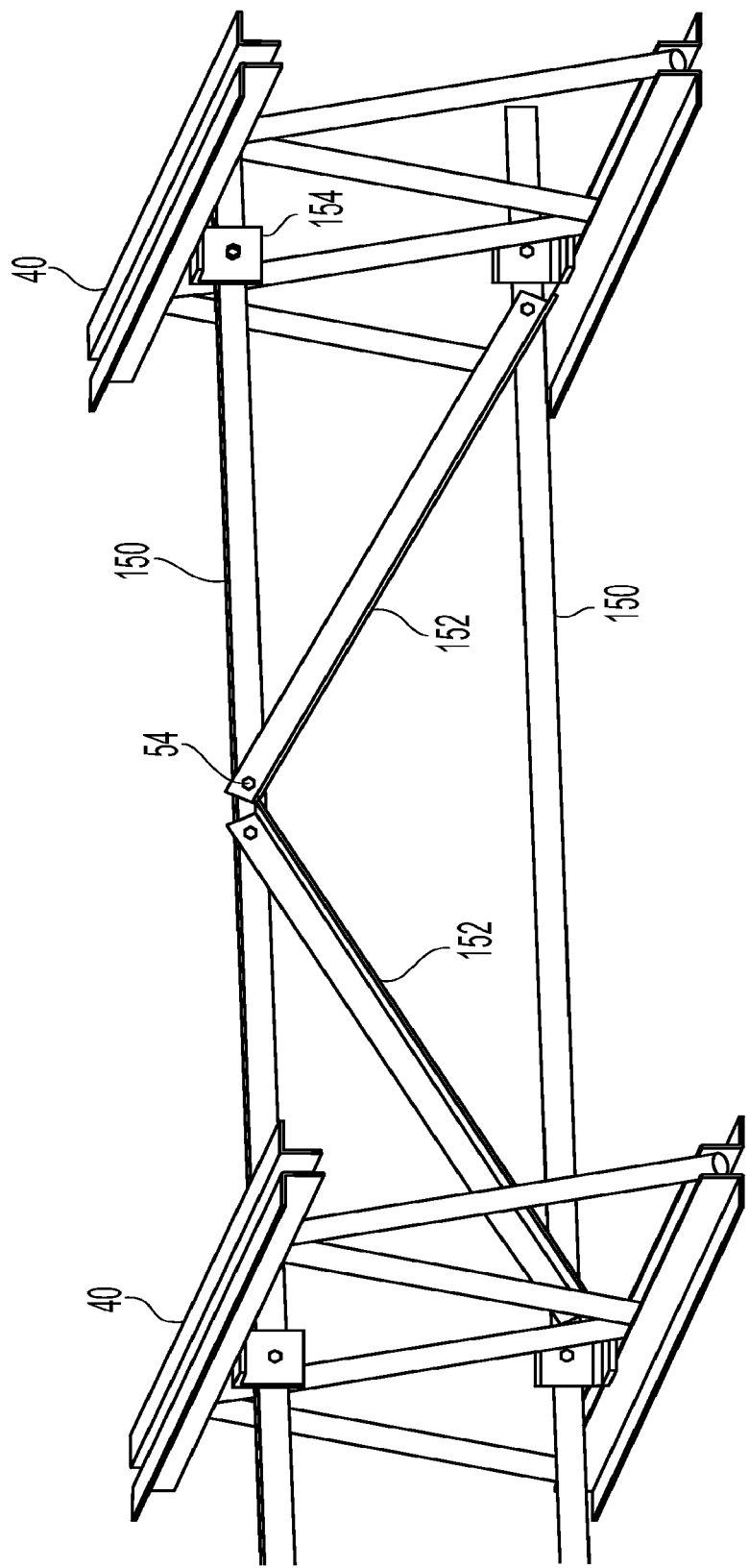
FIG. 32 is a perspective view of a chevron bridging configuration.

FIG. 32 shows the diagonal bridging members 152 in a chevron configuration between two horizontal bridging members 150. The diagonal bridging members 152 may be provided with a slot or clearance hole at each end. The self-drilling, thread-forming fastener 54 may be used to secure the diagonal bridging members 152 to the horizontal bridging members 150.

In the past, the chevron bridging configuration of FIG. 32 with open web joists required pre-drilling or pre-punching holes either during fabrication of the horizontal bridging members 150 or at the construction site. Pre-drilling the horizontal bridging members 150 has not been commercially practicable because of the additional time and inefficiency caused at the job site. Additionally, factory pre-drilling requires the installers to use certain horizontal bridging members 150 in certain locations for hole alignment, which also requires additional time and coordination on the job site. The present self-drilling, thread-forming fasteners 54 enable the operator to rapidly install the diagonal bridging members 152 in a chevron bridging configuration or other configuration wherever the bridging is needed without pre-drilling holes in the horizontal bridging members 150. Optionally, the diagonal bridging members 152 may be installed with the present self-drilling, thread-forming fasteners 54 without pre-drilling holes in the horizontal bridging members 150 or the diagonal bridging members 152 by installing the self-drilling, thread-forming fasteners 54 through both the horizontal and diagonal bridging members.

Figure 33:
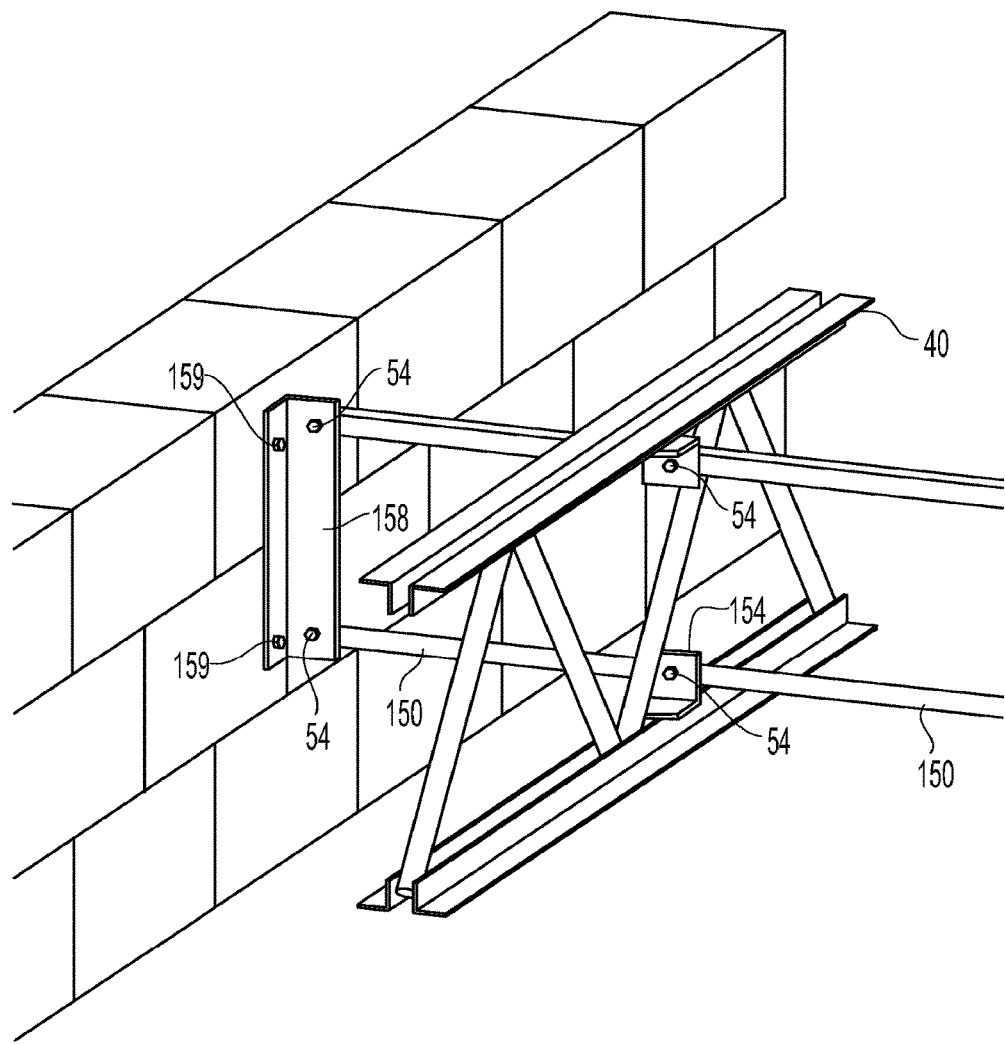
FIG. 33 is a prospective view of a joists with horizontal bridging and wall terminus connection.

Horizontal bridging members 150 are typically secured to a wall or other structure as shown in FIG. 33. In the past, a support bracket was secured to a wall or other structure using fastening methods known in the art, such as masonry screws 159 or other fasteners. With the present disclosure, a support bracket 158 may include clearance holes (not shown) through which self-drilling, thread-forming fastener 54 may be installed. The horizontal bridging member 150 can be cut to a desired length and secured to the support bracket 158 using self-drilling, thread-forming fasteners 54.

Figure 34:
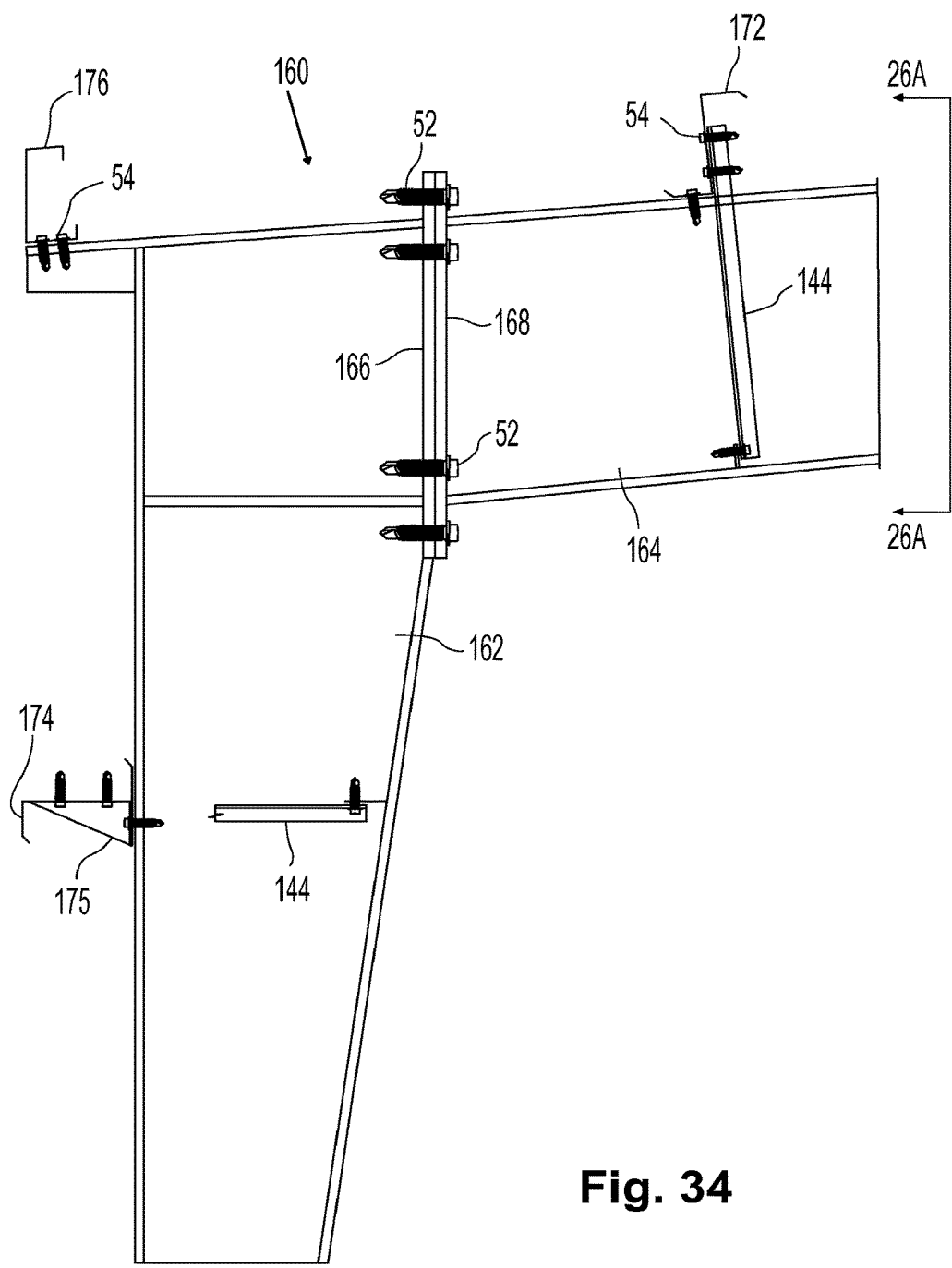
FIG. 34 is a partial side view of a structural knee joint of a metal building system.

Metal building systems may include various rigid frame configurations. The present self-drilling, thread-forming fastener 54 and thread-forming fasteners 52 may be used to form a variety of structural connections rapidly that are very robust and secure. As shown in FIG. 34, a rigid frame knee joint 160 may include a column member 162 and a rafter member 164. The column member 162 includes a butt plate 166 positioned to form a connection with the rafter member 164. The rafter member 164 includes an end plate 168 corresponding to the butt plate 166 for making a bolted connection. Either the end plate 168 or the butt plate 166 may be provided with pilot holes, and the other provided with clearance holes positioned for alignment with the pilot holes and sized for the thread-forming fastener 52. To make the structural connection, the thread-forming fastener 52 may be provided through the clearance hole and turned to form threads in the bore of the pilot hole as discussed above.

Figure 34A:
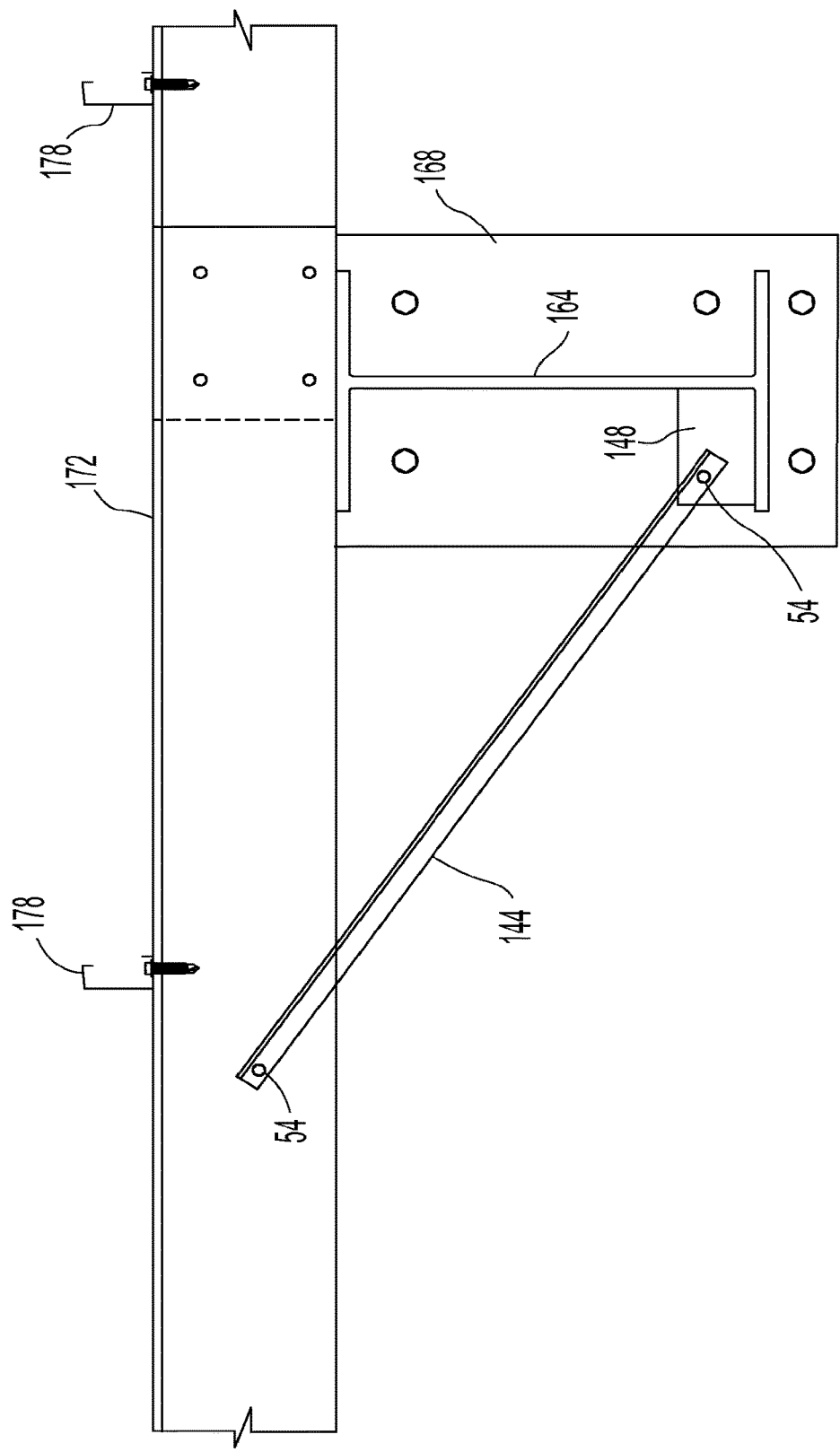
FIG. 34A is a partial cross-sectional view of the knee joint of FIG. 26.

As shown in FIGS. 34 and 34A, the rafter member 164 may be braced by one or more girder braces 144 between bracket 148 and a purlin 172.

In rigid frame connections as shown in FIG. 34, the threaded portion 64 of the thread-forming fastener 52 typically are sized as desired for the size and load requirements of the connection, but may have a major diameter 58 between about ½ and 1½ inch, or larger, and at least a portion may comply with fastener standard ASTM A325 or ASTM A490. In the past, the only way to achieve a secure connection was by using a weld connection or a bolt and corresponding nut. By using the present disclosure, the connection may be made by driving the thread-forming fastener 52 from one side of the connection using an electric or pneumatic drill driver. The present thread-forming fastener 52 may be used to clamp the first member between the head 63 of the fastener 52 and the formed threads in the second member such that the thread-formed second member acts as a nut. In certain applications, a nut may still be desired on the fastener 52, particularly where additional pieces are secured using the same connection. In that case, nuts may be turned onto the threaded portion 64 of fasteners 52 and tightened at less intensive periods during the erection of the building since the thread-forming fasteners 52 already form the structural connection by tightening into the threaded plate 168.

As shown in FIGS. 34 and 34A, rigid frame structures include a plurality of purlins 172 for supporting the roof covering (not shown). Girts 174 are provided for supporting wall sheeting (not shown) on the sides of the structure. An eave strut 176 may be provided adjacent the roof edge. The self-drilling, thread-forming fastener 54 may be used to provide a secure connection of purlins 172, girts 174, and eave struts 176 to the frame. The self-drilling, thread-forming fastener 54 may have a major diameter between about ¼ and ½ inch as desired for the size and load requirements of the application, and at least a portion of the threaded portion 64 comply with fastener standard ASTM A307, A354, A325 or other fastener standard as desired.

Purlin clips 173, such as shown in FIGS. 40 and 42A through 42C, may be connected to the rafter member 164 and the purlins 172 connected to the purlin clips 173 using thread-forming fasteners 52 or self-drilling, thread-forming fasteners 54. Additionally, as shown in FIGS. 34 and 34A, girt clips 175 may be connected to the column member 162 and the girts 174 connected to the girt clips 175 using thread-forming fasteners 52 or self-drilling, thread-forming fasteners 54. The purlin clips 173 and girt clips 175 may include pilot holes positioned for installation of thread-forming fasteners 52 or self-drilling, thread-forming fastener 54. Pilot holes may be provided in the column member 162 and the rafter member 164 for connecting the purlins 172, girts 174, and eave struts 176. The purlins 172, girts 174, and eave struts 176 may be provided with clearance holes positioned for alignment with the pilot holes in the corresponding clips 173, 175, column member 162 and rafter member 164 during installation of fasteners 52 or 54. Thread-forming fasteners 52 may be positioned through the clearance holes and thread-formed into the pilot holes for connecting the members to the frame. Alternatively, when using self-drilling, thread-forming fasteners 54, the purlins 172 and girts 174 may be provided without clearance holes, and the purlin clips 173 and girt clips 175 provided without pilot holes, and the self-drilling, thread-forming fasteners 54 installed by drilling and thread-forming through the purlin or girt and clip. The fasteners 52, 54 for installing purlins 172, girts 174, and eave struts 176 may have a major diameter of ½ inch and at least a portion of the threaded portion 64 satisfy fastener standard ASTM A307, A354, or A325. Alternatively the major diameter 58 may be between about ⅜ and 1 inch, as desired for the size and load requirements of the connection.

The column member 162 may be braced by one or more wide flange girder braces 144 between bracket 148 and a girt 174 using self-drilling, thread-forming fastener 54. As shown in FIG. 34A, the rafter member 164 may be braced by one or more wide flange girder braces 144 between bracket 148 and a purlin 172 using self-drilling, thread-forming fastener 54.

Figure 35:
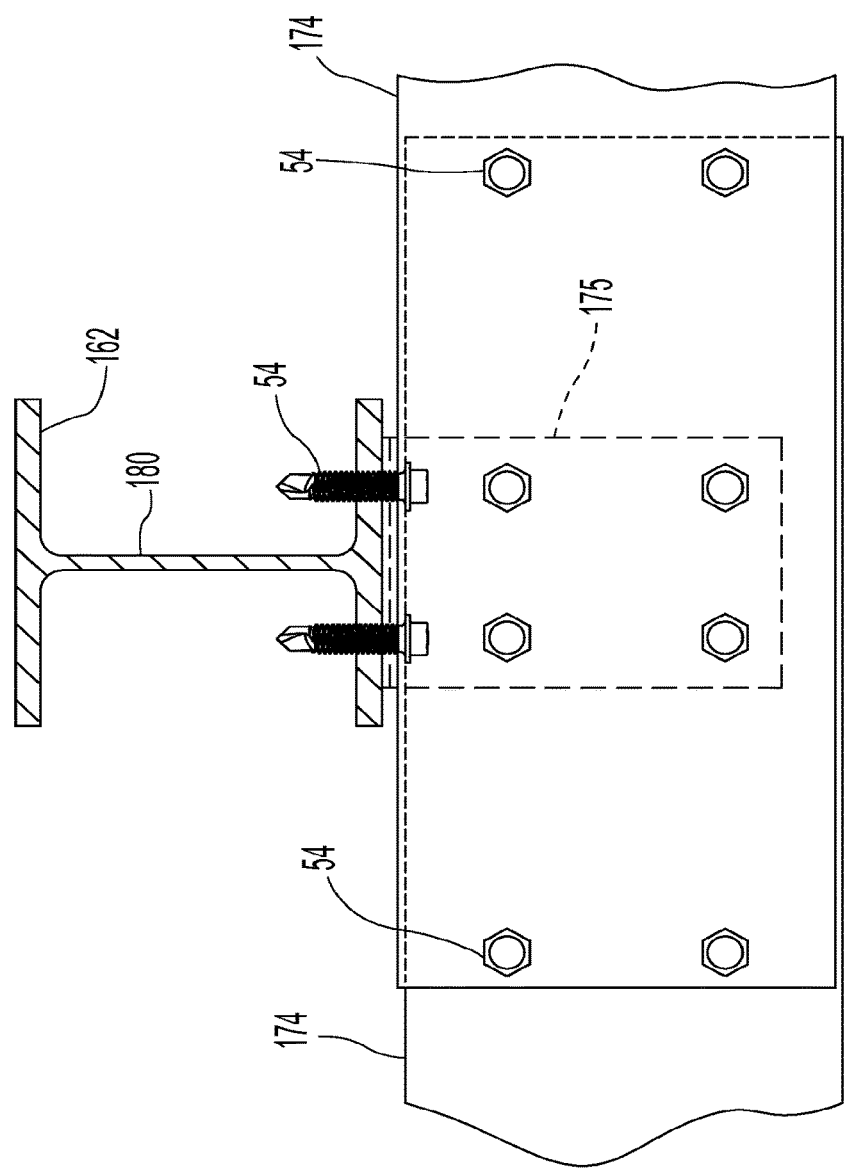
FIG. 35 is a partial top view of a girt lap joint.
Figure 36:
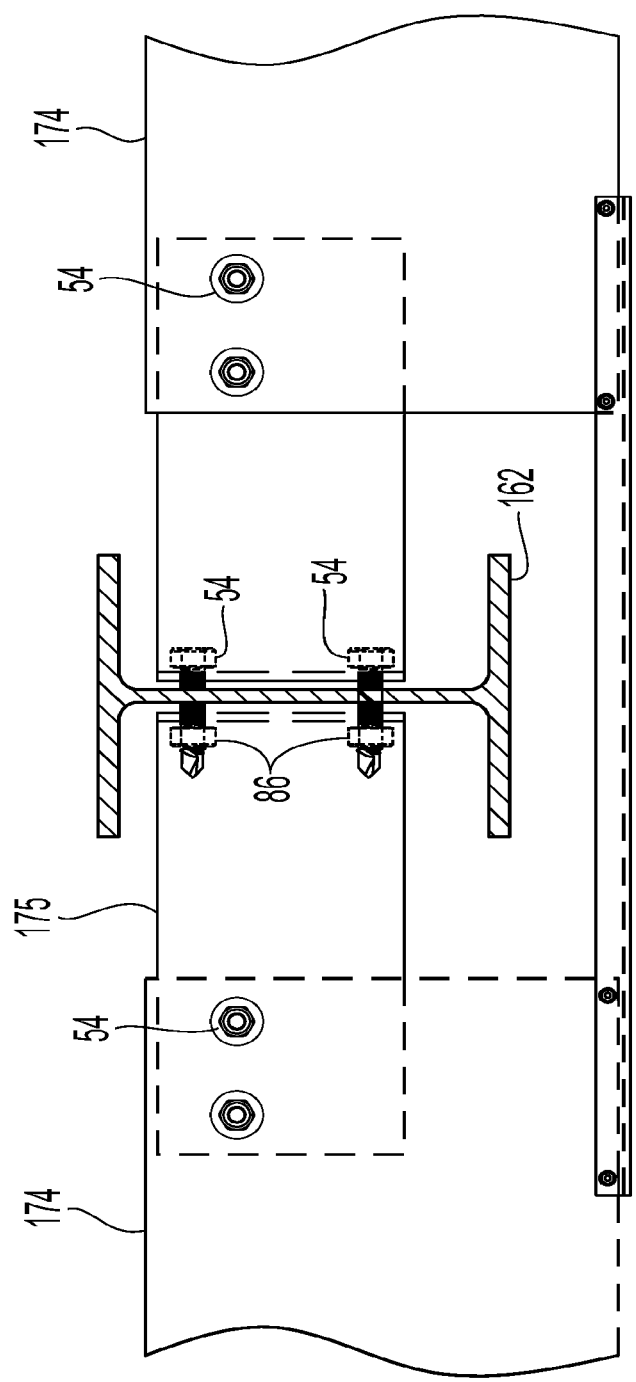
FIG. 36 is a partial top view of an inset mounted girt lap joint.
Figure 37:
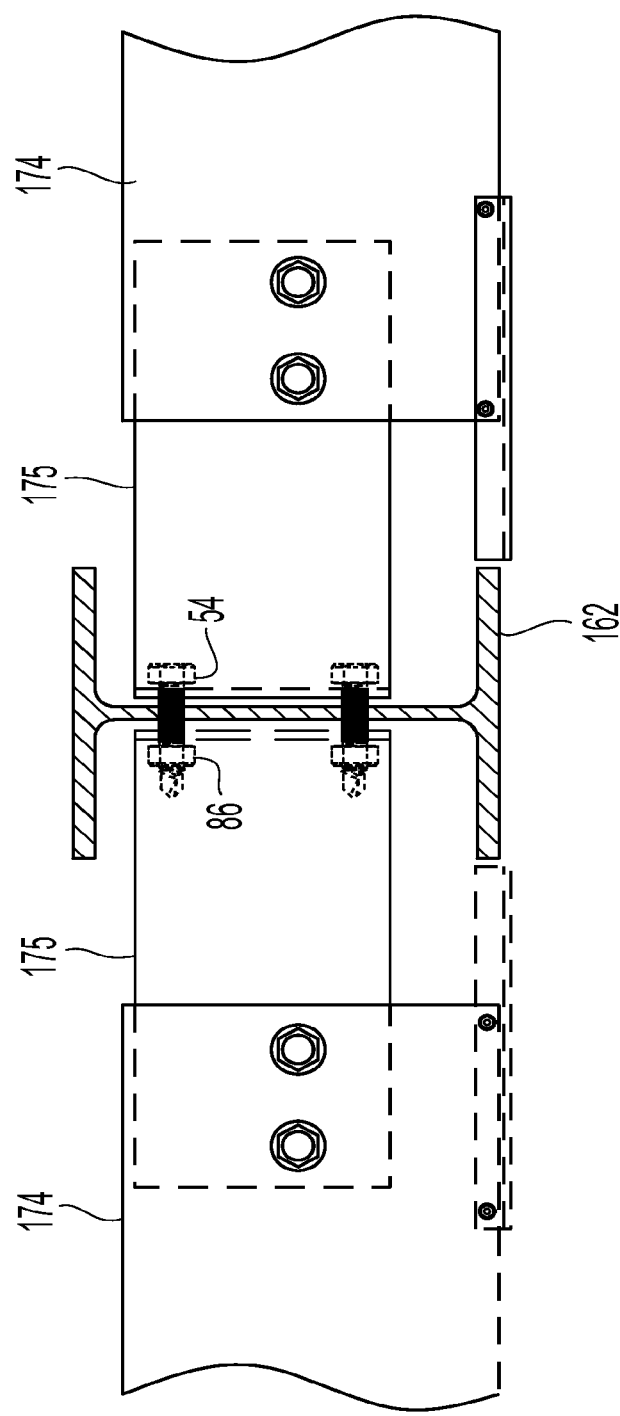
FIG. 37 is a partial top view of a flush mounted girt lap joint.

As shown in FIGS. 35 through 37, girts 174 may be connected to column member 162 using girt clips 175 using self-drilling, thread-forming fasteners 54. The girt clip 175 may be attached to the column 162 using self-drilling, thread-forming fastener 54 as shown in FIGS. 35 through 37. The girt clip 175 may be an L-bracket having clearance holes on the first leg of the L-bracket through which the self-drilling, thread-forming fastener 54 may be installed into the column member 162. The girts 174 may be fastened to the girt clip 175 through the second leg of the L-bracket using self-drilling, thread-forming fastener 54. The girt clip 175 may have no pre-drilled holes on the second leg of the L-bracket, and the self-drilling, thread-forming fastener 54 may drill and install through both the girt 174 and the girt clip 175. In FIG. 35, the girt clip 175 may be installed onto the column member 162, and support a lapped connection of two girts 174. To form the lapped connection, the end of one girt 174 overlaps the end of a second girt 174 and is fastened together with self-drilling, thread-forming fastener 54 or thread-forming fasteners 52 as described above. Alternatively, the column member 162 may be provided to the construction site with girt clips 175 welded in place. In yet another alternative, girt clips may be omitted by bolting the girts 174 directly to the column member 162 (not shown).

In the applications of FIGS. 35 and 37, the girt clips 175 are attached to the web of a girder in a double connection. The first girt clip 175 may be installed using self-drilling, thread-forming fastener 54 or thread-forming fasteners 52 as desired to the girder web 180. Then, the second girt clip may be positioned over the ends of the fasteners 52, 54, and secured to the girder web 180 using nuts 86. A girt 174 may be fastened to each girt clip 175 as desired as shown in FIGS. 35 and 37.

Figure 38:
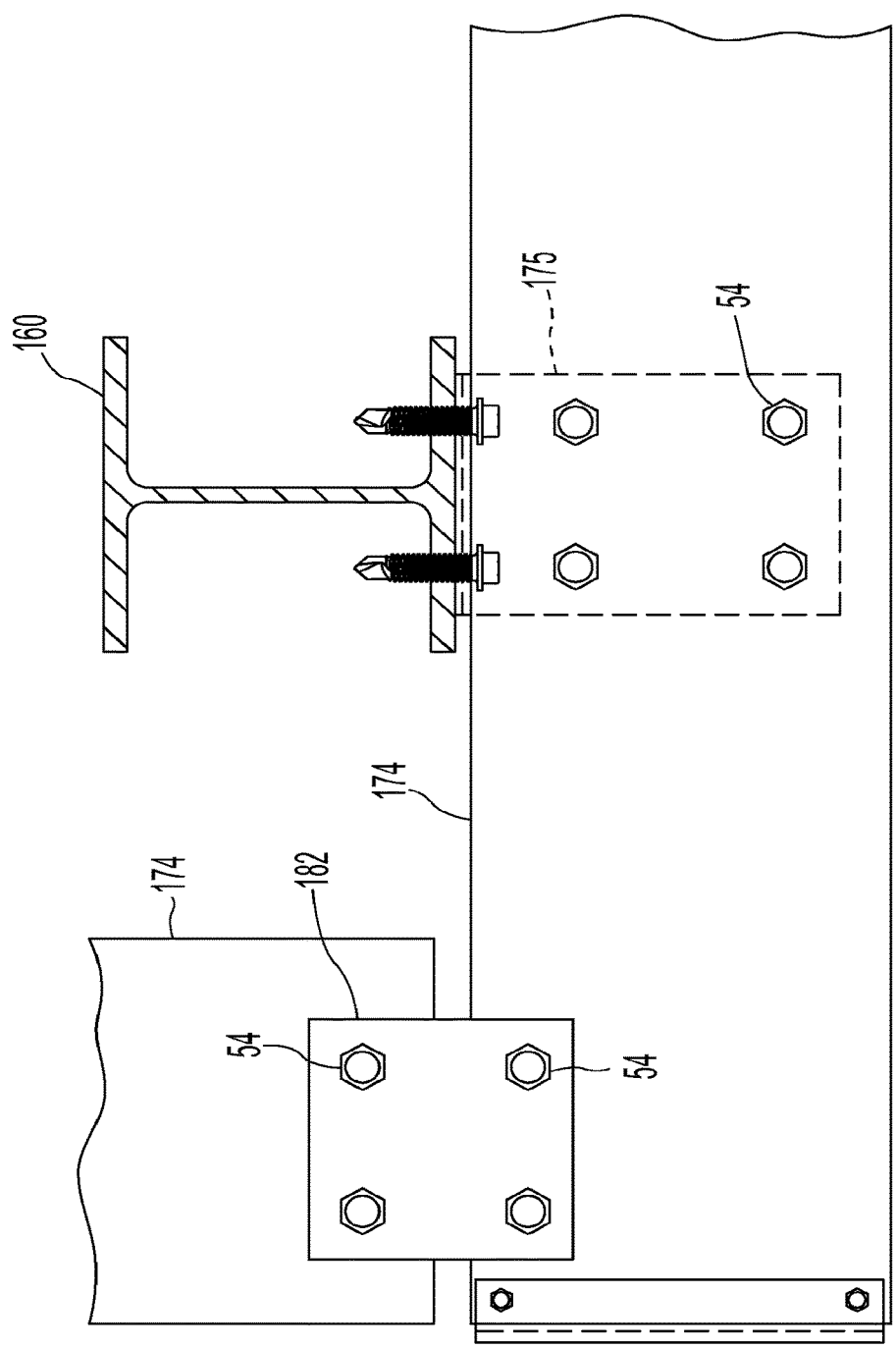
FIG. 38 is a partial top view of a girt corner connection.

A girt corner connection, shown in FIG. 38, may be made using a girt tie clip 182 having clearance holes for installing self-drilling, thread-forming fastener 54 through. The self-drilling, thread-forming fasteners 54 may be provided through the clearance holes in the girt tie clip 182 and installed into the girts 174.

Figure 39:
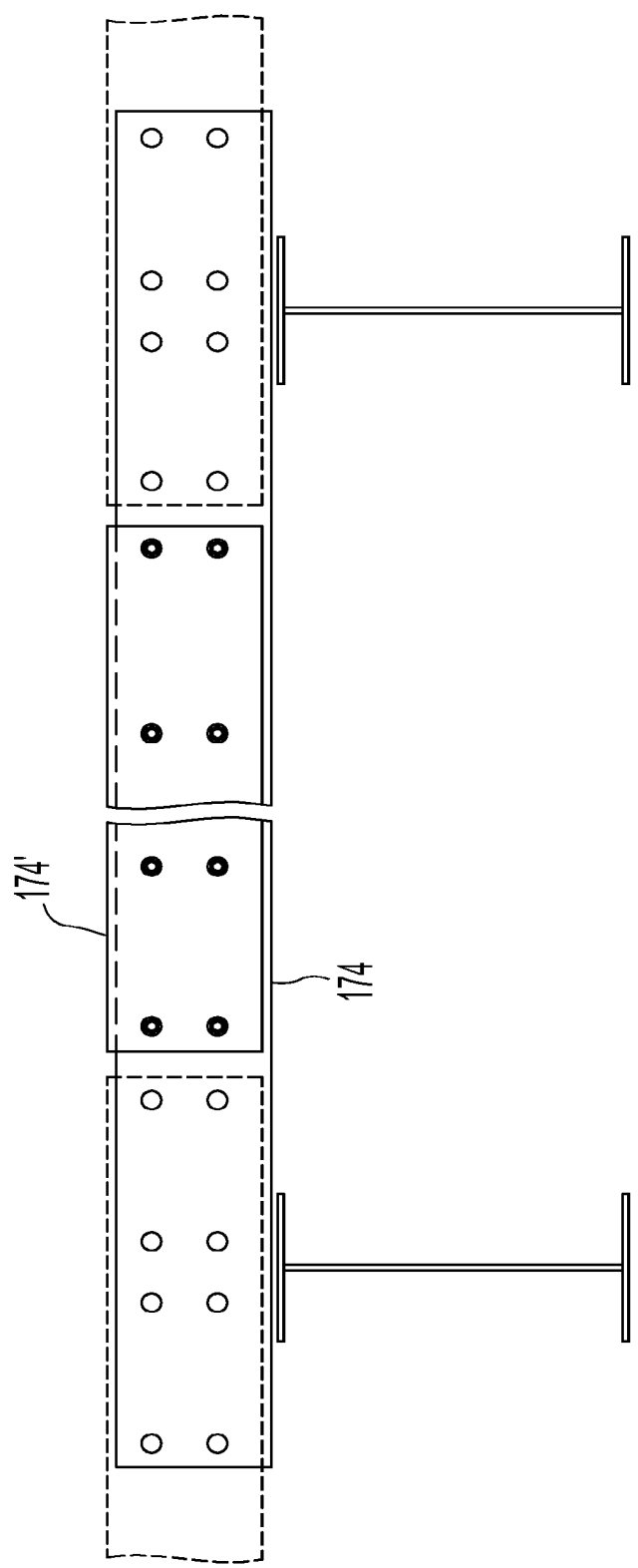
FIG. 39 is a partial top view of a flush mounted nested girt connection.

In certain applications, a plurality of girts 174 may be nested together for increased strength. As shown in FIG. 39, a girt 174 may be placed over a second girt 174' and fastened using a plurality of self-drilling, thread-forming fastener 54. Similarly, purlins may be nested (not shown), and eave struts may be nested (not shown), secured using self-drilling, thread-forming fastener 54 as described above.

Figure 40:
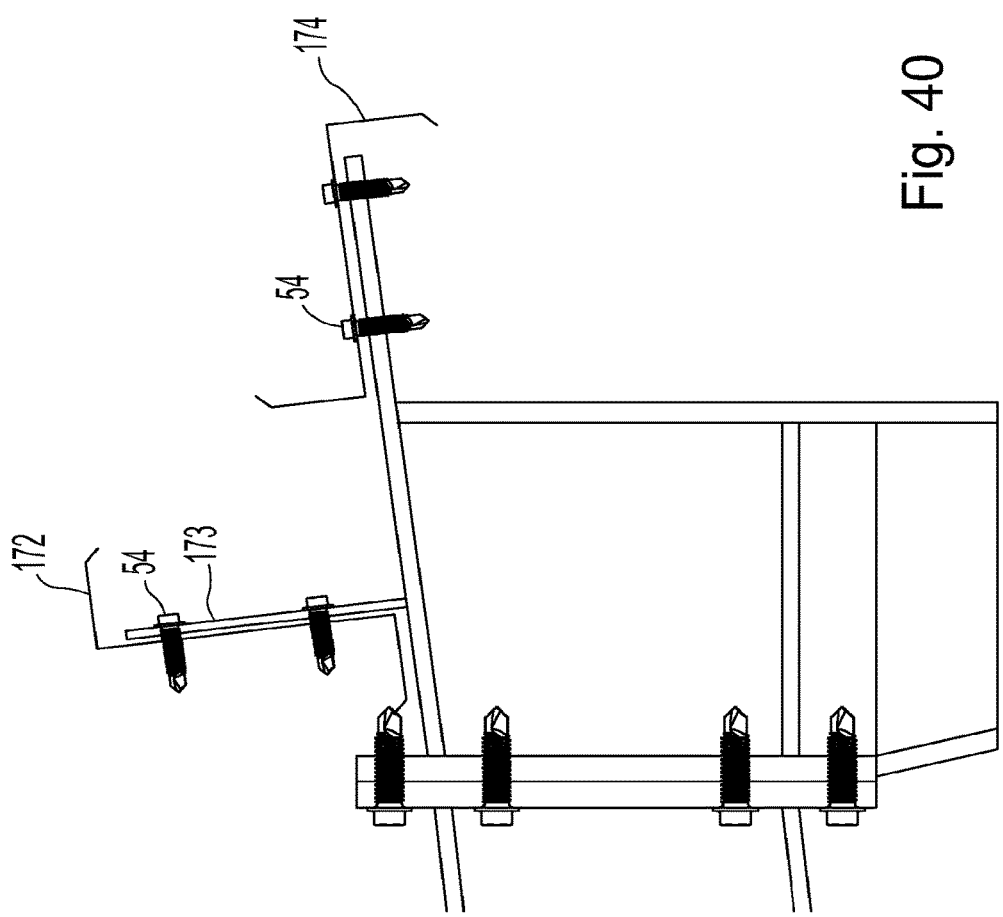
FIG. 40 is a partial side view of a high eave girt connection.

As shown in FIG. 40, for certain sloped roof applications, a girt 174 may be installed adjacent the roof on the high eave using self-drilling, thread-forming fasteners 54.

Figure 41:
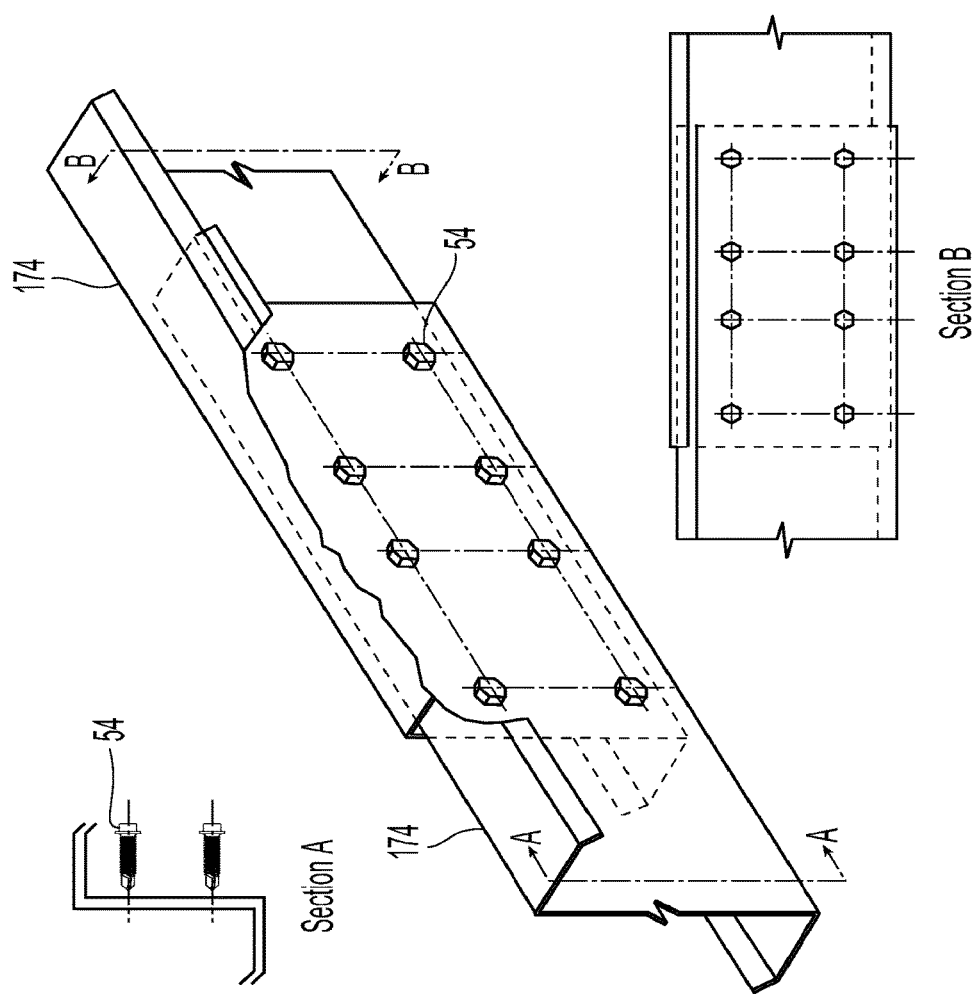
FIG. 41 is a partial perspective view of a purlin lap joint.
Figure 42A:
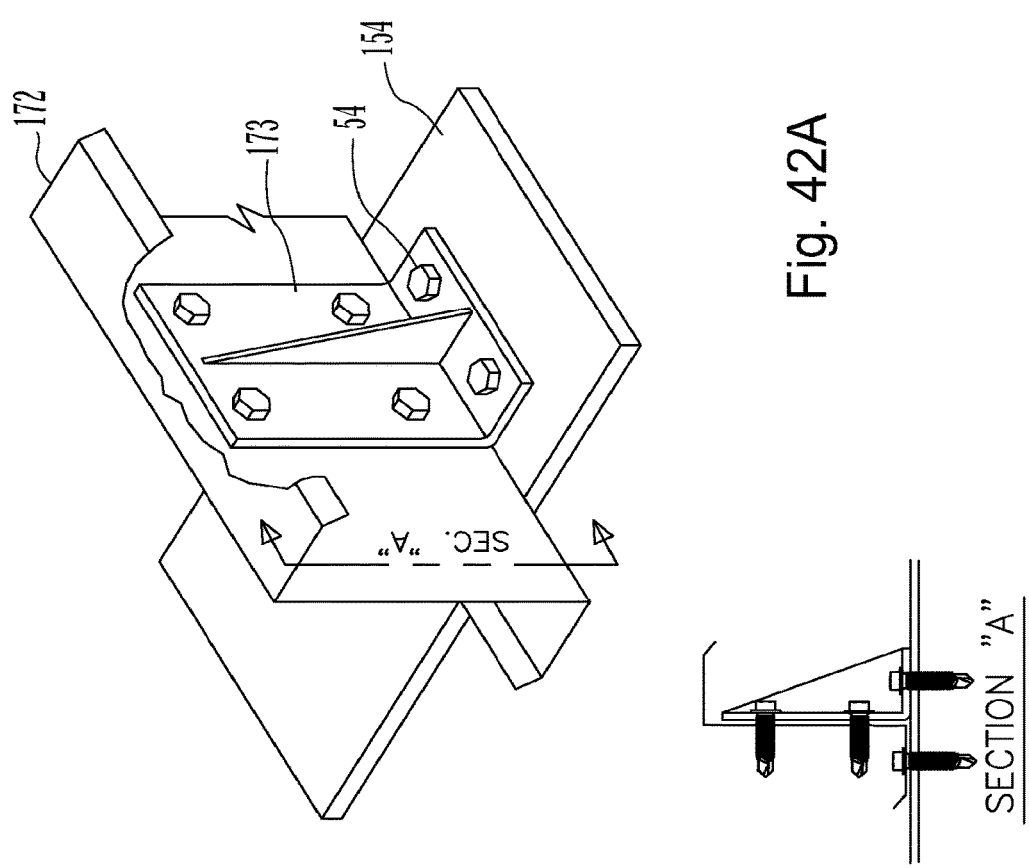

The purlins 172, girts 174, and eave struts 176 may be provided in lengths shorter than required, and connected to form desired lengths. Typically, purlins 172, girts 174, and eave struts 176 are formed of sheet metal having steel thicknesses between about 10 gage and 16 gage. As shown in FIG. 41, two purlins 172 may be overlapped and fastened with self-drilling, thread-forming fastener 54 as described above. In one alternative, the purlins 172 may make a lapped connection at a purlin clip 173 as shown in FIG. 42A, and at least one end of the purlin 172 may be provided with a plurality of clearance holes larger than the major diameter 58 of the fastener 54, positioned for making a lapped connection. To connect the members in a lapped connection as shown in FIGS. 41 and 42A, clearance holes of one member are lapped over a second member, and the self-drilling, thread-forming fastener 54 are positioned through the clearance holes and drilled and thread-formed into the second member and/or the purlin clip 173. Alternatively, clearance holes may be omitted and the self-drilling, thread-forming fastener 54 drilled and thread-formed into the first and second member. For sheet metal connections between about 10 gage and 14 gage, the major diameter of the self-drilling, thread-forming fastener 54 may be between about 0.19 inch (such as a #10 fastener, ASME B1.1 Unified Inch Screw Thread Standard) and ½ inch. The threaded portion 64 may comply with fastener standard A307, A325, A354, or other fastener standard as desired.

Figure 42B:
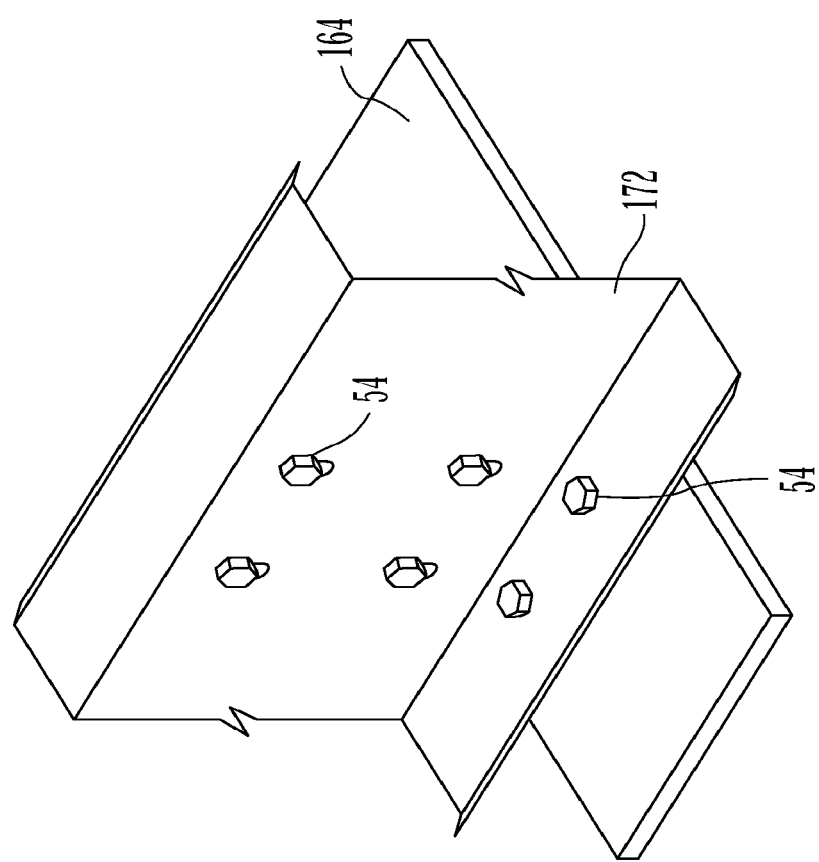

As shown in FIG. 42A, the purlin clip 173 may be an L-bracket having clearance holes on the first leg of the L-bracket through which the self-drilling, thread-forming fastener 54 may be installed into the rafter member 164. The purlin 172 may be fastened to the purlin clip 173 through the second leg of the L-bracket using self-drilling, thread-forming fastener 54. The purlin clip 173 may have no pre-drilled holes on the second leg of the L-bracket, and the self-drilling, thread-forming fastener 54 may drill and thread-form through both the purlin 173 and the purlin clip 173. As shown in FIG. 42B, the purlin clips 173 may be omitted and the purlins 172 connected to the rafter member 164. In yet another alternative, the rafter members 164 may be provided to the construction site with purlin clips 173 welded in place as shown in FIG. 42C.

Figure 43:
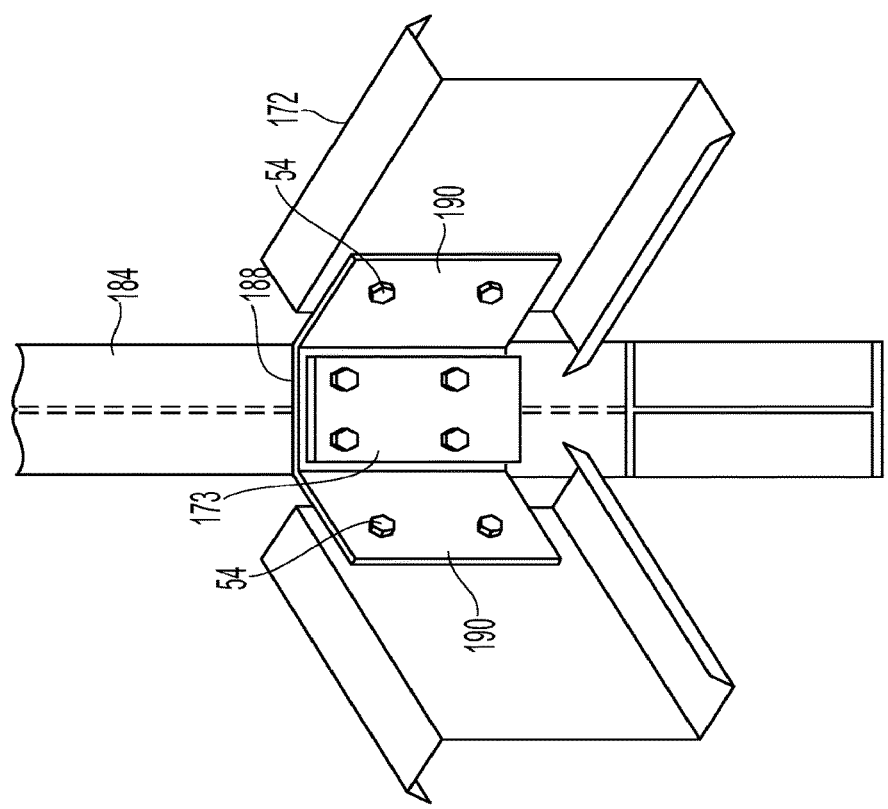
FIG. 43 is a partial perspective view of a purlin connection in a roof valley.

FIG. 43 shows a purlin connection made with self-drilling, thread-forming fastener 54 in a roof valley. A valley rafter 184 may be provided with purlin clips 173 installed by welding. Alternatively, purlin clips 173 may be fastened to the valley rafter 184 using self-drilling, thread-forming fastener 54. In any event, a valley clip 186 is provided having a shape adapted to connect the end of one or more purlins 172 to the valley rafter 184. The valley clip 186 as shown in FIG. 43 includes a clip mounting portion 188. The self-drilling, thread-forming fastener 54 may be installed through the purlin clip 173 and the clip mounting portion 188 to secure the valley clip 186 to the rafter 184. The valley clip includes at least one purlin tab 190. The self-drilling, thread-forming fastener 54 may be provided through the purlin tab 190 and the purlin 172 to install the purlin 172 to the valley clip 186. Clearance holes may be provided in either the purlins 172 or purlin clip 173 as desired to install the purlin 172 to the purlin clip 173, and either the valley clip 186 or purlin clip 173 as desired to install the valley clip 186 to the purlin clip 173.

Panel clips 178 may be attached to purlins 172 using self-drilling, thread-forming fastener 54. The panel clips 178 may be provided with clearance holes larger than the major diameter 58 of the fastener 54. The self-drilling, thread-forming fastener 54 are installed through the clearance holes and drilled and threaded into the purlin 172 as shown in FIG. 34A.

FIGS. 44 and 45 show connections of a door jamb 192 to a girt 174 and rafter member 164. As shown in FIG. 44, the jamb 192 is fastened to jamb clip 194 using self-drilling, thread-forming fastener 54. The jamb clip 194 may be fastened to the girt 174 using self-drilling, thread-forming fastener 54. The jamb clip 194 may be shaped for installing to a rafter member using self-drilling, thread-forming fastener 54 as shown in FIG. 45. The jamb clip 194 may or may not include clearance holes for installing the self-drilling, thread-forming fastener 54 into the girt 174 or rafter member 164. The door jamb 192 may or may not be provided with clearance holes for installing the self-drilling, thread-forming fastener 54 into the jamb clip 194. Alternatively, pilot holes may be provided in the jam clip 194 and thread-forming fasteners 52 may be provided to attach the door jamb 192 to the jamb clip 194.

Figure 46:
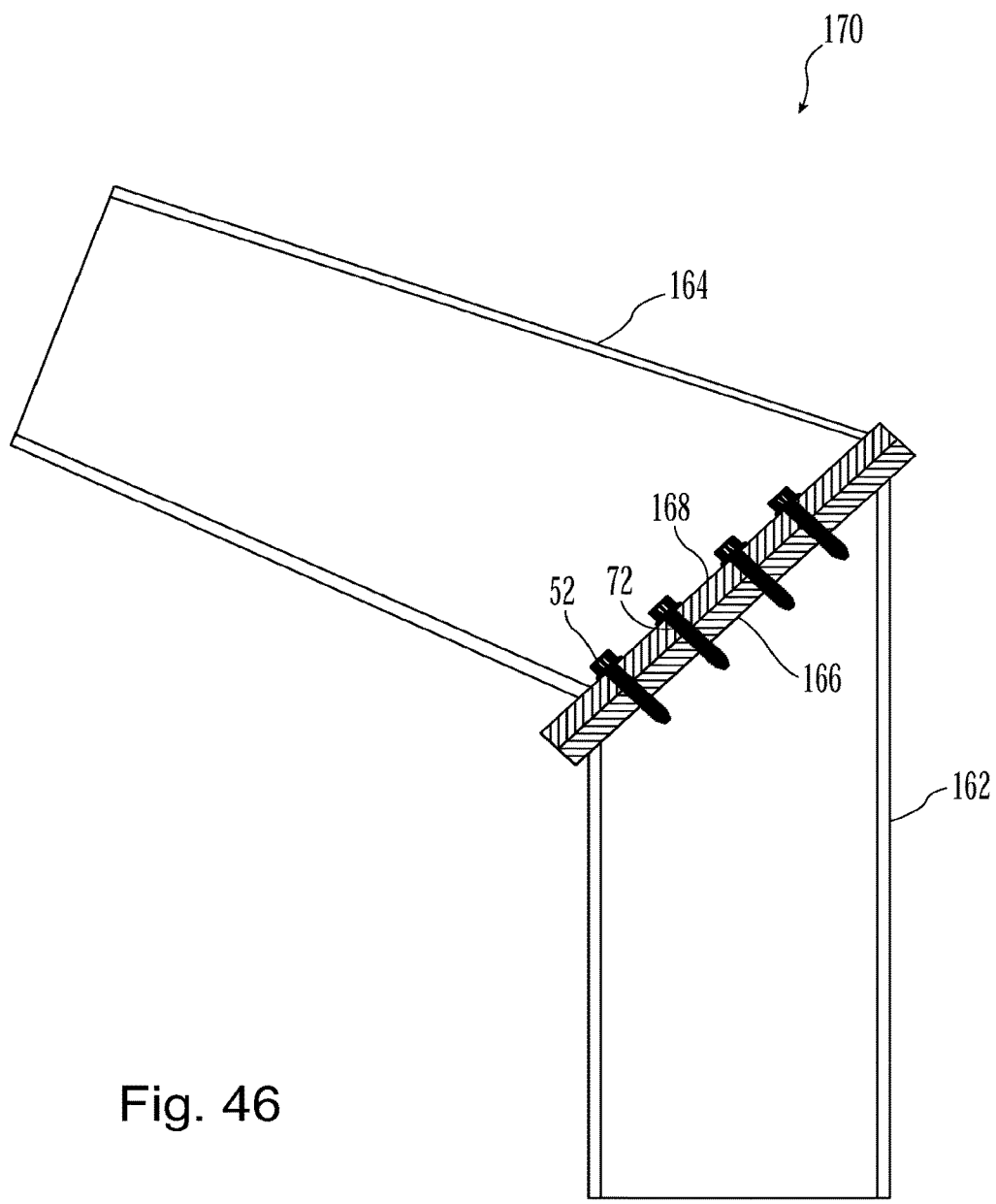
FIG. 46 is a partial side view of an alternative structural knee joint.

Other structural connections may be made using the thread-forming fasteners 52 and/or self-drilling, thread-forming fastener 54 as shown in FIGS. 46 through 61. An alternative structural knee joint 170 is shown in FIG. 46. The column member 162 is connected to the rafter member 164 using thread-forming fasteners 52. In the configuration of FIG. 46, the butt plate 166 is provided with pilot holes and the end plate 168 is provided with clearance holes 72, and the thread-forming fasteners 52 are threaded into the butt plate.

Figure 47:
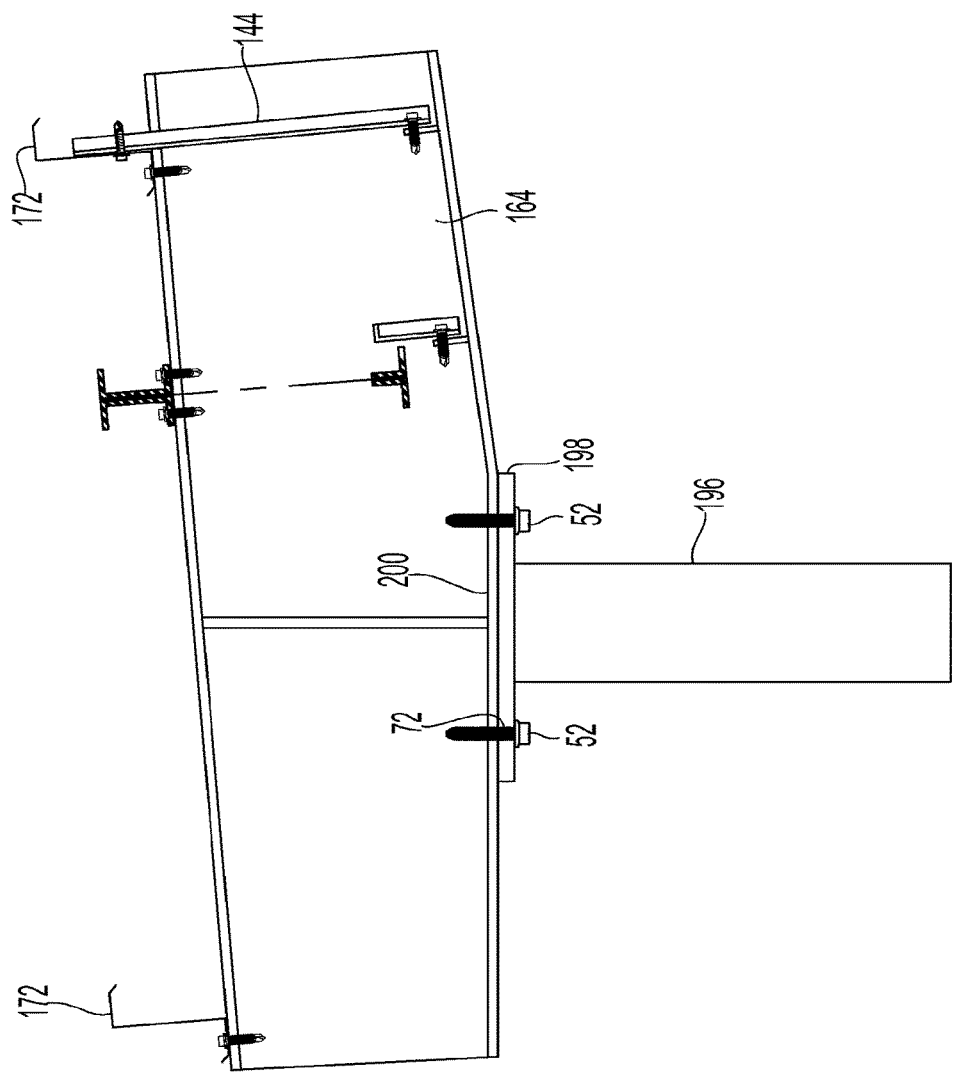
FIG. 47 is a partial side view of a rafter member and column connection.

FIG. 47 shows the rafter member 164 supported by an interior column 196. The interior column 196 has a top plate 198 provided with clearance holes 72. In the application of FIG. 47, the rafter member 164 includes a bottom flange 200 having pilot holes corresponding in location with the clearance holes in the top plate 198 of the column 196. Thread-forming fasteners 52 may be positioned through the clearance holes 72 and thread-formed into the bottom flange 200 to connect the column 196 to the rafter member 164. Alternatively, the top plate 198 may be provided with pilot holes and the bottom flange 200 with clearance holes, and the thread-forming fasteners 52 may be installed through the clearance holes 72 in the bottom flange 200 and thread-formed into the top plate 198 to connect the column 196 to the rafter member 164.

Figure 48:
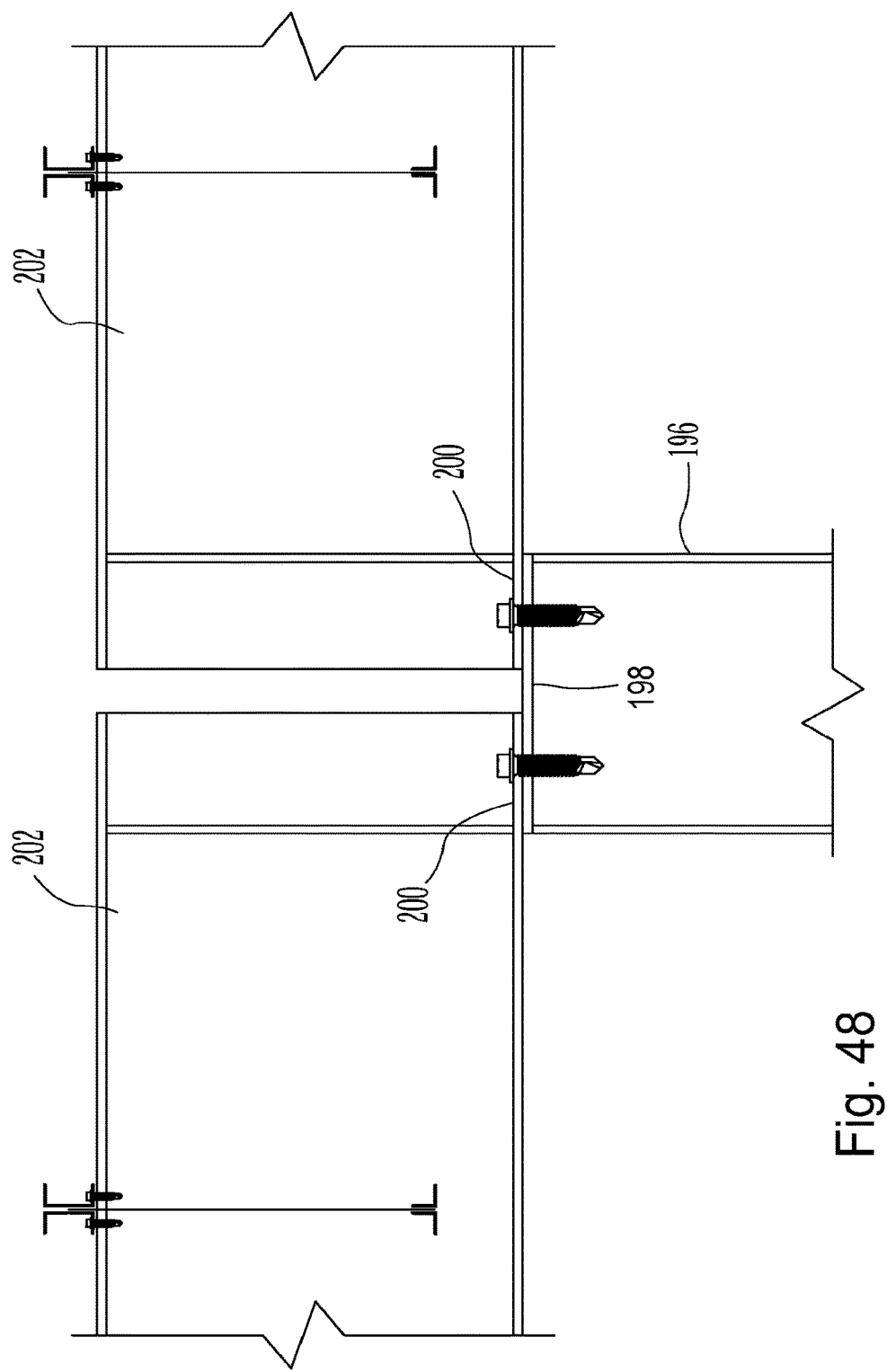
FIG. 48 is a partial side view of a connection of mezzanine beam members and a column.

Shown in FIG. 48, mezzanine members 202 may be supported by the interior column 196. The mezzanine members 202 have a bottom flange 200 provided with clearance holes 72 corresponding in location with pilot holes in the top plate 198. Thread-forming fasteners 52 may be installed through the clearance holes 72 in the bottom flange 200 and thread-formed into the top plate 198 to connect the column 196 to the mezzanine members 202. Alternatively, the bottom flange 200 may be provided with pilot holes corresponding in location with clearance holes in the top plate 198 of the column 196. Thread-forming fasteners 52 may be provided through the clearance holes 72 and threaded into the bottom flange 200 to connect the mezzanine members 202 to the column 196.

Figure 49C:
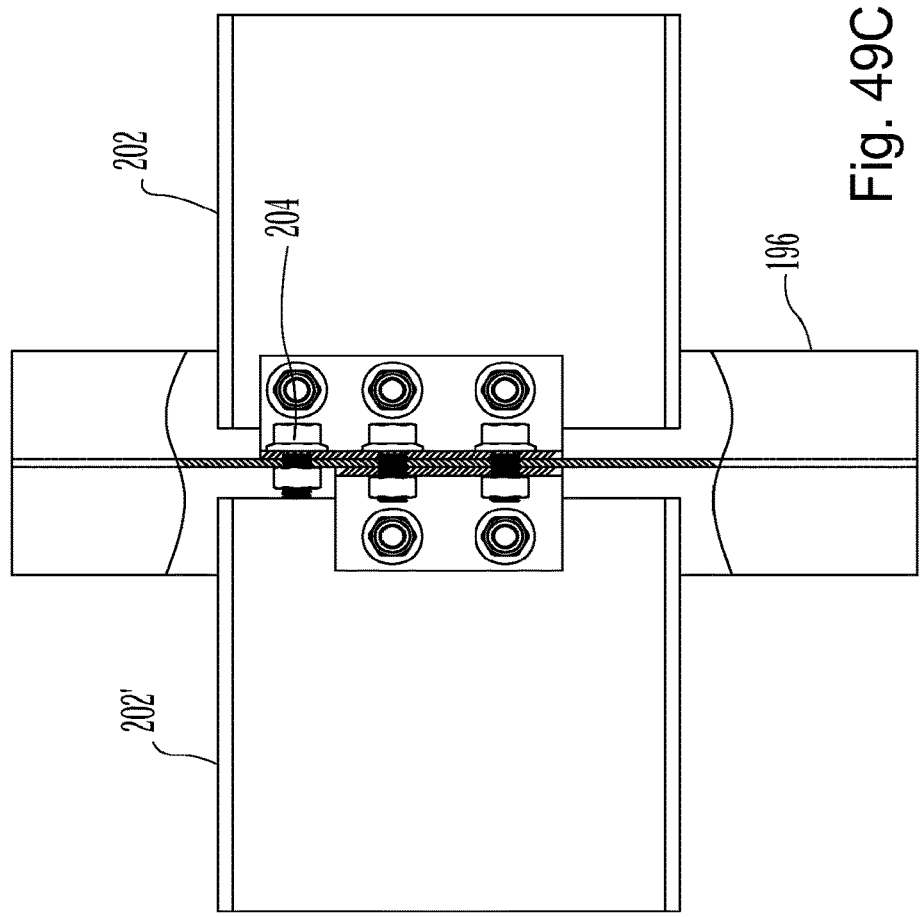
FIG. 49C is a prior art connection of mezzanine beam members to a column.

Alternatively, the mezzanine members 202 may be connected to the web 180 of the interior column 196 in a double connection such as shown in FIG. 49A. To comply with OSHA securement requirements, the first mezzanine member 202 must be secured to the column 196 before connecting the second mezzanine member 202'. In the past, weld connections or bolt-and-nut connections 204 such as shown in FIG. 49C, had to be made to hold the first member 202. The OSHA securement bolt and nut connection had to be positioned to not interfere with the structural connection. As shown in 41C, this required unique parts for the left and right sides of the connection. We have found that the OSHA requirements can be achieved using thread-forming fasteners 52 using the same components on both sides of the double connection as desired such as shown in FIG. 49A.

As shown in FIGS. 49A and 49B, at least one mounting bracket 206 is attached to each mezzanine member 202. The mezzanine members 202 may be provided to the construction site with the mounting brackets 206 welded in place. Alternatively, the mounting brackets 206 may be fastened to the mezzanine members 202 using self-drilling, thread-forming fastener 54 or thread-forming fasteners 52 as desired. In any event, the mounting bracket may be provided with clearance holes 72 larger than the major diameter of the fastener 54 for installing the self-drilling, thread-forming fastener 54. To secure the first mezzanine member 202, the self-drilling, thread-forming fastener 54 may be positioned through the clearance holes 72 in the bracket 206 and drilled and thread-formed into the web 180 of the interior column 196. As installed, the self-drilling, thread-forming fastener 54 is threaded into the web 180 to a desired seating torque, securing the mezzanine member 202 to the column without need for extraneous fasteners 204. Then, the clearance holes of the mounting bracket 206 of the second mezzanine member 202' are positioned over the ends of the installed self-drilling, thread-forming fastener 54 on the opposite side of the web 180, and nuts 86 may be tightened onto the self-drilling, thread-forming fastener 54 to clamp the second mounting bracket 206 against the web 180. Alternatively, pilot holes are pressed in the web corresponding to the clearance holes 72 in the mounting brackets so the thread-forming fastener 52 may be positioned through the bracket 206 and the web 180 of the interior column 196. Thus, the mezzanine members 202 are secured using thread-forming fasteners 52. The self-drilling, thread-forming fastener 54 for the application of FIG. 49A may have between about ¼ and ½ inch major diameter as desired for certain load requirements. Alternatively, the thread-forming fasteners 52 for the application of FIG. 49A may be between about ¼ and 1½ inch, or larger, in major diameter for load requirements as desired.

Figure 50:
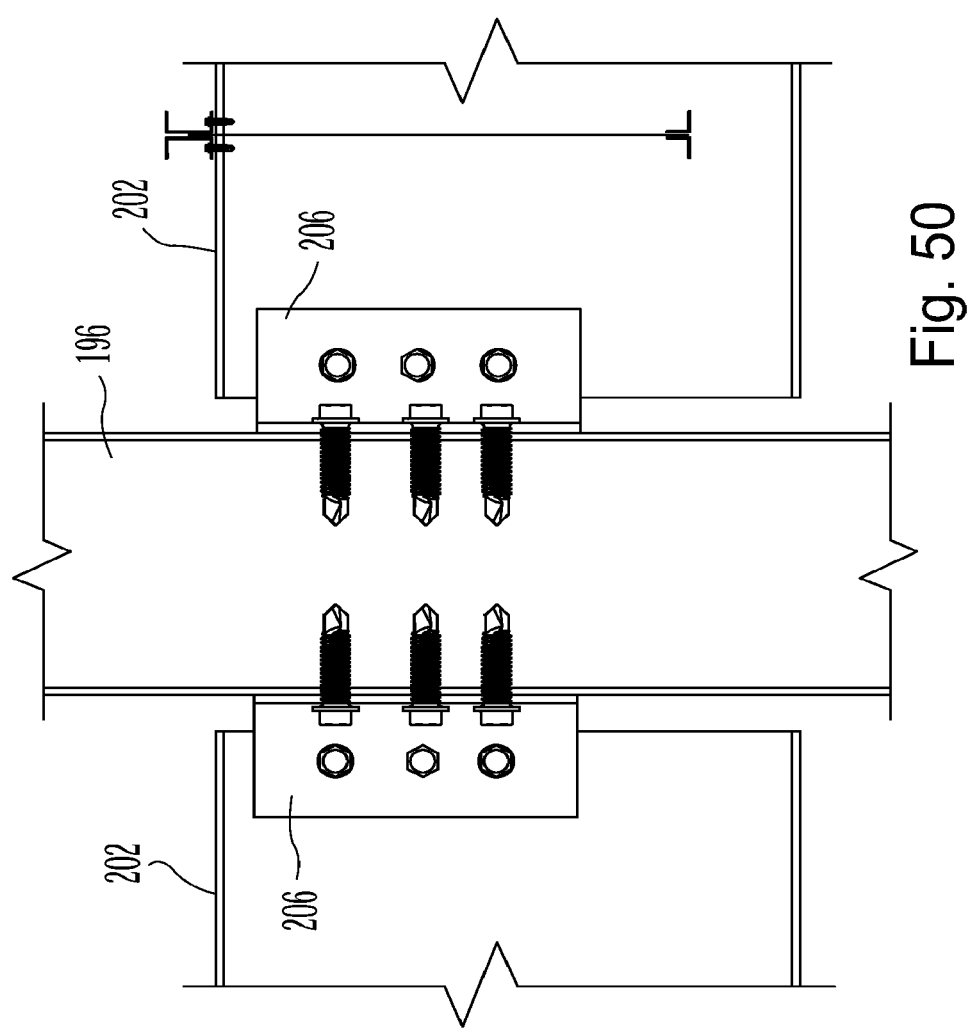
FIG. 50 is yet another alternative connection of connection of mezzanine beam members to a column.

Alternatively, mezzanine members 202 may be connected to the flanges of column 196 as shown in FIG. 50. In this application, the flanges of column 196 may be provided with pilot holes corresponding to clearance holes in the mounting bracket 206. The thread-forming fasteners 52 may be provided through the clearance holes in the mounting bracket 206 and installed into the pilot holes in the column flanges.

Figure 51:
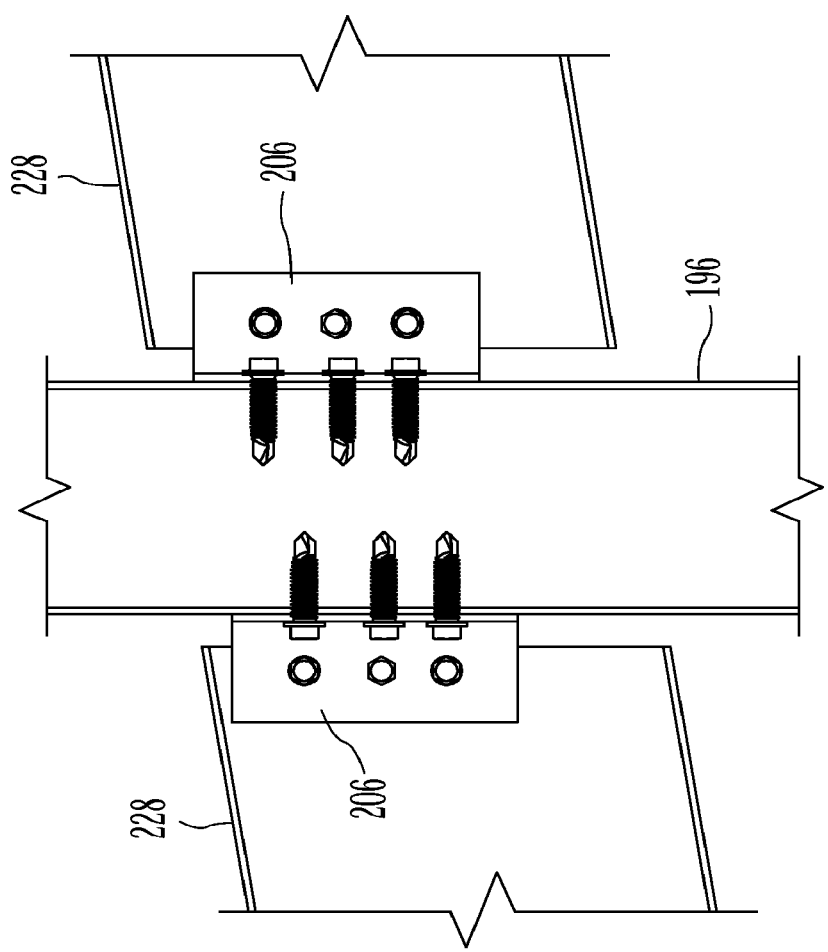
FIG. 51 is a side view of a connection of rafters to a column.

FIG. 51 shows rafters 228 connected to the flanges of column 196. At least one mounting bracket 206 is attached to each rafters 228. The rafters 228 may be provided to the construction site with the mounting brackets 206 welded in place. Alternatively, the mounting brackets 206 may be fastened to the rafters 228 using self-drilling, thread-forming fastener 54 or thread-forming fasteners 52 as desired. In either case, the mounting bracket 206 may be provided with clearance holes 72 larger than the major diameter of the fastener 54 for installing the thread-forming fasteners 52 to the column 196. In this application, the flanges of column 196 may be provided with pilot holes corresponding to the clearance holes in the mounting bracket 206. The thread-forming fasteners 52 may be installed through the clearance holes in the mounting bracket 206 and thread-formed into the pilot holes in the column flanges. Alternatively, the pilot holes may be omitted from the flanges of the column 196 and self-drilling, thread-forming fasteners used to connect the mounting brackets 206 and the rafters 228 to the column. The self-drilling, thread-forming fastener 54 for the application of FIG. 51 may be between about ¼ and ½ inch major diameter as desired for certain load requirements. Alternatively, the thread-forming fasteners 52 for the application of FIG. 51 may be between about ¼ and 1½ inch, or larger, major diameter fasteners for load requirements as desired.

Figure 52:
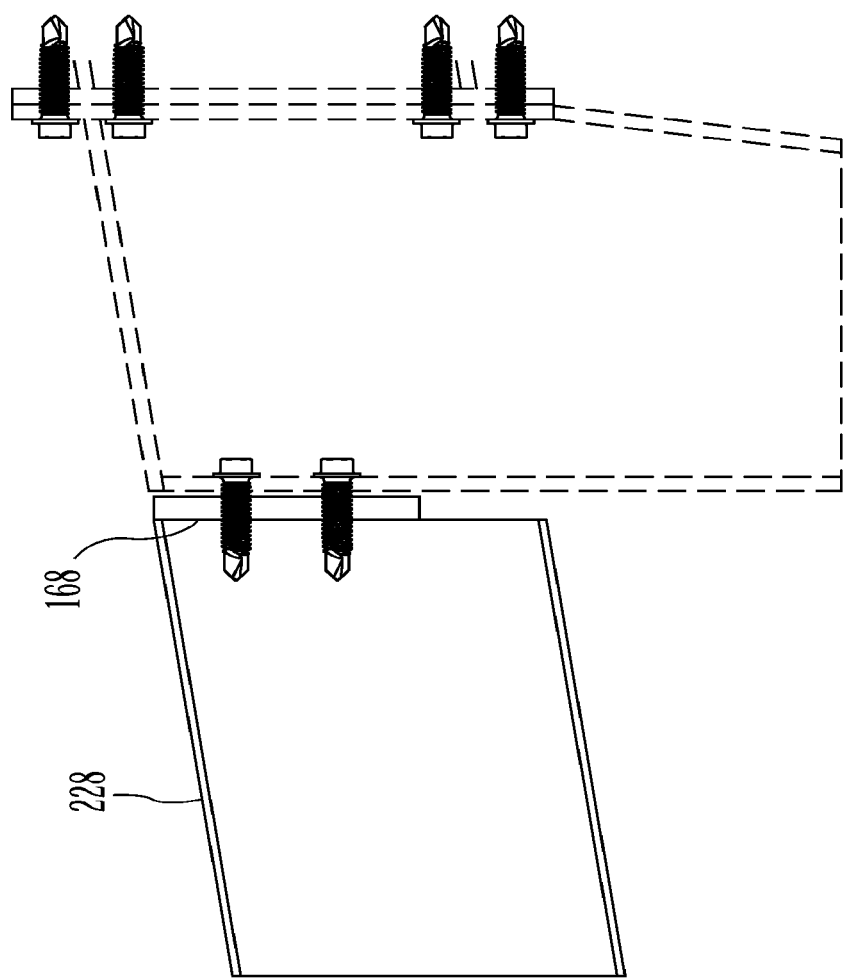
FIG. 52 is a side view of an alternate connection of a rafter to a column.

Alternatively the rafter 228 may be provided with the end plate 168 as shown in FIG. 52, and fasteners 52, 54 as desired installed through the end plate 168 as discussed above with reference to FIGS. 34 and 46.

Figure 53:
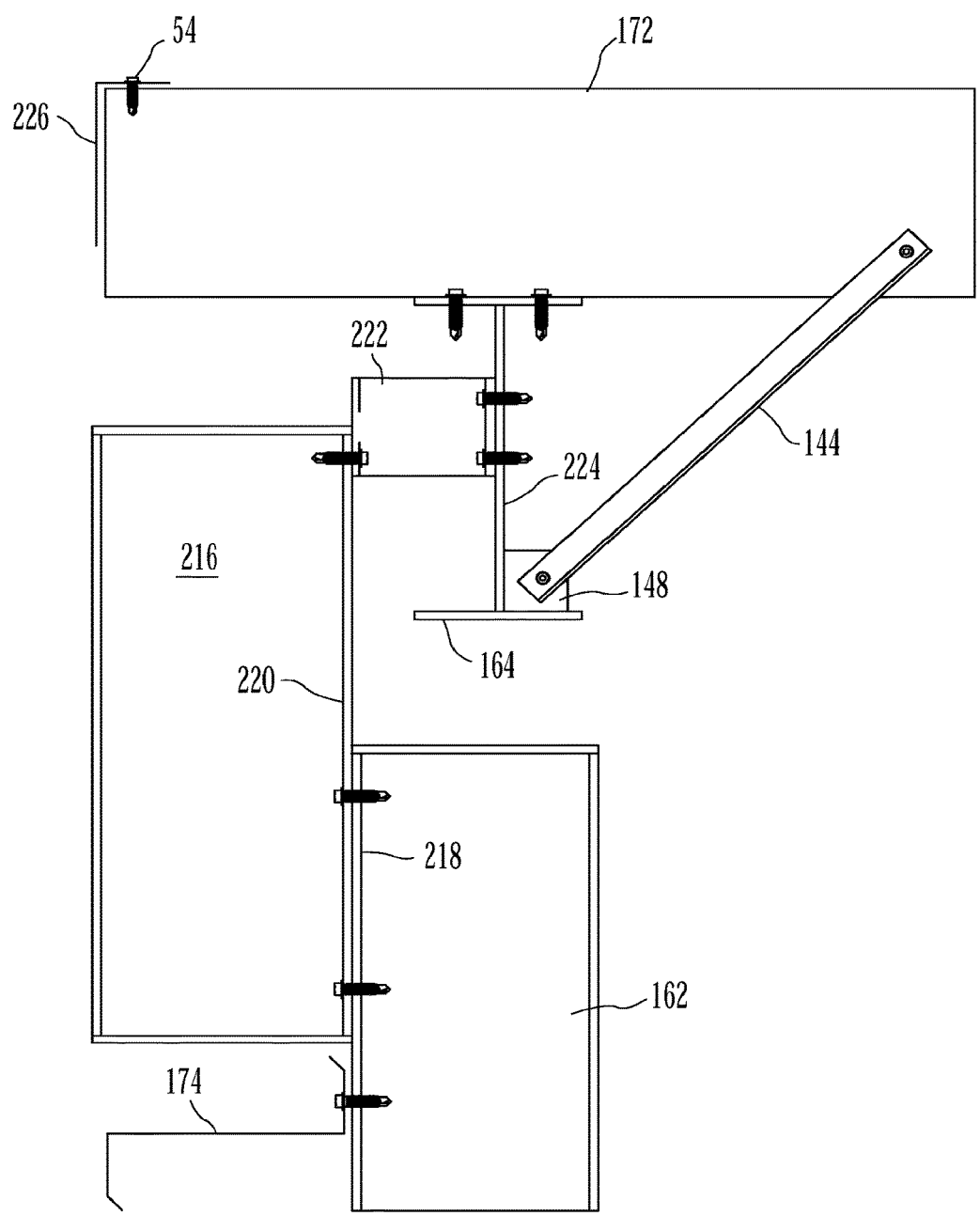
FIG. 53 is an endwall stub connection to a column and roof beam.

FIG. 53 shows an expandable endwall connection including the column member 162 having an outside flange 218 and an endwall stub 216 having an inside flange 220. The outside flange 218 of the column member 162 may be provided with pilot holes to install thread-forming fasteners 52. The inside flange 220 of the endwall stub 216 may be provided with clearance holes larger than the major diameter of the fastener 52 located corresponding to the pilot holes in the outside flange 218. The thread-forming fasteners 52 may be provided through the clearance holes and installed into the pilot holes in the outside flange 218. Optionally, nuts 86 may be provided on the ends of the thread-forming fasteners 52. Alternatively, the pilot holes may be provided in the inside flange 220 and clearance holes in the outside flange 218, and the thread-forming fasteners 52 threaded into the inside flange 220. In yet another alternative, the pilot holes may be omitted and self-drilling, thread-forming fasteners 54 used to connect the endwall stub 216 to the column member 162. A right-angle impact driver may be used to drive the thread-forming fasteners 52 for certain applications when clearance between the beam flanges is limited. The self-drilling, thread-forming fastener 54 for the application of FIG. 53 may be between about ¼ and ½ inch major diameter as desired for certain load requirements. Alternatively, the thread-forming fasteners 52 for the application of FIG. 53 may be between about ¼ and 1½ inch, or larger, major diameter for load requirements as desired.

The endwall stub 216 may be connected to an endwall bracket 222 attached to the web 224 of the rafter member 164. The endwall bracket 222 may be provided with pilot holes and the web 224 provided with clearance holes through which the self-drilling, thread-forming fastener 54 may be thread-formed into the endwall bracket 222. Then, the inside flange 220 may be connected to the endwall bracket 222 using thread-forming fasteners 52 or self-drilling, thread-forming fastener 54 as desired. In certain applications, the connection between the endwall bracket 222 and the inside flange 220 may be tightened to a low torque about equal to hand tightening, with a nut 86 tightened on the back of the bracket 222 to lock the fastener 52, 54 in place. Alternatively, the nut 86 may be omitted and a burr formed on the fastener 52, 54 on the back side of the bracket 222 to lock the fastener 52, 54 in place. As shown in FIG. 53, the rafter member 164 may be braced by one or more wide flange girder braces 144 between bracket 148 and a purlin 172 using self-drilling, thread-forming fastener 54. Self-drilling, thread-forming fastener 54 may be used to install a rake angle 226 along the end of the purlins 172.

Figure 54:
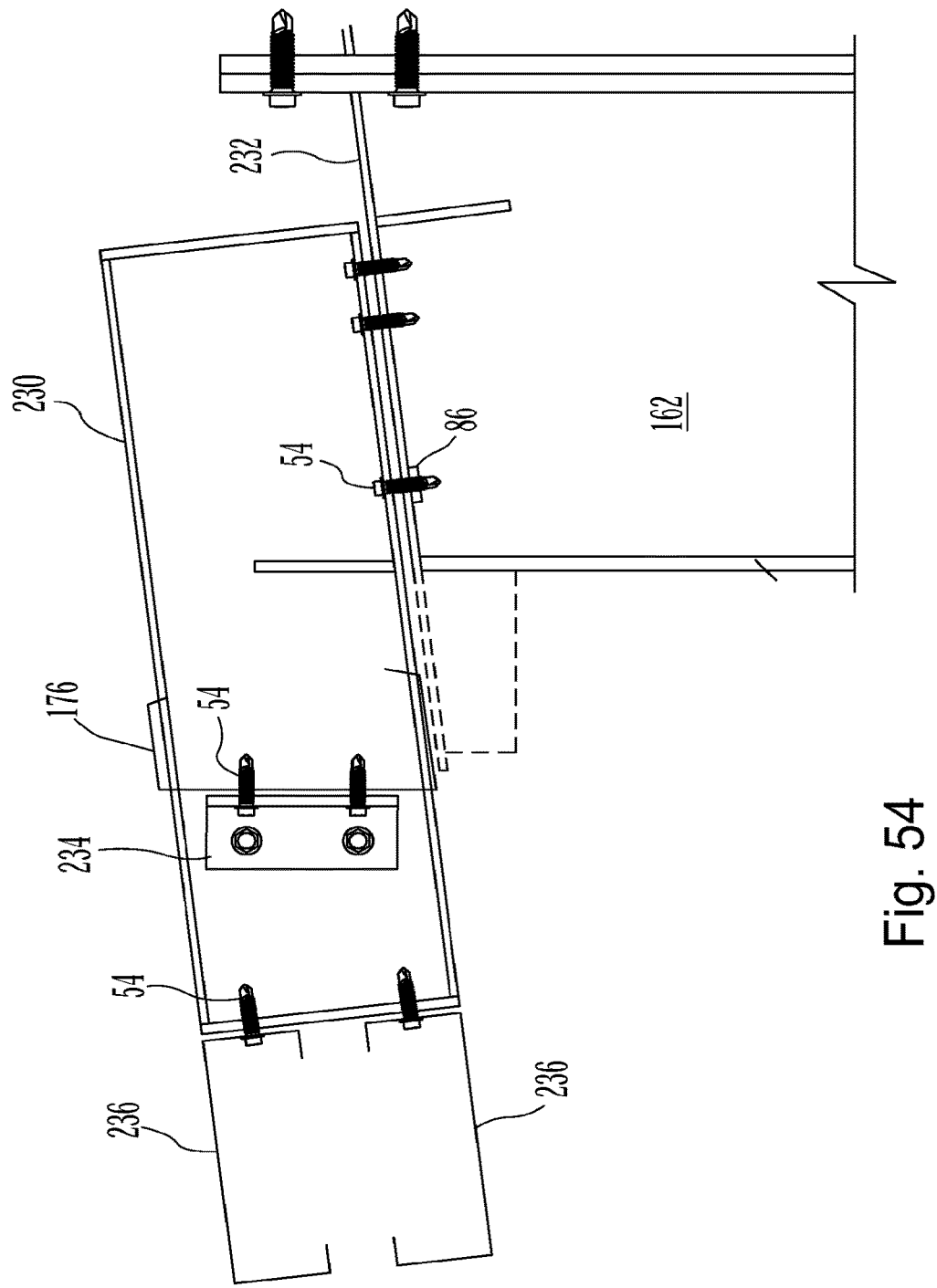
FIG. 54 is a end view of an eave extension.

In certain building applications, an eave extension beam 230 may be connected to the column member 162. As shown in FIG. 54, the column member 162 may include an upper flange 232, which may include pilot holes for connecting the eave extension beam 230. The eave extension beam 230 may include clearance holes larger than the major diameter of the fastener 52 located corresponding to the pilot holes in the upper flange 232. The thread-forming fasteners 52 may be positioned through the clearance holes and thread-formed into the pilot holes in the upper flange 232 to secure the eave extension beam 230 to the column member 162. Alternatively, for certain load requirements, the pilot holes may be omitted and self-drilling, thread-forming fastener 54 provided to connect the eave extension beam 230 to the column member 162. In any event, nuts 86 may be tightened onto the fasteners 52, 54 (not shown) to further secure the eave extension beam 230 as desired.

An eave strut clip 234 may be attached to the eave extension beam 230 using self-drilling, thread-forming fastener 54 as shown in FIG. 54. The eave strut clip 234 may be an L-bracket having clearance holes on the first leg of the L-bracket through which the self-drilling, thread-forming fastener 54 may be installed into the eave extension beam 230. The eave strut 176 may be fastened to the eave strut clip 234 through the second leg of the L-bracket using self-drilling, thread-forming fastener 54. The eave strut clip 234 may have no pre-drilled holes on the second leg of the L-bracket, and the self-drilling, thread-forming fastener 54 may drill and thread-formed through both the eave strut 176 and the eave strut clip 234.

Also shown in FIG. 54, box beam members 236 may be provided adjacent the eave. The box beam members 236 may be fastened to the eave extension beam 230 using self-drilling, thread-forming fastener 54 as installation space permits. In certain applications, bolt-and-nut connections may be used when insufficient clearance for a right-angle impact driver.

Figure 55A:
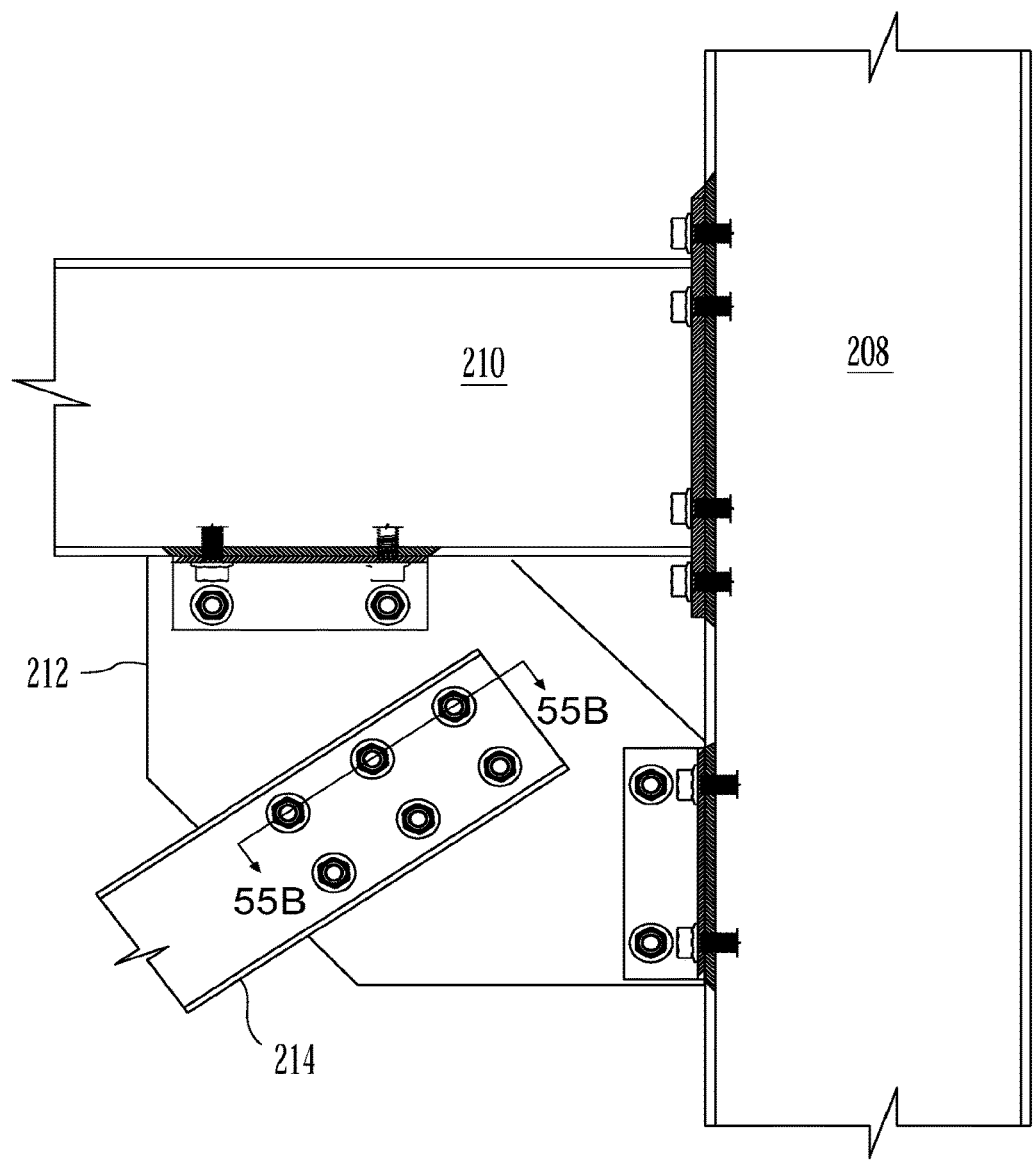

FIG. 55A shows a double connection of diagonal bracing requiring OSHA securement. The diagonal braces 214 of FIG. 55A may be connected to a gusset 212. The gusset 212 may be secured between a column 208 and a beam member 210. As shown in FIG. 55B, a diagonal brace 214 may be provided on each side of the gusset 212. In the past, to secure a diagonal brace on each side of the gusset, OSHA securement requirements required that the first diagonal brace 214' be secured before attaching the second diagonal brace 214. As shown in FIG. 55C, this required additional clearance holes through the first diagonal brace 214' to make a bolt-and-nut connection to the gusset 212 without interfering with the connection of the second diagonal brace 214. We have found that the OSHA requirements can be achieved using self-drilling, thread-forming fastener 54 as shown in FIG. 55B using the same diagonal brace 214 on both sides of the gusset as desired.

As shown in FIGS. 55A and 55B, each diagonal brace 214 may be provided with clearance holes 72 larger than the major diameter of the fastener 54. The self-drilling, thread-forming fastener 54 may be provided through the clearance holes 72 in the diagonal brace 214 and installed into the gusset 212. Once installed, the self-drilling, thread-forming fastener 54 is thread-formed into the gusset 212 and tightened to a desired seating torque, securing the first diagonal brace 214 to the gusset without need for extraneous fasteners 204. Then, the clearance holes of the second diagonal brace 214 are positioned over the ends of the installed self-drilling, thread-forming fastener 54 on the opposite side of the gusset 212, and nuts 86 tightened onto the self-drilling, thread-forming fastener 54 to clamp the second diagonal brace 214 against the gusset 212. Alternatively, pilot holes positioned corresponding to the clearance holes 72 in the diagonal braces 214 may be provided through the gusset 212. Then, the diagonal braces 214 may be secured to the gusset 212 using thread-forming fasteners 52. The thread-forming fasteners 52 for the application of FIG. 55A may be fasteners 52 of 1 inch major diameter. Alternatively, the thread-forming fasteners 52 for the application of FIG. 55A may be between about ¼ and 1½ inch, or larger, major diameter for load requirements as desired. In applications where the self-drilling, thread-forming fastener 54 may be used, the self-drilling, thread-forming fastener 54 for the application of FIG. 55A may be between about ¼ and ½ inch major diameter as desired for certain load requirements. The diagonal bracing 214 may have any desired cross sectional shape, such as U-channel as shown in FIG. 55A, L-channel as shown in FIG. 56, or other sectional shapes as desired.

FIG. 56 shows an alternative bracing configuration having diagonal bracing 214 and a pipe strut 238 installed between two columns 196. A strut bracket 240 is provided on the web 180 of each column 196 as shown in FIGS. 56 and 57. The pipe strut 238 typically is provided to the construction site with a mounting plate 242 welded in place on each end of the pipe strut 238. Alternatively, the mounting plates 242 may be fastened to the strut 238 using thread-forming fasteners 52 as desired. The strut bracket 240 is provided with pilot holes adapted for installing thread-forming fasteners 52, and the strut mounting plates 242 provided with clearance holes larger than the major diameter of the fasteners 52 and positioned to correspond with the pilot holes in the strut bracket 240. Thread-forming fasteners 52 may be provided through the clearance holes and thread-formed into the pilot holes in the strut bracket. The thread-forming fasteners 52 may have a major diameter 58 of 1 inch. Alternatively, the thread-forming fasteners 52 may have a major diameter 58 between about ¼ inch and 1½ inch as desired for load requirements. Alternatively, the pilot holes may be omitted from the strut brackets 240 and self-drilling, thread-forming fastener 54 used to connect the mounting plates 242 to the strut brackets 240 as desired for particular load requirements.

As shown in FIG. 56, diagonal bracing may form an X between the columns 196. At least one diagonal brace 214 may extend from the gusset 212 in an upper corner to the gusset 212 in an opposite lower corner. The opposing diagonal brace 214 may include a splice plate 244 where the diagonal braces cross. As shown in FIG. 56, a piece of the diagonal brace 214 may extend from the gusset 212 in an upper corner to the splice plate 244 in the center of the X-bracing, and a second diagonal brace 214 may extend from the spice plate 244 to the gusset 212 in the opposite lower corner. The splice plate 244 may be provided with pilot holes, and the ends of the diagonal brace 214 provided with clearance holes larger than the major diameter of the fasteners 52. The thread-forming fastener 52 may be positioned through the clearance hole and thread-formed into the pilot holes in the splice plate 244. Alternatively, the pilot holes in the splice plate 244 may be omitted and self-drilling, thread-forming fastener 54 may be used to install the diagonal brace 214 to the splice plate 244. A diagonal brace 214 may be installed on each side of the gusset 212 in a double connection as discussed above with reference to FIG. 55A. Alternatively, the diagonal brace may be installed on one side of the gusset 212 using thread-forming fasteners 52 or self-drilling, thread-forming fastener 54 as desired.

Figure 58:
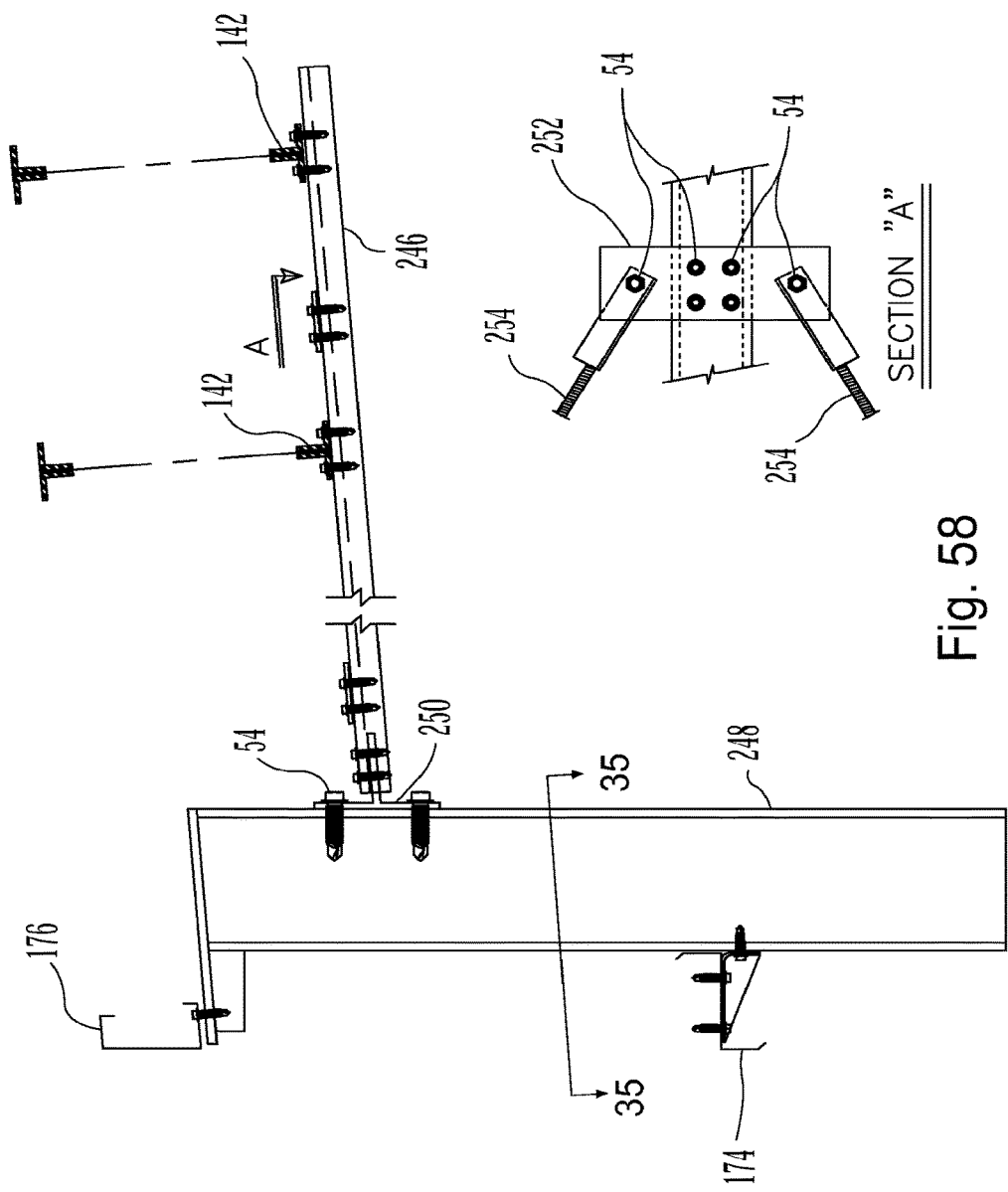
FIG. 58 is a partial side view of a wind column and brace strut connection.

Typically, metal building structures include bracing for wind loads. As shown in FIG. 58, a C-channel brace strut 246 may be connected to a brace strut bracket 250 connected to a wind column 248, the C-channel brace strut 246 extending adjacent the bottom chord of a plurality of joists 40. The C-channel brace strut 246 may be provided with clearance holes through which self-drilling, thread-forming fastener 54 may fasten the C-channel brace strut 246 to the brace strut bracket 250. The brace strut bracket 250 may be fastened to the wind column 248 using self-drilling, thread-forming fastener 54. Alternatively, the wind column 248 may be drilled with pilot holes, and the brace strut bracket 250 may have clearance holes corresponding with the pilot holes through which thread-forming fasteners 52 may be installed to fasten the brace strut bracket 250 to the wind column. The bottom chords 142 may be connected to the C-channel brace strut 246 with self-drilling, thread-forming fastener 54.

Figure 59A:
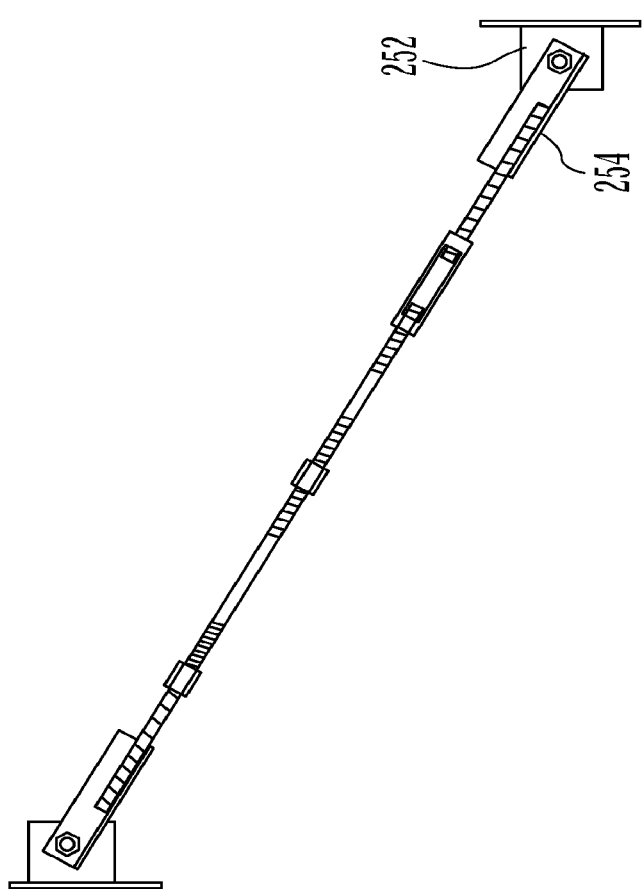

Brace clips 252 may be fastened to the C-channel brace strut 246 using self-drilling, thread-forming fastener 54 as shown in FIGS. 58 and 59. Braces 254 such as shown in FIGS. 59A and 59B are connected to the brace clips 252 and secured to columns or rafters as known in the art for bracing wind loads (not shown).

FIGS. 60A and 60B are views showing a purlin transition connection. In some applications, a second portion of a roof structure may be added adjacent the ends of purlins 172 of a first portion of roof structure. As shown in FIG. 60A, purlins 172 are installed above a rafter member 164. A transition purlin 256 may be attached traverse to the ends of the purlins 172 of the first portion of roof structure adapted to secure purlins 172' of the second portion of roof structure. L-brackets 258 may be used to connect the transition purlin 256 to the ends of the purlins 172 as shown in FIGS. 60A and 60B. The L-bracket 258 may be attached to the purlins using self-drilling, thread-forming fasteners 54. Clearance holes may or may not be provided in the clearance bracket for installing the self-drilling, thread-forming fasteners 54 into the purlin 172. The self-drilling, thread-forming fasteners 54 may be installed through the transition purlin 256 into the L-bracket 258 to secure the transition purlin 256 to the L-bracket and purlins 172. The L-brackets 258 may be provided to secure the purlins 172' of the second portion of roof structure to the transition purlin 256. Clearance holes may or may not be provided in the clearance bracket for installing the self-drilling, thread-forming fasteners 54 into the transition purlin 256. The self-drilling, thread-forming fasteners 54 may be installed through the purlin 172' into the L-bracket 258 to secure the purlin 172' to the L-bracket and the transition purlin 256.

Figure 61:
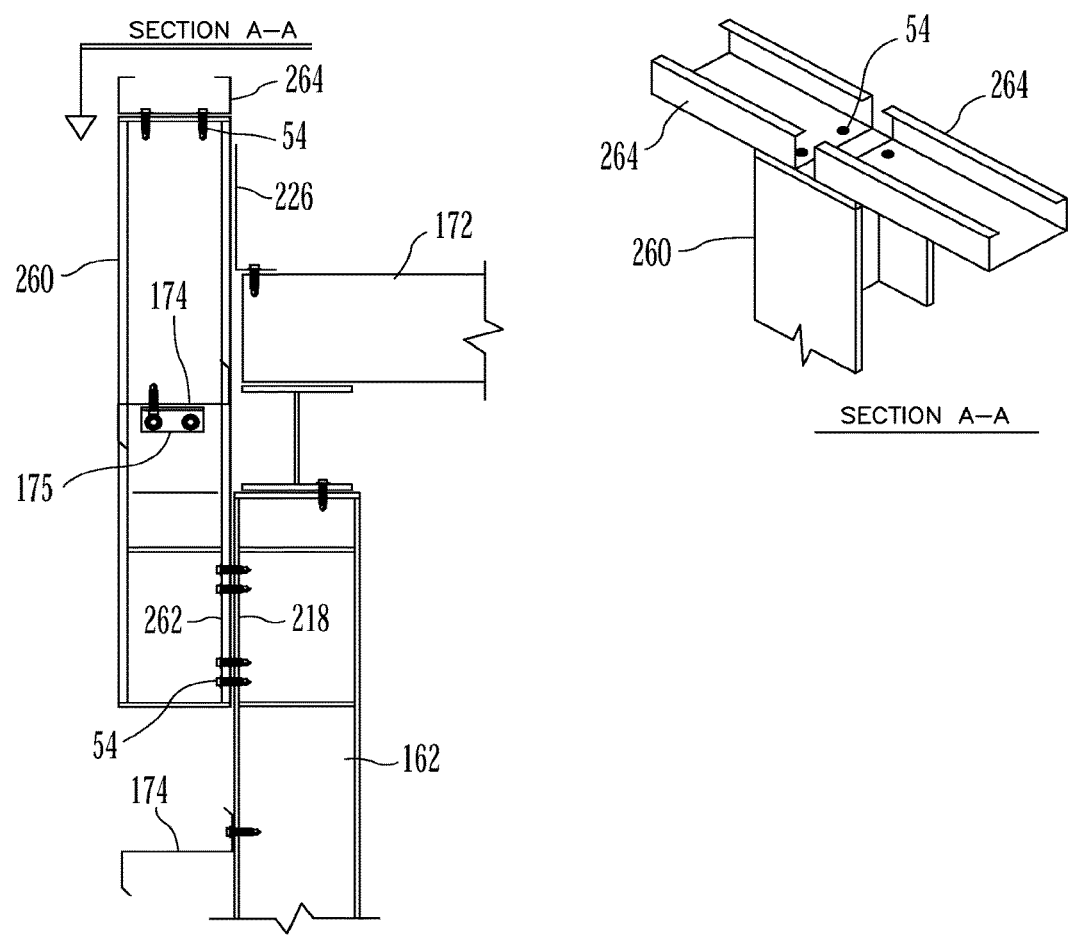
FIG. 61 is a side view of a parapet connection.

The self-drilling, thread-forming fasteners 54 or thread-forming fasteners 52 may be used for installing a parapet as shown in FIG. 61. A parapet stub 260 may have an inside flange 262 and the column member 162 with outside flange 218. The inside flange 262 of the parapet stub 260 may be provided with clearance holes larger than the major diameter of the fastener 54 positioned for installing self-drilling, thread-forming fasteners 54 into the outside flange 218. Alternatively, the outside flange 218 of the column member 162 may be provided with pilot holes to install thread-forming fasteners 52 into the pilot holes in the outside flange 218. Optionally, nuts 86 may be provided on the ends of the thread-forming fasteners 52 or self-drilling, thread-forming fasteners 54. Alternatively, clearance holes may be provided in the outside flange 218 and the fasteners 52 or 54 thread-formed into the inside flange 262. A right-angle impact driver may be used to drive the fasteners 52, 54 for certain applications when clearance between the beam flanges is limited. The self-drilling, thread-forming fastener 54 for the application of FIG. 61 may be between about ¼ and ½ inch major diameter as desired for certain load requirements. Alternatively, the thread-forming fasteners 52 for the application of FIG. 61 may be between about ¼ and 1½ inch, or larger, major diameter for load requirements as desired.

A C-girt 264 may extend between two or more parapet stubs 260, the C-girt 264 installed into an upper portion of the parapet stub 260 using self-drilling, thread-forming fasteners 54. Additionally, girts 174 may be secured to the parapet stub 260 and the column member 162 as discussed above. Self-drilling, thread-forming fastener 54 may be used to install a rake angle 226 along the end of the purlins 172.

Figure 62:
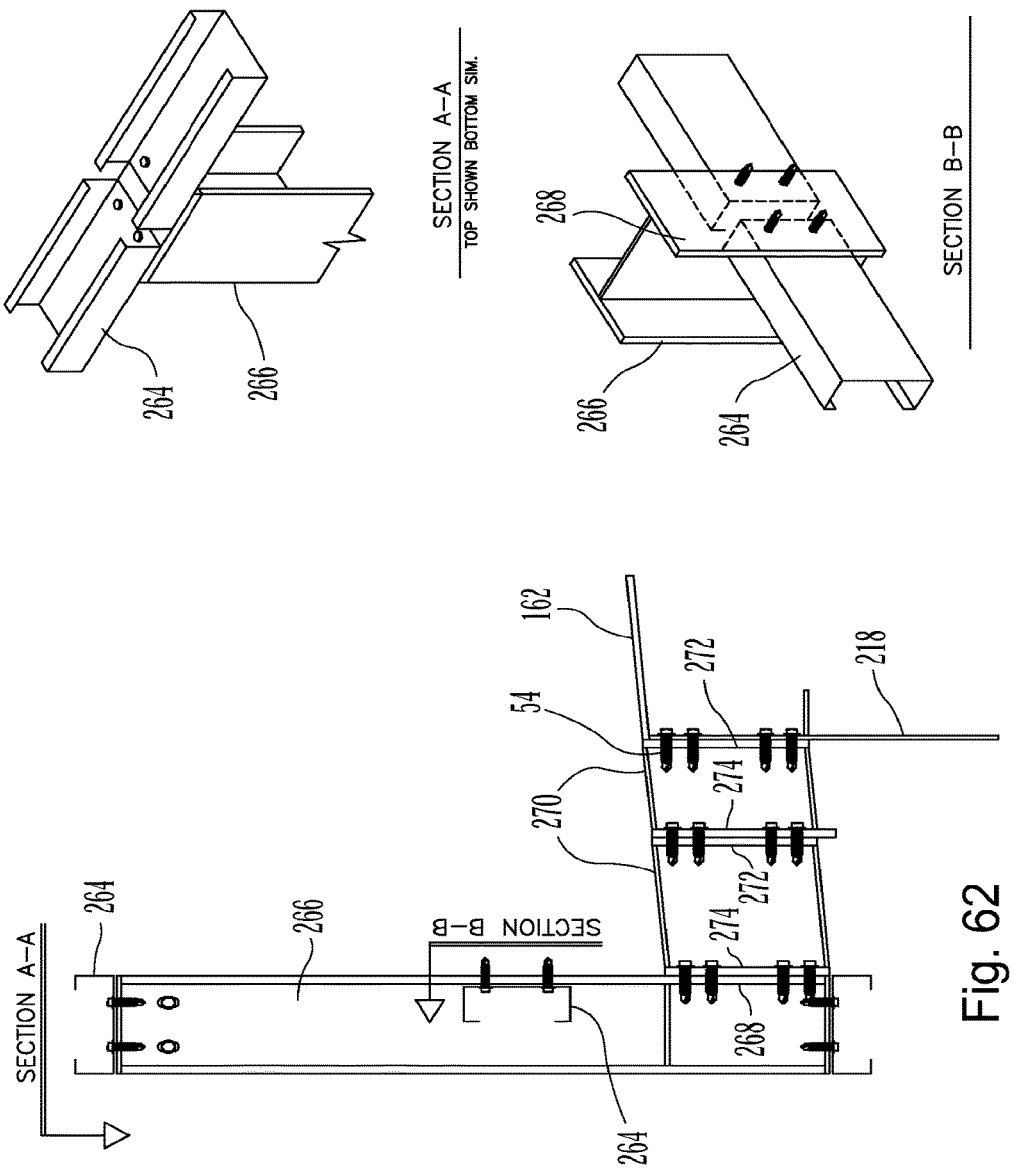
FIG. 62 is a side view of a fascia connection.

A fascia may include a plurality of fascia vertical members 266 such as shown in FIG. 62. The self-drilling, thread-forming fasteners 54 or thread-forming fasteners 52 may be used for installing the fascia. One or more spacer members 270 may be provided to install the fascia a desired distance from the column member 162. Each spacer may include a first end plate 272, and a second end plate 274 having clearance holes. As shown in FIG. 62, self-drilling, thread-forming fasteners 54 may be installed through clearance holes in the outside flange 218 of the column member 162 and thread-formed into the first end plate 272. The fascia vertical members 266 may have an inside flange 268, and self-drilling, thread-forming fasteners 54 may be installed through clearance holes in the second end plate 274 into the inside flange 268.

Alternatively, pilot holes may be provided in the first end plate 272 and the inside flange 268 corresponding with the clearance holes, and the thread-forming fastener 52 may be installed through the clearance holes and thread-formed into the pilot holes. Alternatively, the fasteners 52, 54 may be thread-formed into the second end plate 274 and the outside flange 218 by providing clearance holes in the inside flange 268 and first end plate 272 accordingly. Optionally, nuts 86 may be provided on the ends of the thread-forming fasteners 52 or self-drilling, thread-forming fasteners 54. A right-angle impact driver may be used to drive the fasteners 52, 54 for certain applications when clearance between the beam flanges is limited. The self-drilling, thread-forming fastener 54 for the application of FIG. 62 may be between about ¼ and ½ inch major diameter as desired for certain load requirements. Alternatively, the thread-forming fasteners 52 for the application of FIG. 62 may be between about ¼ and 1½ inch, or larger, major diameter for load requirements as desired.

The C-girt 264 may extend between two or more fascia vertical members 266 installed into an upper portion of the fascia vertical members 266 using self-drilling, thread-forming fasteners 54. Additionally, C girts 264 may extend between two or more fascia vertical members 266 secured to the inside flanges 268 of the fascia vertical members 266.

In certain building structures it may be useful to support an overhead crane or other overhead system. A crane beam member 276 having a bottom flange 278 may be supported by a column member 280 having a top plate 282 as shown in FIG. 63A. The bottom flange 278 of the crane beam member 276 may be provided with clearance holes larger than the diameter of the thread-forming fastener 52, and the top plate 282 provided with pilot holes, and the thread-forming fastener 52 installed through the clearance holes and thread-formed into the pilot holes in the top plate 282. A rail plate 286 may be installed above the crane beam member 176 and a crane rail 284 fastened to the cap channel 286 and crane beam member 176 using thread-forming fasteners 52 as shown in FIG. 63B. Rail clamps 288 may be positioned to clamp the crane rail 284 and cap channel 286 to the crane beam member 176. The rail clamps 288 and cap channel 286 may be provided with clearance holes larger than the diameter of the fasteners 52, and pilot holes may be provided in the top of the crane beam member 176. The thread-forming fasteners 52 may be installed through the clearance holes of the rail clamps 288 and cap channel 286 and thread-formed into the pilot holes in the top of the crane beam member 176 as shown in FIG. 63B. The thread-forming fasteners 52 for the application of FIG. 63A may be between about ¾ and 1½ inch, or larger, major diameter for load requirements as desired. At least a portion of the threaded portion 64 may comply with ASTM A325, A490, or other fastener standard as desired.

A concrete wall panel 380 may be attached to the rafter member 162 using a bracket 382 connected to an embed plate 384 in the concrete wall panel. The bracket 382 may be integral with the embed plate 384, such as by welding. Alternatively, the bracket 382 may be fastened to the embed plate 384. The bracket 382 may be installed to the rafter member 162 using thread-forming fasteners 52 or self-drilling, thread-forming fastener 54 as shown in FIG. 64. The bracket may be provided with clearance holes 72 and the self-drilling, thread-forming fastener 54 installed through the rafter member 164. Alternatively, pilot holes may be provided through the rafter member 164 and thread-forming fasteners 52 installed through the bracket into the pilot holes.

Figure 65:
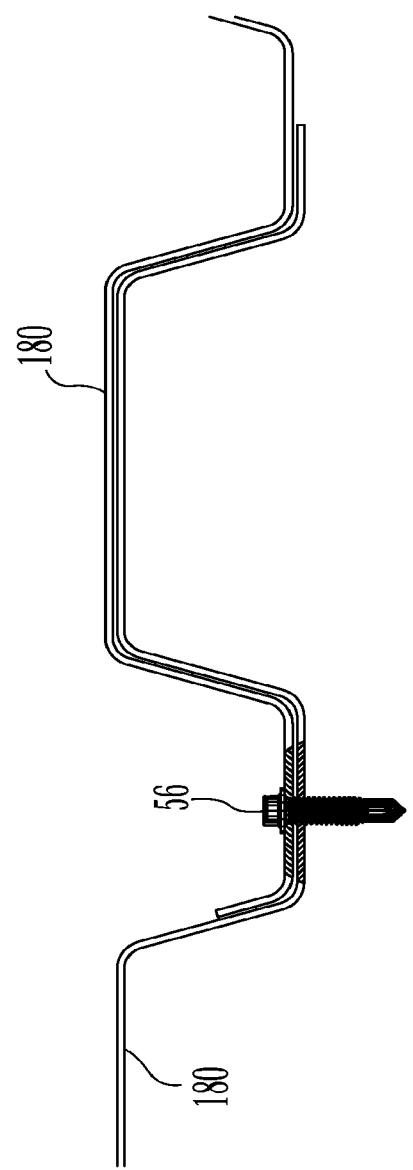
FIG. 65 is a partial cross-sectional view of a lapped connection of two corrugated metal panels.

Panels 180 such as shown in FIG. 65 are typically provided in various thicknesses, sizes, and cross-sectional shapes for use as side-wall sheeting, roof covering, decking, and other uses. Panels 180, and decking 42 as discussed with respect to FIG. 1, are formed of sheet metal having steel thicknesses typically between about 10 gage and 16 gage. Panels 180 and decking 42 may be installed in lapped connections using self-drilling, thread-forming fastener 56. Alternatively, panels 180 and decking 42 may be installed in lapped connections using self-drilling, thread-forming fastener 54. In one alternative, clearance holes larger than the major diameter 58 of the fastener 54, 56 may be provided along one or more edges of the panels 42, 180. To make the overlapped connection, the clearance holes of one panel are lapped over a second panel, and the self-drilling, thread-forming fastener 54, 56 are positioned through the clearance holes and drilled and thread-formed into the second panel.

Figure 66:
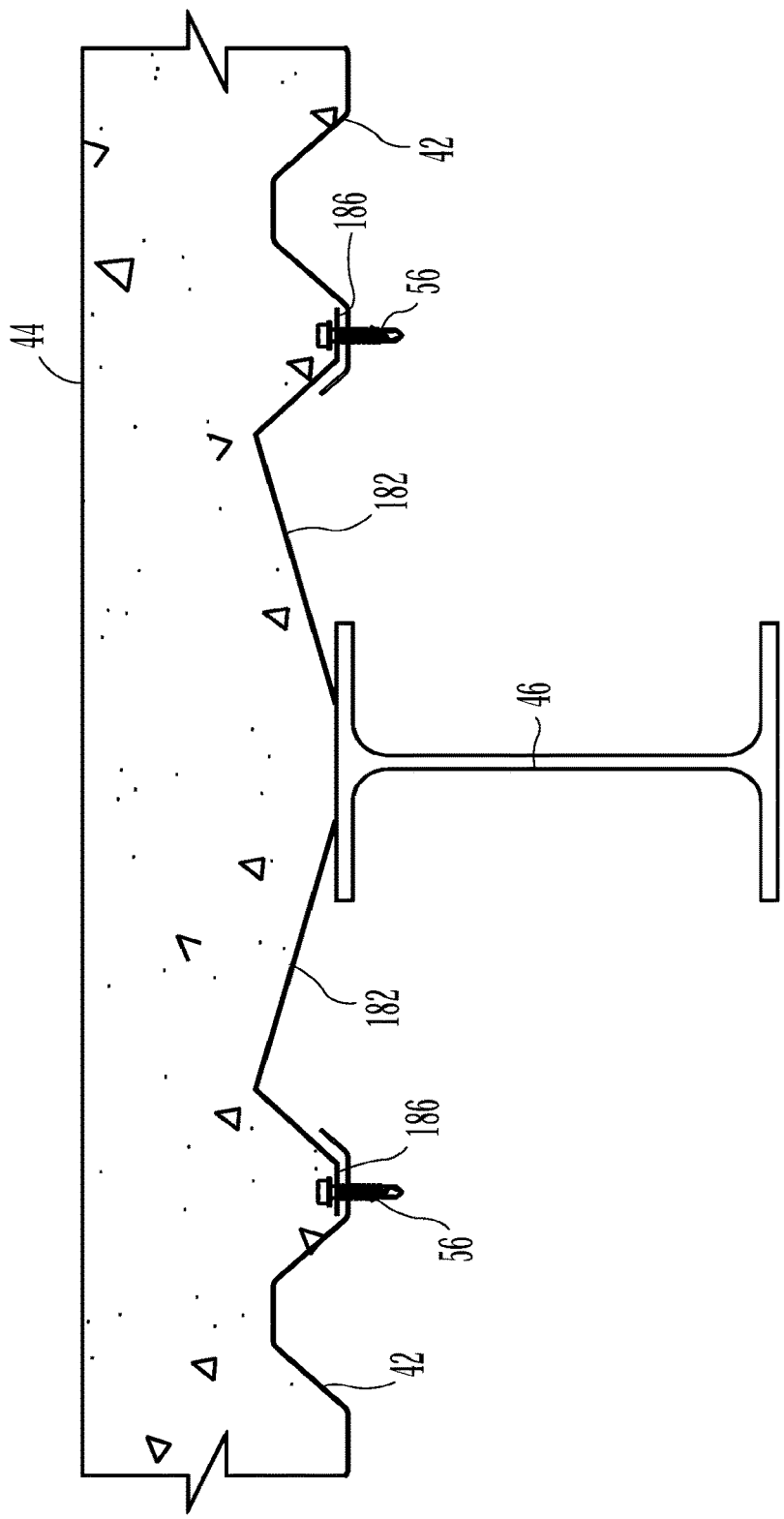
FIG. 66 is a partial cross-sectional view of a filler panel of the present disclosure.
Figure 67:
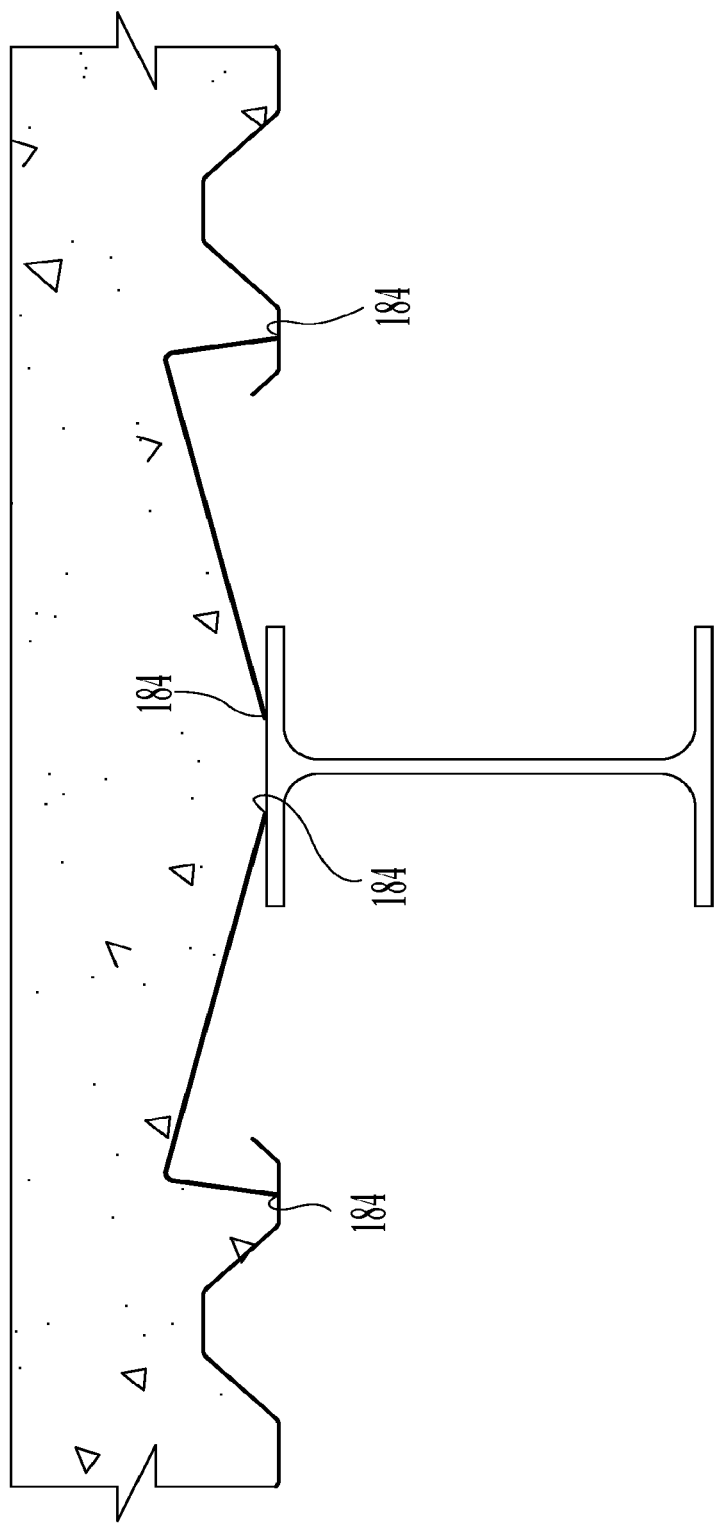
FIG. 67 is a partial cross-sectional view of a prior art filler panel.

Referring now to FIG. 66, a filler panel 182 is provided between an edge of the deck 42 and the girder 46. In the past, as shown in FIG. 67, filler panels had to be welded in place by weld connections 184. The weld connections 184 increased the complexity of the installation and required a trained welder to be at the job site and delays provided in the building schedule so welding can be done. The present filler panel 182 does not require welding and may be installed using self-drilling, thread-forming fastener 56 or self-drilling, thread-forming fastener 54. The filler panel 182 is provided with a flange 186 having a plurality of clearance holes larger than the major diameter 58 of the self-drilling, thread-forming fastener 54, 56. The fasteners 54, 56 are positioned through the clearance holes and drilled and thread-formed into the deck 42. The filler panel 182 may have an alternative shape as shown in FIG. 66. By providing flange 186 and fasteners 54, the filler panel 182 may be installed efficiently by an operator positioned on the deck 42. Alternatively, no clearance holes are provided and the self-drilling, thread-forming fastener 54, 56 installed through both members.

Figure 68:
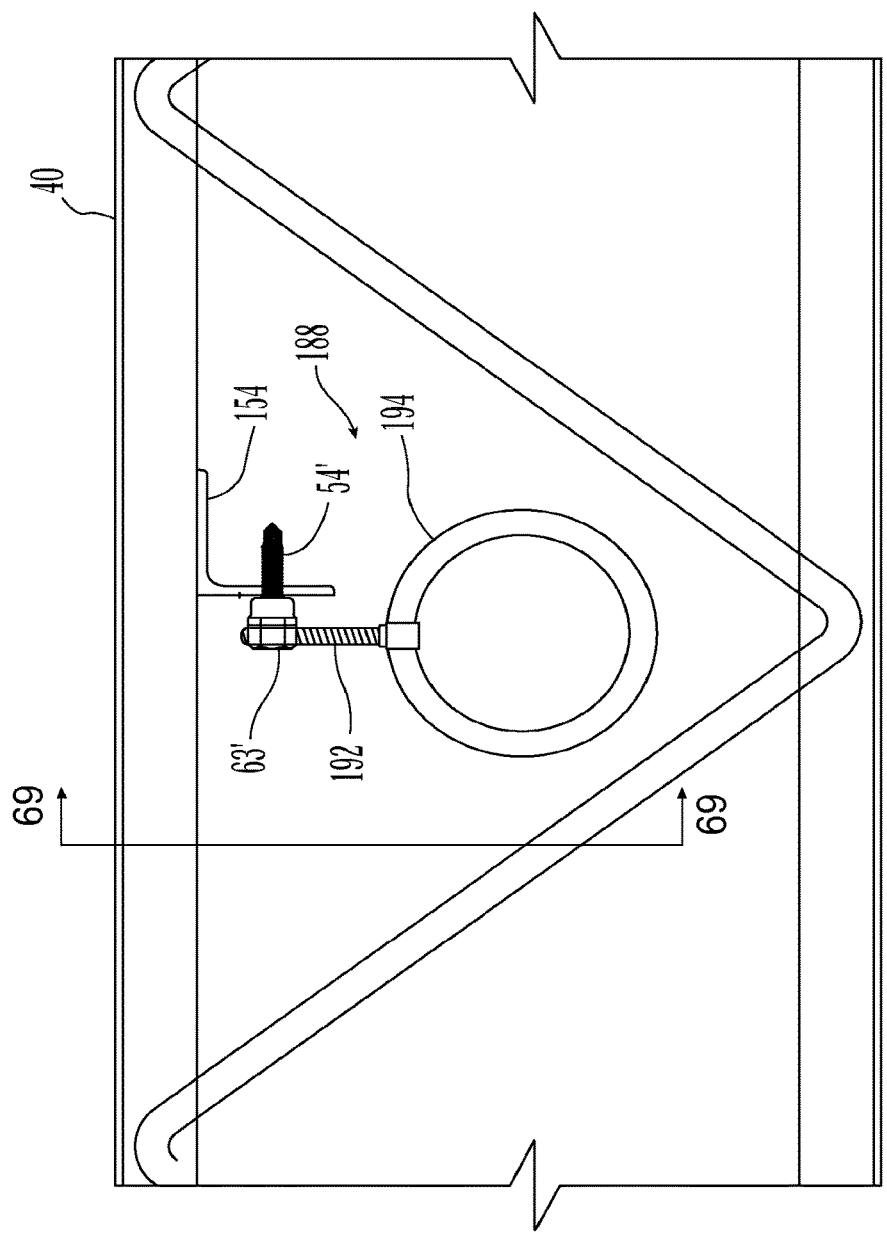
FIG. 68 is a side view of a joist with a utility hanger.
Figure 69:
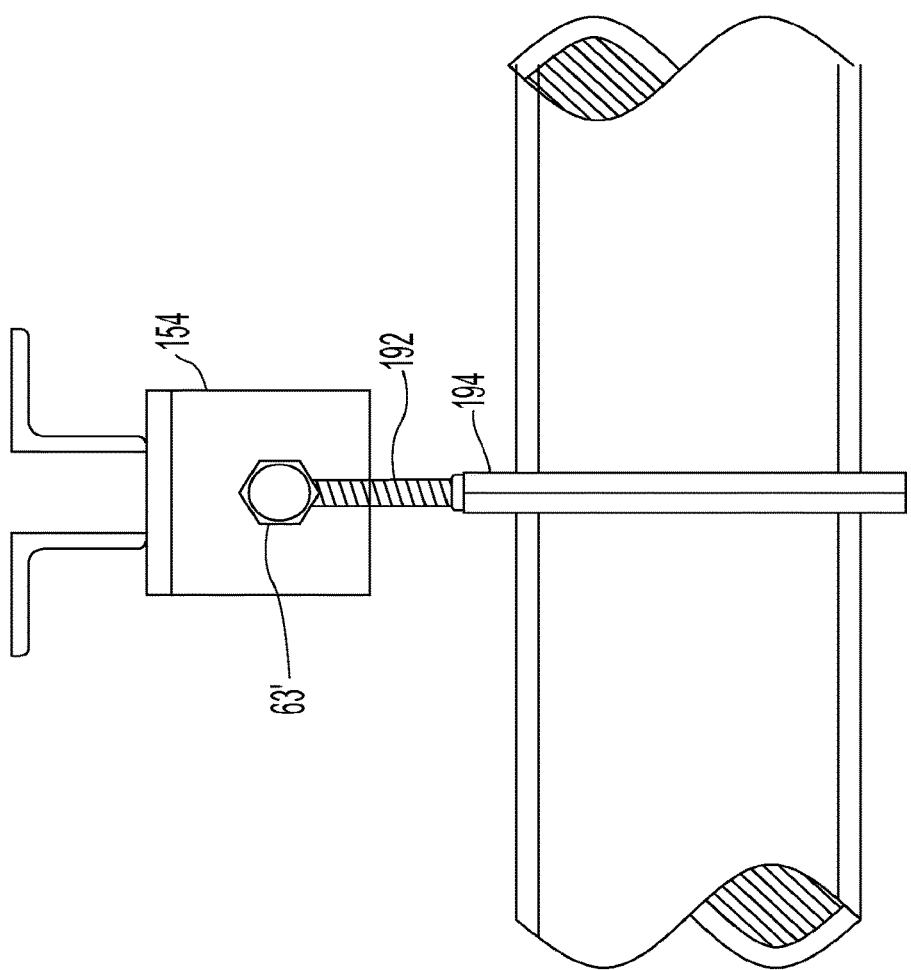
FIG. 69 is a partial cross-sectional view of the utility hanger of FIG. 60.
Figure 70:
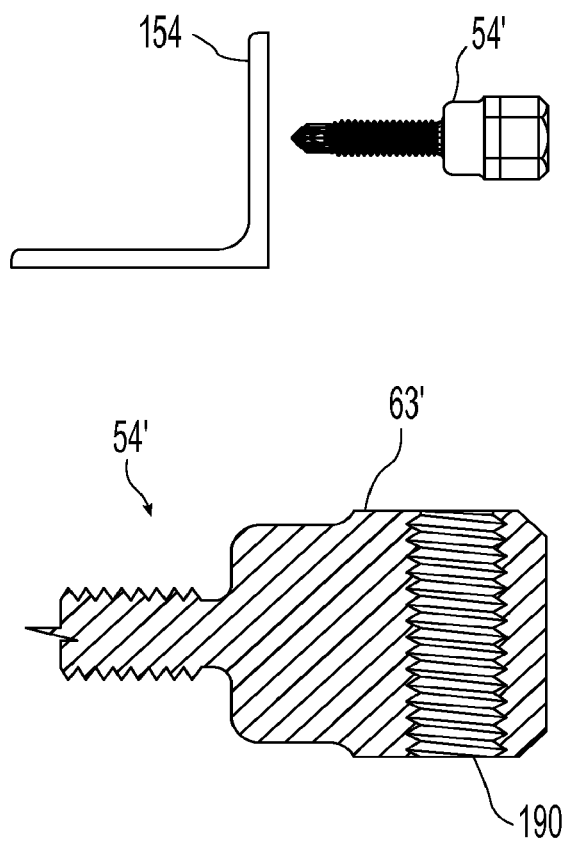
FIG. 70 is an exploded detail view of the utility hanger of FIG. 60.

The joist 40 may be provided with L-bracket 154 for mounting a utility hanger 188. As shown in FIGS. 68 through 70, the utility hanger 188 may include a modified self-drilling, thread-forming fastener 54' where the head 63' comprises a threaded bore 190 adapted to receiving a threaded rod 192. The threaded bore 190 may be cross-drilled, i.e. transverse to the direction of the threaded portion 64 as shown in FIG. 70. Optionally, the threaded bore may be end-drilled aligned with the direction of the threaded portion 64 (not shown). The threaded rod 192 corresponding to the threaded bore 190 may be turned into the threaded bore after the self-drilling, thread-forming fastener 54' is installed. Various hangers may be affixed to the threaded rod 192, such as a ring 194 as shown in FIG. 68. Alternatively, the threaded rod 192 may be affixed to a hook (not shown) or other hanger shapes as desired. To install the utility hanger 188, the self-drilling, thread-forming fastener 54 is drilled and thread-formed into the L-bracket 154 or other supporting member as desired and tightened such that the threaded bore in the head 63' is oriented generally in a vertical direction. Then, the threaded rod 192 is rotated into threaded engagement in the threaded bore 190.

In the past, utility hangers were installed using bolt-and-nut connections through pre-drilled holes. Past connections also included masonry screws driven into the concrete slab of the floor above. In any event, the presently disclosed utility hanger utilizing the self-drilling, thread-forming fastener 54 is able to be efficiently installed in many applications. In one alternative, the utility hanger 188 is installed in a bottom chord of a joist or girder (not shown) with self-drilling, thread-forming fastener 54.

Figure 71:
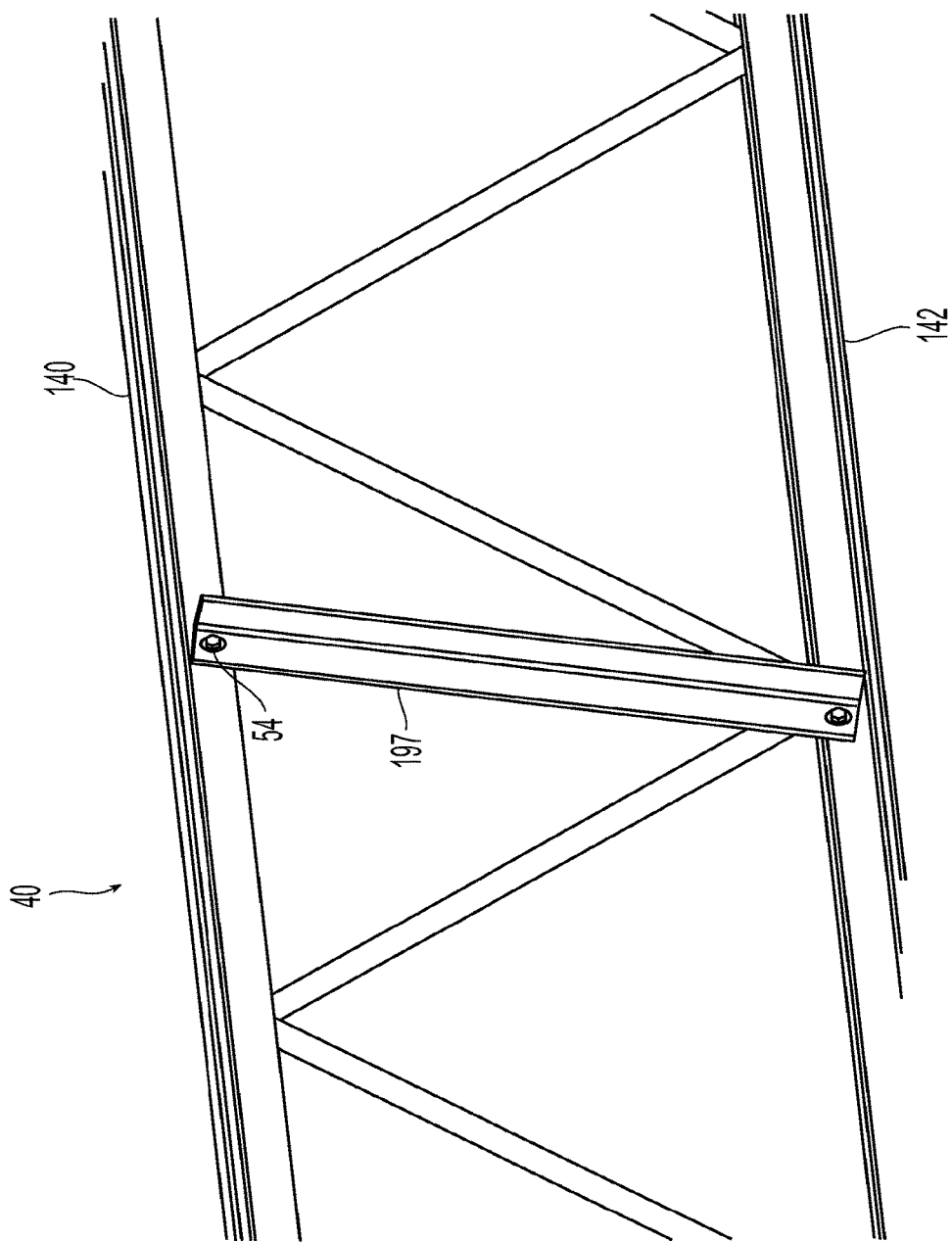
FIG. 71 is a partial perspective view of a joist with an off-panel support brace.

In certain joist loading requirements, additional joist bracing may be required. FIG. 71 shows a chord brace 197 positioned between the top chord 140 and the bottom chord 142 secured by self-drilling, thread-forming fastener 54. The chord brace 197 may be provided with a plurality of clearance holes larger than the major diameter 58 of the self-drilling, thread-forming fastener 54. The self-drilling, thread-forming fastener 54 may be provided through the clearance holes and drilled and thread-formed into the joist. By using the present self-drilling, thread-forming fastener 54, the chord brace 197 may be installed where needed along the joist without pre-drilling holes in the joist. The chord brace 197 is installed faster and more efficiently with the fasteners 54 than with prior connections.

Figure 72:
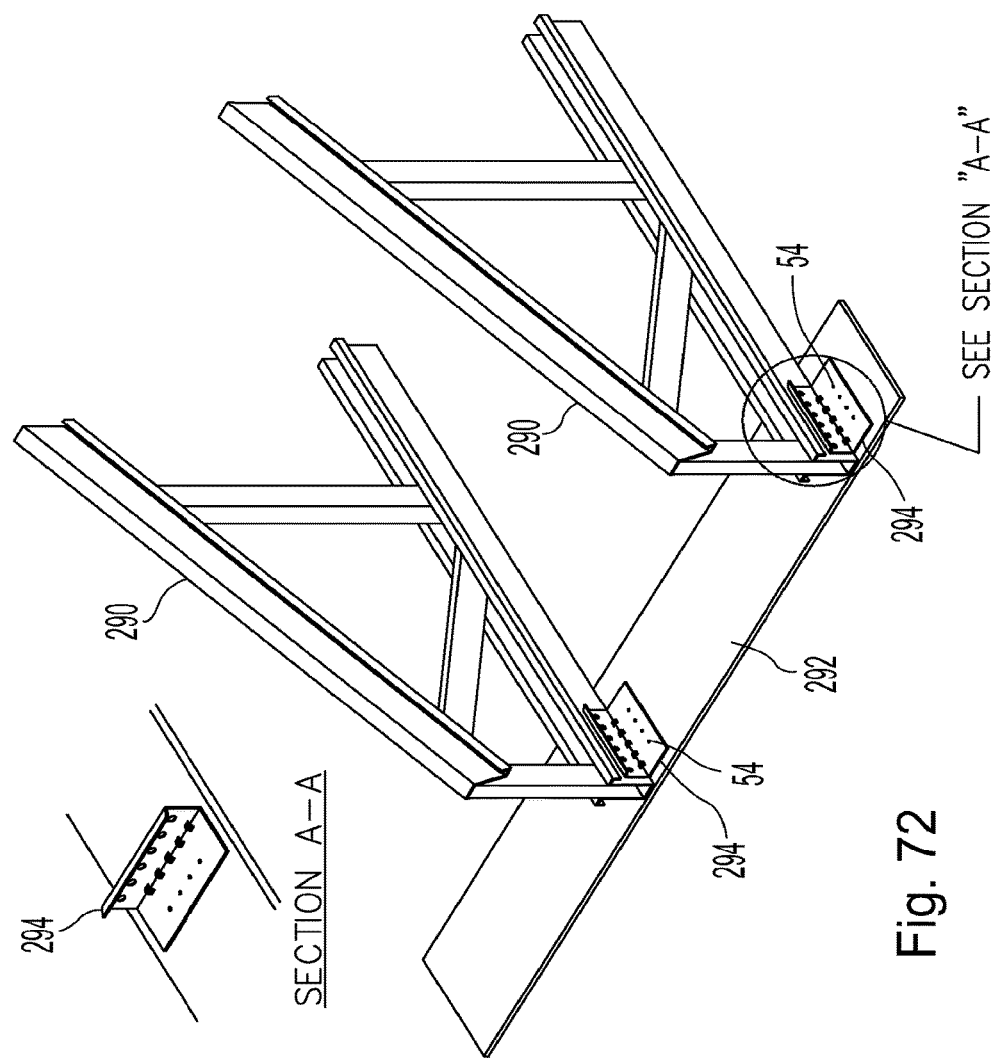
FIG. 72 is a partial perspective view of truss members secured to a support member.
Figure 73:
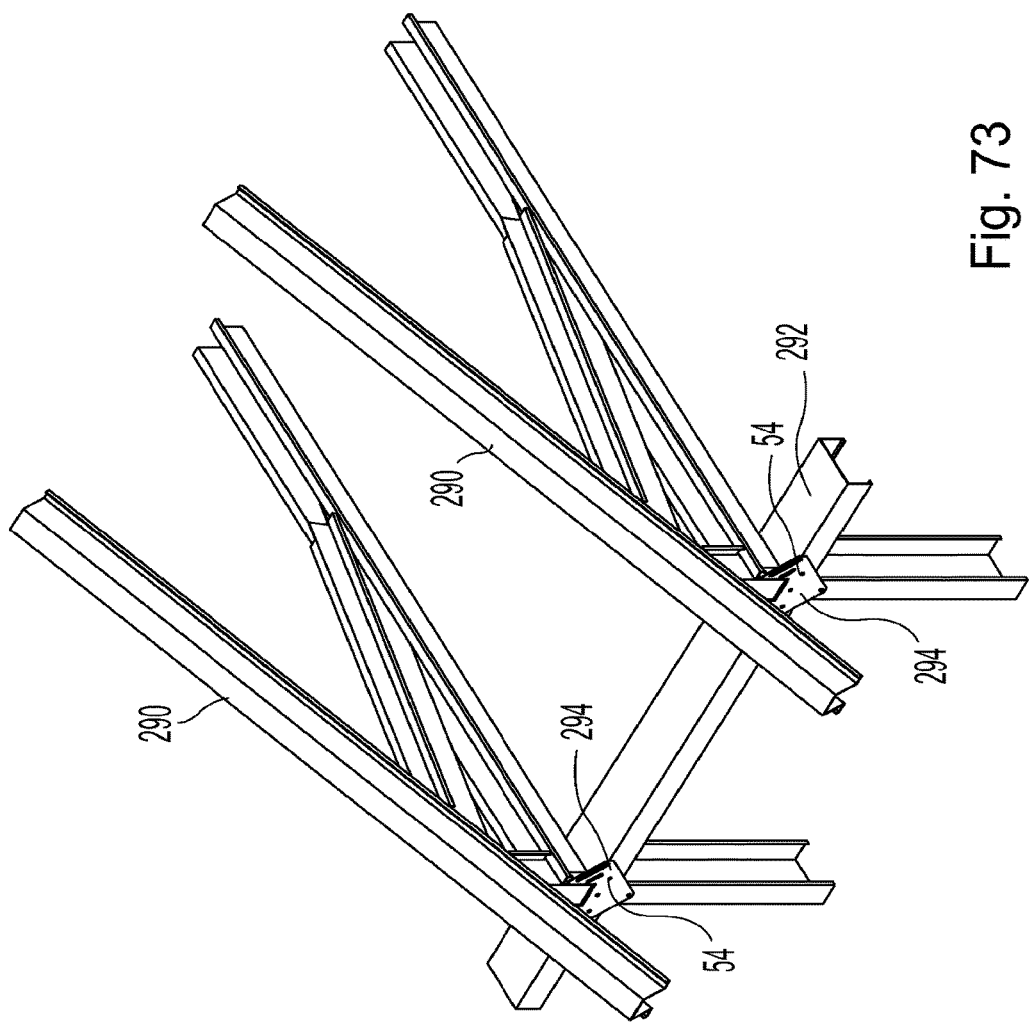
FIG. 73 is a partial perspective view of an alternative connection of truss members to a support member.

Referring now to FIGS. 72 and 73, a plurality of truss members 290 may be secured to a support member 292 using brackets 294 and self-drilling, thread-forming fasteners 54 and/or self-drilling, thread-forming fasteners 56. The self-drilling, thread-forming fasteners 54, 56 may be installed through the bracket 294 into a side of the truss member 290 and through the bracket 294 into the support member 292. As shown in FIGS. 72 and 73, various configurations of bracket 294 may be provided as desired. The self-drilling, thread-forming fasteners 54, 56 may have a major diameter between about 0.19 inch (#10 fastener, ASME B1.1 Unified Inch Screw Thread Standard) to about 0.25 inch (¼ inch fastener, ASME B1.1 Unified Inch Screw Thread Standard). In the past, prior screws used to secure trusses failed by stripping out and not providing a secure clamp, and an extra amount of prior screws typically have been used to accommodate a regular amount of strip out failures. The present self-drilling, thread-forming fasteners 54, 56 provide a desired connection using between 25% and 60% fewer screws than in the past for the same load requirement. Alternatively, the connection may be secured using between 35% and 40% fewer screws than when using the prior screws. The reduction in number of fasteners may provide a significant savings in cost and time for installation.

Figure 74:
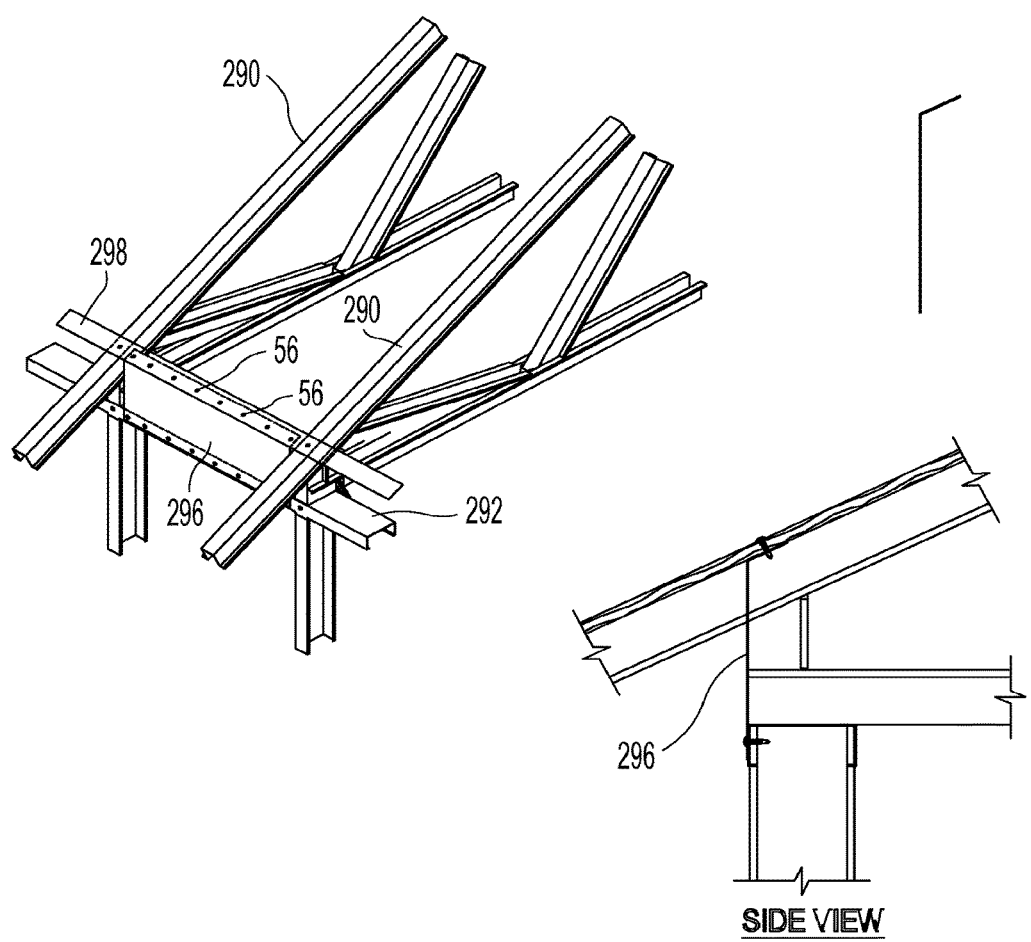
FIG. 74 is a partial perspective view of truss members secured to a support member with a blocking member installed.

FIG. 74 shows a blocking member 296 secured between truss member 290 providing a closure. A strap member 298 may be provided transverse to the truss member 290 positioned for securing a portion of the blocking member 296. The blocking member 296 may be secured between the strap and the support member 292 using a plurality of self-drilling, thread-forming fasteners 56 and/or self-drilling, thread-forming fasteners 54. The self-drilling, thread-forming fasteners 54, 56 may be installed through the blocking member 296 into the strap member 298, and through the blocking member 296 into the support member 292 as shown in FIG. 74. The self-drilling, thread-forming fasteners 54, 56 may have a major diameter between about 0.19 inch (#10 fastener) to about 0.25 inch (¼ inch fastener). As discussed above, the present self-drilling, thread-forming fasteners 54, 56 provide a desired connection using between 25% and 60% fewer screws than in the past for the same load requirement. Alternatively, the connection may be secured using between 35% and 40% fewer screws than when using the prior screws, providing a significant savings in cost and time for installation.

Figure 75:
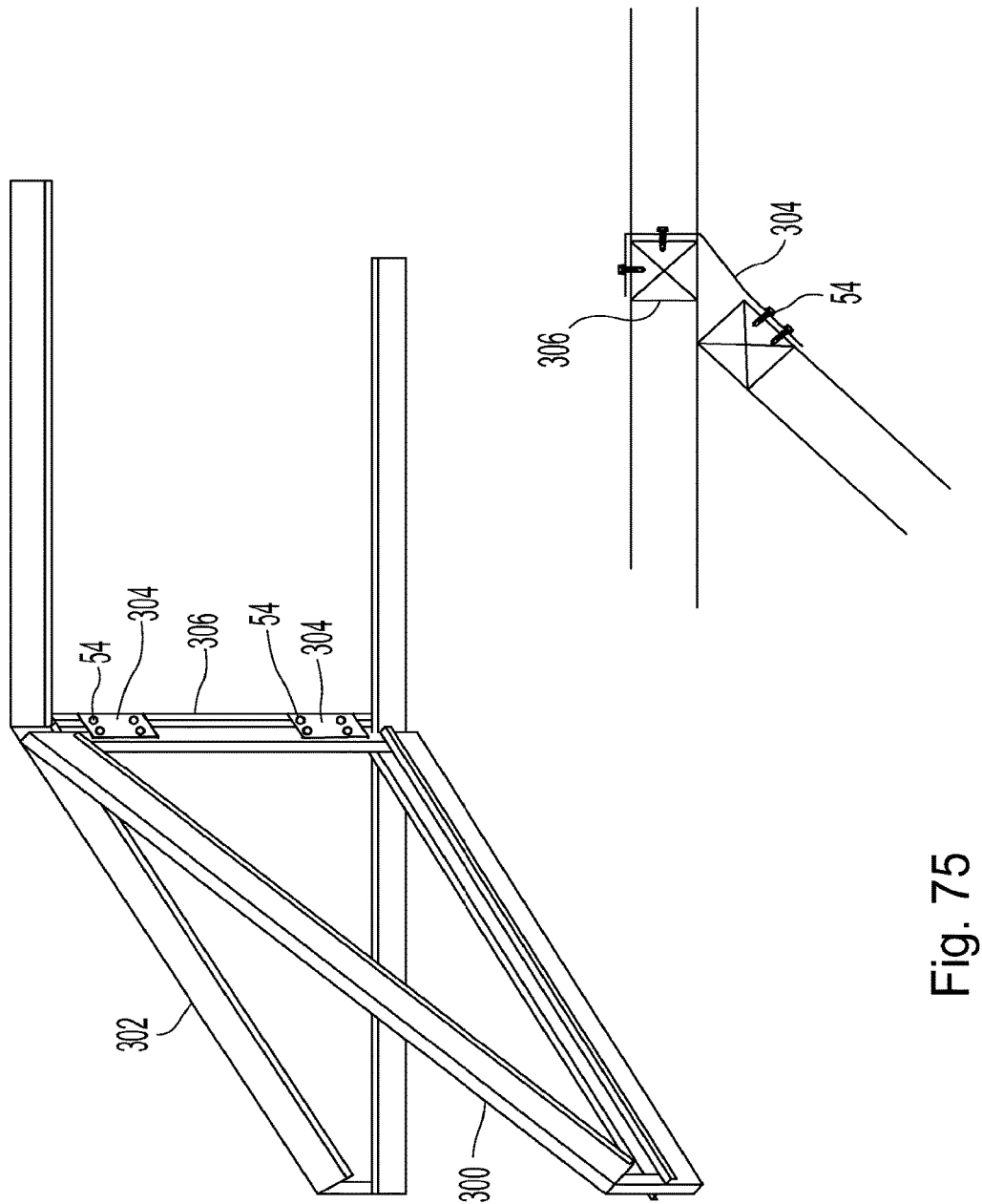
FIG. 75 is a partial perspective view of jack truss secured to a girder truss.

A corner jack 300 may be connected to a girder truss 302 using straps 304 and a plurality of self-drilling, thread-forming fasteners 54 and/or self-drilling, thread-forming fasteners 56 as shown in FIG. 75. The straps 304 may be provided around a vertical web 306, and self-drilling, thread-forming fasteners 54, 56 may be installed through the straps 304 into the vertical web 306 and through the straps 304 into the corner jack 300. The self-drilling, thread-forming fasteners 54, 56 may have a major diameter between about 0.19 inch (#10 fastener) to about 0.25 inch (¼ inch fastener). The present self-drilling, thread-forming fasteners 54, 56 provide a desired connection using between 25% and 60% fewer screws than in the past for the same load requirement. Alternatively, the connection may be secured using between 35% and 40% fewer screws than when using the prior screws, providing a significant savings in cost and time for installation.

Figure 76:
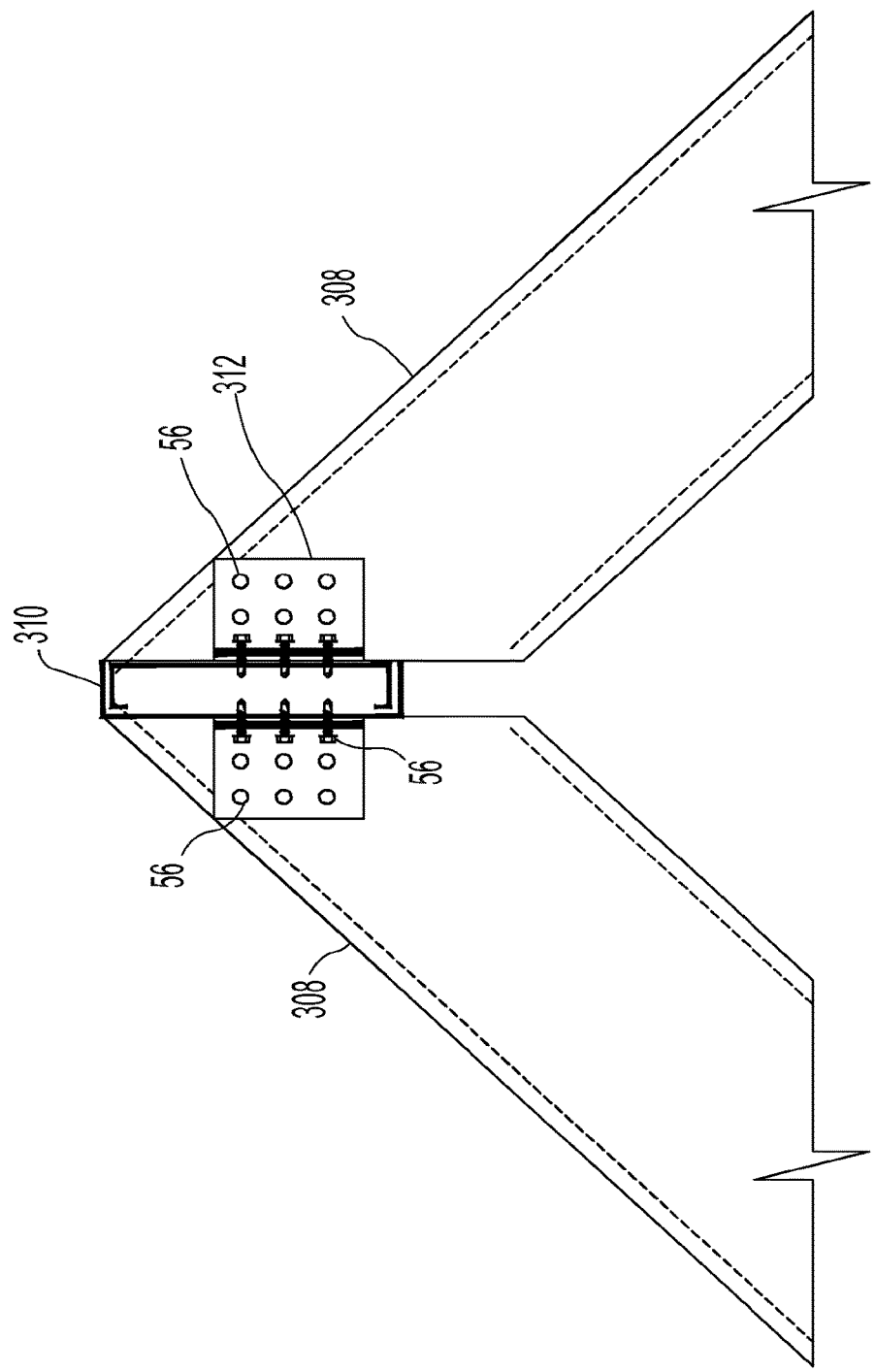
FIG. 76 is a partial sectional view of a ridge rafter and rafter connection.

A plurality of rafters 308 may be secured to a ridge rafter 310 using L-brackets 312 and a plurality of self-drilling, thread-forming fasteners 54 and/or self-drilling, thread-forming fasteners 56 as shown in FIG. 76. The self-drilling, thread-forming fasteners 54, 56 may be installed through the L-bracket 312 into a side of the rafter 308 and through the L-bracket 312 into the ridge rafter 310. The self-drilling, thread-forming fasteners 54, 56 may have a major diameter between about 0.19 inch (#10 fastener) to about 0.25 inch (¼ inch fastener). The present self-drilling, thread-forming fasteners 54, 56 provide a desired connection using between 25% and 60% fewer screws than in the past for the same load requirement. Alternatively, the connection may be secured using between 35% and 40% fewer screws than when using the prior screws, providing a significant savings in cost and time for installation.

Figure 77:
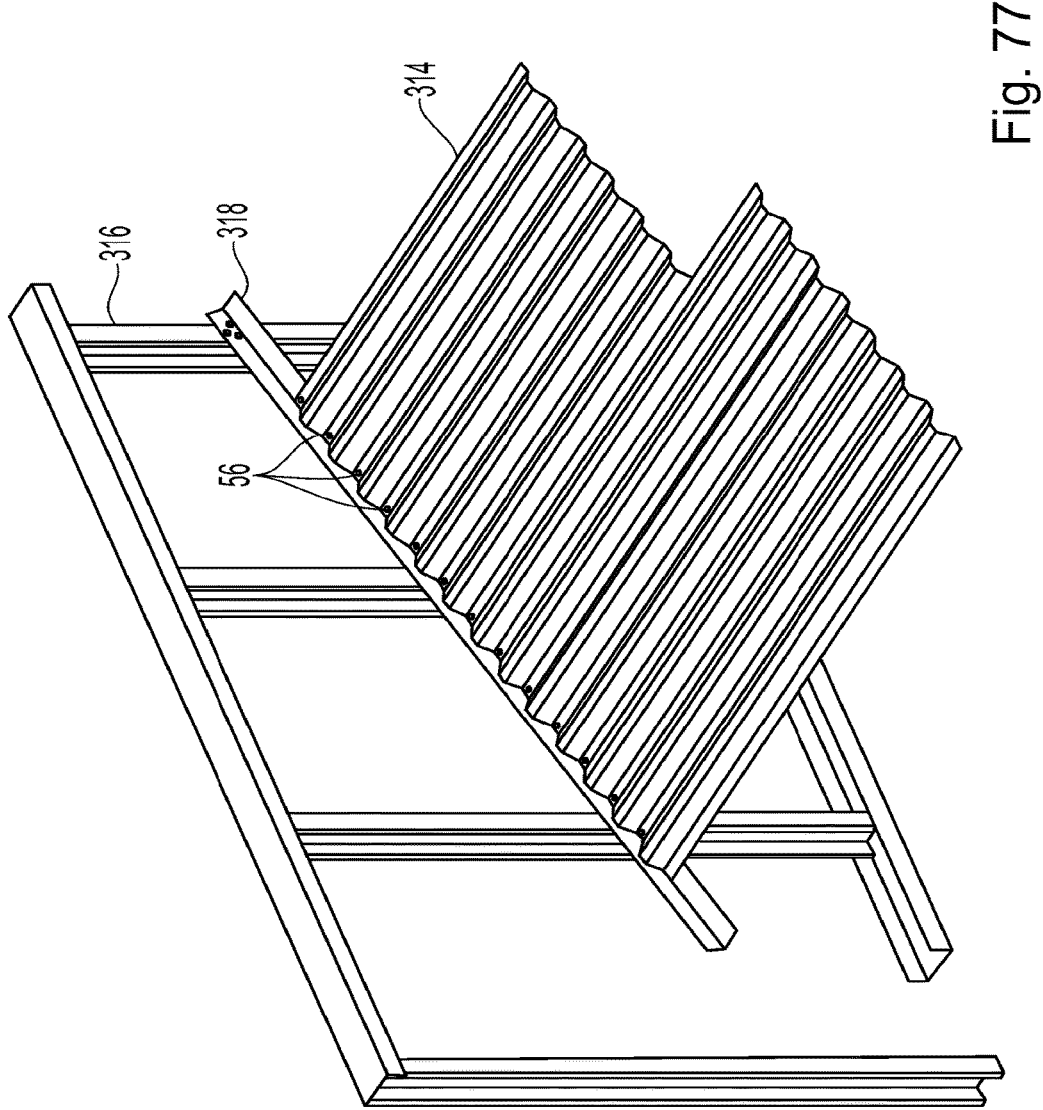
FIG. 77 is a partial perspective view of roof decking secured to a stud wall frame.

Roof decking 314 may be secured to a stud wall frame 316 as shown in FIG. 77 using a ledger angle 318 and a plurality of self-drilling, thread-forming fasteners 56 and/or self-drilling, thread-forming fasteners 54. The self-drilling, thread-forming fasteners 54, 56 may be installed through the ledger angle 318 into the stud wall frame 316 along the desired roof pitch. The roof decking 314 may be secured to the ledger angle 318 using self-drilling, thread-forming fasteners 54, 56. The self-drilling, thread-forming fasteners 54, 56 may have a major diameter between about 0.19 inch (#10 fastener) to about 0.25 inch (¼ inch fastener). The present self-drilling, thread-forming fasteners 54, 56 provide a desired connection using between 25% and 60% fewer screws than in the past for the same load requirement. Alternatively, the connection may be secured using between 35% and 40% fewer screws than when using the prior screws, providing a significant savings in cost and time for installation.

Figure 78:
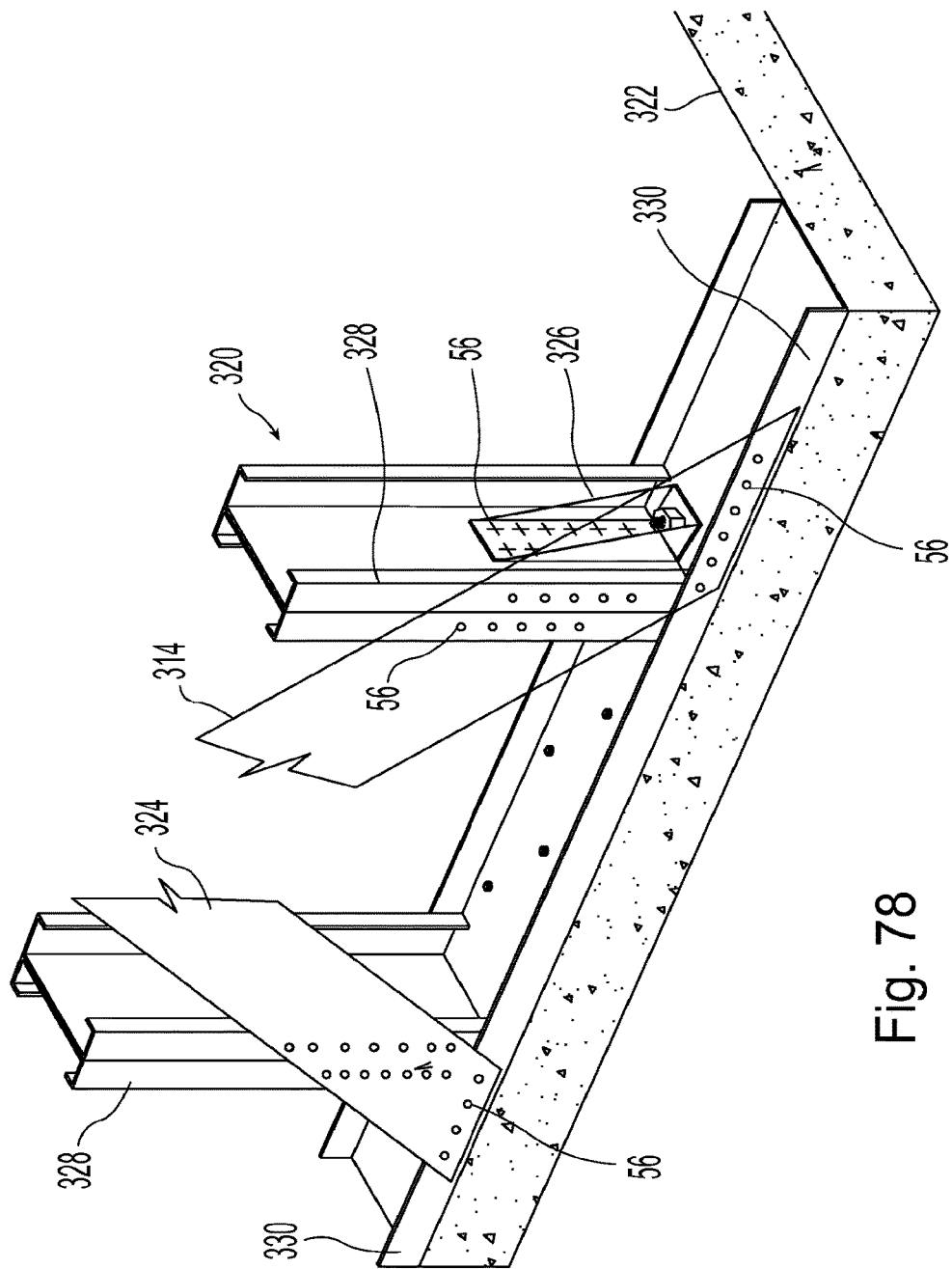
FIG. 78 is a partial perspective view of shear wall connection.
Figure 79:
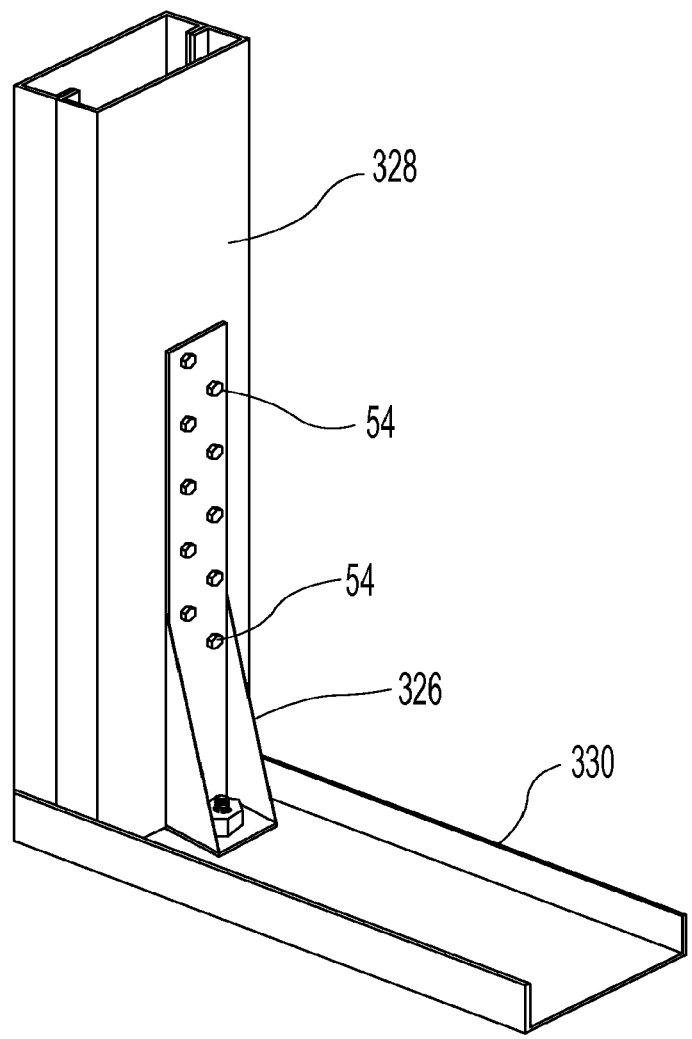
FIG. 79 is a partial perspective view showing a hold-down attachment.

FIG. 78 shows a stud wall frame 320 attached to a concrete slab 322 in a shear wall configuration. Diagonal straps 324 and a hold-down attachment 326 are secured to the stud wall frame 320. A plurality of self-drilling, thread-forming fasteners 56 and/or self-drilling, thread-forming fasteners 54 may be used to install the diagonal straps 324 to steel studs 328 and lower track 330 of the stud frame wall 320. The hold-down attachment 326 may be attached to the steel stud 328 using self-drilling, thread-forming fasteners 54, 56. As shown in FIGS. 78 and 79, various configurations of hold-down attachment 326 may be provided as desired. The self-drilling, thread-forming fasteners 54, 56 may have a major diameter between about 0.19 inch (#10 fastener) to about 0.25 inch (¼ inch fastener). As discussed above, the present self-drilling, thread-forming fasteners 54, 56 provide a desired connection using between 25% and 60% fewer screws than in the past for the same load requirement. Alternatively, the connection may be secured using between 35% and 40% fewer screws than when using the prior screws, providing a significant savings in cost and time for installation.

Figure 80:
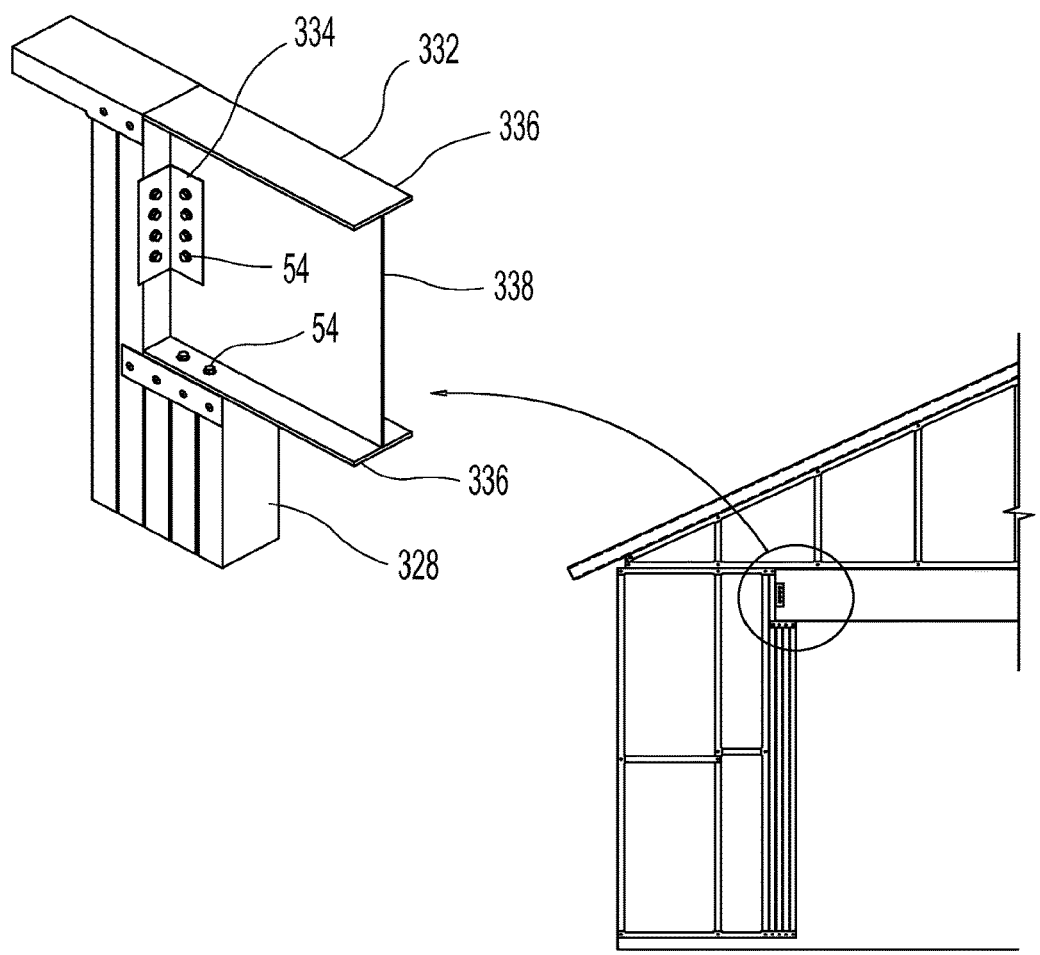
FIG. 80 is a partial perspective view of a connection of a header beam member.

A header beam member 332 may be secured to supporting studs 328 using an L-bracket 334 and a plurality of self-drilling, thread-forming fasteners 54 and/or self-drilling, thread-forming fasteners 56, such as shown in FIG. 80. The header beam member 332 may be an I-beam fabricated by welding top and bottom plates 336 to web member 338. The self-drilling, thread-forming fasteners 54, 56 may be installed through the L-bracket 334 into the web member 338 and through the L-bracket 334 into the adjacent stud 328. The self-drilling, thread-forming fasteners 54, 56 may be installed through the lower plate 336 into the adjacent stud 328. The self-drilling, thread-forming fasteners 54, 56 may have a major diameter between about 0.19 inch (#10 fastener) to about 0.25 inch (¼ inch fastener). The present self-drilling, thread-forming fasteners 54, 56 provide a desired connection using between 25% and 60% fewer screws than in the past for the same load requirement. Alternatively, the connection may be secured using between 35% and 40% fewer screws than when using the prior screws, providing a significant savings in cost and time for installation.

Figure 81:
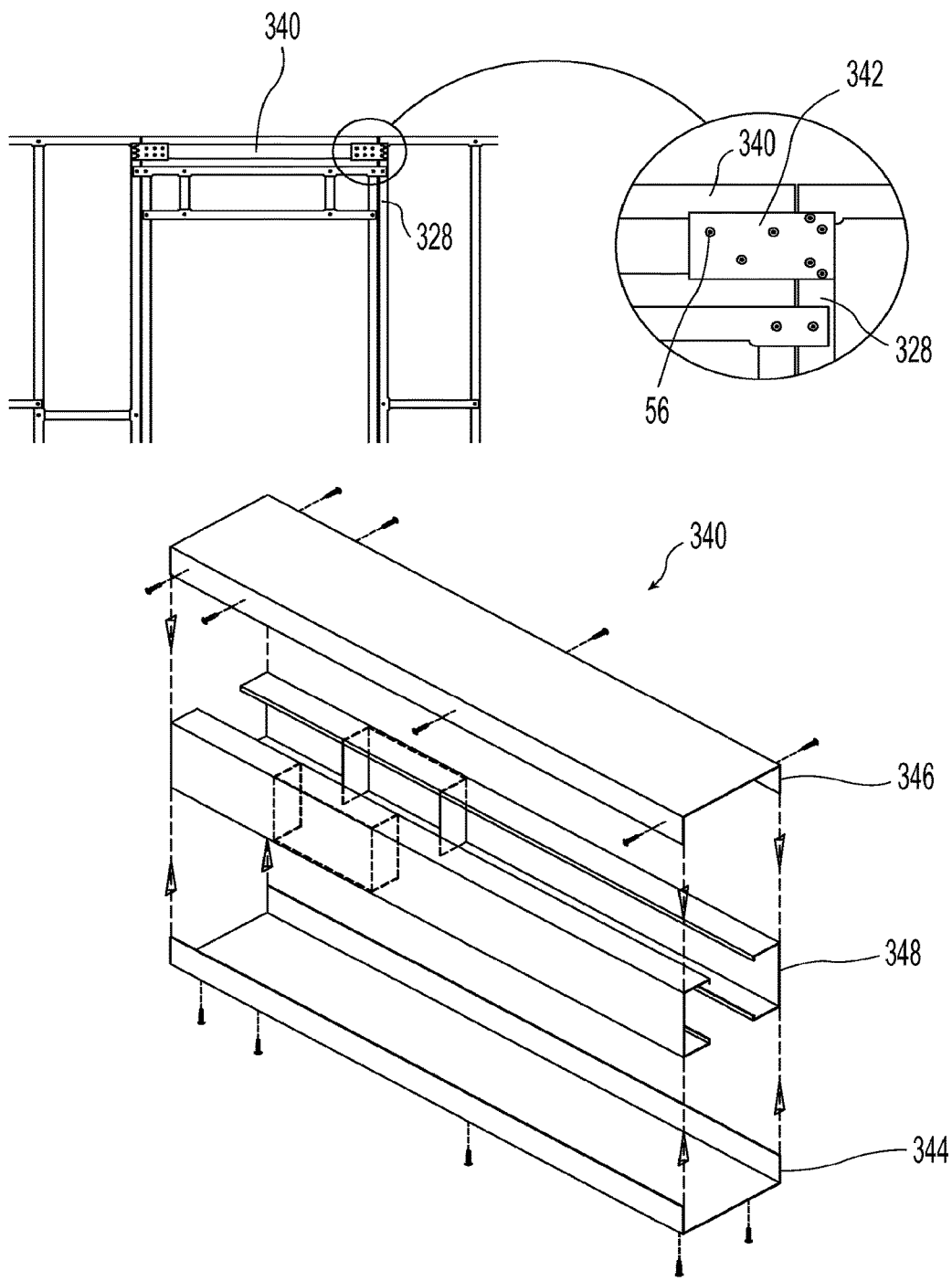
FIG. 81 is a partial perspective view of a connection of an alternate header beam member and exploded view of the header beam member.

As shown in FIG. 81, the header beam member may be a box header 340 secured to supporting studs 328 using a plate 342 and a plurality of self-drilling, thread-forming fasteners 54 and/or self-drilling, thread-forming fasteners 56. The box header 340 may include a bottom track 344 and a corresponding top track 346 and a plurality of steel studs 348 assembled in a box beam as shown in FIG. 81. The box header 340 may be secured to the supporting studs 328 by installing self-drilling, thread-forming fasteners 54, 56 through the plate 342 into the box header 340 and through the plate 342 into the adjacent stud 328. The self-drilling, thread-forming fasteners 54, 56 may have a major diameter between about 0.19 inch (#10 fastener) to about 0.25 inch (¼ inch fastener). The present self-drilling, thread-forming fasteners 54, 56 provide a desired connection using between 25% and 60% fewer screws than in the past for the same load requirement. Alternatively, the connection may be secured using between 35% and 40% fewer screws than when using the prior screws, providing a significant savings in cost and time for installation.

Figure 82:
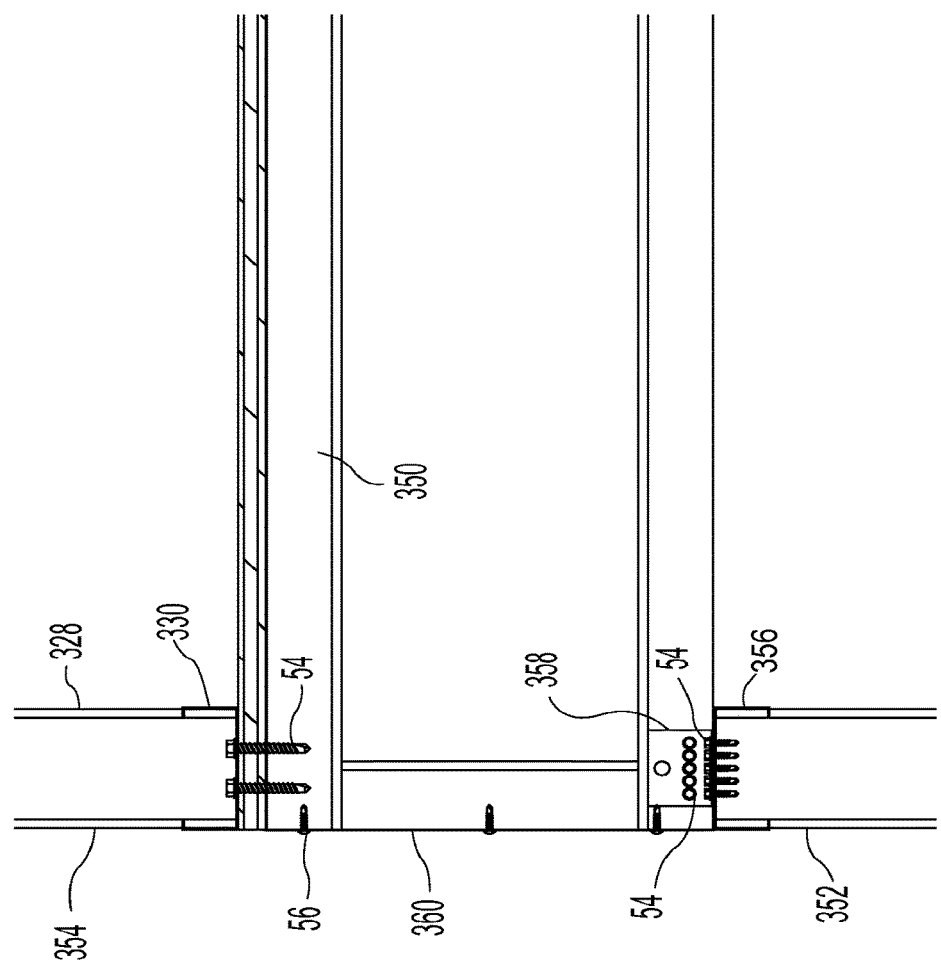
FIG. 82 is a partial sectional view of a outer wall and floor truss connection.

FIG. 82 is a partial section view through an outside wall viewing a floor truss 350. The floor truss 350 is supported at one end by lower wall 352. The floor truss 350 is secured to the lower wall 352 using L-bracket 358 and a plurality of self-drilling, thread-forming fasteners 54 and/or self-drilling, thread-forming fasteners 56. The self-drilling, thread-forming fasteners 54, 56 may be installed through the L-bracket 358 into the floor truss 350 and through the L-bracket 358 into a top track 356 of the lower wall 352. The floor truss 350 supports an upper wall 354. The upper wall 354 is secured to the floor truss 350 using self-drilling, thread-forming fasteners 54 through the lower track 330 of the upper wall 354 and into the floor truss 350. A lateral member 360 may be provided between adjacent floor trusses 350. Self-drilling, thread-forming fasteners 54, 56 may be installed through the lateral member 360 into the floor truss. The self-drilling, thread-forming fasteners 54, 56 may have a major diameter between about 0.19 inch (#10 fastener) to about 0.31 inch (⁵⁄₁₆ inch fastener). The present self-drilling, thread-forming fasteners 54, 56 provide a desired connection using between 25% and 60% fewer screws than in the past for the same load requirement. Alternatively, the connection may be secured using between 35% and 40% fewer screws than when using the prior screws, providing a significant savings in cost and time for installation.

Figure 83:
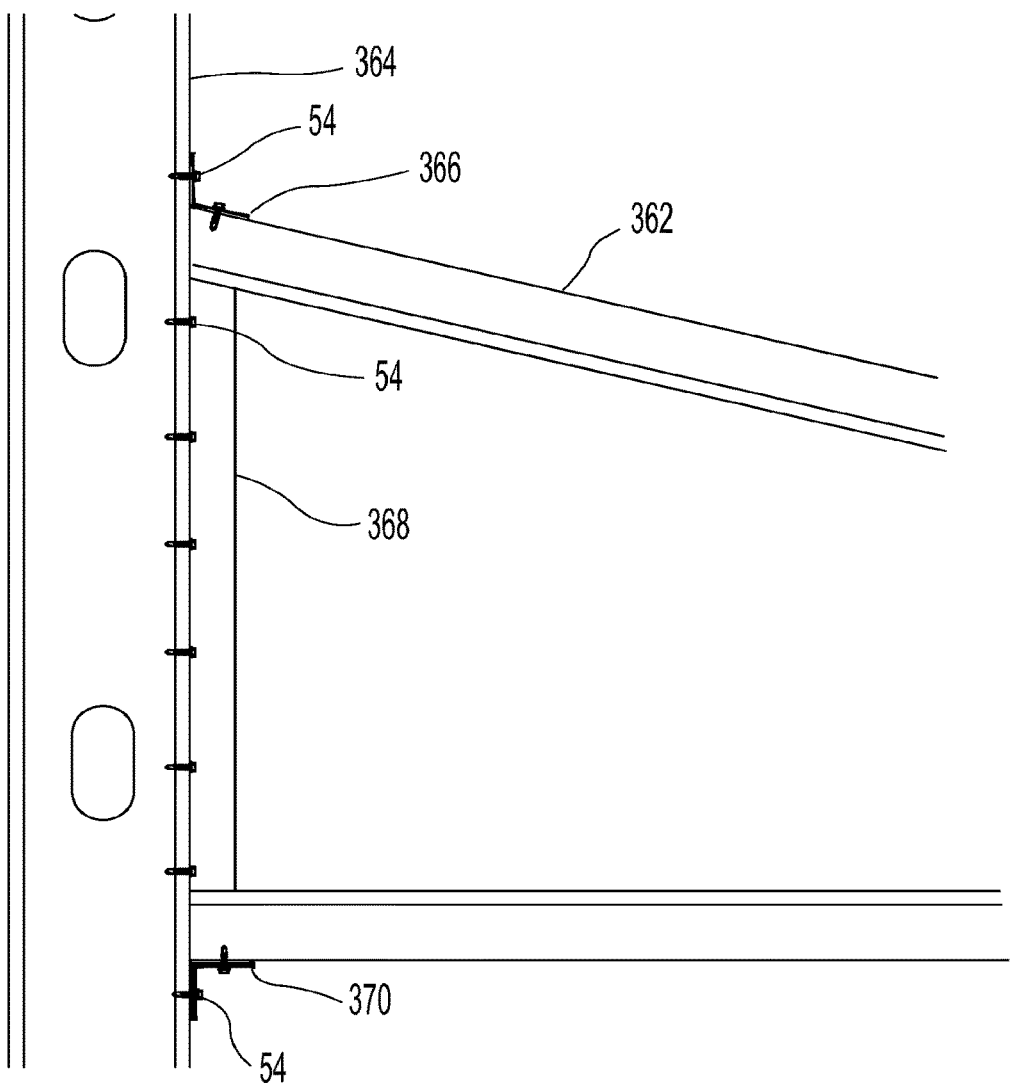
FIG. 83 is a partial side view of a truss member secured to a steel wall stud.

As shown in FIG. 83, a truss member 362 may be connected to a steel stud 364 using a plurality of self-drilling, thread-forming fasteners 54 and/or self-drilling, thread-forming fasteners 56. The self-drilling, thread-forming fasteners 54, 56 may be installed through a vertical member 368 of the truss member 362 into the steel stud 364. Additionally, an angle bracket 370 may be installed below the truss member 362, and optionally an angle bracket 366 may be installed above the truss member 362. Self-drilling, thread-forming fasteners 54, 56 may be installed through the angle brackets 366, 370 into the steel stud 364, and through the angle brackets 366, 370 into the truss member 362. The self-drilling, thread-forming fasteners 54, 56 may have a major diameter between about 0.19 inch (#10 fastener) to about 0.25 inch (¼ inch fastener). The present self-drilling, thread-forming fasteners 54, 56 provide a desired connection using between 25% and 60% fewer screws than in the past for the same load requirement. Alternatively, the connection may be secured using between 35% and 40% fewer screws than when using the prior screws, providing a significant savings in cost and time for installation.

Alternatively, the truss member 362 may be secured to a girder truss 372. As shown in FIG. 84, the truss member 362 may be secured to the girder truss 372 using L-brackets 374 and a plurality of self-drilling, thread-forming fasteners 54 and/or self-drilling, thread-forming fasteners 56. The self-drilling, thread-forming fasteners 54, 56 may be installed through the L-bracket 374 into the truss member 362 and through the L-bracket 374 into the girder truss 372. The self-drilling, thread-forming fasteners 54, 56 may have a major diameter between about 0.19 inch (#10 fastener) to about 0.25 inch (¼ inch fastener). The present self-drilling, thread-forming fasteners 54, 56 provide a desired connection using between 25% and 60% fewer screws than in the past for the same load requirement. Alternatively, the connection may be secured using between 35% and 40% fewer screws than when using the prior screws, providing a significant savings in cost and time for installation.

Disclosed is a method of connecting a plurality of members in a building connection including the steps of providing a first member having a first mounting surface and a second mounting surface opposite the first mounting surface and a first member thickness there between, providing at least one fastener having a thread-forming portion and a threaded portion, positioning a second member having a first aperture adjacent the first mounting surface, installing the fastener through the first aperture and forming threads in a fastener opening through the first member thickness connecting the second member to the first member with the thread-forming portion extending through the second mounting surface, positioning a third member having a second aperture larger than the major diameter of the threaded portion adjacent the second mounting surface such that the second aperture is positioned over the threaded portion, and installing a nut over the threaded portion to connect the third member to the first member.

While the invention has been described with reference to certain embodiments it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments falling within the scope of the appended claims.

What is claimed is:

1. A fastener comprising:
a head,
a threaded portion adjacent the head,
a thread-forming portion of at least HRC 50 hardness adjacent the threaded portion, and
a fluted lead portion of at least HRC 50 hardness adjacent the thread-forming portion with a nominal diameter in a range from 60% to 95% of major diameter of the threaded portion adapted to form a fastener opening,
the thread-forming portion having a series of lobes with recesses between said lobes and said lobes positioned about the rotational axis where each lobe having a lead portion and a tailing portion, the lead portion and first adjacent recess is at a first angle in a range from 50° to 100° from a plane tangent to the lobe adjacent the leading portion, and the tailing portion and second adjacent recess is at a second angle in a range from 25° to 50° from a plane tangent to the lobe adjacent the tailing portion, where the first angle is greater than the second angle.

2. The fastener of claim 1 where the head is capable of clamping a first steel building member to a second steel building member with the fastener installed and the series of lobes are structured having a ratio of strip torque to thread-forming torque of at least 3.0 and a ratio of strip torque to drive torque greater than 8.0 over a range of combined thickness of the first and the second steel building members from about 0.036 inch to 0.084 inch.

3. The fastener of claim 1 where the head is capable of clamping a first steel building member to a second steel building member with the fastener installed and the thread forming portion having a ratio of strip torque to thread-forming torque of at least 3.0 and a ratio of strip torque to drive torque greater than 6.0 over a range of combined thickness of the first and the second steel building members from about 0.036 inch to 0.108 inch.

4. The fastener of claim 1, where the threaded portion adjacent the head has a through hardness in a range from HRB 70 and HRC 40.

5. The fastener claimed in claim 4, where the fasteners have up to five threads between the threaded portion and the thread-forming portion hardened to at least HRC 50 hardness.

6. The fastener claimed in claim 1, where the fasteners are nutable.

7. The fastener claimed in claim 1, where the head is capable of clamping a first steel building member to a second steel building member with the fastener installed and the thread forming portion and a combined thickness of the first steel building member and the second steel building member at the fastener is no more than 0.125 inch in thickness.

8. The fastener claimed in claim 1, where the fluted lead portion has a nominal diameter in a range from 62% to 85% of major diameter.

9. The fastener claimed in claim 1, where the thread-forming portion has a shape selected from a group consisting of quadlobular and pentalobular.

10. The fastener claimed in claim 1, where the lead portion of the fluted lead portion has a milled point.

11. The fastener claimed in claim 1, where the fluted lead portion has at least HRC 50 induction hardness.

12. The fastener claimed in claim 1, where the threaded portion has less than 60° thread angle and back-tapered threads.

13. The fastener claimed in claim 1, where the threaded portion has from 45 to 50° thread angle and back-tapered threads.

14. The fastener claimed in claim 1, where the thread-forming portion is from 3 to 7 thread pitch in length.

15. The fastener claimed in claim 1, the threaded portion comprising a major diameter extending to within 1.5 of the thread pitch of the head.

16. The fastener claimed in claim 15, where the head of the fasteners are undercut and adapted to deform the first steel building member on tightening of the fasteners.

17. The fastener claimed in claim 1, where a sealing member is positioned between the head and the threaded portion.

18. The fastener claimed in claim 1, where serrations are provided in the underside of the head.

19. The fastener claimed in claim 1 where the head is capable of clamping a first steel member to a second steel building member with the fastener installed and the series of lobes are structured having a ratio of strip torque to tread-forming torque of at least 3.0 and a ratio of strip torque to drive torque is greater than 6.0 over a range of combined thickness of first and second steel building members from about 0.036 inch to 0.084 inch.

20. The fastener claimed in claim 1 where the head is capable of clamping a first steel member to a second steel building member with the fastener installed and the series of lobes are structured having a ratio of strip torque to tread-forming torque of at least 4.0 and a ratio of strip torque to drive torque is greater than 8.0 over a range of combined thickness of first and second steel building members from about 0.036 inch to 0.084 inch.

21. The fastener claimed in claim 1 where the head is capable of clamping a first steel member to a second steel building member with the fastener installed and the series of lobes are structured having a ratio of strip torque to tread-forming torque of at least 4.0 and a ratio of strip torque to drive torque is greater than 10.0 over a range of combined thickness of first and second steel building members from about 0.036 inch to 0.084 inch.

22. The fastener claimed in claim 1 where the head is capable of clamping a first steel member to a second steel building member with the fastener installed and the series of lobes are structured having a ratio of strip torque to tread-forming torque of at least 3.5 and a ratio of strip torque to drive torque is greater than 6.0 over a range of combined thickness of first and second steel building members from about 0.036 inch to 0.084 inch.

23. The fastener claimed in claim 1 where the head is capable of clamping a first steel member to a second steel building member with the fastener installed and the series of lobes are structured having a ratio of strip torque to tread-forming torque of at least 3.0 and a ratio of strip torque to drive torque is greater than 4.0 over a range of combined thickness of first and second steel building members from about 0.036 inch to 0.108 inch.

* * * * *